(12) United States Patent
Cirik et al.

(10) Patent No.: US 12,489,511 B2
(45) Date of Patent: Dec. 2, 2025

(54) BEAM FAILURE RECOVERY CONTROL

(71) Applicant: Comcast Cable Communications, LLC, Philadelphia, PA (US)

(72) Inventors: Ali Cagatay Cirik, Herndon, VA (US); Yunjung Yi, Vienna, VA (US); Esmael Hejazi Dinan, McLean, VA (US); Hua Zhou, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 728 days.

(21) Appl. No.: 17/574,179

(22) Filed: Jan. 12, 2022

(65) Prior Publication Data

US 2022/0225135 A1 Jul. 14, 2022

Related U.S. Application Data

(60) Provisional application No. 63/136,441, filed on Jan. 12, 2021.

(51) Int. Cl.
*H04B 7/06* (2006.01)
*H04L 5/00* (2006.01)
(Continued)

(52) U.S. Cl.
CPC ....... *H04B 7/06964* (2023.05); *H04L 5/0048* (2013.01); *H04W 24/08* (2013.01); *H04W 72/046* (2013.01)

(58) Field of Classification Search
CPC ... H04W 24/08; H04W 72/046; H04W 76/19; H04L 5/0048; H04L 5/001; H04L 5/0026;
(Continued)

(56) References Cited

U.S. PATENT DOCUMENTS

2019/0319833 A1* 10/2019 Nagaraja ............... H04L 5/0053
2020/0100311 A1* 3/2020 Cirik .................... H04B 7/0695
(Continued)

FOREIGN PATENT DOCUMENTS

| EP | 3982674 A1 | 4/2022 |
| WO | 2020246014 A1 | 12/2020 |
| WO | 2021107575 A1 | 6/2021 |

OTHER PUBLICATIONS

R1-2009761 3GPP TSG-RAN WG1 Meeting #103-e, e-Meeting, Oct. 26-Nov. 13, 2020, Source: Moderator (Qualcomm), Title: Summary #2 of email discussions [103-e-NR-feMIMO-02] for mTRP PDCCH enhancements.
(Continued)

*Primary Examiner* — Ivan O Latorre
(74) *Attorney, Agent, or Firm* — Banner & Witcoff, Ltd.

(57) ABSTRACT

A plurality of resource sets may be used and controlled in wireless communications. Based on a beam failure associated with a first subset (e.g., at least one first beam resource set) of a plurality of beam resource sets, a candidate reference signal may be used for communications between a base station and a wireless device. At least one parameter associated with a second subset (e.g., at least one second beam resource set) of the plurality of beam resource sets may be maintained, and the candidate reference signal may not be used for communications associated with the second subset of the plurality of beam resource sets.

18 Claims, 30 Drawing Sheets

(51) Int. Cl.
*H04W 24/08* (2009.01)
*H04W 72/044* (2023.01)

(58) Field of Classification Search
CPC ............. H04L 27/26025; H04L 27/261; H04L 5/0023; H04L 5/0053; H04L 5/0091; H04L 5/14; H04B 7/06964
See application file for complete search history.

(56) References Cited

U.S. PATENT DOCUMENTS

| | | | |
|---|---|---|---|
| 2020/0373991 A1 | 11/2020 | Zhou et al. | |
| 2021/0105765 A1 | 4/2021 | Cirik et al. | |
| 2021/0153040 A1* | 5/2021 | Zhou .................... | H04L 5/0096 |
| 2021/0351834 A1 | 11/2021 | Yang et al. | |
| 2022/0086658 A1* | 3/2022 | Zhang .................. | H04L 5/0051 |
| 2022/0124860 A1* | 4/2022 | Guo ..................... | H04W 72/02 |
| 2022/0225135 A1* | 7/2022 | Cirik ................... | H04W 72/046 |
| 2023/0144010 A1* | 5/2023 | Kwak ................... | H04L 5/0051 370/329 |
| 2023/0209375 A1* | 6/2023 | Zhang .................. | H04B 7/0695 370/242 |
| 2023/0247707 A1* | 8/2023 | Chen .................... | H04W 76/19 |
| 2023/0284052 A1* | 9/2023 | Jia ....................... | H04W 24/10 370/225 |
| 2023/0328830 A1* | 10/2023 | Yi ........................ | H04W 76/19 370/329 |
| 2023/0337242 A1* | 10/2023 | Cirik ................... | H04W 52/146 |
| 2024/0080147 A1* | 3/2024 | Li ........................ | H04B 7/06952 |
| 2024/0098531 A1* | 3/2024 | Gao ..................... | H04B 7/0695 |
| 2024/0129772 A1* | 4/2024 | Laddu .................. | H04B 7/022 |
| 2024/0178963 A1* | 5/2024 | Gao ..................... | H04B 7/06964 |
| 2024/0275467 A1* | 8/2024 | Jang .................... | H04B 7/0695 |
| 2024/0430969 A1* | 12/2024 | Gao ..................... | H04W 16/28 |

OTHER PUBLICATIONS

R1-2009683 3GPP TSG-RAN WG1 Meeting #103-e, e-Meeting, Oct. 26-Nov. 13, 2020, Source: Moderator (Qualcomm), Title: Summary of email discussions [103-e-NR-feMIMO-02] for mTRP PDCCH enhancements.
R1-2009480 3GPP TSG RAN WG1 Meeting #103, e-Meeting, Oct. 26-Nov. 13, 2020, Source: Moderator (Nokia, Nokia Shanghai Bell), Title: Summary of Multi-TRP URLLC for PUCCH and PUSCH.
R1-2009251 3GPP TSG-RAN WG1 Meeting #103-e, e-Meeting, Oct. 26-Nov. 13, 2020, Source: Qualcomm Incorporated, Title: Enhancements on Multi-TRP for PDCCH, PUCCH and PUSCH.
R1-2009223 3GPP TSG-RAN WG1 Meeting #103, eMeeting, Oct. 26-Nov. 13, 2020, Source: Ericsson, Title: On PDCCH, PUCCH and PUSCH enhancements with multiple TRPs.
R1-2009175 3GPP TSG RAN WG1 Meeting #103-e, e-Meeting, Oct. 26-Nov. 13, 2020, Source: NTT DOCOMO, Inc, Title: Discussion on MTRP for reliability.
R1-2009159 3GPP TSG-RAN WG1#103-e, e-Meeting, Oct. 26-Nov. 13, 2020, Source: Convida Wireless, Title: Multi-TRP Enhancements for PDCCH, PUCCH and PUSCH.
R1-2009142 3GPP TSG RAN WG1 #103-e, e-Meeting, Oct. 26-Nov. 13, 2020, Source: Spreadtrum Communications, Title: Discussion on enhancements on Multi-TRP for PDCCH, PUCCH and PUSCH.
R1-2009130 3GPP TSG RAN WG1 #103-e, e-Meeting, Oct. 26-Nov. 13, 2020, Source: Sharp, Title: Enhancements on multi-TRP for PUSCH.
R1-2009054 3GPP TSG-RAN WG1 #103-e, e-Meeting, Oct. 26-Nov. 13, 2020, Source: Asia Pacific Telecom, Title: Discussion on enhancements on multi-TRP for uplink channels.
R1-2009028 3GPP TSG RAN WG1 #103-e, e-Meeting, Oct. 26-Nov. 13, 2020, Source: Xiaomi, Title: Enhancements on Multi-TRP for PDCCH, PUCCH and PUSCH.
R1-2008978 3GPP TSG RAN WG1 #103-e, e-Meeting, Oct. 26-Nov. 13, 2020, Source: Intel Corporation, Title: Multi-TRP enhancements for PDCCH, PUCCH and PUSCH.

R1-2008958 3GPP TSG RAN WG1 #103-e, e-Meeting, Oct. 26-Nov. 13, 2020, Source: MediaTek Inc., Title: Enhancements on Multi-TRP for PDCCH, PUSCH and PUCCH.
R1-2008944 3GPP TSG RAN WG1 #103-e, e-Meeting, Oct. 26-Nov. 13, 2020, Source: NEC, Title: Discussion on multi-TRP for PDCCH, PUCCH and PUSCH.
R1-2008911 3GPP TSG RAN WG1 #103-e, e-Meeting, Oct. 26-Nov. 13, 2020, Source: Lenovo, Motorola Mobility, Title: Enhancements on Multi-TRP for PDCCH, PUCCH and PUSCH.
R1-2008904 3GPP TSG RAN WG1 #103 Meeting, e-Meeting, Oct. 26-Nov. 13, 2020, Source: Nokia, Nokia Shanghai Bell, Title: Enhancements for Multi-TRP URLLC schemes.
R1-2008898 3GPP TSG RAN WG1 #103-e, E-meeting, Nov. 2-13, 2020, Source: Fraunhofer IIS, Fraunhofer HHI, Title: On multi-TRP enhancements for PDCCH and PUSCH.
R1-2008574 3GPP TSG RAN WG1 #103-e, e-Meeting, Oct. 26-Nov. 13, 2020, Source: LG Electronics, Title: Enhancements on Multi-TRP for PDCCH, PUCCH and PUSCH.
R1-2008439 3GPP TSG-RAN WG1 #103-e, e-Meeting, Oct. 26-Nov. 13, 2020, Source: Apple Inc., Title: On Multi-TRP Reliability Enhancement.
R1-2008347 3GPP TSG RAN WG1 #103-e, e-Meeting, Oct. 26-Nov. 28, 2020, Source: Sony, Title: Considerations on Multi-TRP for PDCCH, PUCCH, PUSCH.
R1-2008218 3GPP TSG RAN WG1 #103-e, e-Meeting, Oct. 26-Nov. 13, 2020, Source: OPPO, Title: Enhancements on multi-TRP for PDCCH, PUCCH and PUSCH.
R1-2008149 3GPP TSG RAN WG1 #103-e, e-Meeting, Oct. 26-Nov. 13, 2020, Source: Samsung, Title: Enhancements on Multi-TRP for PDCCH, PUCCH and PUSCH.
R1-2008001 3GPP TSG RAN WG1 #103-e, e-Meeting, Oct. 26-Nov. 13, 2020, Source: CMCC, Title: Enhancements on Multi-TRP for PDCCH, PUCCH and PUSCH.
R1-2007825 3GPP TSG RAN WG1 Meeting #103-e, e-Meeting, Oct. 26-Nov. 13, 2020, Source: CATT, Title: Discussion on enhancements on multi-TRP/panel for PDCCH, PUCCH and PUSCH.
R1-2007793 3GPP TSG RAN WG1 Meeting #103-e, E-meeting, Oct. 26-Nov. 13, 2020, Source: TCL communication, Title: Enhancements on Multi-TRP for PDCCH, PUCCH and PUSCH.
R1-2007783 3GPP TSG RAN WG1 #103-e, e-Meeting, Oct. 26-Nov. 13, 2020, Source: Fujitsu, Title: Enhancements on Multi-TRP for PDCCH, PUCCH and PUSCH.
R1-2007764 3GPP TSG RAN WG1 Meeting #103-e, e-Meeting, Oct. 26-Nov. 13, 2020, Source: ZTE, Title: Multi-TRP enhancements for PDCCH, PUCCH and PUSCH.
R1-2007645 3GPP TSG RAN WG1 #103-e, e-Meeting, Oct. 26-Nov. 13, 2020, Source: vivo, Title: Further discussion on enhancement of MTRP operation.
R1-2007627 3GPP TSG RAN WG1 #103-e, e-Meeting, Oct. 26-Nov. 13, 2020, Source: InterDigital, Inc., Title: Reliability Enhancements for PDCCH, PUCCH, and PUSCH.
R1-2007587 3GPP TSG RAN WG1 Meeting #103-e, E-meeting, Oct. 26-Nov. 13, 2020, Source: Huawei, HiSilicon, Title: Enhancements on multi-TRP for reliability and robustness in Rel-17.
R1-2007540 3GPP TSG RAN WG1 #103-e, e-Meeting, Oct. 26-Nov. 13, 2020, Source: FUTUREWEI, Title: Multi-TRP/panel for non-PDSCH.
3GPP TS 38.331 V16.2.0 (Sep. 2020) 3rd Generation Partnership Project; Technical Specification Group Radio Access Network; NR; Radio Resource Control (RRC) protocol specification (Release 16).
3GPP TS 38.321 V16.2.1 (Sep. 2020) 3rd Generation Partnership Project; Technical Specification Group Radio Access Network; NR; Medium Access Control (MAC) protocol specification (Release 16).
3GPP TS 38.300 V16.3.0 (Sep. 2020) 3rd Generation Partnership Project; Technical Specification Group Radio Access Network; NR; NR and NG-RAN Overall Description; Stage 2 (Release 16).
3GPP TS 38.214 V16.3.0 (Sep. 2020) 3rd Generation Partnership Project; Technical Specification Group Radio Access Network; NR; Physical layer procedures for data (Release 16).
3GPP TS 38.213 V16.3.0 (Sep. 2020) 3rd Generation Partnership Project; Technical Specification Group Radio Access Network; NR; Physical layer procedures for control (Release 16).

(56) References Cited

OTHER PUBLICATIONS

3GPP TS 38.212 V16.3.0 (Sep. 2020) 3rd Generation Partnership Project; Technical Specification Group Radio Access Network; NR; Multiplexing and channel coding (Release 16).
3GPP TS 38.211 V16.3.0 (Sep. 2020), Technical Specification, 3rd Generation Partnership Project; Technical Specification Group Radio Access Network; NR; Physical channels and modulation (Release 16).
3GPP TSG RAN WG1 Meeting #103-e R1-2009500, e-Meeting, Oct. 26-Nov. 13, 2020, Source: Moderator (CATT), Title: Summary on beam management for simultaneous multi-TRP transmission with multiple Rx panels.
3GPP TSG RAN WG1 Meeting #103-e R1-2009177, e-Meeting, Oct. 26-Nov. 13, 2020, Source: NTT DOCOMO, Inc, Title: Discussion on beam management for MTRP.
Jun. 9, 2022—EP Search Report—EP App. No. 22151186.8.

\* cited by examiner

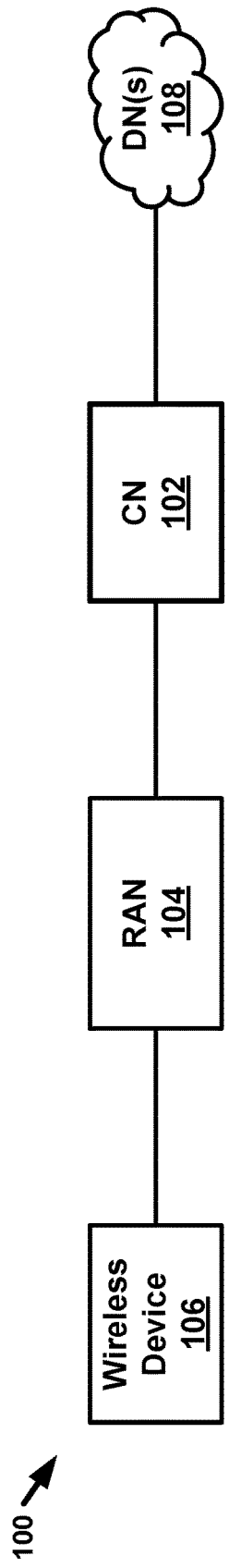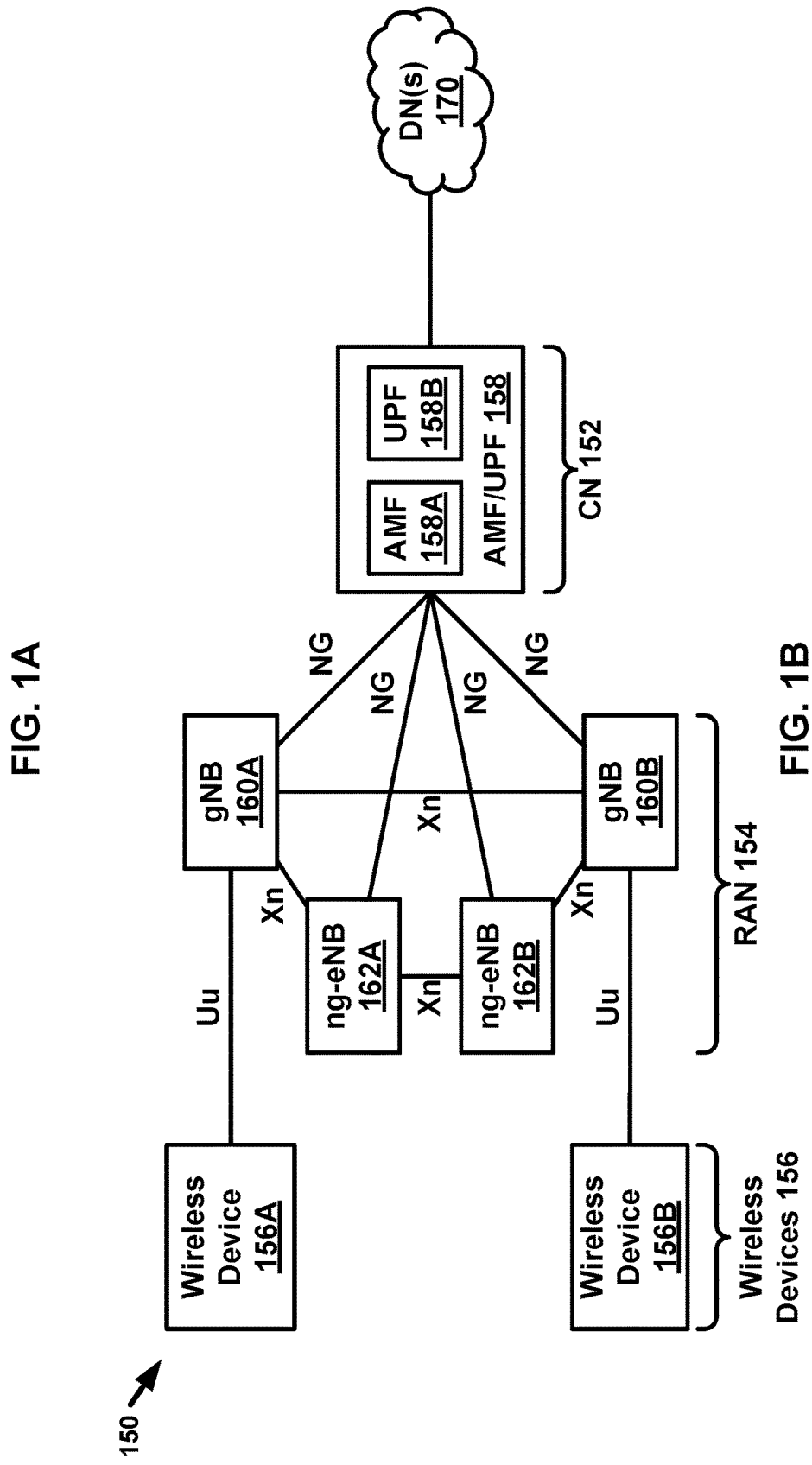
FIG. 1A
FIG. 1B

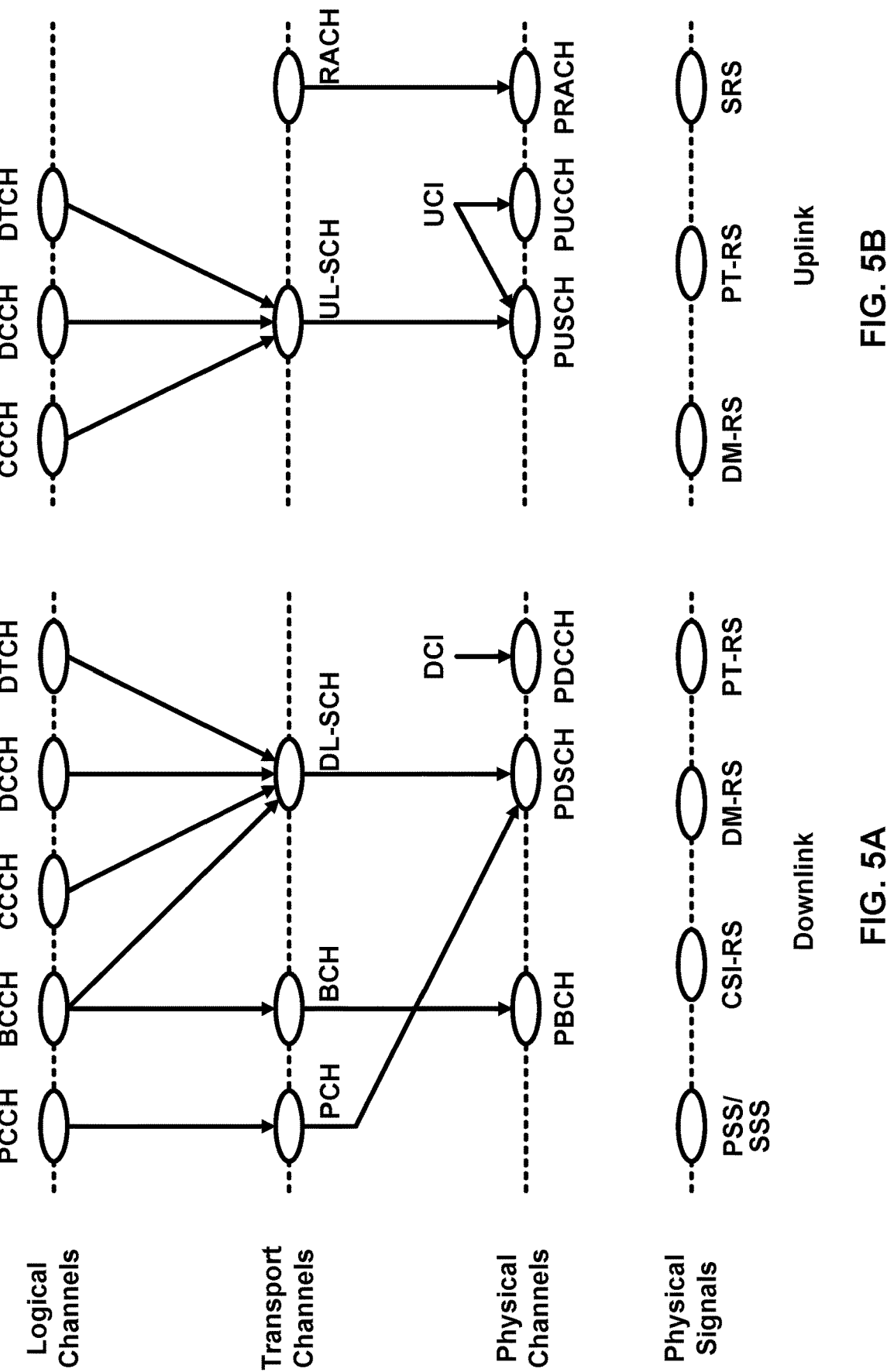

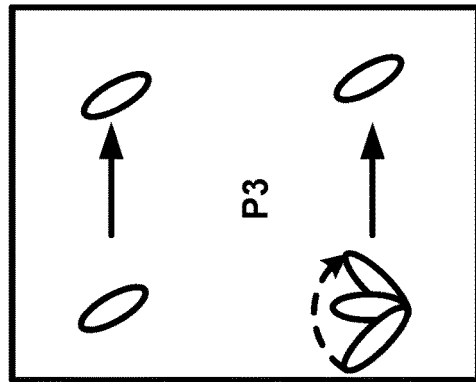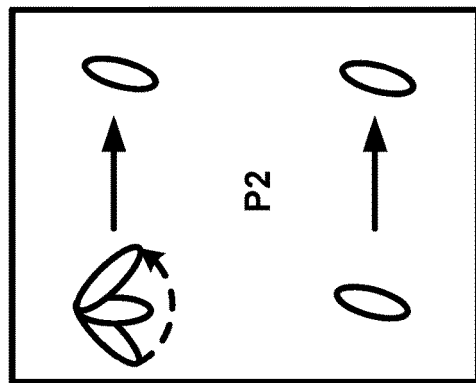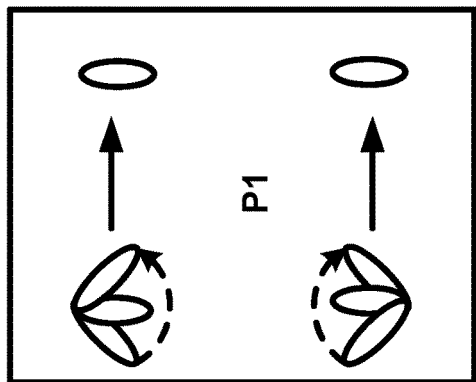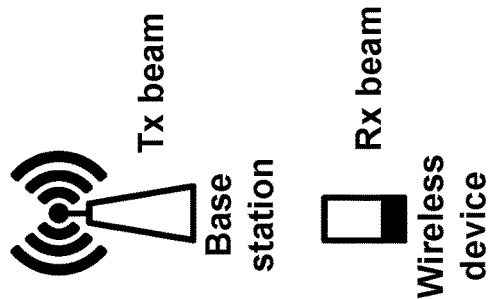
FIG. 12A
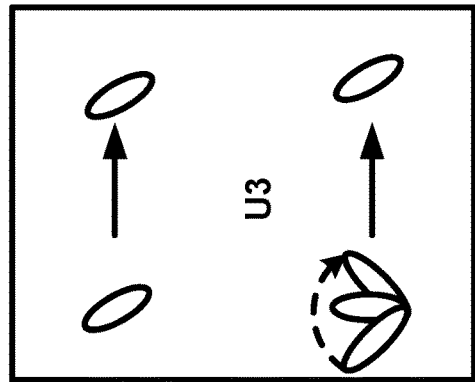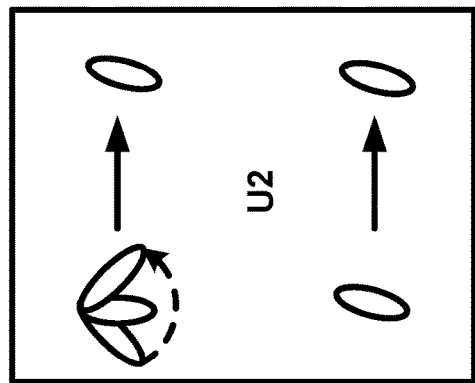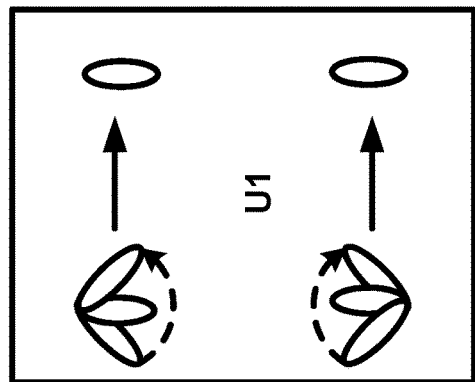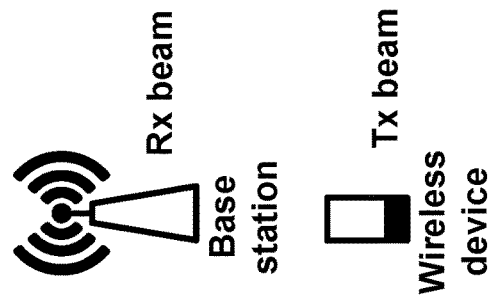
FIG. 12B

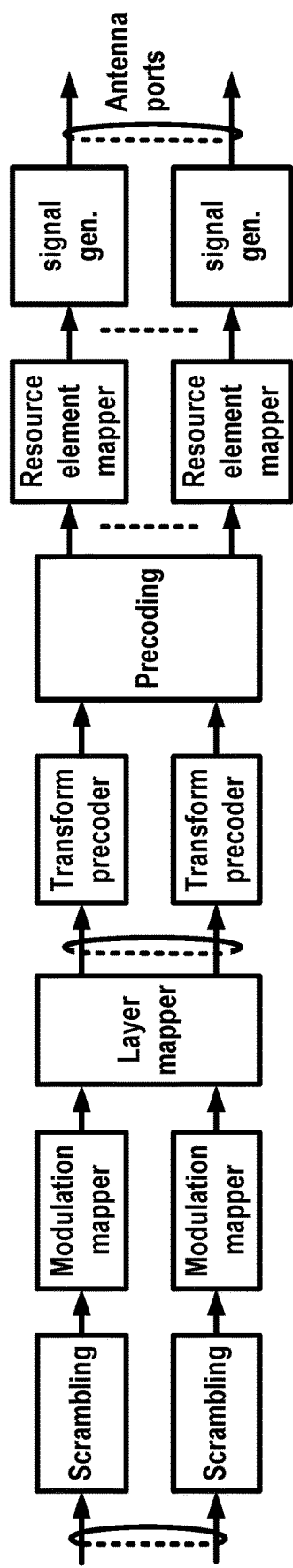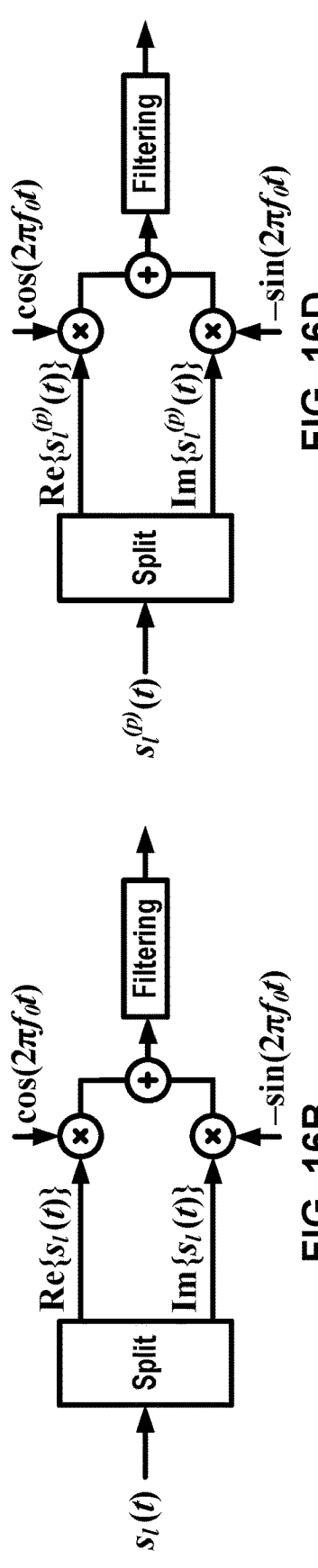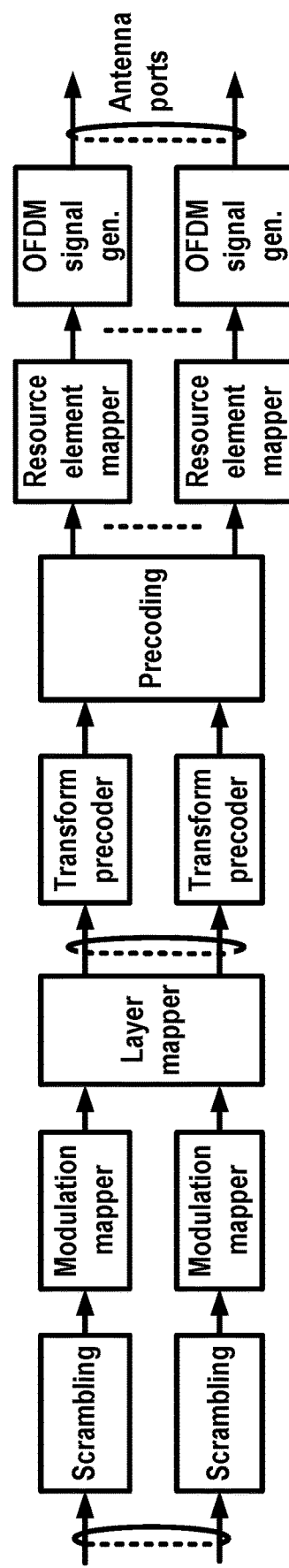
FIG. 16A
FIG. 16B
FIG. 16C
FIG. 16D

```
ControlResourceSet ::=           SEQUENCE {
    controlResourceSetId              ControlResourceSetId,
    frequencyDomainResources          BIT STRING (SIZE (45)),
    duration                          INTEGER (1..maxCoReSetDuration),
    cce-REG-MappingType CHOICE {
        interleaved          SEQUENCE {
            reg-BundleSize           ENUMERATED {n2, n3, n6},
            interleaverSize          ENUMERATED {n2, n3, n6},
            shiftIndex               INTEGER(0..maxNrofPhysicalResourceBlocks-1)
        },
        nonInterleaved           NULL
    },
    precoderGranularity               ENUMERATED {sameAsREG-
bundle,allContiguousRBs},
    tci-StatesPDCCH-ToAddList         SEQUENCE(SIZE (1..maxNrofTCI-StatesPDCCH))
OF TCI-StateId
    tci-StatesPDCCH-ToReleaseList     SEQUENCE(SIZE (1..maxNrofTCI-StatesPDCCH))
OF TCI-StateId
    tci-PresentInDCI                  ENUMERATED {enabled}
    pdcch-DMRS-ScramblingID           INTEGER (0..65535)
...,
[[
    rb-Offset-r16                     INTEGER (0..5)
    tci-PresentInDCI-Format1-2-r16 INTEGER (1..3)
    coresetPoolIndex-r16              INTEGER (0..1)
    controlResourceSetId-v16xy        ControlResourceSetId-v16xy]]}
```

FIG. 18

BEAM FAILURE RECOVERY CONTROL

CROSS-REFERENCE TO RELATED APPLICATIONS

This application claims the benefit of U.S. Provisional Application No. 63/136,441, filed on Jan. 12, 2021. The above-referenced application is hereby incorporated by reference in its entirety.

BACKGROUND

In wireless communications, a plurality of transmission/reception points are used to increase reliability. A plurality of wireless resources are configured for the plurality of transmission/reception points.

SUMMARY

The following summary presents a simplified summary of certain features. The summary is not an extensive overview and is not intended to identify key or critical elements.

A base station may use a plurality of nodes (e.g., a plurality of transmission/reception points) to communicate with a wireless device. Since different nodes may experience different signal losses due to different propagation characteristics, the base station may provide information indicating different parameters for the nodes. The base station may configure a plurality of beam failure detection sets (e.g., a plurality of beam failure detection reference signal sets). Each transmission and/or reception point may be associated with a respective beam failure detection set for beam failure detection. The wireless device may determine a beam failure associated with a first subset of nodes. The wireless device may determine that a second subsets of nodes is not associated with a beam failure. The wireless device may perform a beam failure recovery procedure indicating a candidate resource for the first subset of nodes. One or more parameters for communications with the first subset of nodes may be adjusted based the candidate resource. One or more parameters for communications with the second subset of nodes may not be adjusted. The selective adjustment of one or more parameters for the first subset of nodes may provide advantages such as enhanced beamforming, reduced communication errors, reduced beam misalignments, and/or efficient power allocation and control.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 1A and FIG. 1B show example communication networks.

FIG. 5A shows an example mapping for downlink channels.

FIG. 5B shows an example mapping for uplink channels.

FIG. 12A shows examples of downlink beam management procedures.

FIG. 12B shows examples of uplink beam management procedures.

FIG. 16A, FIG. 16B, FIG. 16C, and FIG. 16D show examples of uplink and downlink signal transmission.

FIG. 18 shows example configuration parameters for a CORESET.

DETAILED DESCRIPTION

Figure 2A:
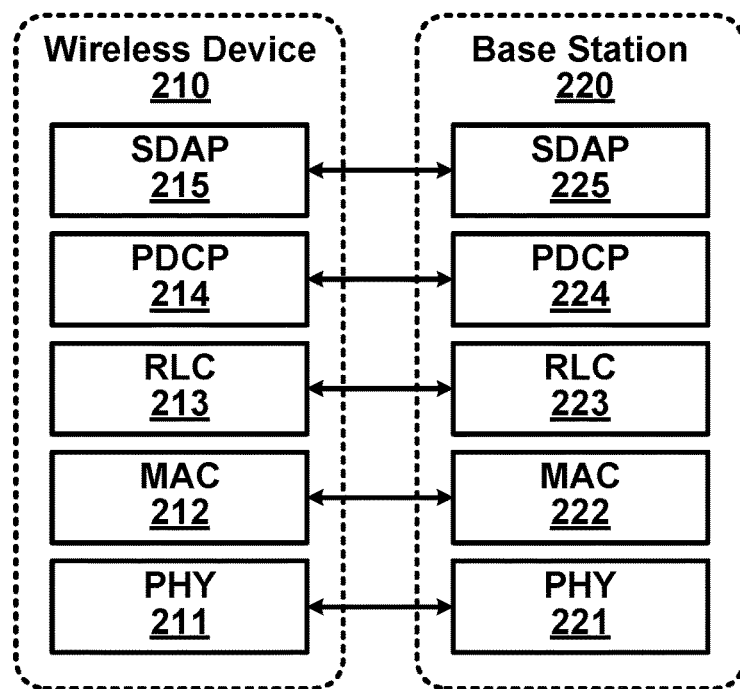
FIG. 2A shows an example user plane.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to transmission and/or reception configuration and signaling for wireless communication.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2B:
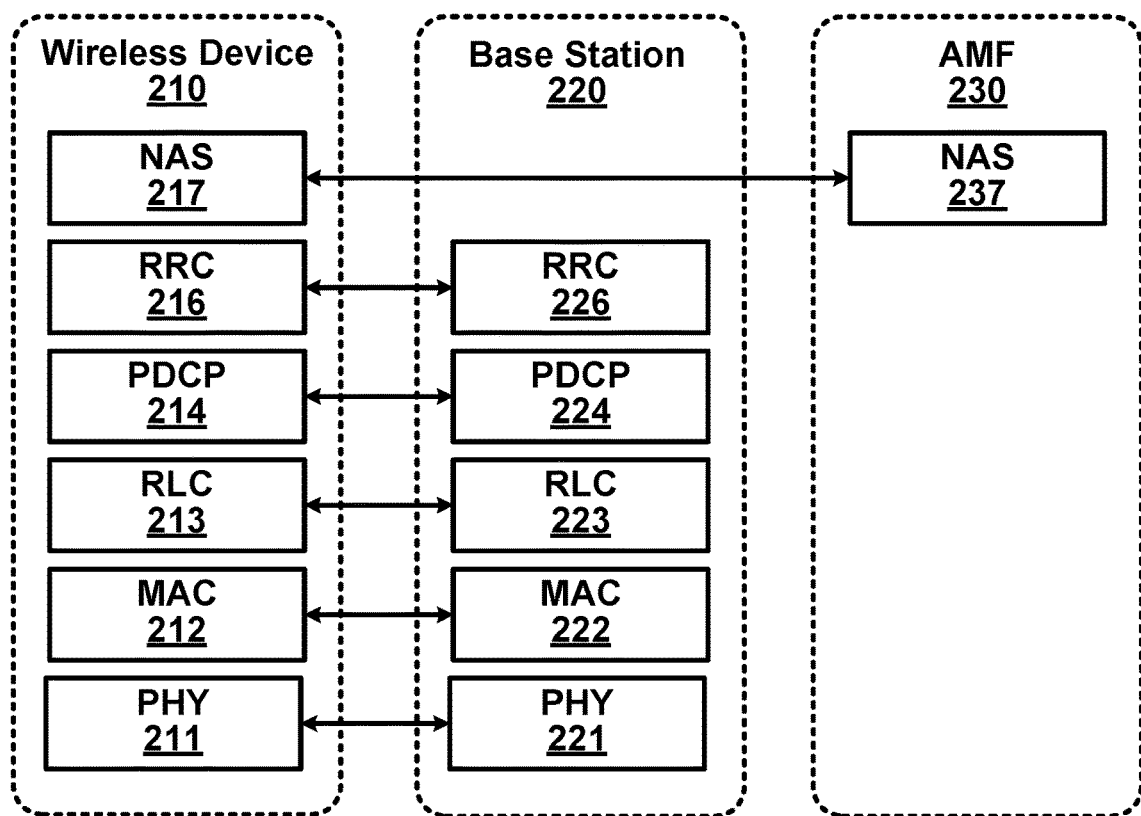
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG.

2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
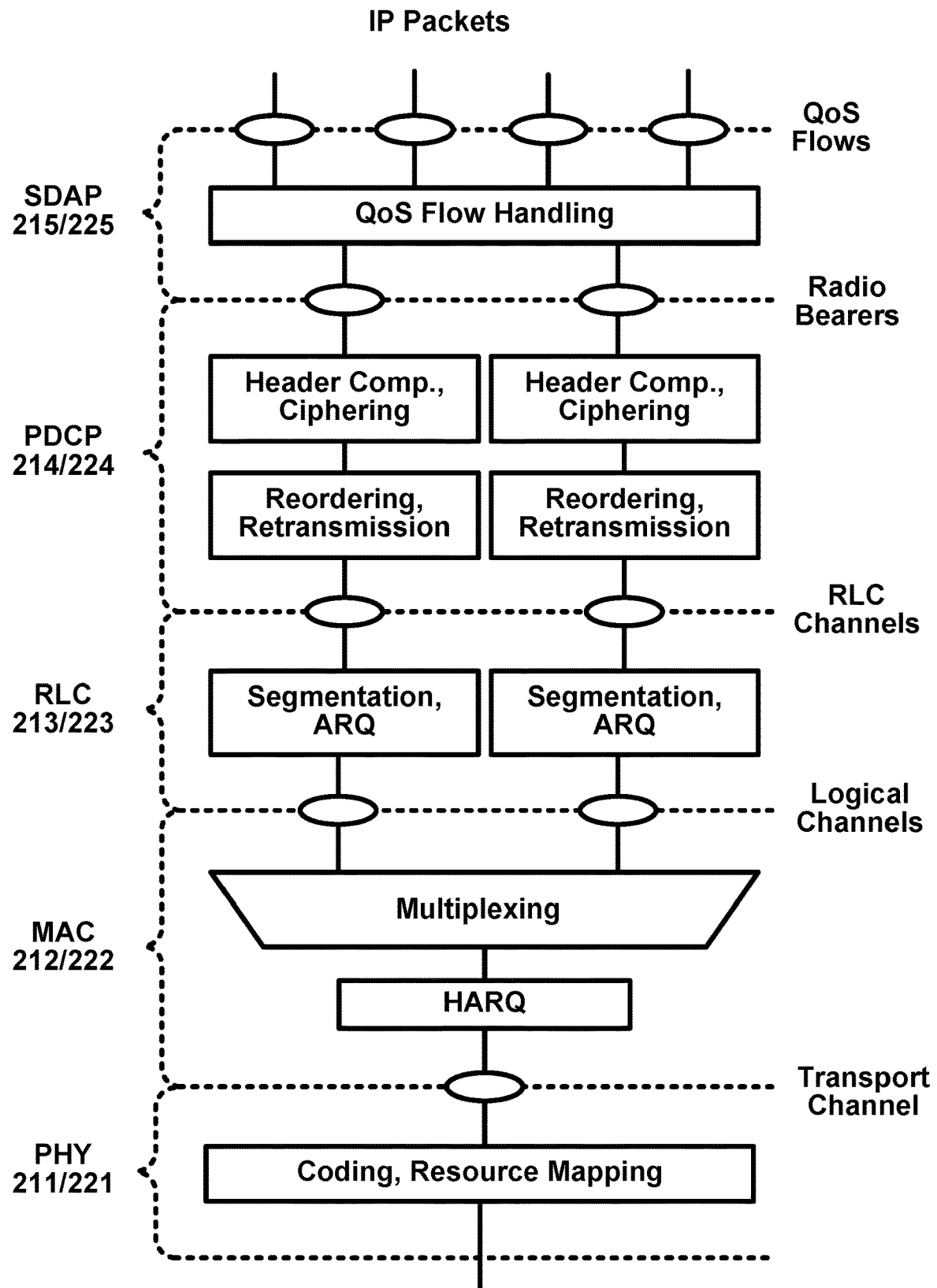
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted over the air interface, ciphering/deciphering to prevent unauthorized decoding of data transmitted over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figures 4A, 4B:
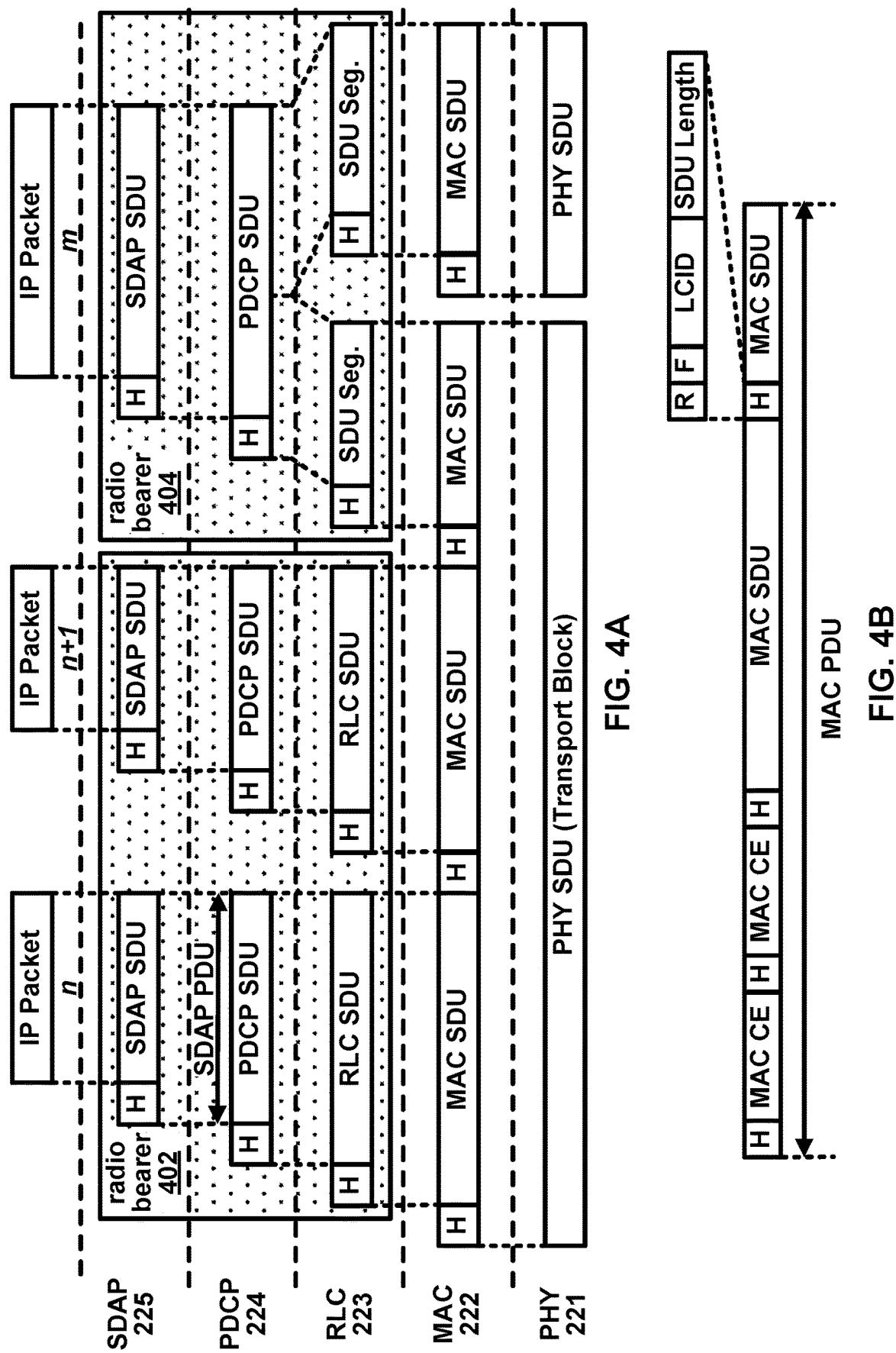
FIG. 4A shows an example downlink data flow for a user plane configuration.
FIG. 4B shows an example format of a Medium Access Control (MAC) subheader in a MAC Protocol Data Unit (PDU).

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless devices).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIB s). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
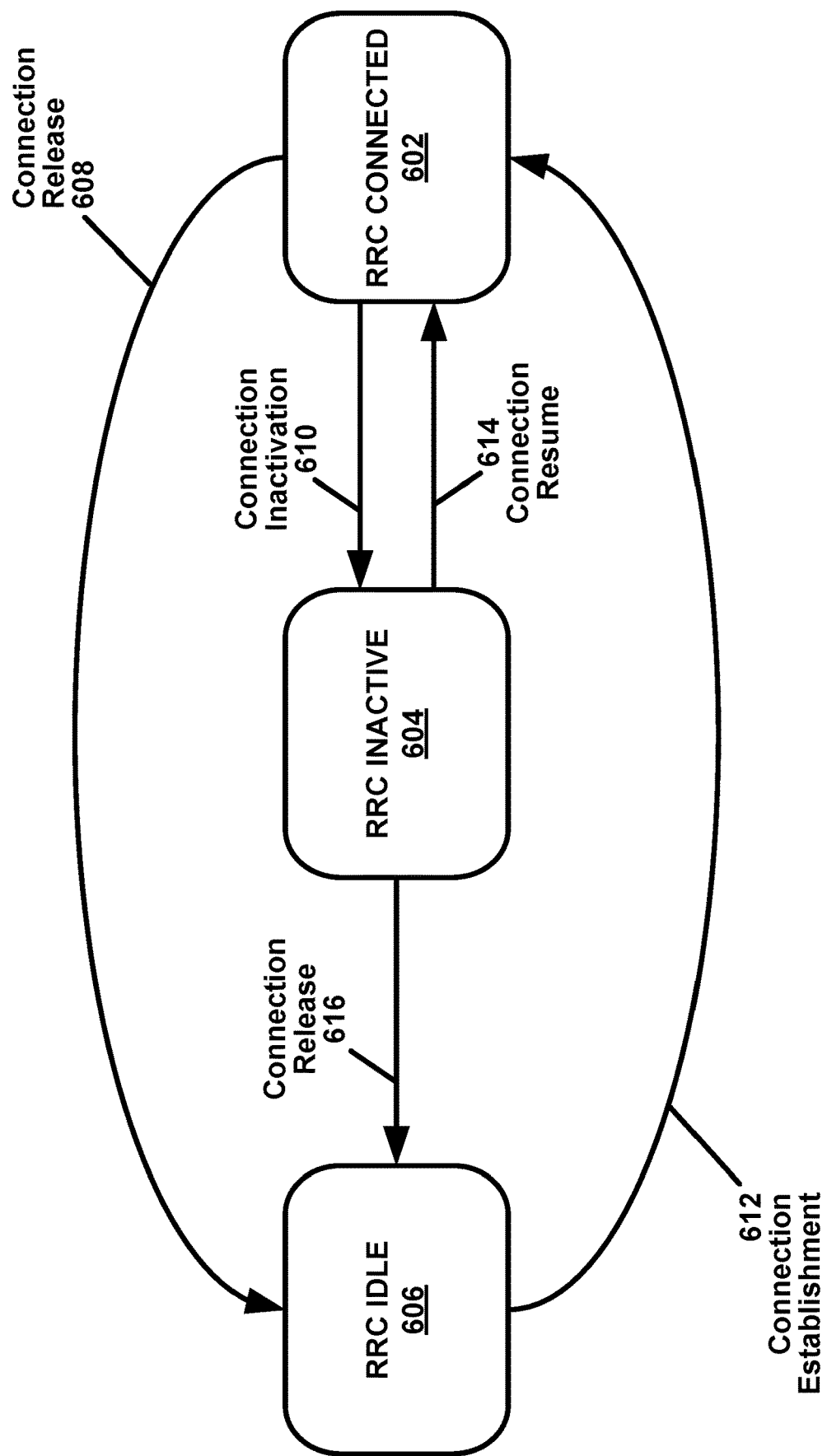
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., each discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier-communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
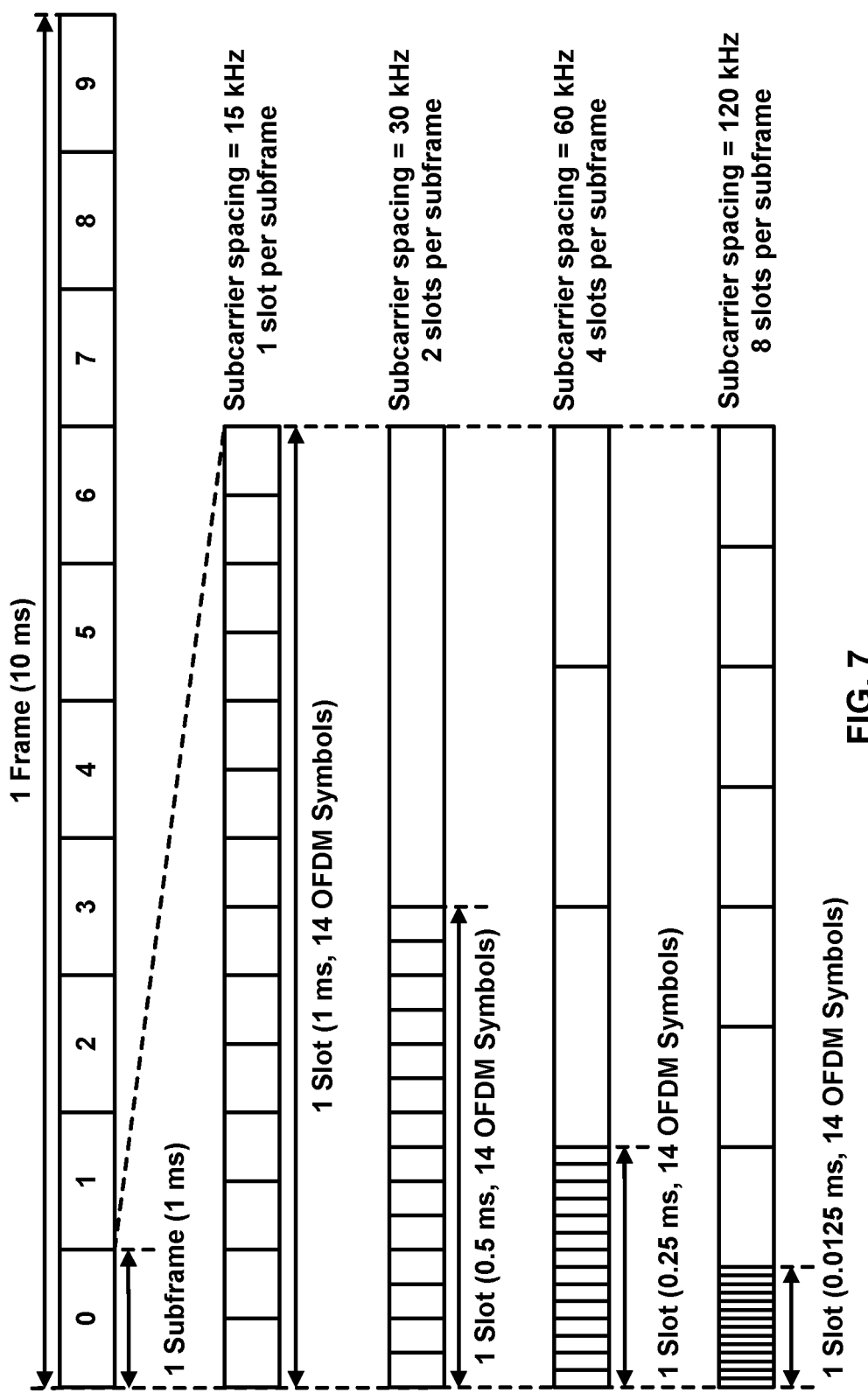
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 μs, for example, for a numerology in an NR configuration or any other radio configurations. Numerologies may be defined with the following subcarrier spacing/cyclic prefix duration combinations: 15 kHz/4.7 μs; 30 kHz/2.3 μs; 60 kHz/1.2 μs; 120 kHz/0.59 μs; 240 kHz/0.29 μs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
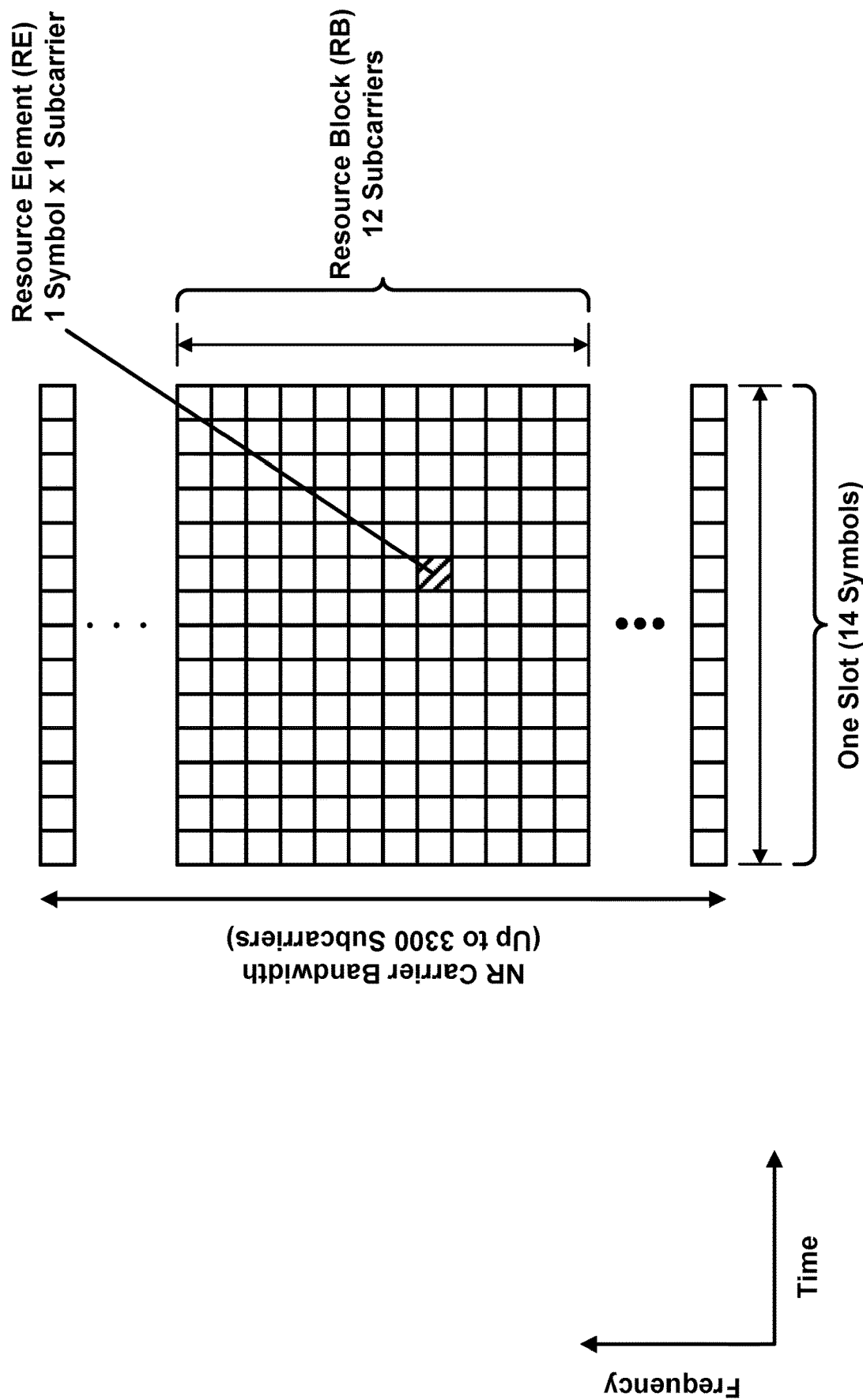
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, after (e.g., based on or in response to) receiving DCI indicating the second BWP as an active BWP. A wireless device may switch an active BWP from a first BWP to a second BWP, for example, after (e.g., based on or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
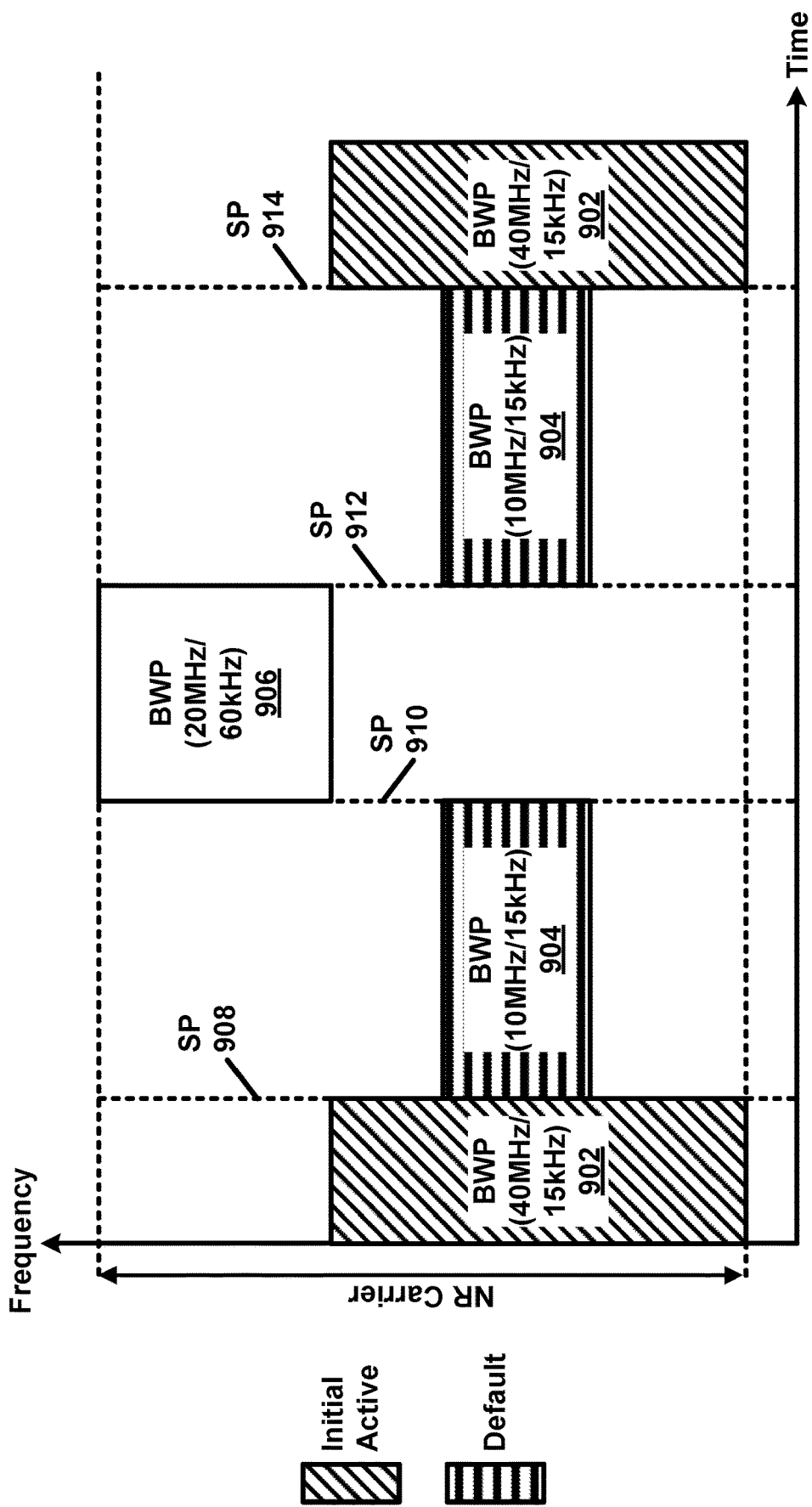
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, after (e.g., based on or in response to) an expiry of a BWP inactivity timer (e.g., indicating switching to the default BWP). The switching at the switching point 908 may occur, for example, after (e.g., based on or in response to) receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, after (e.g., based on or in response to) an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
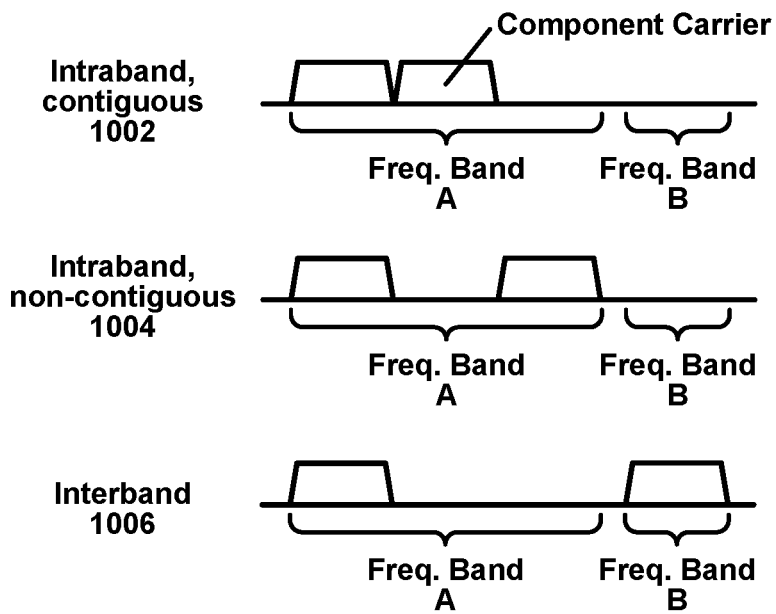
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, after (e.g., based on or in response to) an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
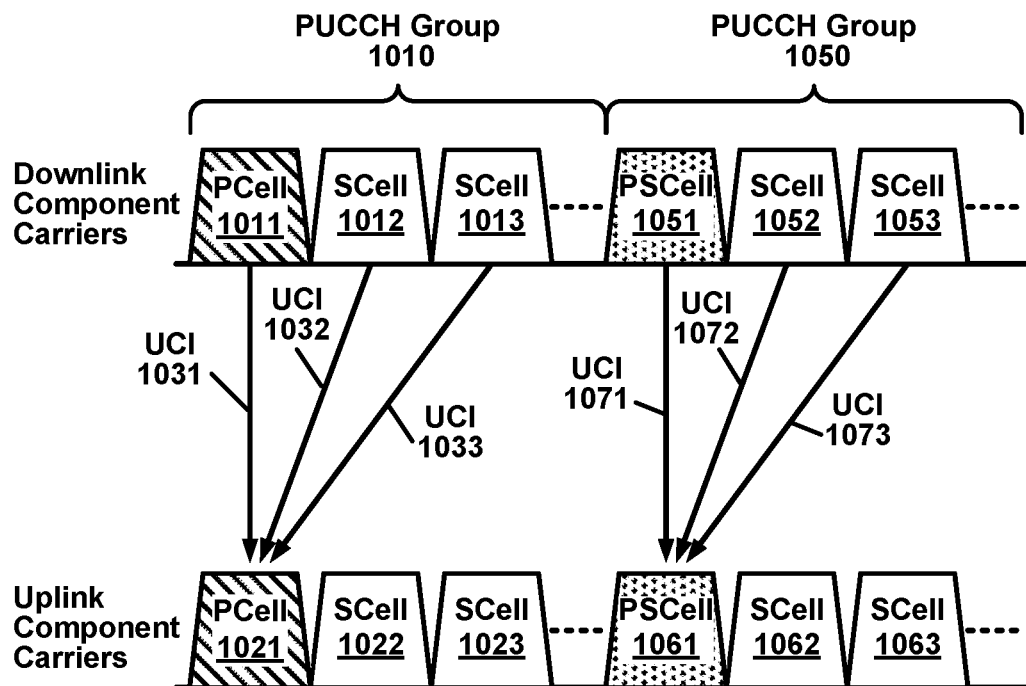
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
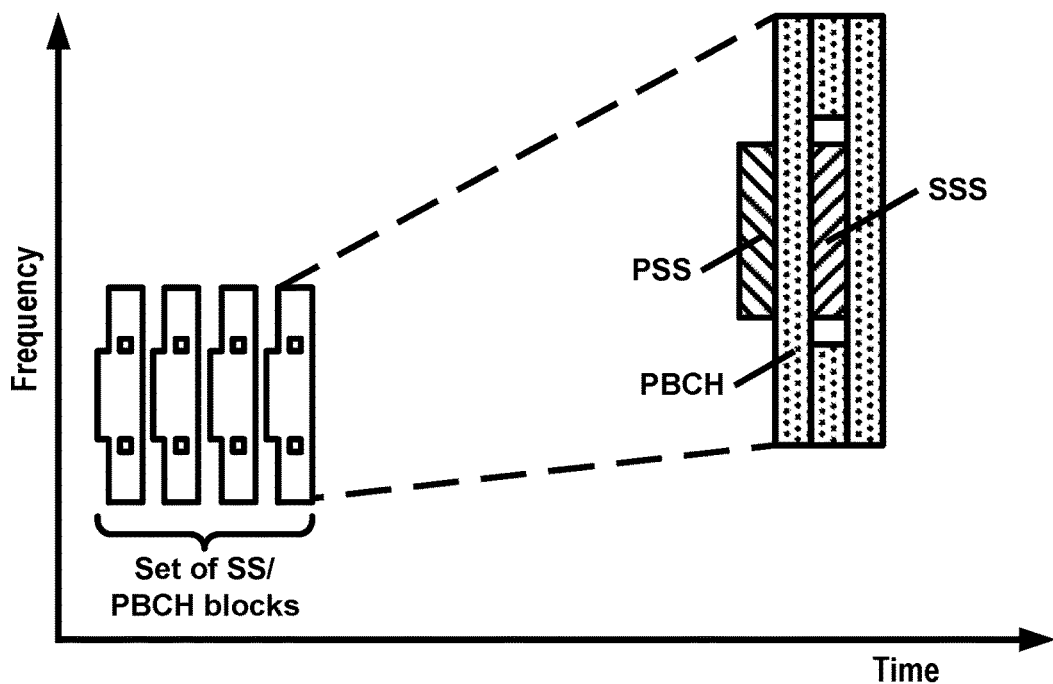
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indexes. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/ employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/ confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
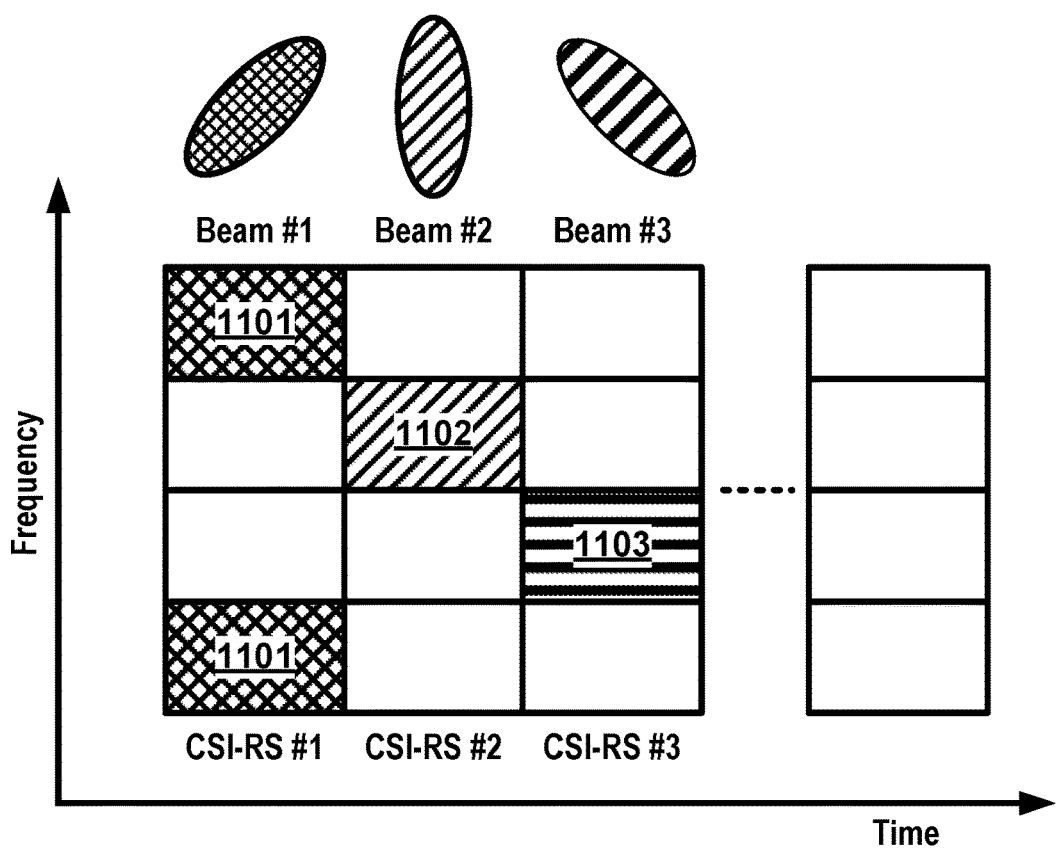
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the UE uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

Figures 13A, 13B, 13C:
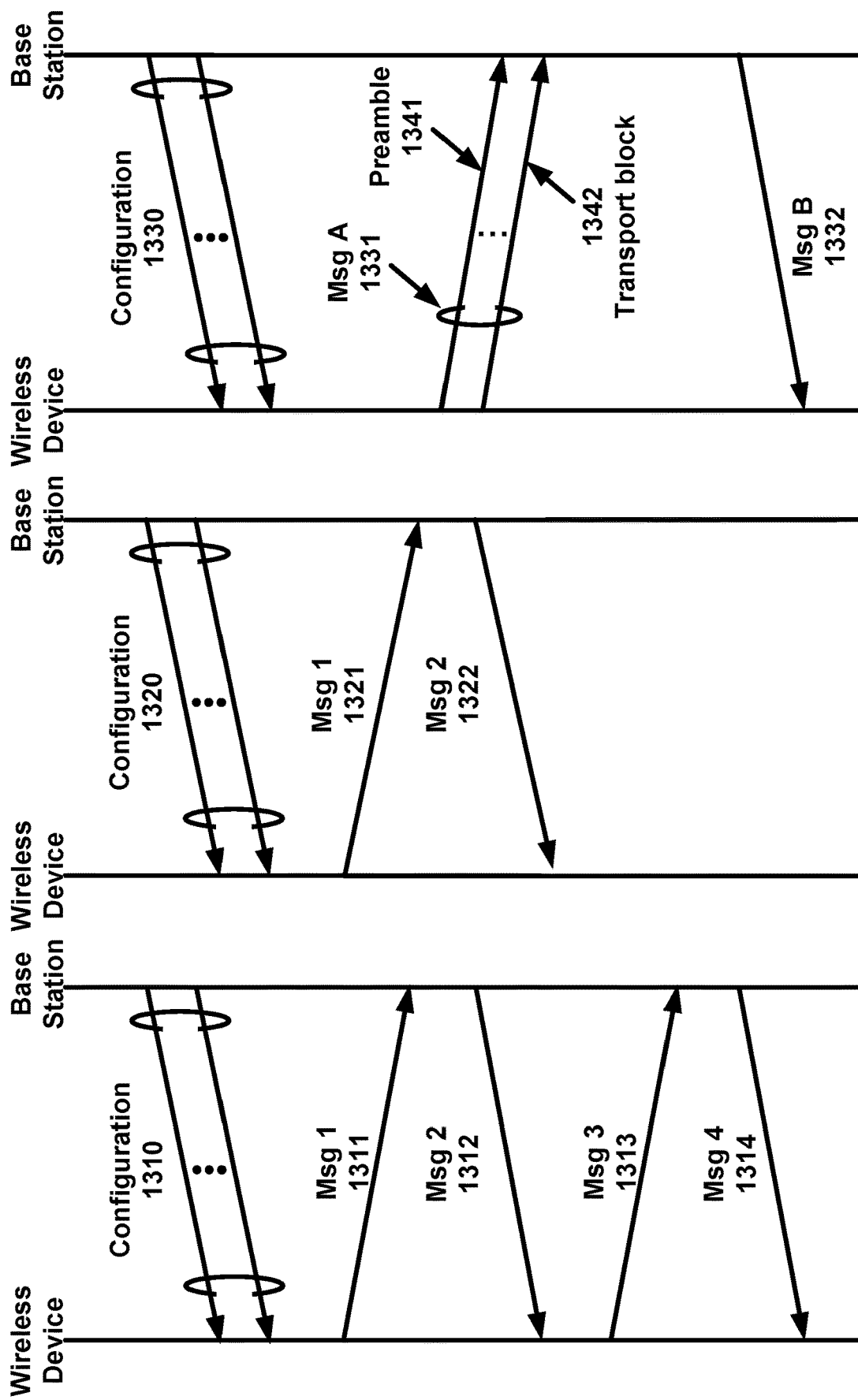
FIG. 13A shows an example four-step random access procedure.
FIG. 13B shows an example two-step random access procedure.
FIG. 13C shows an example two-step random access procedure.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313).

The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received after (e.g., based on or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, after (e.g., based on or in response to) the sending/transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after sending/transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$RA\text{-}RNTI = 1 + s\_id + 14 \times t\_id + 14 \times 80 \times f\_id + 14 \times 80 \times 8 \times ul\_carrier\_id$$

where $s\_id$ may be an index of a first OFDM symbol of the PRACH occasion (e.g., $0 \leq s\_id < 14$), $t\_id$ may be an index of a first slot of the PRACH occasion in a system frame (e.g., $0 \leq t\_id < 80$), $f\_id$ may be an index of the PRACH occasion in the frequency domain (e.g., $0 \leq f\_id < 8$), and $ul\_carrier\_id$ may be a UL carrier used for a preamble transmission (e.g., 0 for an NUL carrier, and 1 for an SUL carrier).

The wireless device may send/transmit the third message (e.g., Msg 3 1313), for example, after (e.g., based on or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, after (e.g., based on or in response to) the sending/transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, after (e.g., based on or in response to) sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, after (e.g., based on or in response to) transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, after (e.g., based on or in response to) sending/transmitting the first message (e.g., Msg A 1331). The second message (e.g., Msg B 1332) may comprise contents that are similar and/or equivalent to the contents of the second message (e.g., Msg 2 1312) (e.g., an RAR shown in FIG. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCI messages may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCI messages with one or more DCI formats, for example, depending on the purpose and/or content of the DCI messages. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
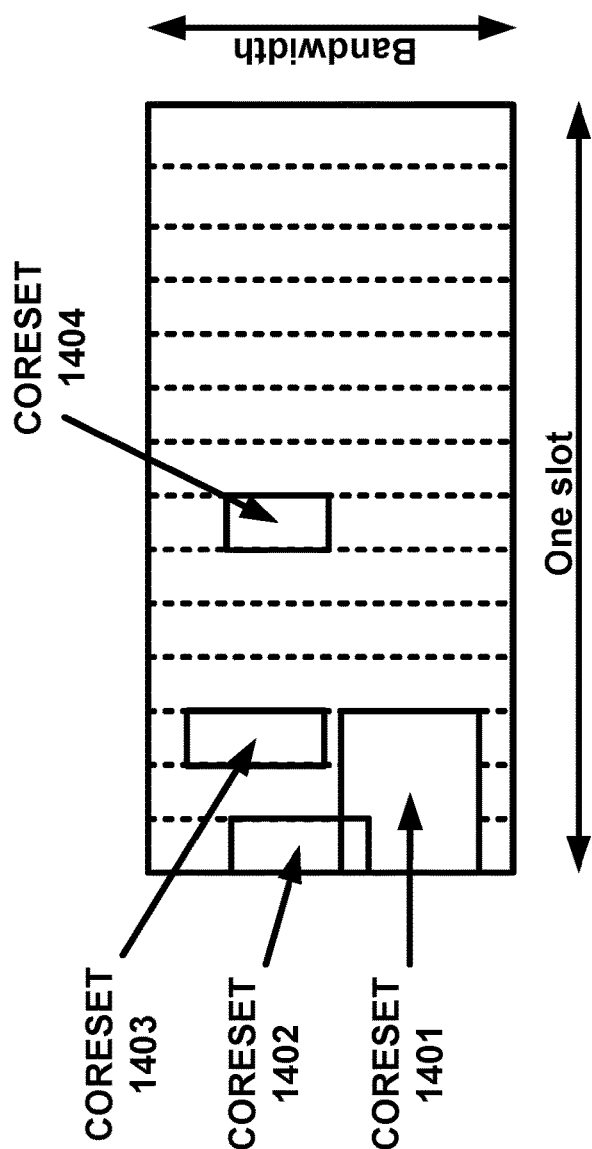
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
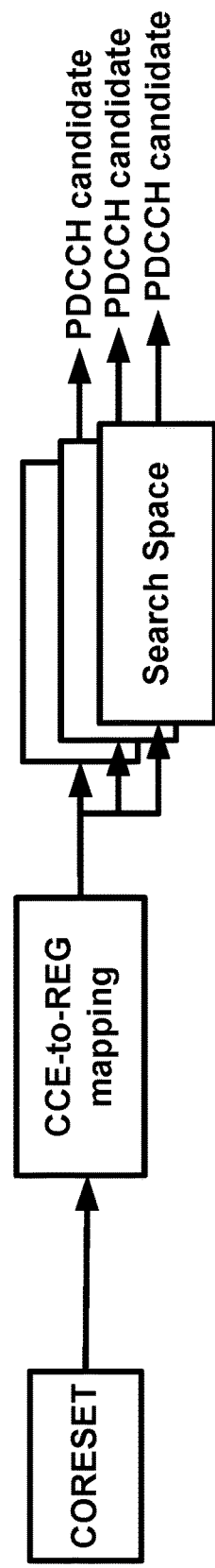
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set.

The wireless device may monitor a set of PDCCH candidates in one or more CORESETs for detecting one or more DCI messages. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, after (e.g., based on or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The wireless device may send/transmit uplink control signaling (e.g., UCI) to a base station. The uplink control signaling may comprise HARQ acknowledgements for received DL-SCH transport blocks. The wireless device may send/transmit the HARQ acknowledgements, for example, after (e.g., based on or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
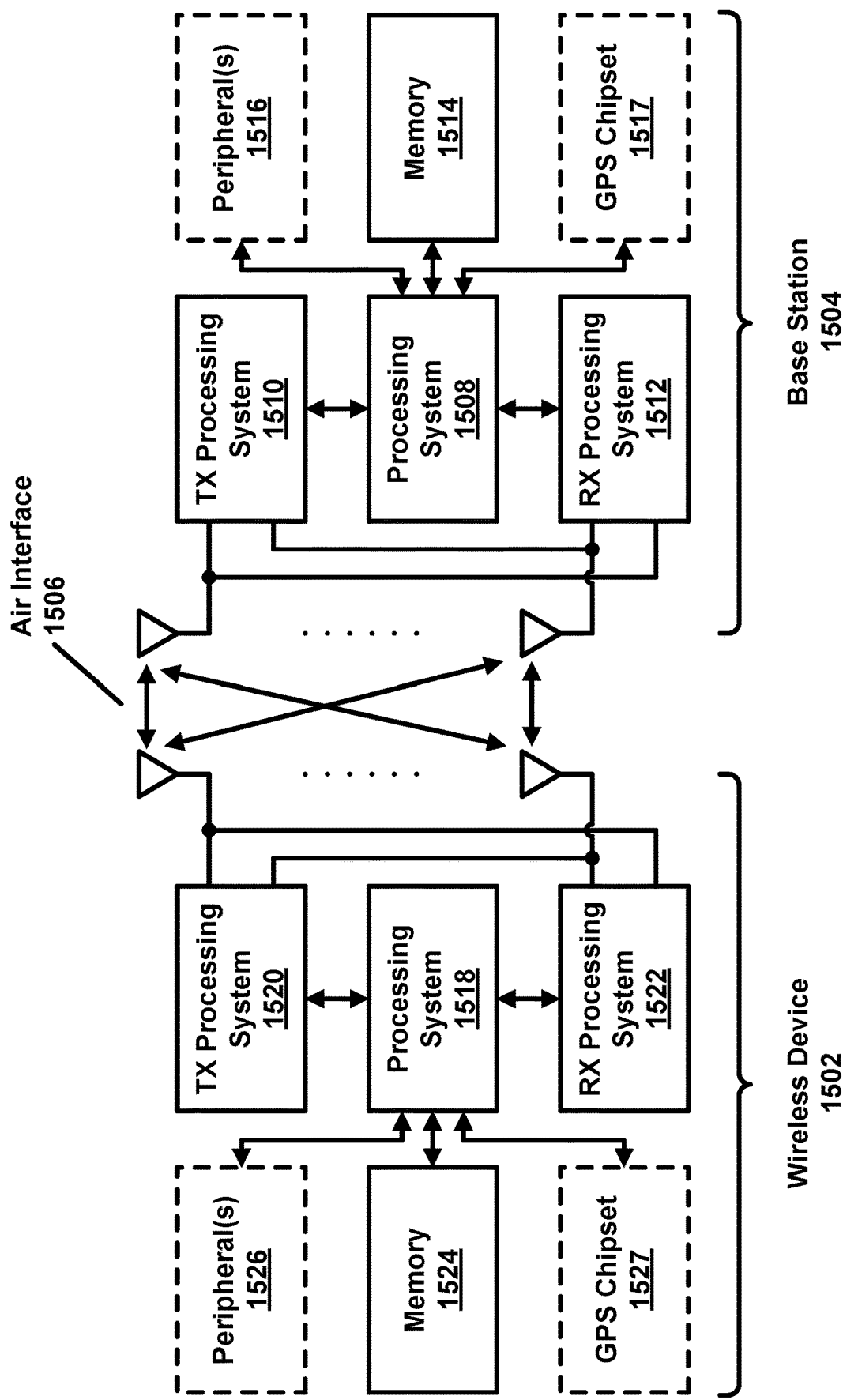
FIG. 15A shows an example of communications between a wireless device and a base station.

FIG. 15A shows example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For sending/transmission processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
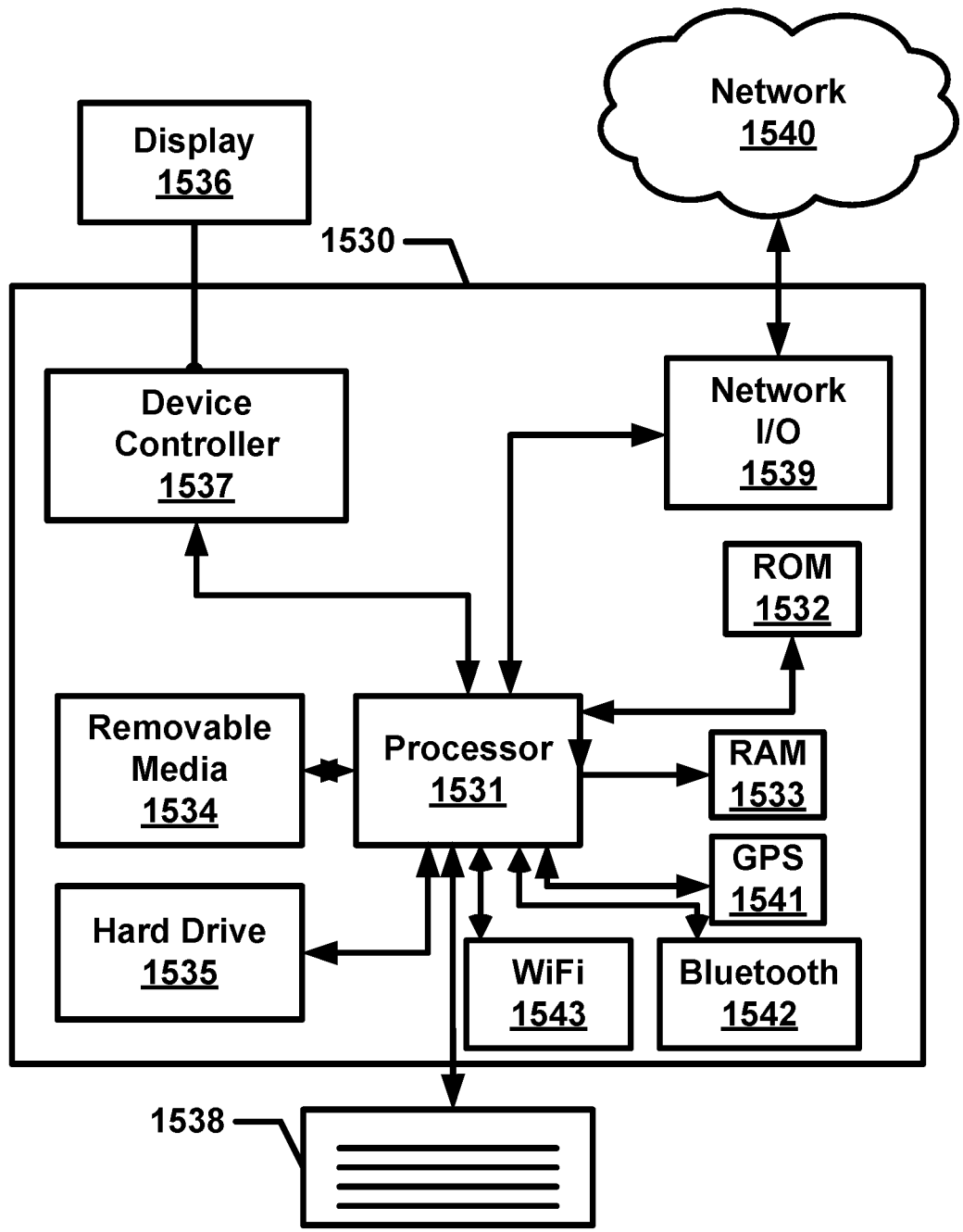
FIG. 15B shows example elements of a computing device that may be used to implement any of the various devices described herein.

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, if it is started, and continue running until it is stopped or until it expires. A timer may be started, for example, if it is not running or restarted if it is running. A timer may be associated with a value (e.g., the timer may be started or restarted from a value or may be started from zero and expire if it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

A beam failure may occur in wireless communications using one or more beams. A wireless device may detect a beam failure for a cell. The wireless device may determine/identify a candidate reference signal for a beam failure recovery of the cell. The wireless device may trigger/initiate/start the beam failure recovery, for example, based on the detecting the beam failure. The wireless device may send/transmit, for the beam failure recovery, an uplink signal (e.g., random-access preamble, BFR MAC-CE, UCI, PUCCH) indicating the candidate reference signal. The wireless device may complete the beam failure recovery successfully, for example, based on receiving (e.g., from a base station) a beam failure recovery response (e.g., DCI).

The wireless device may be configured with a plurality of beam failure detection sets (e.g., a plurality of beam failure detection reference signal sets). A beam failure detection set may be associated with a node, such as a TRP (e.g., a node/TRP of a plurality of nodes/TRPs). Each beam failure detection set, of the plurality of beam failure detection sets, may be associated with a node (e.g., TRP) of a plurality of nodes (e.g., TRPs). Each node (e.g., TRP) and/or each beam failure detection set may be associated with a TCI state, a CORESET, a spatial relation, etc.

A downlink channel resource (e.g., a CORESET, a downlink control channel resource, a downlink shared channel resource, etc.) may be activated with a plurality of TCI states for downlink channel repetition (e.g., PDCCH repetition, PDSCH repetition). A first TCI state may be associated with a node, such a TRP (e.g., a node/TRP of a plurality of nodes/TRPs). Each of the plurality of TCI states may be associated with a respective node (e.g., TRP) and/or associated with a respective beam failure detection set. The wireless device may receive, based on a first TCI state and from a first node (e.g., first TRP), a first repetition of downlink channel signals via the downlink channel resource. The wireless device may receive, based on a second TCI state and from a second node (e.g., second TRP), a second repetition of downlink channel signals via the downlink channel resource.

An uplink channel resource (e.g., an uplink control channel resource, an uplink shared channel resource, an SRS resource, etc.) may be activated with a plurality of spatial relations for uplink channel repetitions (e.g., PUCCH repetition, PUSCH repetition, SRS repetition). Each of the plurality of spatial relations may be associated with a respective node/TRP and/or associated with a respective beam failure detection set. The wireless device may send/transmit, based on a first spatial relation and to a first TRP, a first repetition of uplink channel signals via the uplink channel resource. The wireless device may send/transmit, based on a second spatial relation and to a second TRP, a second repetition of uplink channel signals via the uplink channel resource.

A per-node/per-TRP beam failure detection and a per-node/per-TRP beam failure recovery may be performed. For example, a beam failure of a first TRP may be determined based on one or more reference signals of a beam failure detection set associated with the first TRP. A candidate reference signal may be determined for beam failure recovery for the first TRP. The candidate reference signal may be for the first TRP. A beam non-failure of a second TRP may be determined based on one or more reference signals of a beam failure detection set associated with the second TRP.

The downlink channel resource may be activated with the plurality of TCI states and/or the uplink channel resource may be activated with the plurality of spatial relations. One or more parameters associated with the candidate reference signal may be selectively used for communications with the first TRP, but not for communications with the second TRP, for example, if the beam failure of the first TRP and the beam non-failure of the second TRP are determined. The selective use of the one or more parameters associated with the candidate reference signal for the first TRP may provide advantages such as enhanced beamforming, reduced communication errors, reduced beam misalignments, and/or efficient power allocation and control.

In at least some wireless communications, based on the completing the beam failure recovery, the wireless device may start monitoring one or more CORESETs of the cell based on the candidate reference signal. The wireless device may start monitoring the one or more CORESETs of the cell based on the candidate reference signal, for example, a number/quantity of symbols (e.g., 28 symbols or any other quantity of symbols) after the completing the beam failure recovery.

The wireless device may be served by (e.g., transmit/receive to/from) a plurality of nodes/TRPs comprising a first node/TRP and a second node/TRP. While a TRP may be referenced herein in various examples, one of ordinary skill in the art would understand that any TRP described or referenced herein may comprise any node (e.g., any transmission and/or reception node). The wireless device may receive an activation command (e.g., MAC CE) indicating/activating a plurality of TCI states (e.g., two TCI states or more) or receiving beams for a CORESET of the cell. The first TRP and the second TRP may repeat transmission of downlink control information (DCI) via the CORESET based on the CORESET being activated with the plurality of TCI states (e.g., two TCI states or more). The plurality of TCI states may comprise a first TCI state and a second TCI state. The wireless device may monitor downlink control channels in the CORESET based on the plurality of TCI states. Each TCI state of the plurality of TCI states may be associated with a respective TRP of the plurality of TRPs (e.g., comprising the first TRP and the second TRP). The wireless device may monitor, for the DCI transmitted by the first TRP, the downlink control channels in the CORESET based on the first TCI state (or the first receiving beam). The wireless device may monitor, for the DCI transmitted by the second TRP, the downlink control channels in the CORE- SET based on the second TCI state (or the second receiving beam). This may increase the reliability of transmission of the DCI. The wireless device may receive the DCI transmitted from the second TRP, for example, if the first TRP experiences blockage (e.g., due to trees, building, etc.). The first TCI state may be associated with the first TRP. The second TCI state may be associated with the second TRP.

The wireless device may detect a beam failure associated with (or for) the first TRP. The wireless device may determine/identify a candidate reference signal for a beam failure recovery of the first TRP. The wireless device may send/transmit, for the beam failure recovery, an uplink signal indicating the candidate reference signal. The wireless device may complete the beam failure recovery successfully, for example, based on receiving (e.g., from a base station) a beam failure recovery response (e.g., DCI).

In at least some wireless communications, the wireless device may start monitoring the CORESET activated with the plurality of TCI states, for example, based on the completing the beam failure recovery. The wireless device may start monitoring the CORESET activated with the plurality of TCI states based on the candidate reference signal. Updating the plurality of TCI states of the CORESET with the candidate reference signal (or the monitoring the CORESET activated with the plurality of TCI states based on the candidate reference signal) may not be efficient, for example, if at least one TRP is not experiencing a beam failure (e.g., if/when the first TRP is experiencing a beam failure and the second TRP is not experiencing a beam failure, or vice versa). The second TCI state may be still suitable for the second TRP. The second TCI state associated with the second TRP may have a radio link quality higher/better than a threshold (e.g., higher SINR, higher RSRP, lower BLER, etc.). Updating the second TCI state of the CORESET with the candidate reference signal may not be efficient, for example, if the second TCI state has the radio link quality higher/better than the threshold. Monitoring the CORESET based on the candidate reference signal (e.g., or a single TCI state or a single receiving beam) may reduce the reliability of successful reception of DCI in the CORESET.

A subset of parameters, associated with at least one first node of a plurality of nodes, may be selectively updated for a resource (e.g., a downlink channel resource) associated with a plurality of parameters associated with the plurality of nodes. The at least one first node may be associated with a beam failure. At least one second node, of the plurality of nodes, may not be associated with a beam failure. Wireless communications may be enhanced for a TCI state update of a CORESET activated with plurality of TCI states, for example, if a wireless device completes a beam failure recovery associated with a node (e.g., TRP) of a plurality of nodes (e.g., TRPs). The wireless device may update a single (or a subset of) TCI state(s) of the CORESET activated with the plurality of TCI states with a candidate reference signal. The wireless device may start monitoring downlink control channels in the CORESET based on the candidate reference signal and the second TCI state, for example, based on the completing the beam failure recovery of the first TRP. The wireless device may start monitoring downlink control channels in the CORESET based on the first TCI state and candidate reference signal, for example, based on completing a beam failure recovery of the second TRP. Monitoring the CORESET based on different TCI states (or receiving beams) may increase the reliability of successful reception of DCI in the CORESET.

In at least some wireless communications, the wireless device may start sending/transmitting, via an uplink resource (e.g., PUCCH resource, PUSCH resource, SRS resource) of the cell, an uplink signal (e.g., PUCCH, UCI, SRS, transport block) based on the candidate reference signal. The wireless device may start sending/transmitting, via the uplink resource of the cell, the uplink signal, for example, based on the completing the beam failure recovery. The wireless device may start sending/transmitting, via the uplink resource of the cell, the uplink signal based on the candidate reference signal, for example, a number of symbols (e.g., 28 symbols) after the completing the beam failure recovery.

The wireless device may be served by (e.g., transmit/receive to/from) a plurality of TRPs comprising a first TRP and a second TRP. The wireless device may receive an activation command (e.g., MAC CE) indicating/activating a plurality of spatial relations (e.g., two spatial relations or more) or transmitting beams for an uplink resource (e.g., PUCCH/PUSCH/SRS resource) of the cell. The wireless device may send/transmit repetitions of an uplink signal via the uplink resource towards/to the first TRP and the second TRP, for example, based on the uplink resource being activated with the plurality of spatial relations (e.g., two spatial relations). The first TRP and the second TRP may monitor the uplink resource for repetitions of the uplink signal. The plurality of spatial relations may comprise a first spatial relation and a second spatial relation. Each spatial relation of the plurality of spatial relations may be associated with a respective TRP of the plurality of TRPs (e.g., comprising the first TRP and the second TRP). The first spatial relation may be associated with the first TRP. The second spatial relation may be associated with the second TRP. The wireless device may send/transmit, via the uplink resource, the uplink signal to/towards/for the first TRP based on the first spatial relation (or the first transmitting beam). The wireless device may send/transmit, via the uplink resource, the uplink signal to/towards/for the second TRP based on the second spatial relation (or the second transmitting beam). This may increase the reliability of transmission of the uplink signal. The second TRP may receive the uplink signal, for example, if the first TRP experiences blockage (e.g., due to trees, building, etc.).

The wireless device may detect a beam failure for the first TRP. The wireless device may determine/identify a candidate reference signal for a beam failure recovery of the first TRP. The wireless device may send/transmit, for the beam failure recovery, an uplink signal indicating the candidate reference signal. The wireless device may complete the beam failure recovery successfully based on receiving (e.g., from a base station) a beam failure recovery response (e.g., DCI).

In at least some wireless communications, the wireless device may start sending/transmitting, via an uplink resource activated with the plurality of spatial relations, an uplink signal based on the candidate reference signal. The wireless device may start sending/transmitting, via an uplink resource activated with the plurality of spatial relations, an uplink signal, for example, based on the completing the beam failure recovery. Updating the plurality of spatial relations of the uplink resource with the candidate reference signal (or the sending/transmitting the uplink signal via the uplink resource activated with the plurality of spatial relations based on the candidate reference signal) may not be efficient, for example, if at least one TRP is not experiencing a beam failure (e.g., when the first TRP is experiencing a beam failure and the second TRP is not experiencing a beam failure, or vice versa). The second spatial relation may be still suitable for the second TRP. The second spatial relation associated with the second TRP may have a radio link quality higher/better than a threshold (e.g., higher SINR, higher RSRP, lower BLER, etc.). Updating the second spatial relation of the uplink resource with the candidate reference signal may not be efficient, for example, if the second spatial relation has the radio link quality higher/better than the threshold. Transmitting, via the uplink resource, the uplink signal based on the candidate reference signal (or a single spatial relation or a single transmitting beam) may reduce the reliability of successful reception of the uplink signal.

A subset of parameters, associated with at least one first node of a plurality of nodes, may be selectively updated for a resource (e.g., an uplink channel resource) associated with a plurality of parameters associated with the plurality of nodes. The at least one first node may be associated with a beam failure. At least one second node, of the plurality of nodes, may not be associated with a beam failure. Wireless communications may be enhanced for a spatial relation update of an uplink resource activated with a plurality of spatial relations, for example, if a wireless device completes a beam failure recovery associated with a TRP of a plurality of TRPs. The wireless device may update a single (or a subset of) spatial relation(s) of the uplink resource activated with the plurality of spatial relations with a candidate reference signal. The wireless device may start sending/transmitting, via the uplink resource, an uplink signal based on the candidate reference signal and the second spatial relation, for example, based on the completing the beam failure recovery of the first TRP. The wireless device may start sending/transmitting, via the uplink resource, an uplink signal based on the first spatial relation and candidate reference signal, for example, based on completing a beam failure recovery of the second TRP. Transmitting, via the uplink resource, the uplink signal based on different spatial relations (or transmitting beams) may increase the reliability of successful reception of the uplink signal.

A PDCCH transmission may comprise scheduling assignments and other control information in the form of DCI messages. The information carried by the PDCCH transmission may be referred to as DCI. A base station may transmit, to a wireless device, a plurality of PDCCH transmissions within a control region. The wireless device may monitor a plurality of PDCCHs for receiving PDCCH transmissions. A PDCCH may include an aggregate of one or more CCEs. Monitoring may comprise performing blind decoding for a plurality of candidate PDCCHs. The blind decoding may comprise performing CRC de-masking for each of the plurality of candidate PDCCHs using an RNTI. The blind decoding may be used for detection of a PDCCH transmission. The wireless device may determine that a PDCCH comprises control information, for example, if no CRC error is detected.

Figure 17:
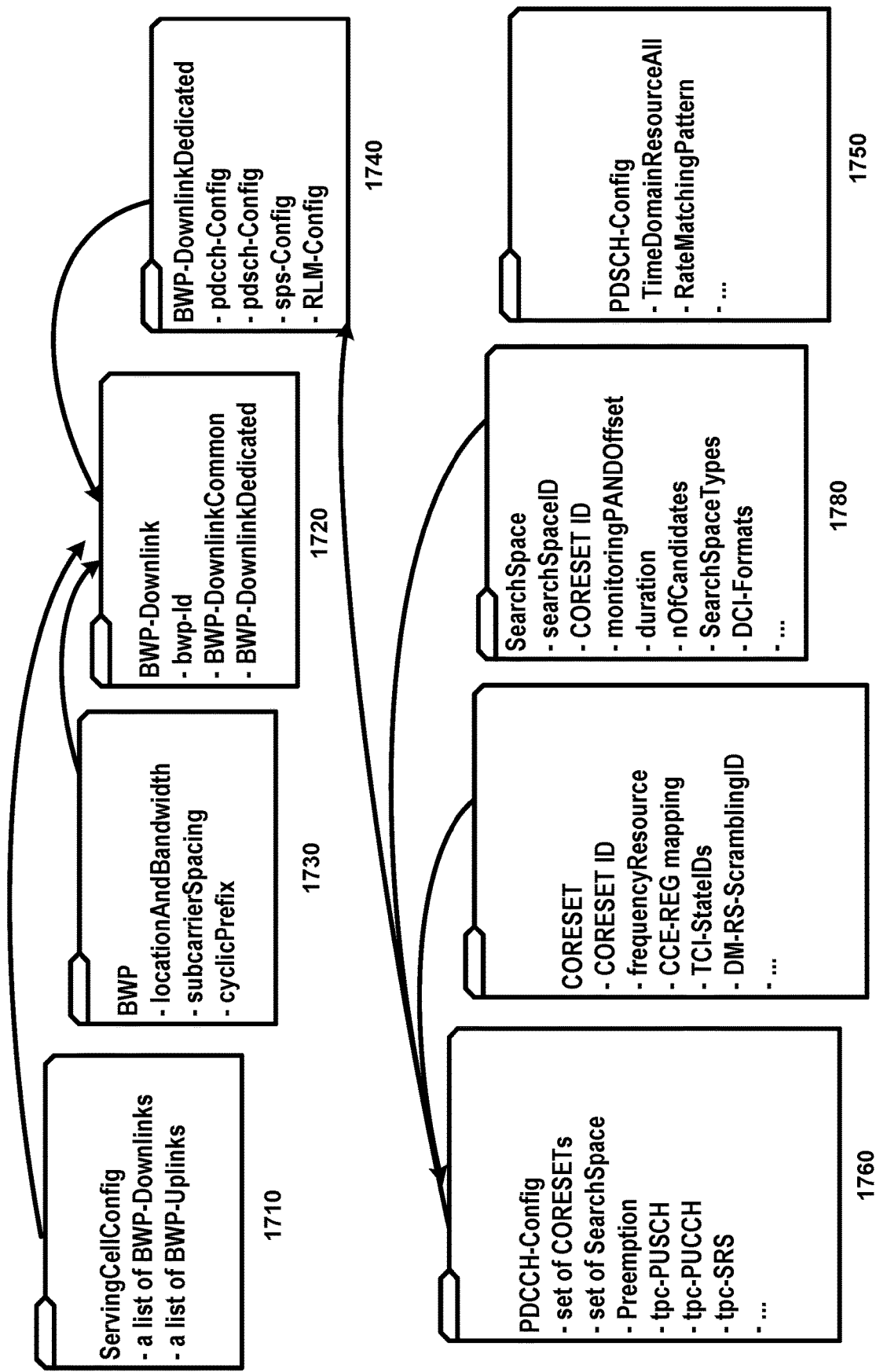
FIG. 17 shows example configuration parameters for wireless communications between a wireless device and a base station.

FIG. 17 shows example configuration parameters for a wireless device to receive control and/or data from a base station. A wireless device may receive one or more radio resource control (RRC) messages comprising configuration parameters of a cell. The configuration parameters may indicate/comprise one or more parameters of a serving cell configuration 1710 (e.g., ServingCellConfig). The one or more parameters of the serving cell configuration 1710 may comprise one or more downlink bandwidth parts (e.g., a list of BWP-Downlinks). The one or more parameters of the serving cell configuration 1710 may comprise one or more uplink bandwidth parts (e.g., a list of BWP-Uplinks). A downlink bandwidth part configuration 1720 (e.g., BWP-Downlink) and/or an uplink bandwidth part (e.g., BWP-Uplink) may comprise a bandwidth part index (e.g., bwp-Id), configuration parameters of a cell-common downlink bandwidth part (e.g., BWP-DownlinkCommon), and/or a wireless device-specific downlink bandwidth part (e.g., BWP-DownlinkDedicated). For example, the bandwidth part index (bwp-Id) may indicate a bandwidth part configuration, wherein an index of the bandwidth part is the bandwidth part index. The bandwidth part configuration 1730 may comprise a location and bandwidth information (locationAndBandwidth). The locationAndBandwidth may indicate a starting resource block (RB) of the bandwidth part and a bandwidth of the bandwidth part, based on a reference point (e.g., a pointA of a carrier/cell for the bandwidth part). The bandwidth part configuration 1730 may comprise a subcarrier spacing (e.g., subcarrierSpacing) and a cyclic prefix (e.g., cyclicPrefix). For example, the subcarrier spacing may be one of 15 kHz, 30 kHz, 60 kHz, 120 kHz, 240 kHz, 480 kHz, and/or 960 kHz. For example, the cyclic prefix may be one of a normal cyclic prefix and/or an extended cyclic prefix.

Configuration parameters of the cell-specific downlink bandwidth (e.g., BWP-DownlinkCommon) may comprise genericParameters, pdcch-ConfigCommon, and/or pdsch-ConfigCommon. For example, pdcch-ConfigCommon may comprise cell-specific parameters for receiving downlink control information (DCI) via the cell-specific downlink bandwidth part (e.g., an initial BWP). For example, pdsch-ConfigCommon may comprise cell-specific parameters for receiving PDSCHs of transport blocks (TBs) via the cell-specific downlink bandwidth part. Configuration parameters of the wireless device-specific downlink bandwidth part 1740 (e.g., BWP-DownlinkDedicated) may comprise pdcch-Config, pdsch-Config, sps-Config, and/or radioLinkMonitoringConfig (e.g., RLM-Config). The configuration parameters may indicate/comprise sps-ConfigList and/or beamFailureRecoverySCellConfig. For example, beamFailureRecoverySCellConfig may comprise reference signal parameters for beam failure recovery for secondary cells. For example, pdcch-Config may comprise parameters for receiving DCI messages for the wireless device-specific downlink bandwidth part. For example, pdsch-Config 1750 may comprise parameters for receiving PDSCHs of TBs for the wireless device-specific downlink bandwidth part. For example, sps-Config may comprise parameters for receiving semi-persistent scheduling PDSCHs. The base station may configure a SPS for a BWP or a list of SPS for the BWP. For example, radioLinkMonitoringConfig may comprise parameters for radio link monitoring.

Configuration parameters of pdcch-Config 1760 may comprise at least one of a set of CORESETs 1770, a set of search spaces 1780, a downlink preemption (e.g., downlinkPreemption), a transmission power control (TPC) for PUSCH (e.g. tpc-PUSCH), a TPC for PUCCH and/or a TPC for SRS. The configuration parameters may indicate/comprise a list of search space switching groups (e.g., searchSpaceSwitchingGroup), a search space switching timer (e.g., searchSpaceSwitchingTimer), an uplink cancellation, and/or a monitoring capability configuration (e.g., monitoringCapabilityConfig). The base station may configure the list of search space switching groups, where the wireless device may switch from a first search space group to a second search space group based on the search space switching timer or a rule, an indication, or an event. The base station may configure up to K (e.g., K=3) CORESETs for a BWP of a cell. The downlink preemption may indicate whether to monitor for a downlink preemption indication for the cell. The monitoring capability config may indicate whether a monitoring capability of the wireless device would be configured for the cell, where the capability is based on a basic capability or an advanced capability. The base station may configure up to M (e.g., M=10) search spaces for the BWP of the cell. The tpc-PUCCH, tpc-PUSCH, or tpc-SRS may enable and/or configure reception of TPC commands for PUCCH, PUSCH or SRS, respectively. The uplink cancellation may indicate to monitor uplink cancellation for the cell.

Configuration parameters of pdcch-ConfigCommon may comprise a control resource set zero (e.g., controlResourceSetZero), a common control resource set (e.g., commonControlResourceSet), a search space zero (e.g., searchSpaceZero), a list of common search space (e.g., commonSearchSpaceList), a search space for SIB1 (e.g., searchSpaceSIB1), a search space for other SIBs (e.g., searchSpaceOtherSystemInformation), a search space for paging (e.g., pagingSearchSpace), a search space for random access (e.g., ra-SearchSpace), and/or a first PDCCH monitoring occasion. The control resource set zero may comprise parameters for a first CORESET with an index value zero. The CORESET zero may be configured for an initial bandwidth part of the cell. The wireless device may use the control resource set zero in a BWP of the cell, wherein the BWP is not the initial BWP of the cell based on one or more conditions. For example, a numerology of the BWP may be the same as the numerology of the initial BWP. For example, the BWP may comprise the initial BWP. For example, the BWP may comprise the control resource set zero. The common control resource set may be an additional common CORESET that may be used for a common search space (CSS) or a UE-specific search space (USS). The base station may configure a bandwidth of the common control resource set is smaller than or equal to a bandwidth of the control resource set zero. The base station may configure the common control resource set such that it is contained within the control resource set zero (e.g., CORESET #0). The list of common search space may comprise one or more CSSs. The list of common search space might not comprise a search space with index zero (e.g., SS #0). The first PDCCH monitoring occasion may indicate a monitoring occasion for a paging occasion. The base station may configure a search space for monitoring DCI messages for paging (e.g., pagingSearchSpace), for RAR monitoring (e.g., ra-SearchSpace), for SIB1 (e.g., searchSpaceSIB1) and/or for other SIBs than SIB1 (e.g., searchSpaceOtherSystemInformation). The search space with index zero (e.g., searchSpaceZero, SS #0) may be configured for the initial BWP of the cell. Similar to the corset #0, the SS #0 may be used in the BWP of the cell based on the one or more conditions.

FIG. 18 shows example configuration parameters of a CORESET. A ControlResourceSet (CORESET) may comprise a CORESET index (e.g., ControlResourceSetId), frequency domain resources (e.g., frequencyDomainResources), a duration of the CORESET (e.g., a number/quantity of OFDM symbols between [1, maxCoReSetDuration], where, for example, maxCoReSetDuration=3) and a CCE to REG mapping type (e.g., between interleaved and nonInterleaved). The base station may also configure a bundle size of REG (e.g., reg-BundleSize) and an interleaver size (e.g., interleaverSize), for example, if the CCE-REG mapping type is configured as interleaved. The CORESET may also comprise a precoder granularity (e.g., between same as REG bundle (e.g., sameAsREG-bundle) and across all contiguous RBs (e.g., allContiguousRBs)). The wireless device may assume that a same precoder is used across REGs in a bundle, for example, if the precoder granularity is configured as 'same as REG bundle.' The wireless device may assume that a same precoder is used across RBs in contiguous RBs of the CORESET, for example, if the precoder granularity is configured as 'across all contiguous RBs.' The CORESET may comprise a list of TCI states, wherein the CORESET is not a CORESET #0. The CORESET may comprise a parameter of a TCI presence in DCI. The wireless device may expect that a DCI format comprises a TCI indication in DCI based on the DCI format (e.g., a DCI format 1_1 and/or a DCI format 0_1) scheduled via a search space associated with the CORESET, for example, if the DCI indicates/comprises the TCI field for the CORESET. The CORESET may optionally comprise one or more of a DMRS scrambling identity, a CORESET pool index, an enhanced CORESET index (e.g., ControlResourceSetId-v16xy), a TCI present in DCI for a DCI format 1_2, and an RB offset. The wireless device may ignore the CORESET index, for example, if the enhanced CORESET index is present in the CORESET configuration. The enhanced CORESET index may indicate a value between [0, . . . , 15] whereas the CORESET index may indicate a value between [0, . . . , 11].

A CORESET may be associated with a search space, and the wireless device may determine search space candidates and/or monitoring occasions of the search space based on configuration of the search space and the CORESET. A search space may be associated with a CORESET, and the wireless device may determine search space candidates and/or monitoring occasions of the search space based on configuration of the search space and the CORESET. Parameters of the search space may comprise an index of the CORESET, for example, if the search space is associated with the CORESET or the CORESET is associated with the search space.

A search space may comprise an index of the search space (e.g., searchSpaceId), an index for the associated CORESET (e.g., controlResourceSetId), a monitoring periodicity and offset (e.g., periodicity in terms of a number/quantity of slots and an offset in terms of a number/quantity of slots, between [1, 2560] slots for periodicity, an offset between [0, . . . , P−1] where the P is the periodicity). The search space may comprise a duration, wherein the wireless device may monitor the search space in consecutive slots starting from the monitoring occasion based on the duration. The base station might not configure the duration for a search space scheduling a DCI format 2_0. A maximum duration value may be the periodicity −1 (e.g., repeated in each slot within an interval/periodicity). The search space may comprise monitoring symbols within a slot (e.g., a bitmap of size of OFDM symbols in a slot (e.g., 12 for extended cyclic prefix (CP), 14 for normal CP)). The search space may comprise a set of a number/quantity of candidates of each aggregation level (e.g., a first candidate number/quantity for an aggregation level L=1, a second candidate number/quantity of an aggregation level L=2, and so on). The search space may comprise a search space type (e.g., between CSS and USS). Each CSS or USS may comprise one or more DCI formats monitored in the search space. For example, for CSS, one or more of a DCI format 0_0/1_0, a DCI format 2_0, a DCI format 2_1, a DCI format 2_2 and a DCI format 2_3 may be configured. For USS, the base station may configure a list of search space group index (if configured). For USS, the base station may configure a frequency monitoring occasion/location for a wideband operation of unlicensed spectrum or licensed spectrum. In the specification, DCI format 0_0/1_0 may be interchangeably used with DCI format 0-0/1-0 or fallback DCI format. DCI format 0_1/1_1 may be interchangeably used with DCI format 0-1/1-1 or non-fallback DCI format. DCI format 0_2/1_2 may be interchangeably used with DCI format 0-2/1-2 or non-fallback DCI format.

Configuration parameters of the pdsch-Config may comprise parameters for receiving transport blocks. For example, the configuration parameters may indicate/comprise a data scrambling identify for PDSCH, a DM-RS mapping type (e.g., between mapping type A and mapping type B), a list of transmission configuration indicator (TCI) states, a parameter of (virtual RB) VRB-to-(physical RB) PRB interleaver, a resource allocation type (e.g., resource allocation type 0, resource allocation type 1 or a dynamic switch between two), a list of time domain allocation, a aggregation factor, a list of rate matching patterns, an RBG (resource block group) size, an MCS table (e.g., between QAM 256 and a QAM64LowSE, between high MCSs or low MCSs), a maximum codeword (e.g., 1 or 2), parameter (s) related to a PRB bundling, maximum MIMO layer, a minimum scheduling offset related to a power saving technique, and/or one or more parameters related to a DCI format 1_2 (e.g., a compact DCI or small sized DCI format).

A base station may configure a CORESET with a plurality of TCI states. The base station may indicate a TCI of the plurality of TCI states for the CORESET as an active TCI state via a MAC CE command or a DCI command. A serving cell index (e.g., Serving Cell ID 1910) may indicate an index of a serving cell, where the MAC CE is used. A CORESET index (e.g., CORESET ID 1920) may indicate a CORESET index where the MAC CE is used. A TCI state index (e.g., TCI State ID 1940) may indicate a TCI state identified by TCI-StateId. The TCI state ID 1940 may indicate one TCI state of first 64 TCI states configured for pdsch-Config of a BWP of the serving cell, for example, if the CORESET is CORESET #0. The BWP of the serving cell may be an active BWP of the cell. The TCI state ID 1940 may indicate a TCI state of the plurality of TCI states configured for the CORESET in pdcch-Config, for example, if the CORESET is not the CORESET #0 (e.g., CORESET ID is not zero).

A physical downlink control channel (PDCCH) may comprise one or more CCEs. For example, the PDCCH may comprise one CCE that may correspond to an aggregation level (AL)=1. For example, the PDCCH may comprise two CCEs that may correspond to an AL of two (AL=2). For example, the PDCCH may comprise four CCEs that may correspond to an AL of four (AL=4). For example, the PDCCH may comprise eight CCEs that may correspond to an AL of eight (AL=8). For example, the PDCCH may comprise sixteen CCEs that may correspond to an AL of sixteen (AL=16).

A PDCCH may be carried over one or more control resource sets (CORESETs). A CORESET may comprise N_rb_CORESET resource blocks (RBs) in the frequency domain and N_symbol_CORESET symbols in the time domain. For example, the N_rb_CORESET may be a multiple of 6 RBs (e.g., 6, 12, 18, etc.). For example, N_symbol_CORESET may be 1, 2 or 3. A CCE may comprise M (e.g., M=6) resource-element groups (REGs). For example, one REG may comprise one RB during one OFDM symbol. REGs within the CORESET may be ordered/numbered in increasing order in a time-first manner, starting with 0 for a first OFDM symbol and a lowest number (e.g., a lowest frequency) RB in the CORESET. The wireless device may increase the numbering in the first OFDM symbol by increasing a frequency location or an RB index. The wireless device may move to a next symbol, for example, based on (e.g., after or in response to) all RBs of the first symbol having been indexed. The wireless device may map one or more REG indices for one or more 6 RBs of N_rb_CORESET RBs within N_symbol_CORESET OFDM symbols of the CORESET.

A wireless device may receive configuration parameters from a base station. The configuration parameters may indicate/comprise a plurality of CORESETs. One CORESET may be associated with one CCE-to-REG mapping. For example, a single CORESET may have a single CCE mapping to physical RB s/resources of the single CORESET. For example, a CCE-to-REG of a CORESET may be interleaved or non-interleaved. For example, a REG bundle may comprise L consecutive REGs (e.g., iL, iL+1, . . . , iL+L−1). For example, L may be a REG bundle size (e.g., L=2 or 6 for N_symbol_CORESET=1 and L=N_symbol_CORESET or 6, for example, if N_symbol_CORESET is 2 or 3). An index of a REG bundle (e.g., i), may be in a range of [0, 1, . . . N_reg_CORESET/L−1]. For example, N_reg_CORESET may be defined as N_rb_CORESET*N_symbol_CORESET (e.g., a total number/quantity of REGs in the single CORESET). For example, a j-th indexed CCE may comprise one or more REG bundles of {f(6j/L), f(6j/L+1), . . . , f(6j/L+6/L−1)}. For example, f(x) may be an interleaver function. For example, f(x) may be x (e.g., j-th CCE may comprise 6j/L, 6j/L+1, . . . , and 6j/L+6/L−1), for example, if the CCE-to-REG mapping is non-interleaved. When the CCE-to-REG mapping may be interleaved, L may be defined as one of {2, 6} when N_symbol_CORESET is 1, or L may be defined as one of {N_symbol_CORESET, 6} when N_symbol_CORESET is 2 or 3. When the CCE-to-REG mapping may be interleaved, the function f(x) may be defined as (rC+c+n_shift) mod (N_reg_CORESET/L), wherein x=cR+r, r=0, 1, . . . , R−1, c=0, 1, . . . , C−1, C=N_reg_CORESET/(L*R), and R is one of {2, 3, 6}.

For example, the configuration parameters may indicate/comprise a frequencyDomainResources that may define N_rb_CORESET. The configuration parameters may indicate/comprise duration that may define N_symbol_CORESET. The configuration parameters may indicate/comprise cce-REG-MappingType that may be selected between interleaved or non-interleaved mapping. The configuration parameters may indicate/comprise reg-BundleSize that may define a value for L for the interleaved mapping. For the non-interleaved mapping, L=6 may be predetermined. The configuration parameters may indicate/comprise shiftIndex that may determine n_shift as one of {0, 1, . . . , 274}. The wireless device may determine/assume a same precoding for REGs within a REG bundle, for example, if precoder granularity (e.g., a precoderGranularity indicated/configured by the configuration parameters) is configured as sameAsREG-bundle. The wireless device may determine/assume a same precoding for all REGs within a set of contiguous RBs of a CORESET, for example, if the precoderGranularity is configured as allContiguousRBs. A first CORESET (e.g., CORESET #0) may be defined/configured with L=6, R=2, n_shift=cell ID, and precoderGranularity=sameAsREG-bundle.

A base station may send (e.g., transmit) one or more messages comprising configuration parameters. The configuration parameters may indicate/comprise a plurality of serving cells for a wireless device. The configuration parameters may indicate/comprise parameter(s) to enable control channel repetition. For example, the control channel repetition may be sent (e.g., transmitted) via one or more serving cells. The control channel repetition may schedule one or more resources for a transport block. The transport block may be sent (e.g., transmitted) via one or more PDSCHs or one or more PUSCHs. For example, the control channel repetition may be sent (e.g., transmitted) via a single cell, where the single cell may operate with a single transmission and reception point (TRP) or a plurality of TRPs. The base station may send (e.g., transmit) one or more control channels for control channel repetition via one or more resources in different frequency resources (e.g., repetition in a frequency domain or in a plurality of carriers/cells). The one or more resources may overlap in time domain. The base station may send (e.g., transmit) one or more second control channels for control channel repetition via one or more second resources in different time resources (e.g., repetition in a time domain or in a plurality of slots). The one or more second resources may overlap in frequency domain. For example, the base station may send (e.g., transmit) the repetitions of the control channel repetition via a plurality of CORESETs of the single cell. For example, the base station may send (e.g., transmit) the control channel repetition via a plurality of search spaces of the single cell.

The control channel repetition may be sent (e.g., transmitted) via a plurality of PDCCHs. For example, a PDCCH may indicate a physical control channel sent (e.g., transmitted) in one search space candidate. A search space candidate may comprise one or more CCEs based on an aggregation level. The plurality of PDCCHs may be sent (e.g., transmitted) via a plurality of CORESETs of a plurality of cells. For example, a CORESET of a cell of the plurality of cells may send (e.g., transmit) a PDCCH of the plurality of the PDCCHs. The plurality of PDCCHs may be sent (e.g., transmitted) via a plurality of CORESETs of a cell. For example, a CORESET of the plurality of CORESETs may send (e.g., transmit) a PDCCH of the plurality of the PDCCHs. The plurality of PDCCHs may be sent (e.g., transmitted) via a plurality of search spaces, where a PDCCH of the plurality of PDCCHs may be sent (e.g., transmitted) via a search space of the plurality of search spaces. The plurality of PDCCHs may be sent (e.g., transmitted) via a plurality of search space candidates where each PDCCH of the plurality of PDCCHs may be sent (e.g., transmitted) via a search space candidate of the plurality of search space candidates. The plurality of search space candidates may belong to a single search space or a plurality of search spaces. A search space may comprise a set of search space candidates associated with monitoring occasions. Monitoring occasions of the search space may refer to timing occasions during which the wireless device may monitor a search space candidate for receiving DCI message/PDCCH transmission.

A PDCCH of the plurality of PDCCHs for the control channel repetition may send (e.g., convey/transmit) DCI based on a DCI format. For example, first DCI of a first PDCCH of the plurality of PDCCHs may be the same as second DCI of a second PDCCH of the plurality of PDCCHs. For example, content of the first DCI message/PDCCH transmission may be the same as content of the second DCI message/PDCCH transmission. Based on the same content of the plurality of PDCCHs, the wireless device may aggregate the plurality of DCI messages/PDCCH transmissions, for example, before decoding DCI message/PDCCH transmission. For example, the wireless device may need to determine a reference frequency domain resource, a reference time domain resource, a reference CCE index, and/or a reference REG index, for example, if the control channel repetition is sent (e.g., transmitted) via equal content DCI messages/PDCCH transmissions. For example, the wireless device may determine an aggregated DCI message/PDCCH transmission by aggregating the plurality of DCI messages/PDCCH transmissions. The wireless device may decode the aggregated DCI message/PDCCH transmission. For example, the reference frequency domain resource of the plurality of DCI messages/PDCCH transmissions may be determined based on an earliest PDCCH (or a latest PDCCH) among the plurality of PDCCHs. The first PDCCH may determine the reference frequency domain resource, for example, if a first PDCCH of the plurality of PDCCHs is sent (e.g., transmitted) in a slot n and a second PDCCH of the plurality of PDCCHs is sent (e.g., transmitted) in a slot n+1. Similarly, the reference time domain resource and/or the reference CCE index and/or the reference REG may be determined based on the earliest PDCCH or the latest PDCCH. The reference frequency domain resource of the plurality of DCI messages/PDCCH transmissions may be determined based on a CORESET index of a plurality of CORESETs where the plurality of DCI messages/PDCCH transmissions are sent (e.g., transmitted). For example, a smallest (or a largest) index of the plurality of CORESETs may be used for the determining.

The reference frequency domain resource of the plurality of DCI messages/PDCCH transmissions may be determined based on a search space index of one or more search spaces where the plurality of DCI messages/PDCCH transmissions are sent (e.g., transmitted). For example, a smallest (or a largest) index of the one or more search spaces may be used for the determining. The reference frequency domain resource of the plurality of DCI messages/PDCCH transmissions may be determined based on a cell index of one or more cells where the plurality of DCI messages/PDCCH transmissions are sent (e.g., transmitted). For example, a smallest (or a largest) index of the one or more cells may be used for the determining. Similarly, the reference time domain resource and/or the reference CCE index and/or the reference REG may be determined based on the CORESET index, the search space index and/or the cell index. Combinations of transmission time, a CORESET index, a search space, and/or a cell index may be used. For example, the reference frequency domain resource may be determined based on the transmission time of DCI message/PDCCH transmission. The wireless device may use the CORESET index, the search space index, and/or the cell index to further identify a reference DCI message/PDCCH transmission, for example, if there are multiple DCI messages/PDCCH transmissions sent (e.g., transmitted) at the same time. The wireless device may determine the reference DCI message/PDCCH transmission for determining the reference frequency domain resource, the reference time domain resource, the reference CCE index, and/or the reference REG index.

The base station may configure a maximum repetition number/quantity K for the control channel repetition. The base station may send (e.g., transmit) a number/quantity of repetitions M that is smaller than the K. The wireless device may determine the reference DCI message/PDCCH transmission, for example, based on a candidate DCI message/PDCCH transmission in the K-th repetition regardless whether the K-th repetition has been actually sent (e.g., transmitted) or not, and/or, for example, based on the M being smaller than K. The wireless device may determine the reference DCI message/PDCCH transmission based on first DCI message/PDCCH transmission, which may be a first repetition. The wireless device may determine the reference DCI message/PDCCH transmission based on a last DCI message/PDCCH transmission which has been actually sent (e.g., transmitted) (e.g., M-th repetition). This type of control channel repetition (e.g., same content is repeated over a plurality of DCI messages/PDCCH transmissions) may be called/referred to as a first control channel repetition mode (e.g., mode 1, repetition mode 1, first repetition mode). A base station may configure a list of time domain resource allocation entries. A time domain resource allocation entry may comprise a number/quantity of repetitions of a control channel, a scheduling offset between the control channel and a PDSCH, and/or a number/quantity of PDSCH repetitions. For example, the number/quantity of repetitions of the control channel may represent the number/quantity of repetitions K. Based on the number/quantity of repetitions, the wireless device may determine a reference DCI message/PDCCH transmission timing based on the K-th DCI message/PDCCH transmission repetition. The repeated DCI messages/PDCCH transmissions may indicate an entry of the list of time domain resource allocation entries.

First DCI message/PDCCH transmission of the plurality of DCI messages/PDCCH transmissions may be different from second DCI message/PDCCH transmission of the plurality of DCI messages/PDCCH transmissions. For example, a wireless device might not aggregate the first DCI message/PDCCH transmission and the second DCI as contents of the first DCI message/PDCCH transmission may be different. The wireless device may attempt to decode the first DCI message/PDCCH transmission separately from the second DCI message/PDCCH transmission. For example, the wireless device may complete the decoding of the control channel repetition, for example, if the wireless device has received at least one DCI message/PDCCH transmission of the plurality of DCI messages/PDCCH transmissions. The wireless device may be able to receive or send (e.g., transmit) a TB scheduled by the plurality of DCI messages/PDCCH transmissions, for example, if the wireless device has received at least one DCI message/PDCCH transmission of the plurality of DCI messages/PDCCH transmissions. This type of control channel repetition (e.g., potentially different contents are sent (e.g., transmitted) via a plurality of DCI messages/PDCCH transmissions, and DCI message/PDCCH transmission of the plurality of DCI messages/PDCCH transmissions may schedule one or more resources of a transport block) may be called/referred to as a second control channel repetition mode (e.g., mode 2, repetition mode 2, second repetition mode). For example, a reference DCI message/PDCCH transmission of the plurality of DCI messages/PDCCH transmissions based on the second control channel repetition mode may be each DCI message/PDCCH transmission received by the wireless device.

Figure 19:
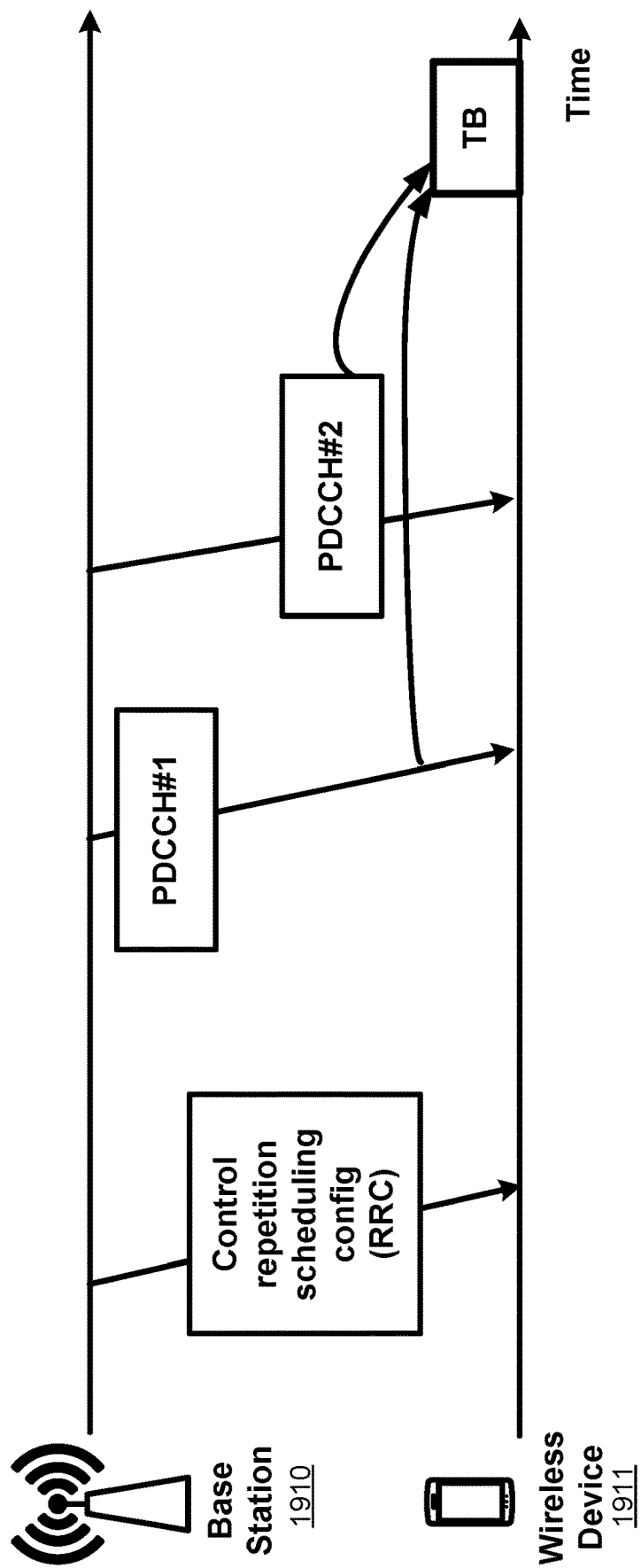
FIG. 19 shows an example of a repetition.

FIG. 19 shows an example of a repetition. The repetition may comprise PDCCH repetition. A base station 1910 may send/transmit one or more RRC messages comprising one or more configuration parameters. The configuration parameter(s) may comprise one or more parameters for a control channel repetition. The one or more parameters may comprise one or more scheduling carriers/cells for transmitting/sending one or more PDCCH transmissions/DCI messages of repeated control channels (and/or of the control channel repetition). The one or more parameters may comprise one or more search spaces for the control channel repetition. Control channel repetition may be enabled via a first search space (e.g., SS #1) of a first carrier/cell (e.g., DL carrier #0). The one or more parameters may indicate one or more indexes of the one or more search spaces of the first carrier and/or a carrier/cell index of the first carrier. The base station 1910 may send/transmit a first PDCCH transmission (e.g., PDCCH #1), scheduling at least one TB via the first carrier, via the first search space of the first carrier. The base station 1910 may send/transmit a second PDCCH transmission (e.g., PDCCH #2), scheduling the at least one TB via the first carrier, via the first search space of the first carrier. The first PDCCH transmission and the second PDCCH transmission may be transmitted/sent via a plurality of monitoring occasions of the first search space. The wireless device 1911 may aggregate the first PDCCH and the second PDCCH, for example, based on the first control channel repetition mode. The wireless device 1911 may attempt to receive/decode each PDCCH transmission independently, for example, based on the second control channel repetition mode. The wireless device 1911 may send/transmit and or receive the at least one TB, for example, based on the first PDCCH and/or the second PDCCH.

The base station 1910 may send/transmit one or more RRC messages. The one or more RRC messages may indicate a control channel repetition enabled for a first carrier/cell. The wireless device 1911 may determine one or more first search spaces of the first carrier/cell, for example, based on the indication of the control channel repetition. The wireless device 1911 may determine the one or more first search spaces for the control channel repetition, for example, based on the active BWP of the first carrier/cell. The one or more first search spaces may be configured with at least one of: a non-fallback DCI format, a DCI format 1_1, a DCI format 1_2, a DCI format 0_1, and/or a DCI format 0_2. The one or more RRC messages may indicate one or more search space indexes of the one or more first search spaces for the control channel repetition. The one or more RRC messages may indicate one or more DCI formats, that the wireless device 1911 may apply/use for the control channel repetition. The wireless device 1911 may determine the one or more first search spaces of the first carrier/cell, for example, based on the one or more DCI formats of the control channel repetition.

A base station may send (e.g., transmit) a plurality of DCI messages/PDCCH transmissions, scheduling resource(s) for a transport block of a cell, via a plurality of TRPs or via a plurality of CORESET pools or via a plurality of CORESET groups. For example, a base station may configure a first TRP (or a first CORESET pool) for a first cell via one or more RRC messages. The one or more RRC messages may comprise configuration parameters. The configuration parameters may indicate/comprise the first CORESET pool of the first cell. The configuration parameters may indicate/comprise a second CORESET pool of the first cell. For example, the second CORESET pool may correspond to a second TRP of the first cell. The base station may send (e.g., transmit) first DCI message/PDCCH transmission via a first search space of a first CORESET of the first CORESET pool. The base station may send (e.g., transmit) second DCI message/PDCCH transmission via a second search space of a second CORESET of the second CORESET pool. The first DCI message/PDCCH transmission and the second DCI message/PDCCH transmission may schedule resource(s) of a transport block. The first/PDCCH and the second DCI message/PDCCH transmission may be repeated transmission of a control information. The transport block may be sent (e.g., transmitted) via the first TRP and the second TRP. The transport block may be sent (e.g., transmitted) based on a plurality of TCI states. The transport block may be sent (e.g., transmitted) based on a TCI state, where the TCI state is associated with a plurality of TCI states. The transport block may be sent (e.g., transmitted) via the first TRP or the second TRP.

The configuration parameters may indicate control channel repetition enabled/configured for the first cell. For example, a parameter of a control channel repetition mode may be configured. The control channel repetition mode may be the first control channel repetition mode or the second control channel repetition mode. The configuration parameters may indicate/comprise a first CORESET associated with (e.g., configured with or of) the first CORESET pool. The configuration parameters may indicate/comprise a second CORESET associated with (e.g., configured with or of) the second CORESET pool. The wireless device may determine a pair of the first CORESET and the second CORESET, where repeated DCI message/PDCCH transmissions may be sent (e.g., transmitted), based on a rule. For example, the wireless device may determine the first CORESET of the first CORESET pool based on a search space associated with the first CORESET, where the wireless device may monitor a DCI format via the search space. For example, the DCI format may be a DCI format 1_1, a DCI format 0_1, a DCI format 1_2, a DCI format 0_2, a DCI format 3_0, or a DCI format 3_1. The wireless device may determine the plurality of first CORESETs of the first CORESET pool, for example, if there is a plurality of first search spaces, of the first CORESET pool, configured with the DCI format. Similarly, the wireless device may determine the second CORESET of the second CORESET pool based on a search space associated with the second CORESET, where the wireless device may monitor the DCI format via the search space. The wireless device may determine the plurality of second search spaces, for example, if there is a plurality of second search spaces, of the second CORESET pool, configured with the DCI format. The wireless device may be configured with at most one search space for a DCI format in each CORESET pool.

The wireless device may determine the second CORESET of the second CORESET pool based on a first CORESET index of the first CORESET of the first CORESET pool. For example, a second index of the second CORESET may be the first CORESET index+GAP. For example, the GAP may be a determined/predetermined value (e.g., 0, 12). For example, the configuration parameters may indicate/comprise a parameter indicating a value of the GAP. The wireless device may determine the second CORESET based on a second search space, associated with the second CORESET, and the first search space. For example, an index of the second search space may be a first index of the first search space+SS-GAP. For example, SS-GAP may be a predetermined value (e.g., 20, 0). For example, the wireless device may determine the second CORESET and/or the second search space based on an association configured by the configuration parameters. For example, the configuration parameters may indicate the association between each of a CORESET/search space associated with the first CORESET pool and each of a CORESET/search space associated with the second CORESET pool. The configuration parameters may indicate/comprise a first CORESET and/or a first search space of the first CORESET pool. The wireless device may monitor first DCI message/PDCCH transmission via the first search space of the first CORESET pool. The configuration parameters may indicate/comprise a parameter indicating control channel repetition across a multi-TRP or a multi-CORESET pool for the first CORESET or the first search space. Based on the parameter, the wireless device may determine a second CORESET or a second search space of the second CORESET pool. For example, the wireless device may determine the second CORESET based on one or more parameters of the first CORESET. For example, a same set of resource blocks configured for the first CORESET may be used for the second CORESET. For example, monitoring occasions of the first search space may be used for determining monitoring occasions of the second search space.

A base station may indicate control channel repetition based on a CORESET. For example, the base station may send (e.g., transmit) a plurality of DCI messages/PDCCH transmissions via the CORESET. The base station may send (e.g., transmit) the plurality of DCI messages/PDCCH transmissions over a plurality of TRPs. The base station may send (e.g., transmit) one or more RRC messages and/or MAC CEs indicating a plurality of TCI states are activated for the CORESET. For example, the plurality of TCI states may comprise a first TCI state, corresponding to a first TRP of the plurality of TRPs, and a second TCI state, corresponding to a second TRP of the plurality of TRPs. The base station may send (e.g., transmit) one or more second RRC messages comprising configuration parameters for the CORESET. For example, the configuration parameters may indicate control channel repetition based on the CORESET. The configuration parameters may indicate the control channel repetition across a plurality of TRPs. The configuration parameters may indicate repetition pattern across the plurality of TRPs. For example, the repetition pattern (e.g., TRP switching pattern) may be [0, . . . , 0, 1, . . . , 1] where 0 may represent a first TRP of the plurality of TRPs and 1 may represent a second TRP of the plurality of TRPs. The base station may indicate a bitmap indicating a number/quantity of control channel repetitions. Each bit of the bitmap may represent which TRP may send (e.g., transmit) i-th repetition. The repetition pattern may be [0, 1, 0, 1, . . . , 0, 1]. The repetition pattern may be [0, 0, . . . , 0, 1, 1, . . . 0, 0, . . . , 0, 1, 1, . . . , 1]. Various repetition patterns may be considered. Based on the repetition pattern, the wireless device may receive a control channel repetition based on a TCI state of the plurality of TCI states. The wireless device may receive the control channel repetition based on the first TCI state, for example, if the repetition pattern indicates the first TRP. The wireless device may receive the control channel repetition based on the second TCI state, for example, if the repetition indicates the second TRP.

Figure 20:
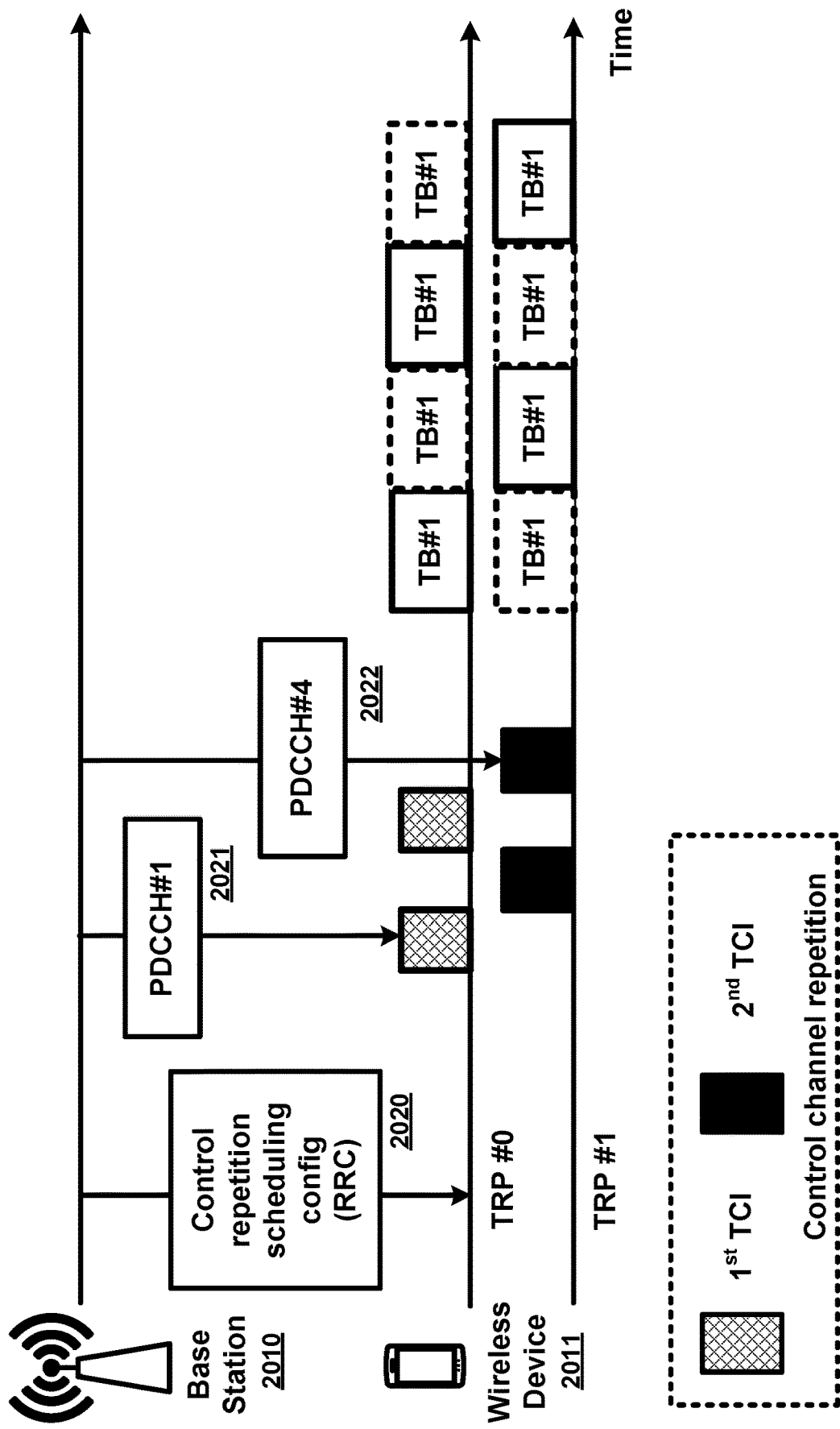
FIG. 20 shows an example of a repetition.

FIG. 20 shows an example of control channel repetition across a plurality of TRPs (or a plurality of CORESET pools). The base station 2010 may send (e.g., transmit) one or more RRC messages 2020 comprising configuration parameters. The configuration parameters may indicate/comprise a first TRP (TRP #0) and a second TRP (TRP #1) associated with a cell. The configuration parameters may comprise/indicate control channel repetition across a multi-TRP (e.g., via the first TRP and the second TRP). The base station 2010 may send (e.g., transmit) first DCI message/PDCCH transmission (e.g., PDCCH #1 2021) via the first TRP or a first CORESET pool. The first DCI message/PDCCH transmission may comprise/indicate resources scheduling a TB via the multi-TRP. The base station 2010 may send (e.g., transmit) second DCI message/PDCCH transmission (e.g., PDCCH #2) via the second TRP or a second CORESET pool. The second DCI message/PDCCH transmission may comprise/indicate the resources scheduling the TB via the multi-TRP. The first DCI message/PDCCH transmission and the second DCI message/PDCCH transmission may indicate a same HARQ process index (e.g., HARQ-K) scheduling the TB. The base station 2010 may send (e.g., transmit) a third DCI message/PDCCH transmission via the first TRP. The base station 2010 may send (e.g., transmit) a fourth DCI message/PDCCH transmission (e.g., PDCCH #4 2022) via the second TRP. A control information scheduling the TB may be repeated four times via a plurality of TRPs. A wireless device 2011 may monitor the first DCI message/PDCCH transmission 2021 and the third DCI message/PDCCH transmission based on a first TCI state, associated with the first TRP or the first CORESET pool. The wireless device 2011 may monitor the second DCI message/PDCCH transmission and the fourth DCI message/PDCCH transmission 2022 based on a second TCI state, associated with the second TRP or the second CORESET pool.

The base station 2010 may repeat the TB via four repetitions of the first TRP and via four repetitions of the second TRP. The wireless device 2011 may repeat the TB simultaneously via the first TRP and the second TRP, for example, if the wireless device 2011 supports simultaneous reception via the first TRP and the second TRP. The base station 2010 may send (e.g., transmit) the repeated transmission of the TB via the first TRP and the second TRP based on a time-domain division multiplexing, for example, if the wireless device 2011 does not support simultaneous reception via the first TRP and the second TRP. For example, the base station 2010 may send (e.g., transmit) a first repetition of the repeated transmission via the first TRP. The base station 2010 may send (e.g., transmit) a second repetition of the repeated transmission via the second TRP. A switching pattern between the first TRP and the second TRP may be configured by the base station 2010 based on RRC/MAC-CE/DCI signaling. The first DCI and the second DCI may schedule the repeated transmissions of the TB. Control channel repetition via a plurality of TRPs may enhance reliability and lead to better QoS experience.

A base station 2010 may send (e.g., transmit) one or more RRC messages 2020 comprising configuration parameters. The configuration parameters may indicate control channel repetition enabled for a cell. The base station 2010 may send (e.g., transmit) a plurality of DCI messages/PDCCH transmissions scheduling a transport block via a plurality of CORESETs of the cell. For example, the configuration parameters may configure a first CORESET and a second CORESET for the control channel repetition. The configuration parameters may comprise/indicate a first search space associated with the first CORESET. The configuration parameters may comprise/indicate a second search space associated with the second CORESET. The configuration parameters may comprise/indicate a first TCI state associated with the first CORESET. The configuration parameters may comprise/indicate a second TCI state associated with the second CORESET. The first TCI state may be the same as or different from the second TCI state. The configuration parameters may comprise/indicate a set of first TCI states associated with the first CORESET. One or more MAC CEs may indicate the first TCI state of the set of the first TCI states for the first CORESET. For example, the configuration parameters may comprise/indicate a set of second TCI states associated with the second CORESET. One or more second MAC CEs may indicate the second TCI state of the set of the second TCI states for the second CORESET. The configuration parameters may indicate the first CORESET and the second CORESET are associated to schedule repeated DCI messages/PDCCH transmissions for a transport block.

The configuration parameters may indicate/comprise a search space associated with the first CORESET and the second CORESET. The configuration parameters may indicate/comprise a plurality of CORESET indexes. The configuration parameters may comprise a CORESET index, of the plurality of CORESET indexes, indicating the first CORESET. The configuration parameters may indicate/comprise one or more indexes, of the plurality of CORESET indexes, of repeated/additional CORESETs (e.g., CORESETs used for control channel repetition in addition to the first CORESET, the second CORESET). For example, an index of the one or more indexes may indicate the second CORESET. First parameters of the first CORESET and second parameters of the second CORESET may have restriction in terms of configuration, for example, if the first CORESET and the second CORESET are associated for control channel repetition. For example, a set of resource blocks (RB) in frequency domain of the first CORESET may be the same as (or a subset of or a superset of) a set of resource block(s) in frequency domain of the second CORESET. The wireless device 2011 may determine a set of RBs belonging to the first CORESET and the second CORESET for the control channel repetition. For example, a first duration of the first CORESET may be the same as a second duration of the second CORESET. For example, a number/quantity of REGs of the first CORESET may be the same as a number/quantity of REGs. For example, a number/quantity of CCEs of the first CORESET may be the same as (or less than or larger than) a number/quantity of CCEs of the second CORESET. The wireless device 2011 may determine a number/quantity of REGs based on the determined set of RBs or based on the set of RBs of the first CORESET. For example, a first CCE-to-REG mapping type of the first CORESET (e.g., between interleaved or non-interleaved) may be the same as a second CCE-to-REG mapping type of the second CORESET. For example, a precoder granularity of the first CORESET may configured as same to a precoder granularity of the second CORESET. For example, a first tci-PresenceInDCI of the first CORESET may same as a second tci-PresenceInDCI of the second CORESET. For example, a first rb-Offset of the first CORESET may be the same as a second rb-Offset of the second CORESET.

The first CORESET and the second CORESET may have potentially different configurations for one or more parameters. For example, the one or more parameters may comprise one or more TCI states. For example, the one or more parameters may comprise DM-RS scrambling identity (e.g., pdcch-DMRS-ScramblingID). For example, the one or more parameters may comprise a CORESET pool index (e.g., CoresetPoolIndex). For example, the one or more parameters may comprise a CORESET index.

The wireless device 2011 may determine whether a first number/quantity of CCEs of the first CORESET is less than or equal to (or greater than or equal to) a second number/quantity of CCEs of the second CORESET, for example, if the wireless device 2011 receives first configuration parameters of the first CORESET and second configuration parameters of the second CORESET. Based on the determining, the wireless device 2011 may consider the first CORESET and the second CORESET may be used for control channel repetition. Otherwise, the wireless device 2011 may determine the first CORESET, and the second CORESET might not be used for the control channel repetition. Alternatively, the wireless device 2011 may determine a smallest number/quantity of CCEs (e.g., M) among one or more of CCEs of a plurality of CORESETs (e.g., determine a CORESET of the plurality of CORESETs with a smallest number/quantity of CCEs). For example, the plurality of CORESETs may be configured/indicated/used for control channel repetition. The wireless device 2011 may determine/assume/consider that first M candidates of each CORESET of the plurality of CORESETs are used for the control channel repetition.

A wireless device 2011 may determine a number/quantity of REGs of a first CORESET of a plurality of CORESETs configured for control channel repetition. The wireless device 2011 may determine a second number of REGs of a second CORESET of the plurality of CORESETs. The wireless device 2011 may determine whether the number of REGs is equal to the second number of REGs. The wireless device 2011 may consider that the control channel repetition is configured via the first CORESET and the second CORESET, for example, based on (e.g., after or in response to) the determination that the number/quantity of REGs is equal to the second number/quantity of REGs. Otherwise, the wireless device 2011 may consider the configuration as an error case and might not activate the control channel repetition via the first CORESET and the second CORESET. The wireless device 2011 may determine a smallest number/quantity of REGs of the plurality of CORESETs (e.g., determine a CORESET with a smallest number/quantity of REGs). The wireless device 2011 may assume that the smallest number/quantity of REGs used for the control channel repetition.

The configuration parameters of the search space, associated with the first CORESET and the second CORESET, may comprise/indicate a switching pattern or mapping pattern of the first CORESET and the second CORESET. For example, the wireless device may determine a search space monitoring occasion based on the configuration parameters of the search space. The wireless device may determine the search space monitoring occasion based on the first CORESET. The wireless device may determine a second search space monitoring occasion or an extended monitoring occasion based on a rule. For example, the wireless device may determine the second search space monitoring occasion as a next slot of the first monitoring occasion. The wireless device may determine the second search space monitoring occasion based on the second search space. The configuration parameters may indicate a bitmap of a number/quantity of OFDM symbols in a slot (or of a number/quantity of slots, for example, a multiple slots). The bitmap may indicate 0 for the first CORESET or 1 for the second CORESET for each corresponding OFDM symbol or a slot. The wireless device may monitor a search space monitoring occasion based on the first CORESET, for example, if 0 is indicated for an OFDM symbol. The wireless device may monitor a second search space monitoring occasion based on a second CORESET, for example, if 1 is indicated for a second OFDM symbol.

A wireless device may receive one or more RRC messages comprising configuration parameters. The configuration parameters may indicate/comprise a CORESET of a bandwidth part of a cell. The configuration parameters may comprise parameters of a search space associated with the CORESET. The parameters of the search space may indicate a first monitoring periodicity in a unit of a first time duration. For example, the first time duration may be a slot or a few slots. The parameters of the search space may indicate a second monitoring periodicity in a unit of a second time duration. For example, the second time duration may be an OFDM symbol or a few OFDM symbols or a slot. For example, the second time duration may be smaller than the first time duration. The wireless device may monitor one or more repeated DCI messages/PDCCH transmissions via one or more monitoring occasions determined based on the second monitoring periodicity within the first monitoring periodicity. For example, the configuration parameters may indicate the one ore monitoring occasions within the first monitoring periodicity.

For example, the wireless device may receive/monitor first DCI message/PDCCH transmission of the one or more repeated DCI messages/PDCCH transmissions via a first monitoring occasion of the one or more monitoring occasions. The wireless device may receive/monitor second DCI message/PDCCH transmission of the one or more repeated DCI messages/PDCCH transmissions via a second monitoring occasion of the one or more monitoring occasions. The first DCI message/PDCCH transmission may be the same as the second DCI message/PDCCH transmission. The first DCI message/PDCCH transmission and the second DCI message/PDCCH transmission may indicate the same resource(s) for a transport block. The wireless device may receive/monitor DCI via the one or more monitoring occasions, where a search space candidate for the DCI may comprise one or more candidates of the one or more monitoring occasions. For example, the search space candidate may comprise a first candidate of the first monitoring occasion and a second candidate of the second monitoring occasion. For example, a first starting CCE index of the first candidate of the first monitoring occasion may be the same as a second starting CCE index of the second candidate of the second monitoring occasion.

The wireless device may receive/monitor the DCI message/PDCCH transmission via the one or more monitoring occasions, where the search space candidate for the DCI message/PDCCH transmission may comprise one or more CCEs from the one or more monitoring occasions. For example, the CORESET may be associated with a plurality of TCI states as active TCI states. For example, the plurality of TCI states may be activated via one or more RRC messages or MAC CEs or DCIs. The wireless device may monitor the first monitoring occasion based on a first TCI of the plurality of TCI states. The wireless device may monitor the second monitoring occasion based on a second TCI of the plurality of TCI states.

Figure 21:
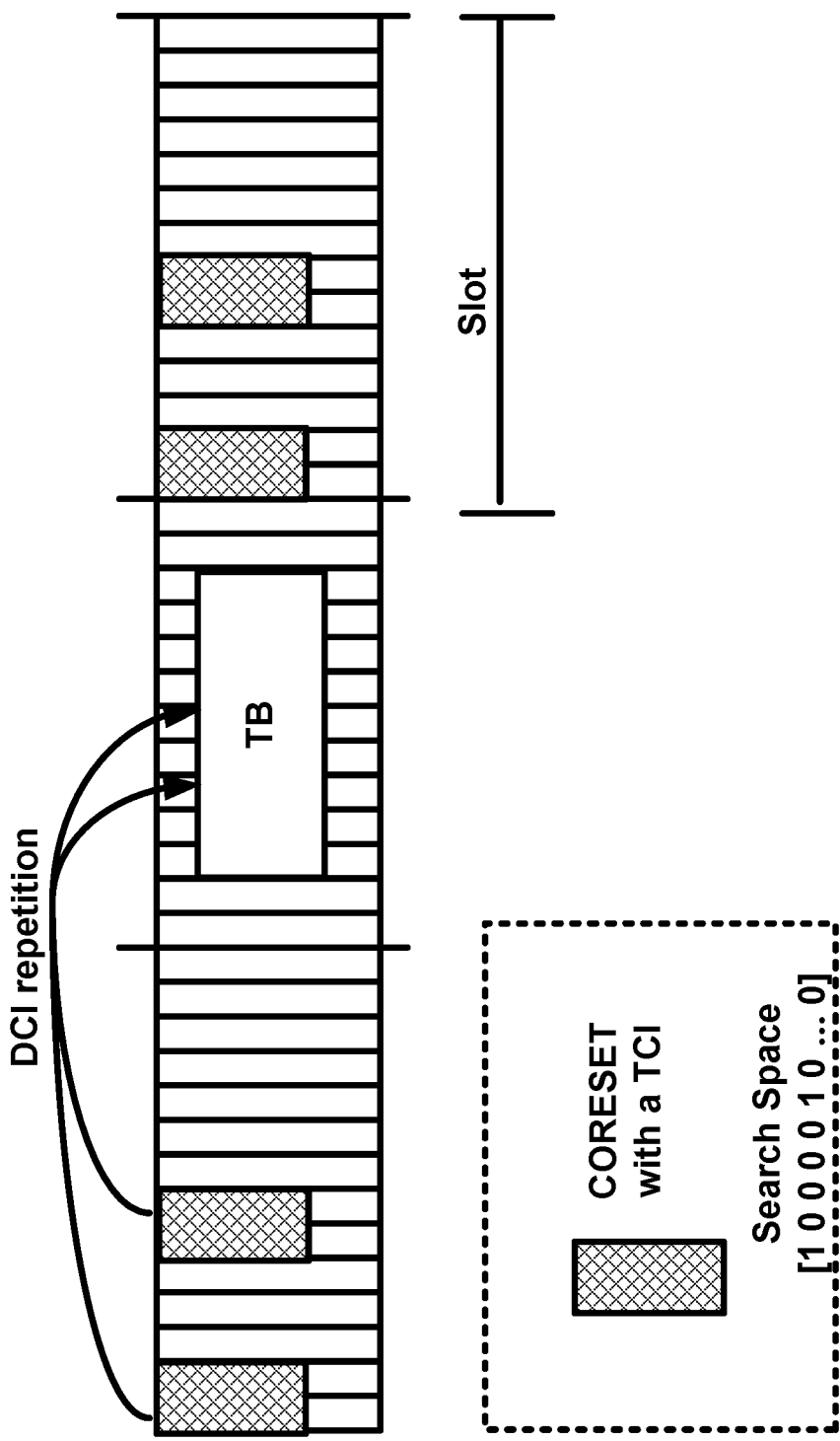
FIG. 21 shows an example of repetition of downlink control information.

FIG. 21 shows an example of repetition. The repetition may comprise repetitions using a plurality of transmission and reception points (TRPs) and/or a plurality of CORESETs. A base station may send/transmit, to a wireless device that may receive, one or more RRC messages comprising configuration parameters. The configuration parameters may comprise/indicate a CORESET associated with an active TCI state. The base station may activate the active TCI state via the one or more RRC messages, one or more MAC CEs, or one or more DCI messages. The configuration parameters may comprise/indicate a bitmap indicating one or more monitoring occasions for a control channel repetition. A bitmap size may be 14 (e.g., the bitmap corresponds to a slot where each bit maps to each OFDM symbol), such as shown in FIG. 21, and/or any other quantity of bits (e.g., less than 14, greater than 14, etc.). The bitmap may indicate monitoring occasions of a 1st OFDM symbol and a 6th OFDM symbol of a slot (or any other symbol of a slot). The configuration parameters may indicate/comprise a first monitoring periodicity as two slots (e.g., monitor in every two slots), or any other quantity of slots. The wireless device may determine one or more monitoring occasions, for example, in each monitoring periodicity, based on the bitmap. The wireless device may determine a monitoring occasion starting at a first OFDM symbol of a slot (or any other symbol of a slot), for example, if the bitmap is not present. The wireless device may determine a first monitoring occasion and/or a second monitoring occasion, for example, based on the bitmap in each monitoring periodicity. The wireless device may determine any quantity of monitoring occasions. The wireless device may monitor the first monitoring occasion and/or the second monitoring occasion for receiving one or more DCI messages/PDCCH transmissions scheduling at least one transport block.

The configuration parameters may indicate (e.g., for a search space) one or more monitoring occasions within a monitoring periodicity. For example, a periodicity value (e.g., monitoringSlotPeriodicityAndOffset) may determine the monitoring periodicity. The wireless device may determine the monitoring periodicity, for example, based on a gap between each monitoring occasion within the slot based on one or more parameters (e.g., the monitoringSymbolWithinSlot, if parameters may comprise a monitoringSymbolWithinSlot). The wireless device may expect/determine an equal interval between monitoring occasions within the slot. Additionally or alternatively, the parameters may not comprise the one or more parameters (e.g., the monitoringSymbolsWithinSlot), for example, if the search space is used for a control channel repetition. The one or more parameters (e.g., monitoringSymbolsWithinSlot) may be used to indicate the one or more monitoring occasions within a monitoring periodicity determined. The one or more parameters may be used to indicate the one or more monitoring occasions within a monitoring periodicity determined based on a periodicity and/or offset parameter (e.g., the monitoringSlotPeriodicityAndOffset), for example, if a control channel repetition is enabled. A parameter to indicate enabling of the control channel repetition may be configured for the search space and/or for a CORESET associated with the search space and/or a DCI format monitored via the search space. A duration of the search space may be used to determine the one or more monitoring occasions within the monitoring periodicity. The wireless device may determine the one or more monitoring occasions based on the monitoring periodicity and the duration, for example, if the monitoring periodicity is larger than a slot. The wireless device may determine a first monitoring occasion of the one or more monitoring occasions based on a parameter (e.g., the monitoringSlotPeriodicityAndOffset), for example, if the monitoring periodicity is P slots and the duration is D. The wireless device may determine a second monitoring occasion of the one or more monitoring occasions as a next slot of the first monitoring occasion. The wireless device may determine D number of monitoring occasions starting from the first monitoring occasions in consecutive slots. The search space may comprise a plurality of control resource set IDs (e.g., a controlResourceSetID and/or a second controlResourceSetID), for example, if a search space is configured/associated with a plurality of CORESETs.

A base station may send/transmit a first DCI message/PDCCH transmission via a first monitoring occasion of the one or more monitoring occasions. The base station may send/transmit a second DCI message/PDCCH transmission via a second monitoring occasion of the one or more monitoring occasions. The first DCI message/PDCCH transmission and the second DCI message/PDCCH transmission may indicate same resource(s) for a transport block. A first content of the first DCI message/PDCCH transmission may be the same as or different from a second content of the second DCI message/PDCCH transmission. The wireless device may determine/attempt to decode the first DCI message/PDCCH transmission independently from the second DCI message/PDCCH transmission. The wireless device may not assume/determine that the base station may send/transmit the first DCI message/PDCCH transmission and the second DCI message/PDCCH transmission. The base station may send/transmit one or more DCI messages/PDCCH transmissions via/in/over the one or more monitoring occasions. The base station may send/transmit a single DCI message/PDCCH transmission via/in/over the one or more monitoring occasions. The base station may send/transmit DCI message/PDCCH transmission via/in/over each monitoring occasion. The base station may send/transmit any number of repeated DCI messages/PDCCH transmissions via/in/over the one or more monitoring occasions.

The base station may indicate that the first control channel repetition mode is used for the one or more monitoring occasions. The wireless device may determine a number/quantity of the one or more monitoring occasions O in a monitoring periodicity, for example, based on the first control channel repetition mode. A monitoring occasion of the one or more monitoring occasions is indexed from 0, . . . , O−1, for example, based on a time-first manner. The wireless device may attempt to decode one or more search space candidates aggregating candidates from the monitoring occasion from 0 to i (e.g., i=0, . . . , O−1 or i=0, 1, 3, 7, . . . ). The wireless device may attempt to decode a first candidate aggregating a candidate from a first monitoring occasion of the one or more monitoring occasions, for example, if O is 4. The wireless device may attempt to decode a second candidate aggregating the candidate and another candidate from a second monitoring occasion of the one or more monitoring occasions. The wireless device may attempt to decode a fourth candidate aggregating each candidate of each monitoring occasion of the one or more monitoring occasions. The wireless device may aggregate candidates from the one or more monitoring occasions where a starting CCE index of a candidate of the candidates is the same. The wireless device may determine candidates, for example, based on a rule. The wireless device may determine candidates of same frequency resources in each monitoring occasion. The wireless device may determine candidates of same REGs (or same REG indexes) in each monitoring occasion.

A wireless device may determine each list of candidates. The wireless device may determine each list of candidates via each monitoring occasion of one or more monitoring occasions. The one or more monitoring occasions may be within a monitoring periodicity of a search space. The wireless device may determine a list of candidates across the one or more monitoring occasions, for example, based on each list of candidates. The list of candidates may comprise one or more candidates of an aggregation level. The wireless device may determine a first list of candidates of a first aggregation level 2*L, for example, based on two candidates over two monitoring occasions of aggregation level L or four candidates over four monitoring occasions of aggregation level L/2.

A base station may indicate four monitoring occasions in a monitoring periodicity indexed from first to fourth monitoring occasions, for example, for determination of one or more search space candidates of an aggregation level across one or more monitoring occasions. A set of candidates for an aggregation level may be assumed to be consistent across the four monitoring occasions. A first candidate of an aggregation level 2 may start in a third CCE and a second candidate of the aggregation level 2 may start in a fifth CCE. A first candidate of an aggregation level 4 may start in N_CCE (e.g., a number/quantity of CCEs)−8th CCE and a second candidate of the aggregation level 4 may start in N_CCE−fourth CCE. The wireless device may determine a list of candidates with an aggregation level 8, for example, by combining/aggregating four candidates (one candidate from one monitoring occasion each) of the aggregation level 2 and/or by combining/aggregating two candidates (one candidate from one monitoring occasion each) of the aggregation level 4. A first box in the left and a second small box in the right show AL=8 candidates. The wireless device may determine more candidates, for example, by aggregating/combining second candidates of AL=2 and/or second candidates of AL=4. The wireless device may determine a candidate of aggregation level (AL)=16, for example, by combining/aggregating four candidates of AL=4. The wireless device may determine two AL=16.

The wireless device may not aggregate candidates wherein the candidates may not comprise a candidate from the first monitoring occasion (or 1st monitoring occasion, an earliest monitoring occasion in a monitoring periodicity). The wireless device may determine possible aggregation levels and/or candidates by aggregating candidates from a 1st monitoring occasion, 1st+2nd monitoring occasions, 1st+2nd+3rd+4th monitoring occasions, 1st+2nd+3rd+4th+5th−6th+7th+8th, . . . , and so on.

The wireless device may determine a list of candidates for an aggregation level, for example, based on a hashing function applied/used in each slot. Same candidates may be determined, for example, if a first monitoring occasion and a second monitoring occasion reside in a same slot. Different candidates may be determined, for example, if a first monitoring occasion and a second monitoring occasion do not reside in a same slot. A base station may send/transmit DCI over a candidate of the across the one or more monitoring occasions.

The base station may send/transmit one or more messages comprising configuration parameters. The configuration parameters may comprise/indicate a search space group for a control channel repetition. The search space group may comprise one or more search spaces. The search group may comprise a first search space of a first carrier and a second search space of a second carrier. The search space group may comprise a first search space of a first BWP of a cell and a second search space of a second BWP of the cell. The search space group may comprise a first search space of first BWP of a first cell and a second search space of a second BWP of a second cell. The configuration parameters may indicate one or more search space groups, for example, for a BWP of a cell. A search space group of the one or more search space groups may be associated/configured with one or more DCI formats. A wireless device may determine a search space group, for example, based on one or more search spaces configured/associated with the BWP of the cell. Each search space of the one or more search spaces may be configured to monitor a DCI format of the one or more DCI formats. The one or more DCI formats may comprise a DCI format 1_1 and a DCI format 0_1. The one or more DCI formats may comprise a DCI format 0_0 and a DCI format 1_0. The one or more DCI formats may comprise a DCI format 1_2 and a DCI format 0_2. The one or more DCI formats may comprise a DCI format 3_0 and a DCI format 3_1. The one or more DCI formats may comprise downlink/uplink DCI messages of non-fallback DCI messages. The one or more DCI formats may comprise downlink/uplink DCI messages of fallback DCI messages. The one or more DCI formats may comprise DCI format(s) of sidelink DCI messages.

The wireless device may determine a search space candidate. The wireless device may determine the search space candidate from/over the one or more search space of the search space group in a similar manner addressed for a control repetition, for example, based on a plurality of CORESETs. The wireless device may determine one or more monitoring occasions in a slot, for example, based on the one or more search spaces. The wireless device may determine one or more first monitoring occasions, for example, in a slot n, based on a first search space of the one or more search spaces. The wireless device may determine, in the slot n, one or more second monitoring occasions, for example, based on a second search space of the one or more search spaces. The wireless device may monitor the one or more first monitoring occasions and the one or more second monitoring occasions in the slot n. The wireless device may not expect to have overlap between a monitoring occasion of a search space of the one or more search spaces and a second monitoring occasion of a second search space of the one or more search spaces in a time domain. The wireless device may monitor one or more repeated DCI messages, for example, based on the DCI format via the one or more monitoring occasions in the slot.

The one or more repeated DCI messages may be transmitted/sent, by the base station, via one or more PDCCHs. Each PDCCH may carry/transmit each DCI. Each DCI of the one or more repeated DCI messages may have same content or different content. The wireless device may aggregate the one or more repeated DCI messages if each DCI may have same content. The one or more repeated DCI messages may be transmitted/sent via a PDCCH. The PDCCH may be transmitted/sent over one or more search space candidates of the one or more search spaces. DCI may be transmitted/sent repeatedly via one or more PDCCHs. Each PDCCH may carrier/transmit the DCI repeatedly.

Figure 22:
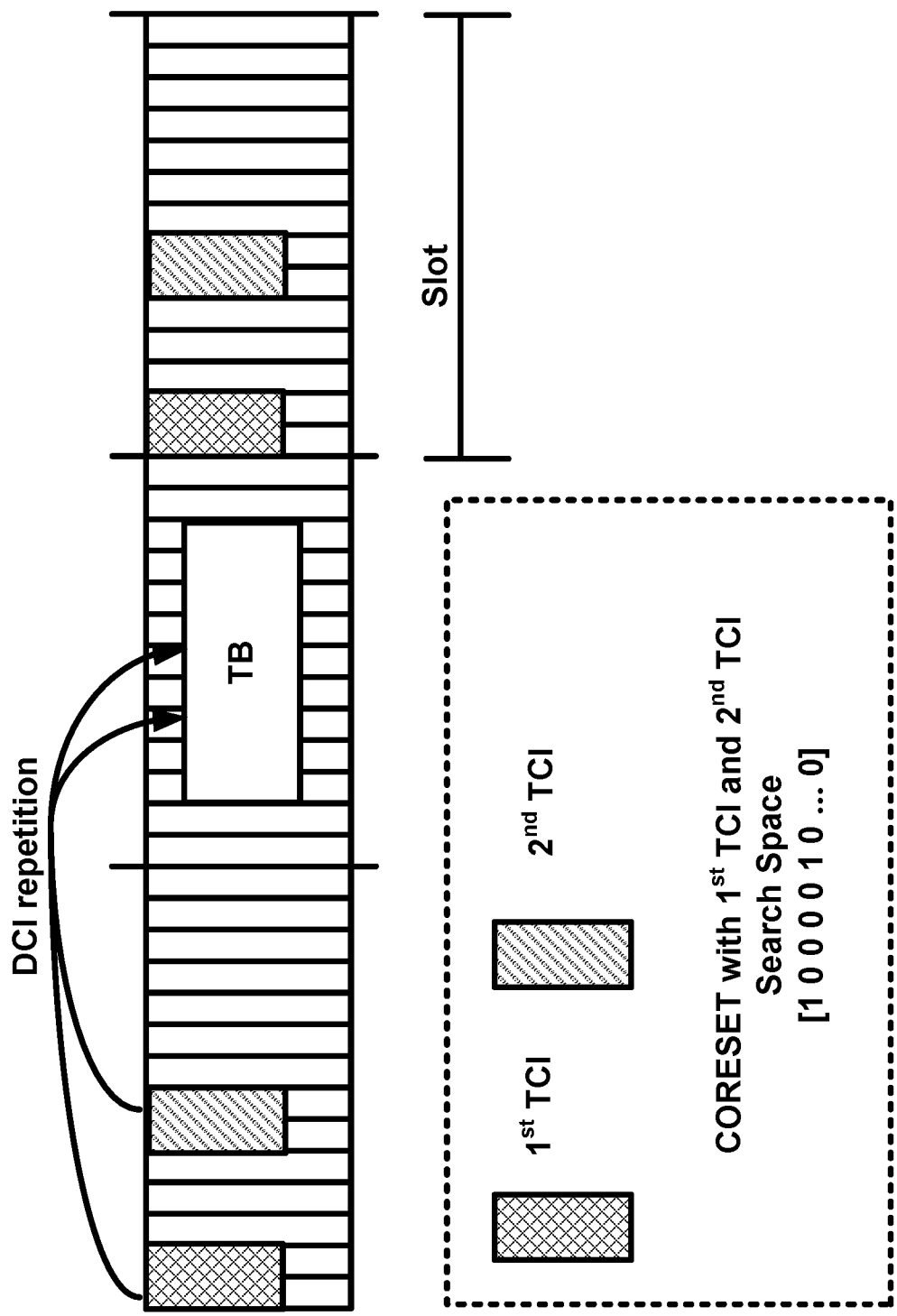
FIG. 22 shows an example of repetition of downlink control information.

FIG. 22 shows an example of repetition of downlink control information. The repetition may use one or more CORESETs. A CORESET may be associated with one or more TCI states as active TCI states. The base station may associate a plurality of TCI states with a CORESET as the active TCI states. The base station may indicate a plurality of monitoring occasions within a slot or in a monitoring periodicity for a control channel repetition. A wireless device may monitor a first monitoring occasion, for example, based on a first TCI state of the plurality of TCI states. The wireless device may monitor a second monitoring occasion, for example, based on a second TCI state of the plurality of TCI states. The base station may indicate a pattern to switch between the plurality of TCI states. Configuration parameters of a search space associated with the CORESET may comprise/indicate enabling a control channel repetition. The configuration parameters may comprise/indicate enabling a TCI switching or enabling the control channel repetition via a plurality of TCI states. The configuration parameters may comprise/indicate a switching pattern. The switching pattern may be an alternating between a first TCI state of the plurality of TCI states and a second TCI state of the plurality of TCI states in each monitoring occasion of one or more monitoring occasions within a monitoring periodicity or a slot or within a few slots (e.g., between a monitoring periodicity configured by monitoringSlotPeriodicityAndOffset parameter of the search space). The switching pattern may be a half-half between the first TCI state and the second TCI state. A number/quantity of the one or more monitoring occasions may be equal to K. The wireless device may monitor first (floor (K/2)) monitoring occasion(s), for example, based on the first TCI state. The wireless device may monitor remaining monitoring occasion(s), for example, based on the second TCI state within the monitoring periodicity. The switching pattern may be a bitmap to indicate a TCI state in each monitoring occasion of the one or more monitoring occasions.

Figure 23:
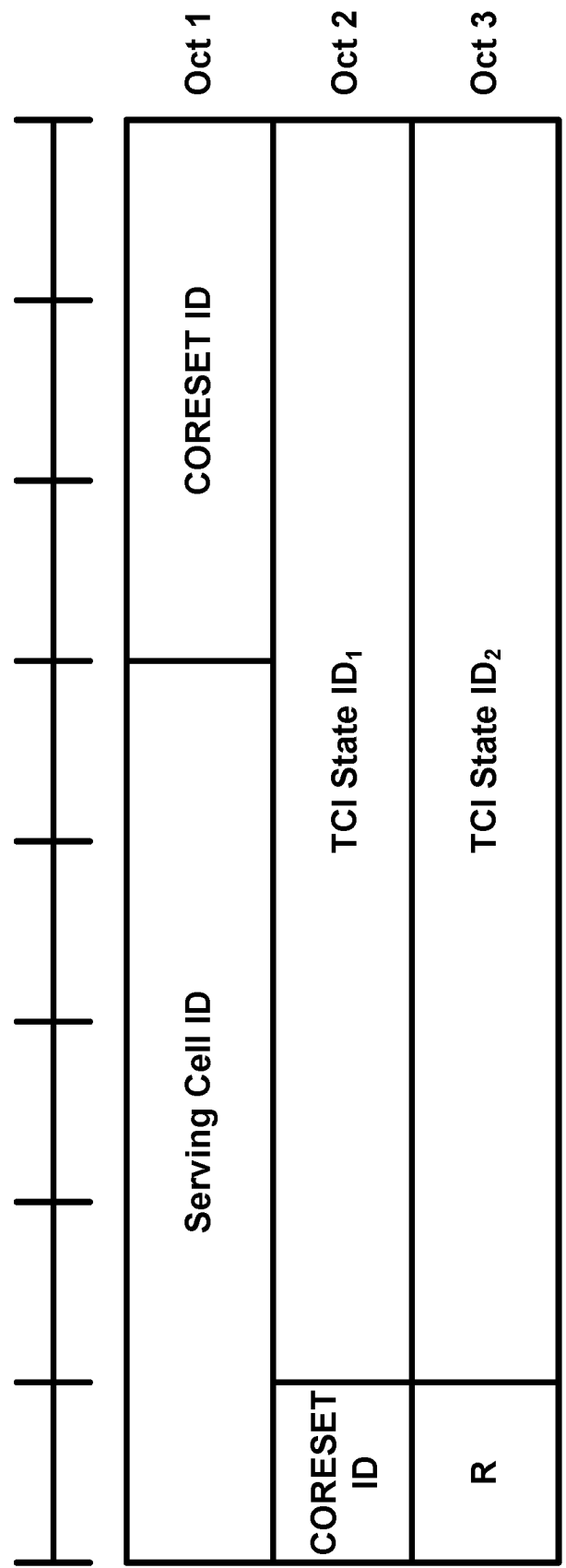
FIG. 23 shows an example format of a MAC control element (MAC CE).

FIG. 23 shows an example format of a MAC CE. The MAC CE may correspond to a TCI state indication for wireless device-specific PDCCH MAC CE, enhanced TCI state indication for wireless device-specific PDCCH MAC CE, etc. The MAC CE may indicate (e.g., activate/update/select) one or more TCI states (e.g., TCI state 1 and TCI state 2) for a CORESET of a serving cell. The base station may indicate, in the MAC CE, one or more TCI state indicators/indexes (e.g., TCI state indicator (ID) 1 and TCI state ID 2) of the one or more TCI states. The base station may indicate, in the MAC CE, the one or more TCI states indexes to activate the one or more TCI states for the CORESET. The CORESET may be indicated by a CORESET indicator (ID) in the MAC CE. The one or more TCI state indexes may indicate/identify the one or more TCI states. Each TCI state index of the one or more TCI state indexes may indicate/identify a respective TCI state of the one or more TCI states.

The MAC CE may comprise one or more fields. A first field of the one or more fields may indicate/comprise a serving cell indicator/index (e.g., serving cell ID provided by a higher layer parameter ServCellIndex or indicated by one or more configuration parameters). The serving cell indicator/index may identify/indicate the serving cell. A second field of the one or more fields may indicate/comprise a CORESET indicator/index (e.g., CORESET ID). The CORESET indicator/index may identify/indicate the CORESET of the serving cell. A third field of the one or more fields may indicate/comprise a first TCI state index (e.g., TCI state ID 1) of/identifying/indicating a first TCI state. The one or more TCI states may comprise the first TCI state. A fourth field (e.g., R) of the one or more fields may be a reserved field. A fifth field of the one or more fields may indicate/comprise a second TCI state index (e.g., TCI state ID 2) of/identifying/indicating a second TCI state. The one or more fields of the MAC CE may comprise the second TCI state index, for example, based on a value of the fourth field (e.g., R). The MAC CE may not comprise the second TCI state index (e.g., the fifth field may be a reserved field), for example, if the value of the fourth field is equal to zero (e.g., or any other predetermined/preset value). The MAC CE format may comprise the second TCI state index, for example, if the value of the fourth field is equal to one (e.g., or any other second predetermined/preset value). The one or more TCI states may comprise the second TCI state. The MAC CE may be an activation command. The MAC CE may be an activation command for parameters indicated by the configuration parameters. The configuration parameters may indicate the first TCI state index for the first TCI state. The configuration parameters may indicate the second TCI state index for the second TCI state. The configuration parameters may indicate the CORESET index for the CORESET. The configuration parameters may indicate the serving cell index for the serving cell. The configuration parameters may indicate the one or more TCI state indexes for the one or more TCI states. The one or more TCI states may comprise the first TCI state and the second TCI state. The one or more TCI state indexes may comprise the first TCI state index and the second TCI state index.

Figure 24:
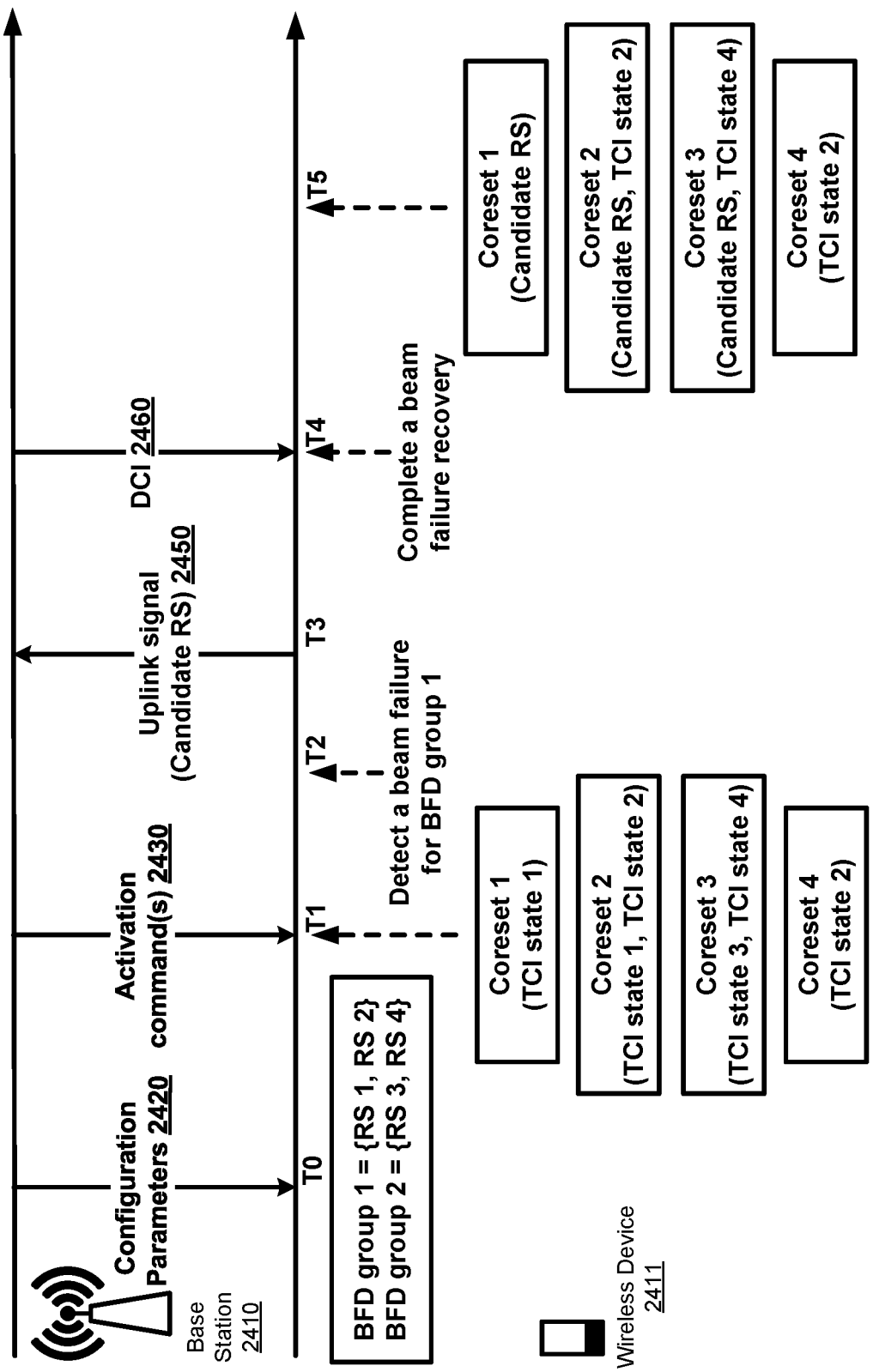
FIG. 24 shows an example of channel control for transmission and/or reception.
Figure 25A:
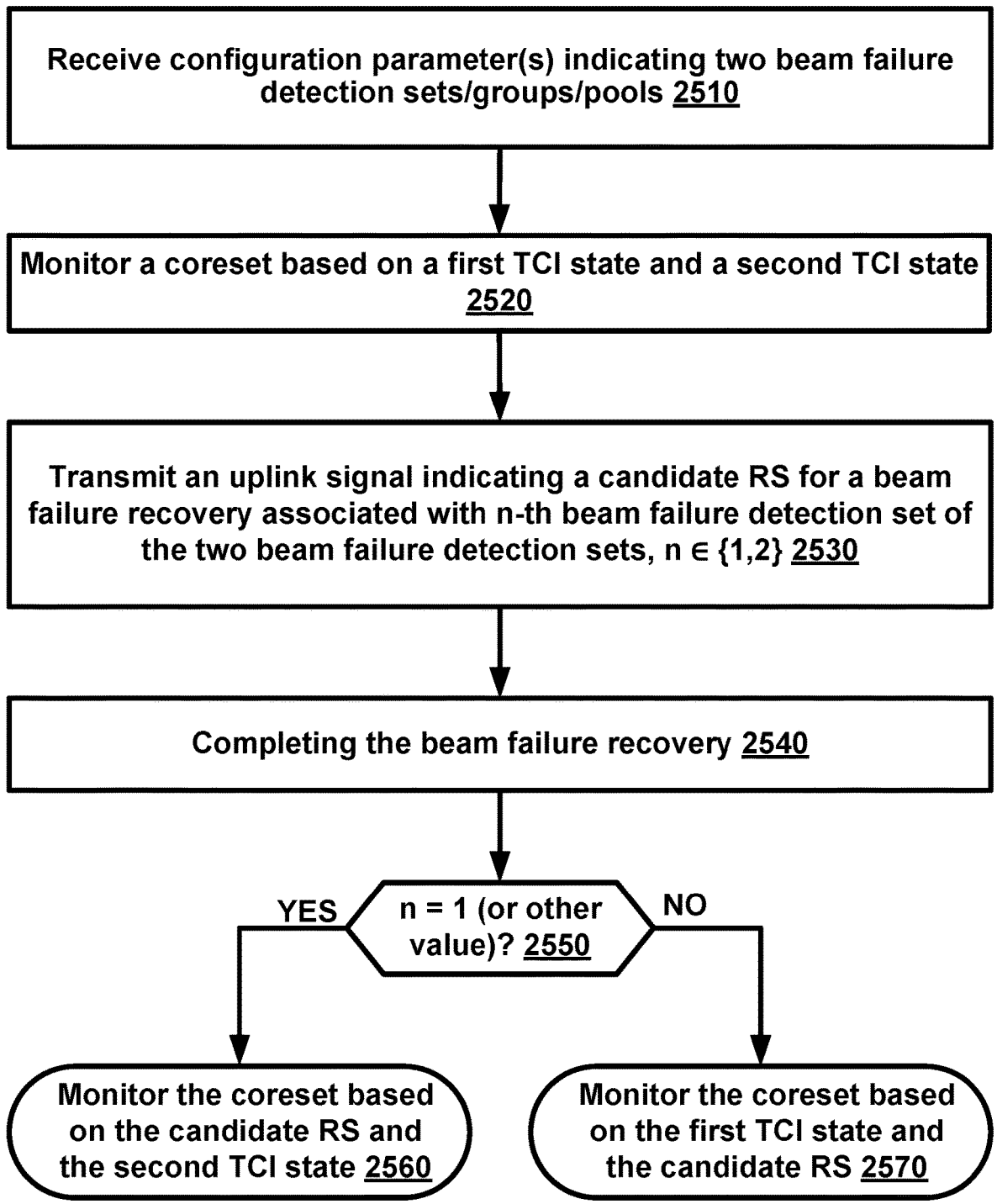
FIG. 25A and FIG. 25B show example methods of channel control for transmission and/or reception.
Figure 25B:
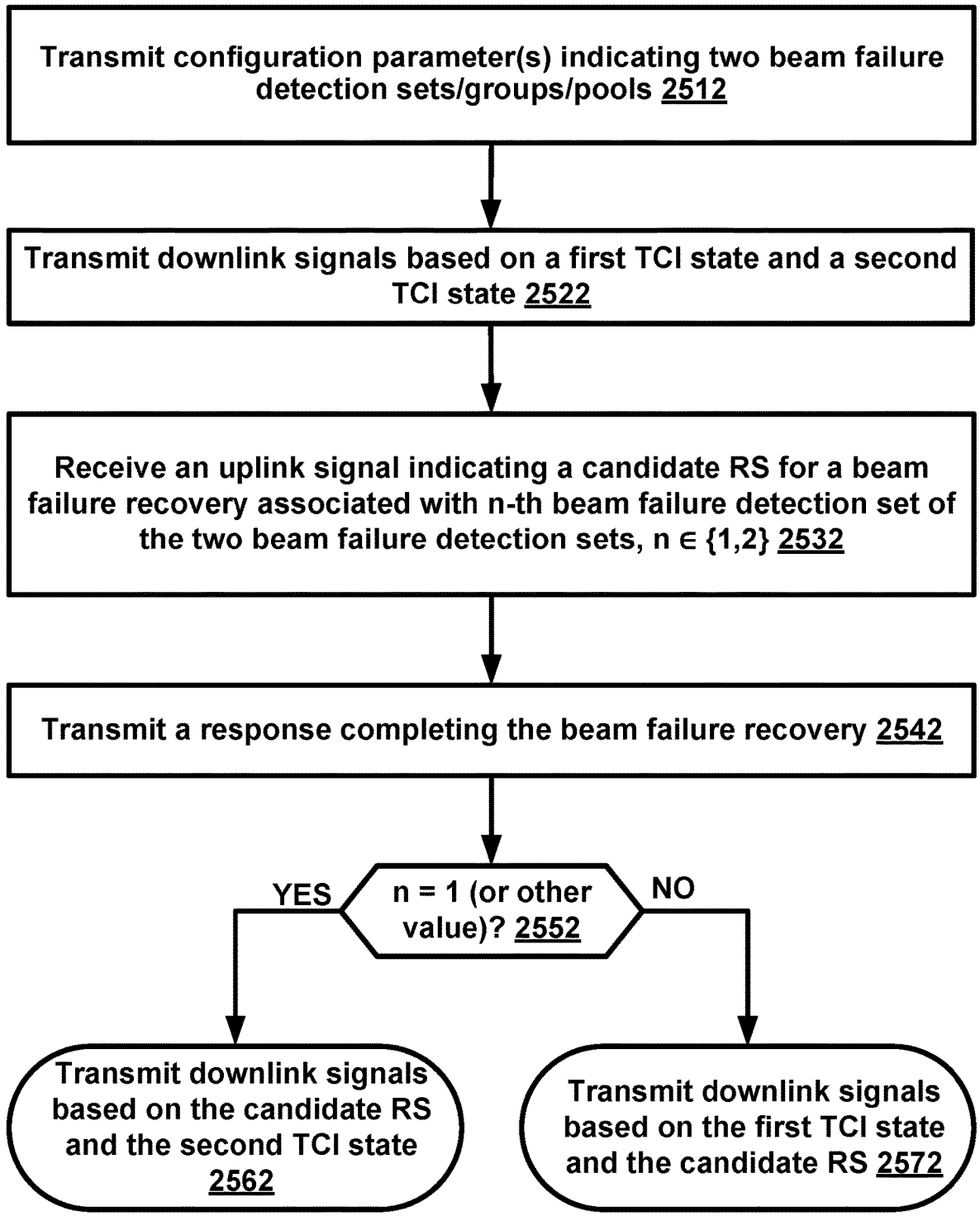
Figure 26:
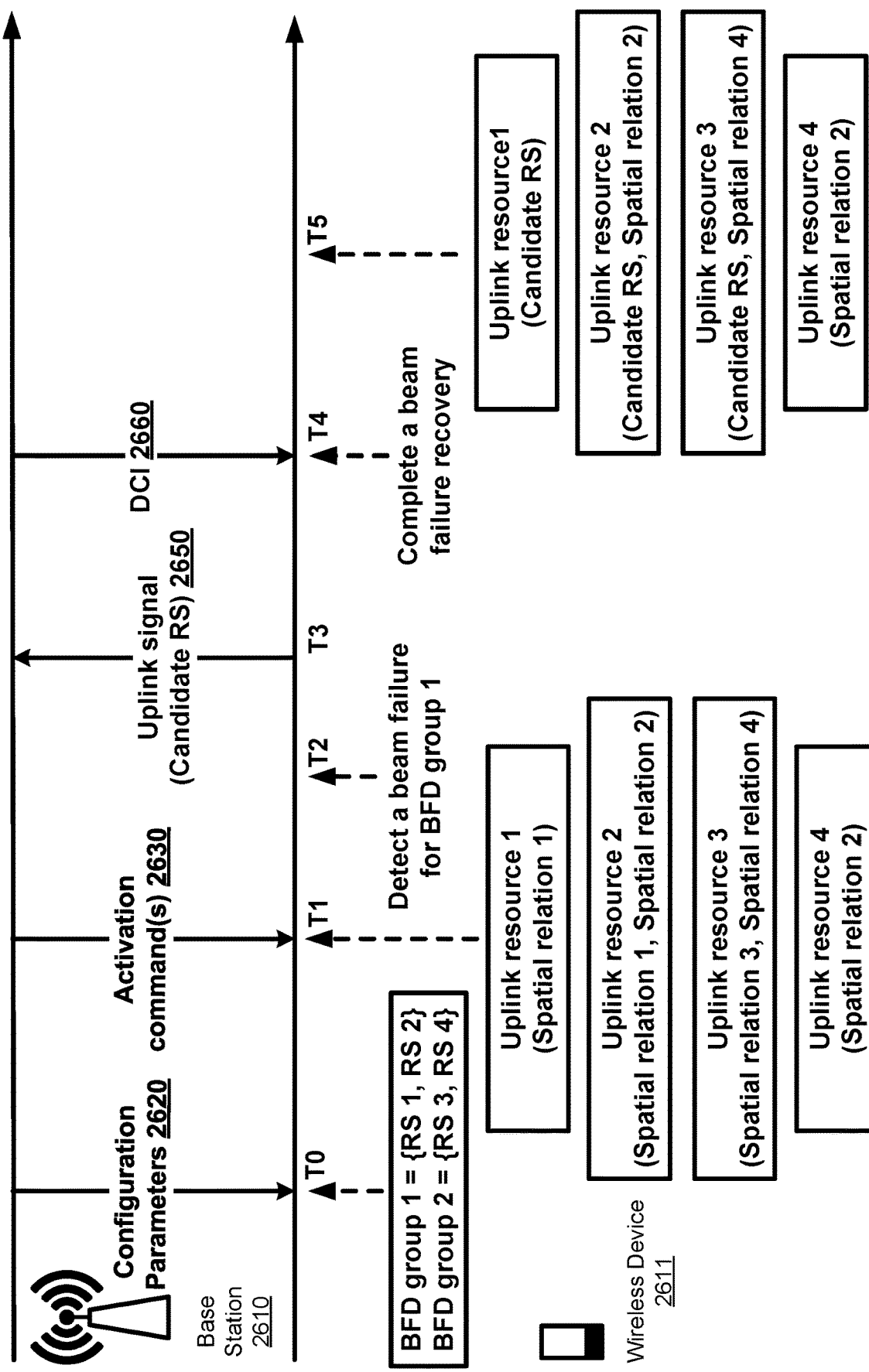
FIG. 26 shows an example of channel control for transmission and/or reception.

FIG. 24 and FIG. 26 show examples of channel control for transmission and/or reception. FIG. 25A, FIG. 25B, FIG. 27A, and FIG. 27B show example methods of channel control for transmission and/or reception. The channel control may comprise channel repetition for transmission and/or reception. The channel repetition may correspond to control channel repetition. The control channel repetition may be used for sending, by a base station 2410, repetitions of control information (e.g., PDCCH, DCI). The control information may schedule a transmission (e.g., a downlink transmission) to the wireless device 2411. The control channel repetition may be used for sending, by a wireless device 2611, repetitions of control information (e.g., PUCCH, UCI, HARQ-ACK/NACK, etc.). The base station 2410/2610 and/or the wireless device 2411/2611 may determine a beam (e.g., TCI state, spatial relation) to be used for the transmission and/or reception, for example, based on a beam failure detection group. While FIG. 24 relates to the specific example of downlink control channel transmission and/or repetition (e.g., for transmission of DCI or for transmission repetition of DCI) and FIG. 26 relates to the specific example of uplink channel repetition (e.g., for transmission of PUCCH, SRS), the base station 2410/2610 and/or the wireless device 2411/2611 may similarly transmit (and/or receive) repetitions of any message (e.g., control messages and/or data, for example, via PUCCH, PUSCH, PDSCH) via channel repetition, and in accordance with the procedures described herein. The channel repetition (e.g., PDSCH repetition, downlink data channel repetition) may be used for sending, by the base station 2410, repetitions of data (e.g., transport block(s)). The channel repetition (e.g., PUSCH repetition, uplink data channel repetition) may be used for sending, by the wireless device 2611, repetitions of data (e.g., transport block(s)). The wireless device 2411/2611 may be any wireless device described herein. The base station 2410/2610 may be any base station (or relay or any other wireless devices) described herein.

The wireless device 2411 may receive one or more messages (e.g., from the base station 2410, a relay, or any other wireless device). The wireless device 2411 may receive the one or more messages from the base station 2411 (e.g., at time T0 as shown in FIGS. 24 and 26). The one or more messages may comprise one or more configuration parameters 2420/2620 (e.g., configuration parameters in FIG. 24 and FIG. 26 or any other configuration parameters). The one or more configuration parameters 2420/2620 may be RRC configuration parameter(s) and/or RRC reconfiguration parameter(s).

The one or more configuration parameters 2420/2620 may be for a cell. At least one configuration parameter of the one or more configuration parameters 24202620 may be for a cell. The cell may be a primary cell (PCell). The cell may be a secondary cell (SCell). The cell may be a secondary cell configured with PUCCH (e.g., PUCCH SCell). The cell may be an unlicensed cell (e.g., operating in an unlicensed band). The cell may be a licensed cell (e.g., operating in a licensed band). The cell may operate in a first frequency range (e.g., FR1). The FR1 may, for example, comprise frequency bands below 6 GHz. The cell may operate in a second frequency range (e.g., FR2). The FR2 may, for example, comprise frequency bands from 24 GHz to 52.6 GHz. The cell may operate in any frequency range (e.g., comprising any frequency band(s)).

The wireless device 2411/2611 may perform uplink transmissions (e.g., PUSCH, PUCCH, SRS) via the cell in/during a first time period and in/using a first frequency. The wireless device 2411/2611 may perform downlink receptions (e.g., PDCCH, PDSCH) via the cell in/during a second time period and in/using a second frequency. The cell may operate in a time-division duplex (TDD) mode. The first frequency and the second frequency may be the same, for example, in the TDD mode. The first time and the second time may be different, for example, in the TDD mode. The cell may operate in a frequency-division duplex (FDD) mode. The first frequency and the second frequency may be different, for example, in the FDD mode. The first time and the second time may be the same, for example, in the FDD mode.

The wireless device 2411/2611 may be in an RRC connected mode, an RRC idle mode, and/or an RRC inactive mode. The cell may comprise a plurality of BWPs. The plurality of BWPs may comprise one or more uplink BWPs comprising an uplink BWP of the cell. The plurality of BWPs may comprise one or more downlink BWPs comprising a downlink BWP of the cell.

A BWP of the plurality of BWPs may be in one of an active state and an inactive state. The wireless device 2411/2611 may monitor a downlink channel/signal (e.g., PDCCH, DCI, CSI-RS, PDSCH) on/for/via the downlink BWP, for example, in the active state of a downlink BWP of the one or more downlink BWPs. The wireless device 2411/2611 may receive a PDSCH transmission on/via/for the downlink BWP, for example, in the active state of a downlink BWP of the one or more downlink BWPs. The wireless device 2411/2611 may not monitor a downlink channel/signal (e.g., PDCCH, DCI, CSI-RS, PDSCH) on/via/for the downlink BWP, for example, in the inactive state of a downlink BWP of the one or more downlink BWPs. The wireless device 2411/2611 may stop monitoring (or receiving) a downlink channel/signal (e.g., PDCCH, DCI, CSI-RS, PDSCH) on/via/for the downlink BWP, for example, in the inactive state of a downlink BWP of the one or more downlink BWPs. The wireless device 2411/2611 may not receive a PDSCH transmission on/via/for the downlink BWP, for example, in the inactive state of a downlink BWP of the one or more downlink BWPs. The wireless device 2411/2611 may stop receiving a PDSCH transmission on/via/for the downlink BWP, for example, in the inactive state of a downlink BWP of the one or more downlink BWPs.

The wireless device 2411/2611 may send/transmit an uplink signal/channel (e.g., PUCCH, preamble, PUSCH, PRACH, SRS, etc.) on/via the uplink BWP, for example, in the active state of an uplink BWP of the one or more uplink BWPs. The wireless device 2411/2611 may not send/transmit an uplink signal/channel (e.g., PUCCH, preamble, PUSCH, PRACH, SRS, etc.) on/via the uplink BWP, for example, in the inactive state of an uplink BWP of the one or more uplink BWPs.

The wireless device 2411/2611 may activate the downlink BWP of the one or more downlink BWPs of the cell. The activating the downlink BWP may comprise that the wireless device 2411/2611 sets (or switches to) the downlink BWP as an active downlink BWP of the cell. The activating the downlink BWP may comprise that the wireless device sets the downlink BWP in the active state. The activating the downlink BWP may comprise switching the downlink BWP from the inactive state to the active state.

The wireless device 2411/2611 may activate the uplink BWP of the one or more uplink BWPs of the cell. The activating the uplink BWP may comprise that the wireless device sets (or switches to) the uplink BWP as an active uplink BWP of the cell. The activating the uplink BWP may comprise that the wireless device 2411/2611 sets the uplink BWP in the active state. The activating the uplink BWP may comprise switching the uplink BWP from the inactive state to the active state.

The one or more configuration parameters 2420/2620 may be for the (active) downlink BWP of the cell. At least one configuration parameter of the one or more configuration parameters 2420/2620 may be for the downlink BWP of the cell. The one or more configuration parameters 2420/2620 may be for the (active) uplink BWP of the cell. At least one configuration parameter of the one or more configuration parameters 2420/2620 may be for the uplink BWP of the cell.

The one or more configuration parameters 2420/2620 may indicate one or more CORESETs (e.g., CORESET 1 and CORESET 2, CORESET 3, and CORESET 4 in FIG. 24).

The one or more configuration parameters 2420/2620 may indicate the one or more CORESETs for the (active) downlink BWP of the cell. The (active) downlink BWP of the cell may comprise one or more CORESETS.

The one or more configuration parameters 2420/2620 may indicate one or more CORESET indicators/indexes (e.g., provided by a higher layer parameter ControlResourceSetId) for the one or more CORESETs. Each CORESET of the one or more CORESETs may be identified/indicated by a respective CORESET indicator/index of the one or more CORESET indicators/indexes. A first CORESET of the one or more CORESETs may be identified by a first CORESET index of the one or more CORESET indexes. A second CORESET of the one or more CORESETs may be identified/indicated by a second CORESET index of the one or more CORESET indexes. A CORESET index may be a CORESET identifier/indicator.

The one or more configuration parameters 2420/2620 may indicate one or more uplink resources (e.g., Uplink resource 1, Uplink resource 2, Uplink resource 3, and Uplink resource 4 in FIG. 26). The one or more configuration parameters 2420/2620 may indicate the one or more uplink resources for the (active) uplink BWP of the cell. The (active) uplink BWP of the cell may comprise the one or more uplink resources.

The one or more uplink resources may comprise/be one or more PUCCH resources. The one or more uplink resources may comprise/be one or more PUSCH resources. The one or more uplink resources may comprise/be one or more SRS resources. The one or more uplink resources may comprise/be one or more PRACH resources.

The one or more configuration parameters 2420/2620 may indicate a plurality of search space sets, e.g., for the downlink BWP of the cell (e.g., by a higher layer parameter SearchSpace). The one or more configuration parameters 2420/2620 may indicate a plurality of search space sets, e.g., for the cell (e.g., by a higher layer parameter SearchSpace).

The one or more configuration parameters 2420/2620 may indicate search space set indexes/identifiers (e.g., provided by a higher layer parameter searchSpaceId) for the plurality of search space sets. Each search space set of the plurality of search space sets may be identified/indicated by a respective search space set index of the search space set indexes. A first search space set of the plurality of search space sets may be identified/indicated by a first search space set index of the search space set indexes. A second search space set of the plurality of search space sets may be identified/indicated by a second search space set index of the search space set indexes.

The one or more configuration parameters 2420/2620 may indicate PDCCH monitoring periodicities and/or offsets (e.g., parameter monitoringSlotPeriodicityAndOffset) for the plurality of search space sets. The one or more configuration parameters 2420/2620 may indicate a respective PDCCH monitoring periodicity and/or offset of the PDCCH monitoring periodicities and/or offsets (e.g., monitoringSlotPeriodicityAndOffset) for each search space set of the plurality of search space sets. The one or more configuration parameters 2420/2620 may indicate a first PDCCH monitoring periodicity (e.g., 2 slots, or any other first quantity of slots) of the PDCCH monitoring periodicities for a first search space set of the plurality of search space sets. The one or more configuration parameters 2420/2620 may indicate a second PDCCH monitoring periodicity (e.g., 10 slots, or any other second quantity of slots) of the PDCCH monitoring periodicities for a second search space set of the plurality of search space sets.

The one or more configuration parameters 2420/2620 may indicate PDCCH candidates (e.g., parameter nrofCandidates) for the plurality of search space sets. The one or more configuration parameters 2420/2620 may indicate respective PDCCH candidate(s) of the PDCCH candidates for each search space set of the plurality of search space sets. The one or more configuration parameters 2420/2620 may indicate first PDCCH candidate(s) (e.g., AL=1, AL=4, or any other AL) of the PDCCH candidates for a first search space set of the plurality of search space sets. The one or more configuration parameters may indicate second PDCCH candidate(s) (e.g., AL=8. AL=16, or any other AL) of the PDCCH candidates for a second search space set of the plurality of search space sets.

A search space set of the plurality of search space sets may be associated with (or linked to) a CORESET of the one or more CORESETs. The one or more configuration parameters 2420/2620 may indicate the CORESET (or a CORESET index of the CORESET) for the search space set (e.g., provided by a higher layer parameter controlResourceSetId in the higher layer parameter SearchSpace). The association (or the linkage) may be one-to-one. The association being one-to-one may comprise the search space set associated with (or linked to) the CORESET not being associated (or linked to) a second CORESET that is different from the CORESET. The one or more CORESETs may comprise the second CORESET.

The wireless device 2411/2611 may monitor, for a downlink control signal/channel (e.g., DCI, PDCCH, RS, GC-PDCCH, DMRS, etc.), PDCCH in the CORESET. The first monitoring, for the downlink control signal/channel, the PDCCH in the CORESET may comprise monitoring, for the downlink control signal, PDCCH candidate(s) in PDCCH monitoring occasion(s) for/of the search space set associated with (or linked to) the CORESET. The wireless device 2411/2611 may monitor, for DCI, PDCCH candidate(s) in PDCCH monitoring occasion(s) for/of the search space set in the CORESET associated with (or linked to) the search space set, for example, based on the search space set being associated with (or linked to) the CORESET. The wireless device 2411/2611 may monitor, for DCI, PDCCH for the search space set in the CORESET associated with (or linked to) the search space set, for example, based on the search space set being associated with (or linked to) the CORESET.

The wireless device 2411/2611 may monitor, for DCI, downlink control channels in the CORESET. The monitoring, for the DCI, the downlink control channels in the CORESET may comprise monitoring, for the DCI, one or more PDCCH candidates in one or more PDCCH monitoring occasions for/of one or more search space sets associated with the CORESET. The plurality of search space sets may comprise the one or more search space sets. The plurality of PDCCH candidates may comprise the one or more PDCCH candidates. The one or more configuration parameters 2420/2620 may indicate, for the one or more search space sets, the one or more PDCCH candidates. The wireless device 2411/2611 may determine the one or more PDCCH monitoring occasions of the one or more search space sets based on one or more search space set configuration parameters (e.g., IE SearchSpace) of the one or more configuration parameters 2420/2620. The one or more search space set configuration parameters may indicate one or more PDCCH monitoring periodicities (e.g., monitoringSlotPeriodicityAndOffset) for the one or more search space sets. The one or more search space set configuration parameters may indicate a respective PDCCH monitoring periodicity of the one or more PDCCH monitoring periodicities for each search space set of the one or more search space sets. The wireless device 2411/2611 may determine the one or more PDCCH monitoring occasions, for example, based on the one or more PDCCH monitoring periodicities. The one or more search space set configuration parameters may indicate PDCCH monitoring symbols (e.g., monitoringSymbolsWithinSlot) for the one or more search space sets. The one or more search space set configuration parameters may indicate respective PDCCH monitoring symbol(s) of the PDCCH monitoring symbols (e.g., monitoringSymbolsWithinSlot) for each search space set of the one or more search space sets. The wireless device 2411/2611 may determine the one or more PDCCH monitoring occasions, for example, based on the PDCCH monitoring symbols.

The one or more configuration parameters 2420/2620 may indicate the one or more CORESET indexes for the plurality of search space sets (e.g., provided by a higher layer parameter controlResourceSetId in the higher layer parameter SearchSpace). Each search space set of the plurality of search space sets may be associated with (or linked to) a respective CORESET, of the one or more CORESETs, identified by a respective CORESET index of the one or more CORESET indexes. The one or more configuration parameters 2420/2620 may indicate the first CORESET index of the first CORESET for the first search space set. The one or more configuration parameters 2420/2620 may indicate the first CORESET index of the first CORESET in a first CORESET index field (e.g., provided by a higher layer parameter controlResourceSetId in the higher layer parameter SearchSpace) of the first search space set. The first search space set may be associated with (or linked to) the first CORESET, for example, based on the one or more configuration parameters 2420/2620 indicating the first CORESET index of the first CORESET for the first search space set. The one or more configuration parameters 2420/2620 may indicate the first CORESET index of the first CORESET for the second search space set. The one or more configuration parameters 2420/2620 may indicate the first CORESET index of the first CORESET in a second CORESET index field (e.g., provided by a higher layer parameter controlResourceSetId in the higher layer parameter SearchSpace) of the second search space set. The second search space set may be associated with (or linked to) the first CORESET, for example, based on the one or more configuration parameters indicating the first CORESET index of the first CORESET for the second search space set. The one or more configuration parameters 2420/2620 may indicate the second CORESET index of the second CORESET for the first search space set. The first search space set may be associated with (or linked to) the second CORESET, for example, based on the one or more configuration parameters indicating the second CORESET index of the second CORESET for the first search space set. The one or more configuration parameters 2420/2620 may indicate the second CORESET index of the second CORESET for the second search space set. The second search space set may be associated with (or linked to) the second CORESET, for example, based on the one or more configuration parameters indicating the second CORESET index of the second CORESET for the second search space set.

One or more first search space sets, of the plurality of search space sets, may be associated with (or linked to) the first CORESET. The one or more configuration parameters 2420/2620 may indicate the first CORESET (or the first CORESET index of the first CORESET) for the one or more first search space sets. The one or more configuration parameters 2420/2620 may indicate, for the first CORESET, the one or more first search space sets. One or more second search space sets of the plurality of search space sets may be associated with (or linked to) the second CORESET. The one or more configuration parameters 2420/2620 may indicate the second CORESET (or the second CORESET index of the second CORESET) for the one or more second search space sets. The one or more configuration parameters 2420/2620 may indicate, for the second CORESET, the one or more second search space sets.

The wireless device 2411/2611 may monitor, for DCI, the PDCCH candidates in the one or more CORESETs. The wireless device 2411/2611 may monitor, for the DCI, the PDCCH candidates in PDCCH monitoring occasions for/of the plurality of search space sets associated with the one or more CORESETs. The wireless device 2411/2611 may monitor, for DCI, one or more first PDCCH candidates in the first CORESET. The wireless device 2411/2611 may monitor, for the DCI, the one or more first PDCCH candidates in one or more first PDCCH monitoring occasions. The one or more first PDCCH monitoring occasions may be for/of the one or more first search space sets associated with the first CORESET. The one or more configuration parameters 2420/2620 may indicate, for the one or more first search space sets, the one or more first PDCCH candidates. The PDCCH candidates may comprise the one or more first PDCCH candidates. The wireless device may monitor, for DCI, one or more second PDCCH candidates in the second CORESET. The wireless device may monitor, for the DCI, the one or more second PDCCH candidates in one or more second PDCCH monitoring occasions. The one or more second PDCCH monitoring occasions may be for/of the one or more second search space sets associated with the second CORESET. The one or more configuration parameters 2420/2620 may indicate, for the one or more second search space sets, the one or more second PDCCH candidates. The PDCCH candidates may comprise the one or more second PDCCH candidates.

The one or more configuration parameters (e.g., the one or more configuration parameters 2420/2620 or any other configuration parameters) may indicate one or more beam failure detection groups/sets/pools (or beam failure detection reference signal groups/sets/pools or BFD-RS groups/sets/pools). In FIG. 24 and FIG. 26, the one or more beam failure detection groups/sets/pools comprise a first beam failure detection group/set/pool (e.g., BFD group 1) and a second beam failure detection group/set/pool (e.g., BFD group 2). Each beam failure detection group/set/pool may be associated with (e.g., correspond to) a TRP, a CORESET pool, an SRS resource set, etc.

The one or more configuration parameters may indicate one or more beam failure detection group/set/pool indexes (or a CORESET pool index or a TRP index or an antenna panel index, and the like) for the one or more beam failure detection groups/sets/pools. Each beam failure detection group/set/pool of the one or more beam failure detection groups/sets/pools may be identified/indicated by a respective beam failure detection group/set/pool index of the one or more beam failure detection group/set/pool indexes (e.g., 0, 1). The first beam failure detection group/set/pool (e.g., BFD group 1) of the one or more beam failure detection groups/sets/pools may be identified/indicated by a first beam failure detection group/set/pool index (e.g., 0 or any other value) of the one or more beam failure detection group/set/pool indexes. The second beam failure detection group/set/pool (e.g., BFD group 2) of the one or more beam failure detection groups/sets/pools may be identified/indicated by a second beam failure detection group/set/pool index (e.g., 1 or any other value) of the one or more beam failure detection group/set/pool indexes. A beam failure detection group/set/pool index may be a beam failure detection group/set/pool identifier.

The one or more beam failure detection groups/sets/pools may indicate one or more reference signals (e.g., CSI-RS, SS/PBCH block, DM-RS, tracking reference signal (TRS), and the like). Each beam failure detection group/set/pool of the one or more beam failure detection groups/sets/pools may indicate respective reference signal(s) of the one or more reference signals. The first beam failure detection group/set/pool may indicate, for example, one or more first reference signals (e.g., RS 1 and RS 2 in FIG. 24 and FIG. 26). The second beam failure detection group/set/pool may indicate, for example, one or more second reference signals (e.g., RS 3 and RS 4 in FIG. 24 and FIG. 26). The one or more second reference signals may not be indicated by the first beam failure detection group/set/pool or any other beam failure detection group/set/pool. The first beam failure detection group/set/pool and the second beam failure detection group/set/pool may be disjoint sets.

The one or more beam failure detection groups/sets/pools may indicate, for beam failure detection, the one or more reference signals. The wireless device (e.g., the wireless device 2411/2611 or any other wireless device) may determine/detect a beam failure of the first beam failure detection group/set/pool, for example, based on the one or more first reference signals (e.g., detect a beam failure for beam failure detection group 1 at time T2 as shown in FIG. 24 and FIG. 26). The wireless device may determine/detect the beam failure of the first beam failure detection group/set/pool, for example, based on measuring/assessing the one or more first reference signals. The wireless device may determine/detect the beam failure of the first beam failure detection group/set/pool, for example, based on measuring/assessing/determining a radio link quality (e.g., BLER, SINR, L1-RSRP, and the like) of the one or more first reference signals (e.g., radio link qualities of RS1 and RS2 in FIGS. 24 and 26 are below the threshold). The wireless device may determine/detect a beam failure of the second beam failure detection group/set/pool, for example, based on the one or more second reference signals. The wireless device may determine/detect the beam failure of the second beam failure detection group/set/pool, for example, based on measuring/assessing the one or more second reference signals. The wireless device may determine/detect the beam failure of the second beam failure detection group/set/pool, for example, based on measuring/assessing/determining a radio link quality (e.g., BLER, SINR, L1-RSRP, and the like) of the one or more second reference signals (e.g., radio link qualities of RS3 and RS4 in FIGS. 24 and 26 are below the threshold).

The wireless device may be served by (e.g., receive from or transmit to) a plurality of TRPs (e.g., TRP 1 and TRP 2). The determining/detecting the beam failure of the first beam failure detection group/set/pool may, for example, comprise/be determining/detecting a beam failure of a first TRP (e.g., TRP 1) of the plurality of TRPs. The first TRP may be associated with the first beam failure detection group/set/pool. The first TRP may, for example, send/transmit the one or more first reference signals. The first TRP may, for example, be associated with the one or more first reference signals. The determining/detecting the beam failure of the second beam failure detection group/set/pool may, for example, comprise/be determining/detecting a beam failure of a second TRP (e.g., TRP 2) of the plurality of TRPs. The second TRP may be associated with the second beam failure detection group/set/pool. The second TRP may, for example, send/transmit the one or more second reference signals. The second TRP may, for example, be associated with the one or more second reference signals.

The wireless device may be equipped with a plurality of antenna panels by (e.g., for reception and/or transmission). The determining/detecting the beam failure of the first beam failure detection group/set/pool may, for example, comprise/ be determining/detecting a beam failure of a first antenna panel of the plurality of antenna panels. The first antenna panel may be associated with the first beam failure detection group/set/pool. The wireless device may receive/measure, via the first antenna panel, the one or more first reference signals. The first antenna panel may, for example, be associated with the one or more first reference signals. The determining/detecting the beam failure of the second beam failure detection group/set/pool may, for example, comprise/ be determining/detecting a beam failure of a second antenna panel of the plurality of antenna panels. The second antenna panel may be associated with the second beam failure detection group/set/pool. The wireless device may receive/ measure, via the second antenna panel, the one or more second reference signals. The second antenna panel may, for example, be associated with the one or more second reference signals.

The one or more configuration parameters may indicate one or more candidate reference signals. The one or more configuration parameters may indicate, for a beam failure recovery, the one or more candidate reference signals.

The wireless device may determine/detect a beam failure of/for a beam failure detection group/set/pool of the one or more beam failure detection groups/sets/pools. The wireless device may determine/detect the beam failure of/for the beam failure detection group/set/pool, for example, based on one or more reference signals of the beam failure detection group/set/pool. The wireless device may determine/detect the beam failure of/for the beam failure detection group/set/ pool, for example, based on the one or more reference signals indicated by the beam failure detection group/set/ pool. The wireless device may determine/detect the beam failure of the beam failure detection group/set/pool, for example, based on measuring/assessing/determining a radio link quality (e.g., BLER, SINR, L1-RSRP, and the like) of the one or more reference signals. The radio link quality may be worse (e.g., lower L1-RSRP, lower SINR, higher BLER, and the like) than a threshold (e.g., a beam failure detection threshold). The one or more configuration parameters may indicate the threshold. The one or more reference signals may be, for example, the one or more first reference signals, for example, if the beam failure detection group/set/pool is the first beam failure detection group/set/pool. The one or more reference signals may be, for example, the one or more second reference signals, for example, if the beam failure detection group/set/pool is the second beam failure detection group/set/pool.

The one or more configuration parameters may indicate a beam failure detection group/set/pool index (or a CORESET pool index or a TRP index or an antenna panel index, and the like) for the beam failure detection group/set/pool. The one or more beam failure detection group/set/pool indexes may comprise the beam failure detection group/set/pool index.

The beam failure detection group/set/pool index may be (or indicate), for example, the first beam failure detection group/set/pool (e.g., BFD group 1). The beam failure detection group/set/pool index may be (or indicate), for example, the second beam failure detection group/set/pool (e.g., BFD group 2).

The beam failure detection group/set/pool may be the first beam failure detection group/set/pool (e.g., BFD group 1), for example, in FIG. 24 and FIG. 26. The one or more reference signals may be the one or more first reference signals, for example, based on the beam failure detection group/set/pool being the first beam failure detection group/ set/pool. The beam failure detection group/set/pool may be the second beam failure detection group/set/pool (e.g., BFD group 2). The one or more reference signals may be the one or more second reference signals, for example, based on the beam failure detection group/set/pool being the second beam failure detection group/set/pool.

The wireless device may initiate/trigger/start a beam failure recovery (or a beam failure recovery procedure). The wireless device may initiate/trigger/start, for the beam failure detection group/set/pool, the beam failure recovery. The wireless device may initiate/trigger/start the beam failure recovery, for example, based on the determining/detecting the beam failure of/for the beam failure detection group/set/ pool.

The wireless device may determine/identify/select a candidate reference signal (e.g., Candidate RS in FIG. 24 and FIG. 26). The wireless device may determine/identify, for the beam failure recovery, the candidate reference signal. The wireless device may determine/identify the candidate reference signal, for example, based on measuring/assessing/determining a radio link quality (e.g., BLER, SINR, L1-RSRP, and the like) of the candidate reference signal. The radio link quality may be better (e.g., higher L1-RSRP, higher SINR, lower BLER, and the like) than a threshold (e.g., a candidate beam identification threshold). The one or more configuration parameters may indicate the threshold. The one or more candidate reference signals may comprise the candidate reference signal. A first candidate reference signal group may comprise the one or more candidate reference signals and may be associated with (e.g., correspond to) the first beam failure detection group/set/pool (e.g., BFD group 1). The wireless device may determine/ identify the candidate reference signal among the one or more candidate reference signals. The wireless device may determine/identify the candidate reference signal among the one or more candidate reference signals, for example, based on measuring/assessing/determining one or more radio link qualities (e.g., BLER, SINR, L1-RSRP, and the like) of the one or more candidate reference signals. The one or more radio link qualities may comprise the radio link quality of the candidate reference signal. Each radio link quality of the one or more radio link qualities may correspond to (or be associated with) a respective reference signal of the one or more candidate reference signals. A second candidate reference signal group may comprise one or more second candidate reference signals and may be associated with (e.g., correspond to) the second beam failure detection group/set/ pool (e.g., BFD group 2). The second candidate reference signal group may be used, for example, if a beam failure of the second beam failure detection group/set/pool is determined.

The wireless device may send/transmit, for the beam failure recovery, an uplink signal (e.g., Uplink signal 2450/ 2650 transmitted at time T3 in FIG. 24 and FIG. 26) indicating the candidate reference signal. The wireless device may, for example, send/transmit, via the active uplink BWP of the cell, the uplink signal. The wireless device may, for example, send/transmit, via an active uplink BWP of a second cell different from the cell, the uplink signal.

The uplink signal may be, for example, a random-access preamble. The cell may be a PCell. The one or more configuration parameters may indicate a mapping/linkage/ association between the candidate reference signal and the random-access preamble. The one or more configuration parameters may map/link/associate the candidate reference signal to/with the random-access preamble. The uplink signal may indicate the candidate reference signal, for example, based on the mapping/linkage/association between the candidate reference signal and the random-access preamble.

The uplink signal may be, for example, a BFR MAC-CE. The uplink signal may be/comprise, for example, a PUSCH transmission comprising/with the BFR MAC-CE. The cell may be an SCell. The BFR MAC-CE may comprise a field (e.g., candidate beam RS field) indicating the candidate reference signal. The field may comprise, for example, a candidate reference signal index. The candidate reference signal index may identify/indicate the candidate reference signal. The candidate reference signal index may indicate a location of the candidate reference signal. The one or more configuration parameters may indicate, for the candidate reference signal, the candidate reference signal index. The BFR MAC-CE may comprise a field (e.g., ServCellIndex) indicating the cell. The field indicating the cell may be a bitmap. The field indicating the cell may correspond to (or be associated with) a serving cell index of the cell. The one or more configuration parameters may indicate, for the cell, the serving cell index.

The uplink signal may be/comprise, for example, a PUCCH transmission (e.g., SR). The one or more configuration parameters may indicate a mapping/linkage/association between the candidate reference signal and the PUCCH transmission. The one or more configuration parameters may map/link/associate the candidate reference signal to/with the PUCCH transmission. The uplink signal may indicate the candidate reference signal based on the mapping/linkage/association between the candidate reference signal and the PUCCH transmission.

The wireless device may not send/transmit, for the beam failure recovery, a PUCCH with a link recovery request (LRR) (e.g., via an SCell). The wireless device may send/transmit, via a PCell or a PSCell, a PUCCH with a link recovery request (LRR) for the beam failure recovery.

The wireless device may receive/detect a response (e.g., receiving a PDCCH comprising DCI at time T4 as shown in FIGS. 24 and 26). The wireless device may complete the beam failure recovery, for example, based on the receiving/detecting the response (e.g., DCI). The wireless device may complete the beam failure recovery successfully, for example, based on the receiving/detecting the response (e.g., DCI). The response (e.g., DCI) may be, for example, a BFR response. The receiving/detecting the response may comprise performing/detecting a PDCCH reception with the DCI.

A cyclic redundancy check (CRC) of the DCI may be scrambled with/by a RNTI. The RNTI may be/comprise, for example, C-RNTI or any other RNTI. The RNTI may be/comprise, for example, MCS-C-RNTI.

The cell may be a PCell. The wireless device may receive the response (e.g., DCI) in a recovery search space set indicated/identified by a recovery search space set index (e.g., RecoverySearchSpaceId). The search space set indexes may comprise the recovery search space set index. The plurality of search space sets may comprise the recovery search space set. The recovery search space set may be associated with a recovery CORESET (e.g., BFR CORESET, dedicated CORESET). The one or more CORESETs may, for example, comprise the recovery CORESET. The wireless device may receive, via the recovery CORESET, the response (e.g., DCI). The wireless device may complete the beam failure recovery, for example, based on the receiving/detecting the response (e.g., DCI) via the recovery CORESET. The wireless device may complete the beam failure recovery, for example, based on the receiving/detecting the response (e.g., DCI) via the recovery search space set associated with the recovery CORESET. The receiving the response (e.g., DCI) in the recovery search space set may comprise detecting/performing the PDCCH reception with the DCI in the recovery search space set.

The cell may be an SCell. The wireless device may send/transmit, based on a first HARQ process number, the uplink signal (e.g., the BFR MAC-CE or the PUSCH transmission comprising/with the BFR MAC-CE) indicating the candidate reference signal. The first HARQ process number may be used for transmission of the uplink signal (or the PUSCH transmission). The response (e.g., DCI or the BFR response) may schedule/trigger transmission of a second uplink signal (e.g., a second PUSCH transmission). The response (e.g., DCI) may schedule/trigger transmission of the second uplink signal based on a second HARQ process number. The response (e.g., DCI) may schedule/trigger transmission of the second uplink signal with the second HARQ process number. The first HARQ process number and the second HARQ process number may be, for example, the same (or equal). The second HARQ process number indicated by the response (e.g., DCI) for transmission of the second uplink signal may be same as (or equal to) the first HARQ process number used for transmission of the uplink signal (e.g., the BFR MAC-CE or the PUSCH transmission comprising/with the BFR MAC-CE). The wireless device may complete the beam failure recovery, for example, based on the first HARQ process number and the second HARQ process number being the same (or equal). The response (e.g., DCI) may comprise a new data indicator (NDI) field. The NDI field may be, for example, toggled. The wireless device may complete the beam failure recovery, for example, based on the NDI field being toggled.

The wireless device may monitor, for response (e.g., DCI), the PDCCH candidates in the one or more CORESETs based on one or more TCI states (or one or more antenna port quasi co-location (QCL) assumptions/properties/structures). The wireless device may monitor, for response (e.g., DCI), PDCCH candidate(s) in each CORESET of the one or more CORESETs based on respective TCI state(s) of the one or more TCI states. For example, the one or more TCI states may be TCI state 1, TCI state 2, TCI state 3, and TCI state 4 as shown in FIG. 24. One or more CORESETs (e.g., CORESET 1, CORESET 2, CORESET 3, and CORESET 4 shown in FIG. 24) may be configured (e.g., by the configuration parameters 2420/2620 sent from the base station 2410/2610). The wireless device may monitor PDCCH (or PDCCH candidate(s)) in CORESET 1 based on TCI state 1. The wireless device may monitor a PDCCH (or PDCCH candidate(s)) in CORESET 2 based on TCI state 1 and TCI state 2. The wireless device may monitor a PDCCH (or PDCCH candidate(s)) in CORESET 3 based on TCI state 3 and TCI state 4. The wireless device may monitor PDCCH (or PDCCH candidate(s)) in CORESET 4 based on TCI state 2.

The wireless device may, for example, receive one or more activation commands (e.g., Activation command(s) 2430/2630 received at time T1 in FIGS. 24 and 26) indicating/updating/activating the one or more TCI states for the one or more CORESETs. Each activation command (e.g., MAC-CE, DCI, RRC, TCI State Indication for UE-specific PDCCH MAC CE, Enhanced TCI State Indication for UE-specific PDCCH MAC CE) of the one or more activation commands may indicate/update/activate, for a respective CORESET of the one or more CORESETs, respective TCI state(s) of the one or more TCI states. A first activation command of the one or more activation commands may, for example, indicate/update/activate TCI state 1 for CORESET 1 shown in FIG. 24. A second activation command of the one or more activation commands may, for example, indicate/update/activate TCI state 1 and TCI state 2 for CORESET 2 shown in FIG. 24. A third activation command of the one or more activation commands may, for example, indicate/update/activate TCI state 3 and TCI state 4 for CORESET 3 shown in FIG. 24. A fourth activation command of the one or more activation commands may, for example, indicate/update/activate TCI state 2 for CORESET 4 shown in FIG. 24.

The one or more configuration parameters may, for example, indicate/update/activate the one or more TCI states for the one or more CORESETs. The one or more configuration parameters may indicate/update/activate, for a respective CORESET of the one or more CORESETs, respective TCI state(s) of the one or more TCI states. The one or more configuration parameters may indicate/update/activate TCI state 1 for CORESET 1. The one or more configuration parameters may indicate/update/activate TCI state 1 and TCI state 2 for CORESET 2. The one or more configuration parameters may indicate/update/activate TCI state 3 and TCI state 4 for CORESET 3. The one or more configuration parameters may indicate/update/activate TCI state 2 for CORESET 4. The activation commands (e.g., Activation command(s) 2430/2630) may change one or more TCI state(s) of one or more CORESETs, for example, after the one or more configuration parameters indicates/updates/activates the one or more TCI states for the one or more CORESETs.

The wireless device may monitor, for a response (e.g., DCI or for repetition of DCI), PDCCH (or PDCCH candidate(s) or PDCCH transmissions/receptions) in a CORESET of the one or more CORESETs, for example, based on at least two TCI states (or at least two antenna port quasi co-location (QCL) assumptions/properties/structures). The one or more TCI states may, for example, comprise the at least two TCI states. The at least two TCI states may comprise a first TCI state and a second TCI state. The at least two TCI states may be/comprise the first TCI state (TCI state 1) and the second TCI state (TCI state 2), for example, if the CORESET is CORESET 2 shown in FIG. 24. The at least two TCI states may be/comprise the first TCI state (TCI state 3) and the second TCI state (TCI state 4), for example, if the CORESET is CORESET 3 shown in FIG. 24.

The wireless device may monitor the PDCCH (or the PDCCH candidate(s) or the PDCCH transmissions/receptions) in the CORESET based on the at least two TCI states, for example, before/prior to completing the beam failure recovery. The wireless device may monitor the PDCCH (or the PDCCH candidate(s) or the PDCCH transmissions/receptions) in the CORESET based on the at least two TCI states, for example, before/prior to completing the beam failure recovery successfully. The wireless device may monitor the PDCCH (or the PDCCH candidate(s) or the PDCCH transmissions/receptions) in the CORESET based on the at least two TCI states, for example, during the beam failure recovery. The wireless device may monitor the PDCCH (or the PDCCH candidate(s) or the PDCCH transmissions/receptions) in the CORESET based on the at least two TCI states, for example, before/prior to the detecting the beam failure. The wireless device may monitor the PDCCH (or the PDCCH candidate(s) or the PDCCH transmissions/receptions) in the CORESET based on the at least two TCI states, for example, after (or in response to or on) receiving an activation command indicating/updating/activating, for the CORESET, the at least two TCI states. The one or more activation commands may comprise the activation command (e.g., Activation command 2430/2630).

The wireless device may receive, for example, an activation command indicating/updating/activating the at least two TCI states for the CORESET. The activation command may indicate/update/activate the at least two TCI states among a plurality of TCI states (e.g., provided by a higher layer parameter tci-StatesPDCCH-ToAddList). The one or more configuration parameters may indicate, for the CORESET, the plurality of TCI states. The one or more activation commands may comprise the activation command. The one or more configuration parameters may, for example, indicate/update/activate the at least two TCI states for the CORESET.

A TCI state of the plurality of TCI states may be/comprise/indicate an antenna port quasi co-location (QCL) assumption/property/structure. The antenna port quasi co-location (QCL) assumption/property/structure may indicate at least one of: channel characteristics, Doppler shift, Doppler spread, average delay, delay spread, and spatial receive filter for the CORESET.

The at least two TCI states may indicate at least two reference signals (e.g., CSI-RS, SSB/PBCH block, SRS, DM-RS). Each TCI state of the at least two TCI states may indicate a respective reference signal of the at least two reference signals (e.g., TCI state 1 may indicate RS 1, TCI state 3 may indicate RS 2, TCI state 2 may indicate RS 3, and TCI state 4 may indicate RS 4).

The first TCI state (e.g., TCI state 1 of CORESET 2 and/or TCI state 3 of CORESET 3) may indicate/comprise a first reference signal index (e.g., provided by a higher layer parameter reference Signal, ssb-index, csi-RS-Index, NZP-CSI-RS-ResourceId) identifying/indicating/of a first reference signal (e.g., RS 1 and/or RS 2) of the at least two reference signals. The one or more configuration parameters may indicate the first reference signal index for the first reference signal. The first TRP may, for example, send/transmit the first reference signal. The first TCI state may be associated with the first TRP, for example, based on the first TRP transmitting the first reference signal indicated by the first TCI state. The first TCI state may be associated with the first beam failure detection group/set/pool, for example, based on the first TRP transmitting the one or more first reference signals in the first beam failure detection group/set/pool and the first reference signal indicated by the first TCI state. The first TCI state may be associated with the first beam failure detection group/set/pool, for example, based on the one or more first reference signals in the first beam failure detection group/set/pool comprising the first reference signal indicated by the first TCI state. The first TCI state may be associated with the first beam failure detection group/set/pool, for example, based on at least one reference signal of/among the one or more first reference signals in the first beam failure detection group/set/pool being quasi co-located with the first reference signal indicated by the first TCI state. The at least one reference signal may be quasi co-located with the first reference signal, for example, with respect to a quasi co-location type (e.g., QCL TypeD, QCL TypeC, QCL TypeB, QCL TypeA, and the like). The quasi co-location type may be, for example, QCL TypeD. The one or more configuration parameters may indicate, for the CORESET (or for the first TCI state of the CORESET, or for the first reference signal indicated by the first TCI state), an index (e.g., TRP index, CORESET pool index, antenna panel index, beam failure detection group/set/pool index). The index (or a value of the index) may indicate the first beam failure detection group/set/pool (or the first TRP). The index may be, for example, equal to the first beam failure detection group/set/pool index. The first TCI state may be associated with the first beam failure detection group/set/pool, for example, based on the index (or the value of the index) indicating the first beam failure detection group/set/pool. The first TCI state may be associated with the first beam failure detection group/set/pool, for example, based on the first TCI state being a first/starting/earliest TCI state among the at least two TCI states. TCI state x may be associated with the first beam failure detection group/set/pool, for example, based on the first TCI state being the first/starting/earliest TCI state among the at least two TCI states (e.g., if the at least two TCI states=[TCI state x, TCI state y]). The first TCI state may locate/be in a 1st entry in at least two entries of the at least two TCI states.

The second TCI state (e.g., TCI state 2 of CORESET 2 and/or TCI state 4 of CORESET 3) may indicate/comprise a second reference signal index (e.g., provided by a higher layer parameter referenceSignal, ssb-index, csi-RS-Index, NZP-CSI-RS-ResourceId) identifying/indicating/of a second reference signal (e.g., RS 3 and/or RS 4) of the at least two reference signals. The one or more configuration parameters may indicate the second reference signal index for the second reference signal. The second TRP may, for example, send/transmit the second reference signal. The second TCI state may be associated with the second TRP, for example, based on the second TRP transmitting the second reference signal indicated by the second TCI state. The second TCI state may be associated with the second beam failure detection group/set/pool, for example, based on the second TRP transmitting the one or more second reference signals in the second beam failure detection group/set/pool and the second reference signal indicated by the second TCI state. The second TCI state may be associated with the second beam failure detection group/set/pool, for example, based on the one or more second reference signals in the second beam failure detection group/set/pool comprising the second reference signal indicated by the second TCI state. The second TCI state may be associated with the second beam failure detection group/set/pool, for example, based on at least one reference signal of/among the one or more second reference signals in the second beam failure detection group/set/pool being quasi co-located with the second reference signal indicated by the second TCI state. The at least one reference signal may be quasi co-located with the second reference signal, for example, with respect to a quasi co-location type (e.g., QCL TypeD, QCL TypeC, QCL TypeB, QCL TypeA, and the like). The quasi co-location type may be, for example, QCL TypeD. The one or more configuration parameters may indicate, for the CORESET (or for the second TCI state of the CORESET, or for the second reference signal indicated by the second TCI state), an index (e.g., TRP index, CORESET pool index, antenna panel index, beam failure detection group/set/pool index). The index (or a value of the index) may indicate the second beam failure detection group/set/pool (or the second TRP). The index may be, for example, equal to the second beam failure detection group/set/pool index. The second TCI state may be associated with the second beam failure detection group/set/pool, for example, based on the index (or the value of the index) indicating the second beam failure detection group/set/pool. The second TCI state may be associated with the second beam failure detection group/set/pool, for example, based on the second TCI state being a second/second starting/second earliest TCI state among the at least two TCI states. TCI state y may be associated with the second beam failure detection group/set/pool, for example, based on the second TCI state being the second/second starting/second earliest TCI state among the at least two TCI states (e.g., if the at least two TCI states=[TCI state x, TCI state y]). The second TCI state may locate/be in a 2nd entry in at least two entries of the at least two TCI states.

The at least two TCI states may indicate at least two quasi co-location types for the at least two reference signals. Each TCI state of the at least two TCI states may indicate a respective quasi co-location type of the at least two quasi co-location types. The at least two quasi co-location types, for example, may be QCL-TypeD. For example, the first TCI state (e.g., TCI state 1 of CORESET 2 and/or TCI state 3 of CORESET 3) may indicate/comprise a first quasi co-location type, of the at least two quasi co-location types, for the first reference signal. The second TCI state (e.g., TCI state 2 of CORESET 2 and/or TCI state 4 of CORESET 3) may indicate/comprise a second quasi co-location type, of the at least two quasi co-location types, for the second reference signal. The first quasi co-location type, for example, may be QCL-TypeD. The second quasi co-location type, for example, may be QCL-TypeD.

The wireless device may monitor, for the response (e.g., DCI or repetition of the DCI), the PDCCH (or the PDCCH candidate(s) or the PDCCH transmissions/reception(s))) in the CORESET based on the at least two TCI states, for example, based on/in response to the receiving the activation command indicating/activating/selecting/updating the at least two TCI states for the CORESET.

The monitoring, for the response (e.g., DCI), the PDCCH (or the PDCCH candidate(s) or the PDCCH transmissions/reception(s))) in the CORESET may comprise monitoring, for the response (e.g., DCI), PDCCH candidate(s) in one or more PDCCH monitoring occasions for/of one or more search space sets associated with the CORESET. The plurality of search space sets may comprise the one or more search space sets. The PDCCH candidates of the plurality of search space sets may comprise the PDCCH candidate(s) of the one or more search space sets. The wireless device may determine the one or more PDCCH monitoring occasions of the one or more search space sets based on one or more search space set configuration parameters (e.g., IE SearchSpace) of the one or more configuration parameters. The one or more search space set configuration parameters may indicate one or more PDCCH monitoring periodicities (e.g., monitoringSlotPeriodicityAndOffset) for the one or more search space sets. The PDCCH monitoring periodicities may comprise the one or more PDCCH monitoring periodicities. The one or more search space set configuration parameters may indicate PDCCH monitoring symbols (e.g., monitoringSymbolsWithinSlot) for the one or more search space sets.

The monitoring the PDCCH (or the PDCCH candidate(s) or the PDCCH transmissions/reception(s))) in the CORESET based on the at least two TCI states may comprise one or more DM-RS antenna ports of the PDCCH (or the PDCCH candidate(s) or the PDCCH transmissions/reception(s))) in the CORESET being quasi co-located with the at least two reference signals indicated by the at least two TCI states. The one or more DM-RS antenna ports of the PDCCH (or the PDCCH candidate(s) or the PDCCH transmissions/reception(s))) in the CORESET may be quasi co-located with each reference signal, of the at least two reference signals, indicated by a respective TCI state the at least two TCI states. The one or more DM-RS antenna ports of the PDCCH (or the PDCCH candidate(s) or the PDCCH transmissions/reception(s)) in the CORESET may be quasi co-located with the at least two reference signals with respect to the at least two quasi co-location types indicated by the at least two TCI states.

The monitoring the PDCCH (or the PDCCH candidate(s) or the PDCCH transmissions/reception(s)) in the CORESET based on the at least two TCI states may comprise one or more DM-RS antenna ports of the PDCCH (or the PDCCH candidate(s) or the PDCCH transmissions/reception(s)) in the CORESET being quasi co-located with the first reference signal indicated by the first TCI state. The one or more DM-RS antenna ports of the PDCCH (or the PDCCH candidate(s) or the PDCCH transmissions/reception(s)) in the CORESET may be quasi co-located with the first reference signal with respect to the first quasi co-location type indicated by the first TCI state. The monitoring the PDCCH (or the PDCCH candidate(s) or the PDCCH transmissions/reception(s)) in the CORESET based on the at least two TCI states may comprise the one or more DM-RS antenna ports of the PDCCH (or the PDCCH candidate(s) or the PDCCH transmissions/reception(s)) in the CORESET being quasi co-located with the second reference signal indicated by the second TCI state. The one or more DM-RS antenna ports of the PDCCH (or the PDCCH candidate(s) or the PDCCH transmissions/reception(s)) in the CORESET may be quasi co-located with the second reference signal with respect to the second quasi co-location type indicated by the second TCI state. The one or more DM-RS antenna ports of the PDCCH (or the PDCCH candidate(s) or the PDCCH transmissions/reception(s)) in the CORESET may be quasi co-located with the first reference signal and the second reference signal. The one or more DM-RS antenna ports of the PDCCH (or the PDCCH candidate(s) or the PDCCH transmissions/reception(s)) in the CORESET may be quasi co-located with the first reference signal with respect to the first quasi co-location type and the second reference signal with respect to the second quasi co-location type.

The monitoring the PDCCH (or the PDCCH candidate(s) or the PDCCH transmissions/reception(s)) in the CORESET based on the at least two TCI states may comprise one or more first DM-RS antenna ports of the PDCCH (or the PDCCH candidate(s) or the PDCCH transmissions/reception(s)) in the CORESET being quasi co-located with the first reference signal indicated by the first TCI state. The one or more first DM-RS antenna ports of the PDCCH (or the PDCCH candidate(s) or the PDCCH transmissions/reception(s)) in the CORESET may be quasi co-located with the first reference signal with respect to the first quasi co-location type indicated by the first TCI state. The monitoring the PDCCH (or the PDCCH candidate(s) or the PDCCH transmissions/reception(s)) in the CORESET based on the at least two TCI states may comprise one or more second DM-RS antenna ports of the PDCCH (or the PDCCH candidate(s) or the PDCCH transmissions/reception(s)) in the CORESET being quasi co-located with the second reference signal indicated by the second TCI state. The one or more second DM-RS antenna ports of the PDCCH (or the PDCCH candidate(s) or the PDCCH transmissions/reception(s)) in the CORESET may be quasi co-located with the second reference signal with respect to the second quasi co-location type indicated by the second TCI state. The one or more first DM-RS antenna ports and the one or more second DM-RS antenna ports may be different (e.g., orthogonal, not comprise a common DM-RS antenna port).

The wireless device may receive the response (e.g., DCI) in/via the CORESET. The wireless device may receive the response (e.g., DCI) in/via the CORESET, for example, while the monitoring the PDCCH (or the PDCCH candidate(s) or the PDCCH transmissions/reception(s)) in/via the CORESET. The wireless device may receive the response (e.g., DCI) in/via the CORESET based on the at least two TCI states. The receiving the response (e.g., DCI) in/via the CORESET based on the at least two TCI states may comprise one or more DM-RS antenna ports of the PDCCH (or the PDCCH candidate(s) or the PDCCH transmissions/reception(s)) in the CORESET being quasi co-located with the at least two reference signals indicated by the at least two TCI states. The one or more DM-RS antenna ports of the PDCCH (or the PDCCH candidate(s) or the PDCCH transmissions/reception(s)) in the CORESET may be quasi co-located with each reference signal of the at least two reference signals indicated by a respective TCI state of the at least two TCI states. The one or more DM-RS antenna ports of the PDCCH (or the PDCCH candidate(s) or the PDCCH transmissions/reception(s)) in the CORESET may be quasi co-located with the at least two reference signals with respect to the at least two quasi co-location types indicated by the at least two TCI states.

The receiving the response (e.g., DCI) in/via the CORESET based on the at least two TCI states may comprise one or more DM-RS antenna ports of the PDCCH (or the PDCCH candidate(s) or the PDCCH transmissions/reception(s)) in the CORESET being quasi co-located with the first reference signal indicated by the first TCI state. The one or more DM-RS antenna ports of the PDCCH (or the PDCCH candidate(s) or the PDCCH transmissions/reception(s)) in the CORESET may be quasi co-located with the first reference signal with respect to the first quasi co-location type indicated by the first TCI state. The receiving the response (e.g., DCI) in/via the CORESET based on the at least two TCI states may comprise the one or more DM-RS antenna ports of the PDCCH (or the PDCCH candidate(s) or the PDCCH transmissions/reception(s)) in the CORESET being quasi co-located with the second reference signal indicated by the second TCI state. The one or more DM-RS antenna ports of the PDCCH (or the PDCCH candidate(s) or the PDCCH transmissions/reception(s)) in the CORESET may be quasi co-located with the second reference signal with respect to the second quasi co-location type indicated by the second TCI state. The one or more DM-RS antenna ports of the PDCCH (or the PDCCH candidate(s) or the PDCCH transmissions/reception(s)) in the CORESET may be quasi co-located with the first reference signal and the second reference signal. The one or more DM-RS antenna ports of the PDCCH (or the PDCCH candidate(s) or the PDCCH transmissions/reception(s)) in the CORESET may be quasi co-located with the first reference signal with respect to the first quasi co-location type and the second reference signal with respect to the second quasi co-location type.

The receiving the response (e.g., DCI) in/via the CORESET based on the at least two TCI states may comprise one or more first DM-RS antenna ports of the PDCCH (or the PDCCH candidate(s) or the PDCCH transmissions/reception(s)) in the CORESET being quasi co-located with the first reference signal indicated by the first TCI state. The one or more first DM-RS antenna ports of the PDCCH (or the PDCCH candidate(s) or the PDCCH transmissions/reception(s)) in the CORESET may be quasi co-located with the first reference signal with respect to the first quasi co-location type indicated by the first TCI state. The receiving the response (e.g., DCI) in/via the CORESET based on the at least two TCI states may comprise one or more second DM-RS antenna ports of the PDCCH (or the PDCCH candidate(s) or the PDCCH transmissions/reception(s)) in the CORESET being quasi co-located with the second reference signal indicated by the second TCI state. The one or more second DM-RS antenna ports of the PDCCH (or the PDCCH candidate(s) or the PDCCH transmissions/reception(s)) in the CORESET may be quasi co-located with the second reference signal with respect to the second quasi co-location type indicated by the second TCI state. The one or more first DM-RS antenna ports and the one or more second DM-RS antenna ports may be different (e.g., orthogonal, not comprise a common DM-RS antenna port).

The one or more configuration parameters may indicate a control channel repetition (e.g., PDCCH repetition/aggregation). The one or more configuration parameters may comprise a control channel repetition enabling parameter that enables (or activates or indicates) the control channel repetition. The control channel repetition may comprise a repetition of a downlink control signal/channel (e.g., PDCCH, DCI).

The activation command indicating/updating/activating the at least two TCI states may indicate a control channel repetition, for example, for the CORESET. The activation command indicating/updating/activating the at least two TCI states for the CORESET may indicate the control channel repetition for the CORESET.

The control channel repetition may be based on a repetition/multiplexing scheme. The repetition/multiplexing scheme may be, for example, a spatial/code domain repetition scheme (e.g., single frequency network (SFN)/spatial domain multiplexing (SDM)/CDM scheme).

The wireless device may monitor, for the control channel repetition, the PDCCH (or the PDCCH candidate(s) or the PDCCH transmissions/reception(s)) in/via the CORESET. The base station may send/transmit, for the CORESET, the activation command indicating/activating/updating the at least two TCI states for the control channel repetition. The wireless device may monitor, for repetition of DCI, PDCCH (or PDCCH candidate(s) or PDCCH transmissions/reception(s)) in/via the CORESET. The wireless device may monitor, for repetition of the response (e.g., DCI), the PDCCH (or the PDCCH candidate(s) or the PDCCH transmissions/reception(s)) in/via the CORESET, for example, based on the at least two TCI states. The wireless device may monitor, for one or more first repetitions of the DCI, the CORESET based on the first TCI state. The wireless device may monitor, for one or more second repetitions of the response (e.g., DCI), the CORESET based on the second TCI state.

Each repetition of the response (e.g., DCI) may be the same (or may have the same content, e.g., same DCI fields, same value for the DCI fields, same payload, same DCI size, etc.). Each repetition of the response (e.g., DCI) may be different (or may have different content, different DCI size, different payload, e.g., different DCI fields, different value for the DCI fields, etc.).

The base station may send/transmit, via the CORESET, repetition of a message, an indication, or control information (e.g., the DCI). The wireless device may monitor, for repetition of the message, the indication, or the control information (e.g., DCI), the CORESET. The wireless device may, for example, receive the message, the indication, or the control information (e.g., DCI) via CORESET. The one or more configuration parameters may, for example, indicate the CORESET for the control channel repetition.

The base station may send/transmit, via a search space set of the CORESET, repetition of the message, the indication, or the control information (e.g., DCI). The wireless device may monitor, for repetition of the message, the indication, or the control information (e.g., DCI), the search space set of the CORESET. The wireless device may, for example, receive the message, the indication, or the control information (e.g., DCI) via the search space set. The one or more configuration parameters may, for example, indicate the search space set for the control channel repetition.

The base station may send/transmit, via a PDCCH candidate in the CORESET, repetition of the message, the indication, or the control information (e.g., DCI). The wireless device may monitor, for repetition of the message, the indication, or the control information (e.g., DCI), the PDCCH candidate. The wireless device may, for example, receive the PDCCH candidate with the message, the indication, or the control information (e.g., DCI). The one or more configuration parameters may, for example, indicate the PDCCH candidate for the control channel repetition.

The wireless device may update/override/overwrite/replace a TCI state, of/among the at least two TCI states, with the candidate reference signal. The wireless device may update/override/overwrite/replace the TCI state, of/among the at least two TCI states, with the candidate reference signal, for example, based on the completing the beam failure recovery. The wireless device may update/override/overwrite/replace the TCI state, of/among the at least two TCI states, with the candidate reference signal, for example, based on receiving/detecting the message, the indication, or the control information (e.g., DCI) that completes the beam failure recovery.

The at least two TCI states may comprise one or more non-updated TCI states. The one or more non-updated TCI states may not comprise the (updated/overridden/overwritten/replaced) TCI state. The one or more non-updated TCI states may be different from the (updated) TCI state. Each TCI state of the one or more non-updated TCI states may be different from the (updated) TCI state. The (updated) TCI state may be the first TCI state (e.g., TCI state 1 of CORESET 2 and/or TCI state 3 of CORESET 3 in FIG. 24). The one or more non-updated TCI states may be the second TCI state (e.g., TCI state 2 of CORESET 2 and/or TCI state 4 of CORESET 3 in FIG. 24), for example, based on the (updated) TCI state being the first TCI state. The (updated) TCI state may be the second TCI state (e.g., TCI state 2 of CORESET 2 and/or TCI state 4 of CORESET 3 in FIG. 24). The one or more non-updated TCI states may be the first TCI state (e.g., TCI state 1 of CORESET 2 and/or TCI state 3 of CORESET 3 in FIG. 24), for example, based on the (updated) TCI state being the second TCI state.

The wireless device may not update/override/overwrite/replace the one or more non-updated TCI states with the candidate reference signal. The wireless device may not update/override/overwrite/replace each TCI state of the one or more non-updated TCI states with the candidate reference signal.

The wireless device may monitor, for a message, an indication, or control information (e.g., DCI or for repetition of DCI), PDCCH (or PDCCH candidate(s) or PDCCH transmissions/receptions) in/via the CORESET based on the candidate reference signal. The wireless device may monitor, for the message, the indication, or the control information (e.g., DCI or for repetition of the DCI), the PDCCH (or the PDCCH candidate(s) or the PDCCH transmissions/ receptions) in/via the CORESET based on the candidate reference signal, for example, based on/in response to the completing the beam failure recovery. The wireless device may monitor, for the message, the indication, or the control information (e.g., DCI or for repetition of the DCI), the PDCCH (or the PDCCH candidate(s) or the PDCCH transmissions/receptions) in/via the CORESET based on the candidate reference signal, for example, based on/in response to the receiving/detecting the response (e.g., DCI or the BFR response) that completes the beam failure recovery.

The wireless device may start monitoring, for a message, an indication, or control information (e.g., DCI or for repetition of DCI), PDCCH (or PDCCH candidate(s) or PDCCH transmissions/receptions) in/via the CORESET based on the candidate reference signal. The wireless device may start monitoring, for the message, the indication, or the control information (e.g., DCI or for repetition of the DCI), the PDCCH (or the PDCCH candidate(s) or the PDCCH transmissions/receptions) in/via the CORESET based on the candidate reference signal, for example, based on/in response to the completing the beam failure recovery. The wireless device may start monitoring, for the message, the indication, or the control information (e.g., DCI or for repetition of the DCI), the PDCCH (or the PDCCH candidate(s) or the PDCCH transmissions/receptions) in/via the CORESET based on the candidate reference signal, for example, based on/in response to the receiving/detecting the DCI (or the BFR response) that completes the beam failure recovery.

The monitoring the PDCCH in/via the CORESET based on the candidate reference signal may be (or start or occur) after a number of symbols from a last/ending/latest symbol of the PDCCH reception with the response (e.g., the BFR response or the DCI 2460/2660 in FIG. 24 and FIG. 26). The monitoring the PDCCH in the CORESET based on the candidate reference signal may be (or start or occur) after a number of symbols from a last/ending/latest symbol of the PDCCH reception with the response (e.g., DCI or the BFR response) that completes the beam failure recovery. The number of symbols may be, for example, fixed/preconfigured/predefined/preset. The number of symbols may be, for example, 28 symbols. The number of symbols may be, for example, 14 symbols. The number of symbols may be, for example, 42 symbols. The number of symbols may be, for example, based on latency/delay of a backhaul (e.g., 2 ms, 5 ms, 10 ms, 20 ms, 50 ms, and the like). The one or more configuration parameters may, for example, indicate the number of symbols.

The wireless device may monitor, for a message, an indication, or control information (e.g., DCI or for repetition of DCI), PDCCH (or PDCCH candidate(s) or PDCCH transmissions/receptions) in/via the CORESET based on the candidate reference signal and the one or more non-updated TCI states (e.g., Candidate RS and TCI state 2 of CORESET 2, or Candidate RS and TCI state 4 of CORESET 3). The wireless device may monitor, for the message, the indication, or the control information (e.g., DCI or for repetition of the DCI), the PDCCH (or the PDCCH candidate(s) or the PDCCH transmissions/receptions) in/via the CORESET based on the candidate reference signal and the one or more non-updated TCI states, for example, based on/in response to the completing the beam failure recovery. The wireless device may monitor, for the message, the indication, or the control information (e.g., DCI or for repetition of the DCI), the PDCCH (or the PDCCH candidate(s) or the PDCCH transmissions/receptions) in/via the CORESET based on the candidate reference signal and the one or more non-updated TCI states, for example, based on/in response to the updating/overriding/overwriting/replacing the TCI state, of/among the at least two TCI states, with the candidate reference signal (e.g., with an antenna port quasi co-location parameter associated with the candidate reference signal). The wireless device may monitor, for the message, the indication, or the control information (e.g., DCI or for repetition of the DCI), the PDCCH (or the PDCCH candidate(s) or the PDCCH transmissions/receptions) in/via the CORESET based on the candidate reference signal and the one or more non-updated TCI states, for example, based on/in response to the receiving/detecting the response (e.g., DCI) that completes the beam failure recovery.

The wireless device may start monitoring, for a message, an indication, or control information (e.g., DCI or for repetition of DCI), PDCCH (or PDCCH candidate(s) or PDCCH transmissions/receptions) in/via the CORESET based on the candidate reference signal and the one or more non-updated TCI states. The wireless device may start monitoring, for the message, the indication, or the control information (e.g., DCI or for repetition of the DCI), the PDCCH (or the PDCCH candidate(s) or the PDCCH transmissions/receptions) in/via the CORESET based on the candidate reference signal and the one or more non-updated TCI states, for example, based on the completing the beam failure recovery. The wireless device may start monitoring, for the message, the indication, or the control information (e.g., DCI or for repetition of the DCI), the PDCCH (or the PDCCH candidate(s) or the PDCCH transmissions/receptions) in the CORESET based on the candidate reference signal and the one or more non-updated TCI states, for example, based on the updating/overriding/overwriting/replacing the TCI state, of/among the at least two TCI states, with the candidate reference signal. The wireless device may start monitoring, for the message, the indication, or the control information (e.g., DCI or for repetition of the DCI), the PDCCH (or the PDCCH candidate(s) or the PDCCH transmissions/receptions) in the CORESET based on the candidate reference signal and the one or more non-updated TCI states, for example, based on/in response to the receiving/detecting the DCI that completes the beam failure recovery.

The monitoring the PDCCH in the CORESET based on the candidate reference signal and the one or more non-updated TCI states may be (or start or occur) after a number of symbols from a last/ending/latest symbol of the PDCCH reception with the response (e.g., the BFR response or the DCI 2460/2660 in FIG. 24 and FIG. 26). The monitoring the PDCCH in/via the CORESET based on the candidate reference signal and the one or more non-updated TCI states may be (or start or occur) after a number/quantity of symbols from a last/ending/latest symbol of the PDCCH reception with the response (e.g., DCI or the BFR response) that completes the beam failure recovery. The number/quantity of symbols may be, for example, fixed/preconfigured/predefined/preset. The number/quantity of symbols may be, for example, 28 symbols. The number/quantity of symbols may be, for example, 14 symbols. The number/quantity of symbols may be, for example, 42 symbols. The number/quantity of symbols may be, for example, based on latency/delay of a backhaul (e.g., 2 ms, 5 ms, 10 ms, 20 ms, 50 ms, and the like). The one or more configuration parameters may, for example, indicate the number/quantity of symbols.

The (updated) TCI state may be the first TCI state. The one or more non-updated TCI states may be the second TCI state. The monitoring, for the message, the indication, or the control information (e.g., DCI or for repetition of the DCI), the PDCCH (or the PDCCH candidate(s) or the PDCCH transmissions/receptions) in/via the CORESET based on the candidate reference signal and the one or more non-updated TCI states may comprise monitoring, for the message, the indication, or the control information (e.g., DCI or for repetition of the DCI), the PDCCH (or the PDCCH candidate(s) or the PDCCH transmissions/receptions) in/via the CORESET based on the candidate reference signal and the second TCI state. The monitoring, for the message, the indication, or the control information (e.g., DCI or for repetition of the DCI), the PDCCH (or the PDCCH candidate(s) or the PDCCH transmissions/receptions) in/via the CORESET based on the candidate reference signal and the second TCI state may comprise one or more DM-RS antenna ports of the PDCCH (or the PDCCH candidate(s) or the PDCCH transmissions/reception(s)) in the CORESET being quasi co-located with the candidate reference signal. The monitoring, for the message, the indication, or the control information (e.g., DCI or for repetition of the DCI), the PDCCH (or the PDCCH candidate(s) or the PDCCH transmissions/receptions) in/via the CORESET based on the candidate reference signal and the second TCI state may comprise the one or more DM-RS antenna ports of the PDCCH (or the PDCCH candidate(s) or the PDCCH transmissions/reception(s)) in the CORESET being quasi co-located with the second reference signal indicated by the second TCI state. The one or more DM-RS antenna ports of the PDCCH (or the PDCCH candidate(s) or the PDCCH transmissions/reception(s)) in the CORESET may be quasi co-located with the second reference signal with respect to the second quasi co-location type indicated by the second TCI state. The one or more DM-RS antenna ports of the PDCCH (or the PDCCH candidate(s) or the PDCCH transmissions/reception(s)) in the CORESET may be quasi co-located with the candidate reference signal and the second reference signal. The one or more DM-RS antenna ports of the PDCCH (or the PDCCH candidate(s) or the PDCCH transmissions/reception(s)) in the CORESET may be quasi co-located with the candidate reference signal with respect to a quasi co-location type (e.g., QCL typeD) and with the second reference signal with respect to the second quasi co-location type.

The (updated) TCI state may be the second TCI state. The one or more non-updated TCI states may be the first TCI state. The monitoring, for the message, the indication, or the control information (e.g., message, the indication, or the control information (e.g., DCI or for repetition of the DCI), the PDCCH (or the PDCCH candidate(s) or the PDCCH transmissions/receptions) in/via the CORESET based on the candidate reference signal and the one or more non-updated TCI states may comprise monitoring, for the message, the indication, or the control information (e.g., DCI or for repetition of the DCI), the PDCCH (or the PDCCH candidate(s) or the PDCCH transmissions/receptions) in/via the CORESET based on the candidate reference signal and the first TCI state. The monitoring, for the message, the indication, or the control information (e.g., DCI or for repetition of the DCI), the PDCCH (or the PDCCH candidate(s) or the PDCCH transmissions/receptions) in/via the CORESET based on the candidate reference signal and the first TCI state may comprise one or more DM-RS antenna ports of the PDCCH (or the PDCCH candidate(s) or the PDCCH transmissions/reception(s)) in the CORESET being quasi co-located with the candidate reference signal. The monitoring, for the message, the indication, or the control information (e.g., DCI or for repetition of the DCI), the PDCCH (or the PDCCH candidate(s) or the PDCCH transmissions/receptions) in/via the CORESET based on the candidate reference signal and the first TCI state may comprise the one or more DM-RS antenna ports of the PDCCH (or the PDCCH candidate(s) or the PDCCH transmissions/reception(s)) in the CORESET being quasi co-located with the first reference signal indicated by the first TCI state. The one or more DM-RS antenna ports of the PDCCH (or the PDCCH candidate(s) or the PDCCH transmissions/reception(s)) in the CORESET may be quasi co-located with the first reference signal with respect to the first quasi co-location type indicated by the first TCI state. The one or more DM-RS antenna ports of the PDCCH (or the PDCCH candidate(s) or the PDCCH transmissions/reception(s)) in the CORESET may be quasi co-located with the candidate reference signal and the first reference signal. The one or more DM-RS antenna ports of the PDCCH (or the PDCCH candidate(s) or the PDCCH transmissions/reception(s)) in the CORESET may be quasi co-located with the candidate reference signal with respect to a quasi co-location type (e.g., QCL typeD) and with the first reference signal with respect to the first quasi co-location type.

The wireless device may receive/detect the message, the indication, or the control information (e.g., DCI or repetition of the DCI) in/via the CORESET. The wireless device may receive/detect, via/in the CORESET, the message, the indication, or the control information (e.g., DCI or repetition of the DCI), for example, based on the candidate reference signal and the one or more non-updated TCI states. The wireless device may receive/detect the message, the indication, or the control information (e.g., DCI or repetition of the DCI) in/via the CORESET, for example, based on (or while or during) monitoring, for the message, the indication, or the control information (e.g., DCI or for repetition of the DCI), the PDCCH (or the PDCCH candidate(s) or the PDCCH transmissions/receptions) in/via the CORESET.

The CORESET may be identified/indicated by a CORESET index. The one or more CORESET indexes may comprise the CORESET index. The CORESET index may be equal to, for example, zero (or any other value). The CORESET may be, for example, CORESET-0 based on the CORESET index being equal to zero. The cell may be a primary cell. The wireless device may monitor, for the message, the indication, or the control information (e.g., DCI or for repetition of the DCI), the PDCCH (or the PDCCH candidate(s) or the PDCCH transmissions/receptions) in/via the CORESET based on the candidate reference signal and the one or more non-updated TCI states, for example, based on/in response to the CORESET index of the CORESET being equal to zero. The wireless device may monitor, for the message, the indication, or the control information (e.g., DCI or for repetition of the DCI), the PDCCH (or the PDCCH candidate(s) or the PDCCH transmissions/receptions) in/via the CORESET with the CORESET index that is equal to zero based on the candidate reference signal and the one or more non-updated TCI states, for example, based on/in response to the cell being the primary cell.

The CORESET index may or may not be equal to zero. The cell may be a secondary cell. The wireless device may monitor, for the message, the indication, or the control information (e.g., DCI or for repetition of the DCI), the PDCCH (or the PDCCH candidate(s) or the PDCCH transmissions/receptions) in/via the CORESET with the CORESET index that is equal to or different from zero based on the candidate reference signal and the one or more non-updated TCI states, for example, based on/in response to on the cell being the secondary cell.

The wireless device may update/override/overwrite/replace the TCI state, of/among the at least two TCI states, with the candidate reference signal, for example, based on the beam failure detection group/set/pool. The wireless device may update/override/overwrite/replace the TCI state, of/among the at least two TCI states, with the candidate reference signal, for example, based on the beam failure detection group/set/pool index of the beam failure detection group/set/pool. The wireless device may update/override/overwrite/replace the TCI state, of/among the at least two TCI states, with the candidate reference signal, for example, based on whether the beam failure detection group/set/pool is the first beam failure detection group/set/pool or the second beam failure detection group/set/pool. The wireless device may update/override/overwrite/replace the TCI state, of/among the at least two TCI states, with the candidate reference signal, for example, based on the TCI state being associated with the beam failure detection group/set/pool.

The wireless device may determine/select the TCI state of/among the at least two TCI states, for example, based on the beam failure detection group/set/pool. The wireless device may determine/select the TCI state of/among the at least two TCI states, for example, based on the beam failure detection group/set/pool index of the beam failure detection group/set/pool. The wireless device may determine/select the TCI state of/among the at least two TCI states, for example, based on whether the beam failure detection group/set/pool is the first beam failure detection group/set/pool or the second beam failure detection group/set/pool. The wireless device may determine/select the TCI state of/among the at least two TCI states, for example, based on the TCI state being associated with the beam failure detection group/set/pool.

The (updated) TCI state may be, for example, the first TCI state. The (updated) TCI state may be the first TCI state, for example, based on the beam failure detection group/set/pool being the first beam failure detection group/set/pool. The wireless device may monitor, for the message, the indication, or the control information (e.g., DCI or for repetition of the DCI), the PDCCH (or the PDCCH candidate(s) or the PDCCH transmissions/receptions) in/via the CORESET based on the candidate reference signal and the second TCI state, for example, based on/in response to the beam failure detection group/set/pool being the first beam failure detection group/set/pool. The (updated) TCI state may be the first TCI state, for example, based on the beam failure being associated with the first TRP. The (updated) TCI state may be the first TCI state, for example, based on the beam failure detection group/set/pool index being equal to a first value. The first value may be, for example, fixed/preconfigured/predefined/preset. The first value may be, for example, equal to zero (or any other value). The first value may be, for example, equal to one (or any other value). The one or more configuration parameters may, for example, indicate the first value. The wireless device may monitor, for the message, the indication, or the control information (e.g., DCI or for repetition of the DCI), the PDCCH (or the PDCCH candidate(s) or the PDCCH transmissions/receptions) in/via the CORESET based on the candidate reference signal and the second TCI state, for example, based on/in response to the beam failure detection group/set/pool index being equal to the first value (e.g., 0, 1). The wireless device may monitor, for the message, the indication, or the control information (e.g., DCI or for repetition of the DCI), the PDCCH (or the PDCCH candidate(s) or the PDCCH transmissions/receptions) in the CORESET based on the candidate reference signal and the second TCI state, for example, based on/in response to the first TCI state being associated with the beam failure detection group/set/pool. The candidate reference signal and the second TCI state may be, for example, Candidate RS and TCI state 2 of CORESET 2 shown in FIG. 24, respectively. The candidate reference signal and the second TCI state may be, for example, Candidate RS and TCI state 4 of CORESET 3 shown in FIG. 24, respectively.

The (updated) TCI state may be, for example, the second TCI state. The (updated) TCI state may be the second TCI state, for example, based on the beam failure detection group/set/pool being the second beam failure detection group/set/pool. The wireless device may monitor, for the message, the indication, or the control information (e.g., DCI or for repetition of the DCI), the PDCCH (or the PDCCH candidate(s) or the PDCCH transmissions/receptions) in/via the CORESET based on the candidate reference signal and the first TCI state, for example, based on/in response to the beam failure detection group/set/pool being the second beam failure detection group/set/pool. The (updated) TCI state may be the second TCI state, for example, based on the beam failure being associated with the second TRP. The (updated) TCI state may be the second TCI state, for example, based on the beam failure detection group/set/pool index being equal to a second value. The second value may be, for example, fixed/preconfigured/predefined/preset. The second value may be, for example, equal to one (or any other value that is different from the first value). The second value may be, for example, equal to two (or any other value that is different from the first value). The one or more configuration parameters may, for example, indicate the second value. The wireless device may monitor, for the message, the indication, or the control information (e.g., DCI or for repetition of the DCI), the PDCCH (or the PDCCH candidate(s) or the PDCCH transmissions/receptions) in/via the CORESET based on the candidate reference signal and the first TCI state, for example, based on/in response to the beam failure detection group/set/pool index being equal to the second value (e.g., 1, 2). The wireless device may monitor, for the message, the indication, or the control information (e.g., DCI or for repetition of the DCI), the PDCCH (or the PDCCH candidate(s) or the PDCCH transmissions/receptions) in/via the CORESET based on the candidate reference signal and the first TCI state, for example, based on/in response to the second TCI state being associated with the beam failure detection group/set/pool.

The wireless device may monitor, for a message, an indication, or control information (e.g., DCI or for repetition of DCI), PDCCH (or PDCCH candidate(s) or PDCCH transmissions/receptions) in/via a CORESET of the one or more CORESETs based on a TCI state (or a single TCI state or one TCI state or an antenna port quasi co-location (QCL) assumption/property/structure). The TCI state may be TCI state 1 shown in FIG. 24, for example, if the CORESET is CORESET 1 shown in FIG. 24. The TCI state may be TCI state 2 shown in FIG. 24, for example, if the CORESET it CORESET 4 shown in FIG. 24.

The wireless device may monitor the PDCCH (or the PDCCH candidate(s) or the PDCCH transmissions/receptions) in the CORESET based on the TCI state, for example, before/prior to completing the beam failure recovery. The wireless device may monitor the PDCCH (or the PDCCH candidate(s) or the PDCCH transmissions/receptions) in the CORESET based on the TCI state, for example, before/prior to completing the beam failure recovery successfully. The wireless device may monitor the PDCCH (or the PDCCH candidate(s) or the PDCCH transmissions/receptions) in the CORESET based on the TCI state, for example, during the beam failure recovery. The wireless device may monitor the PDCCH (or the PDCCH candidate(s) or the PDCCH transmissions/receptions) in the CORESET based on the TCI state, for example, before/prior to the detecting the beam failure. The wireless device may monitor the PDCCH (or the PDCCH candidate(s) or the PDCCH transmissions/receptions) in the CORESET based on the TCI state, for example, after (or in response to or on) receiving an activation command indicating/updating/activating, for the CORESET, the TCI state. The one or more activation commands may comprise the activation command (e.g., Activation Command(s) 2430/2630). The wireless device may monitor the PDCCH (or the PDCCH candidate(s) or the PDCCH transmissions/receptions) in the CORESET based on the TCI state, for example, after (or in response to or on) receiving the one or more configuration parameters indicating/updating/activating, for the CORESET, the TCI state.

The wireless device may receive, for example, an activation command indicating/updating/activating the TCI state for the CORESET. The activation command may indicate/update/activate the TCI state among a plurality of TCI states (e.g., provided by a higher layer parameter tci-StatesPDCCH-ToAddList). The one or more configuration parameters may indicate, for the CORESET, the plurality of TCI states. The one or more activation commands may comprise the activation command. The one or more configuration parameters may, for example, indicate/update/activate the TCI state for the CORESET.

The TCI state may indicate a reference signal (e.g., CSI-RS, SSB/PBCH block, SRS, DM-RS). The TCI state may indicate a quasi co-location type (e.g., QCL TypeD) for the reference signal. The reference signal may be a first reference signal indicated by the TCI state 1 shown in FIG. 24, for example, if the CORESET is CORESET 1 shown in FIG. 24. The reference signal may be a second reference signal indicated by the TCI state 2 shown in FIG. 24, for example, if the CORESET is CORESET 4 shown in FIG. 24.

The first TRP may, for example, send/transmit the reference signal indicated by the TCI state. The TCI state may be associated with the first TRP, for example, based on the first TRP transmitting the reference signal indicated by the TCI state. The TCI state may be associated with the first beam failure detection group/set/pool, for example, based on the first TRP transmitting the one or more first reference signals in the first beam failure detection group/set/pool and the reference signal indicated by the TCI state. The TCI state may be associated with the first beam failure detection group/set/pool, for example, based on the one or more first reference signals in the first beam failure detection group/set/pool comprising the reference signal indicated by the TCI state. The TCI state may be associated with the first beam failure detection group/set/pool, for example, based on at least one reference signal of/among the one or more first reference signals in the first beam failure detection group/set/pool being quasi co-located with the reference signal indicated by the TCI state. The at least one reference signal may be quasi co-located with the reference signal, for example, with respect to a quasi co-location type (e.g., QCL TypeD, QCL TypeC, QCL TypeB, QCL TypeA, and the like). The quasi co-location type may be, for example, QCL TypeD. The one or more configuration parameters may indicate, for the CORESET (or for the TCI state of the CORESET, or for the reference signal indicated by the TCI state), an index (e.g., TRP index, CORESET pool index, antenna panel index, beam failure detection group/set/pool index). The index (or a value of the index) may indicate the first beam failure detection group/set/pool (or the first TRP). The index may be, for example, equal to the first beam failure detection group/set/pool index. The TCI state may be associated with the first beam failure detection group/set/pool, for example, based on the index (or the value of the index) indicating the first beam failure detection group/set/pool. The TCI state of the CORESET being associated with the first beam failure detection group/set/pool may, for example, comprise the CORESET being associated with the first beam failure detection group/set/pool. The CORESET may be associated with the first beam failure detection group/set/pool, for example, based on the one or more configuration parameters indicating, for the CORESET, the index indicating the first beam failure detection group/set/pool.

The second TRP may, for example, send/transmit the reference signal indicated by the TCI state. The TCI state may be associated with the second TRP, for example, based on the second TRP transmitting the reference signal indicated by the TCI state. The TCI state may be associated with the second beam failure detection group/set/pool, for example, based on the second TRP transmitting the one or more second reference signals in the second beam failure detection group/set/pool and the reference signal indicated by the TCI state. The TCI state may be associated with the second beam failure detection group/set/pool, for example, based on the one or more second reference signals in the second beam failure detection group/set/pool comprising the reference signal indicated by the TCI state. The TCI state may be associated with the second beam failure detection group/set/pool, for example, based on at least one reference signal of/among the one or more second reference signals in the second beam failure detection group/set/pool being quasi co-located with the reference signal indicated by the TCI state. The at least one reference signal may be quasi co-located with the reference signal, for example, with respect to a quasi co-location type (e.g., QCL TypeD, QCL TypeC, QCL TypeB, QCL TypeA, and the like). The quasi co-location type may be, for example, QCL TypeD. The one or more configuration parameters may indicate, for the CORESET (or for the TCI state of the CORESET, or for the reference signal indicated by the TCI state), an index (e.g., TRP index, CORESET pool index, antenna panel index, beam failure detection group/set/pool index). The index (or a value of the index) may indicate the second beam failure detection group/set/pool (or the second TRP). The index may be, for example, equal to the second beam failure detection group/set/pool index. The TCI state may be associated with the second beam failure detection group/set/pool, for example, based on the index (or the value of the index) indicating the second beam failure detection group/set/pool. The TCI state of the CORESET being associated with the second beam failure detection group/set/pool may, for example, comprise the CORESET being associated with the second beam failure detection group/set/pool. The CORESET may be associated with the second beam failure detection group/set/pool, for example, based on the one or more configuration parameters indicating, for the CORESET, the index indicating the second beam failure detection group/set/pool.

The monitoring the PDCCH (or the PDCCH candidate(s) or the PDCCH transmissions/reception(s)) in/via the CORESET based on the TCI state may comprise one or more DM-RS antenna ports of the PDCCH (or the PDCCH candidate(s) or the PDCCH transmissions/reception(s)) in the CORESET being quasi co-located with the reference signal indicated by the TCI state. The one or more DM-RS antenna ports of the PDCCH (or the PDCCH candidate(s) or the PDCCH transmissions/reception(s)) in the CORESET may be quasi co-located with the reference signal with respect to the quasi co-location type indicated by the TCI state.

The wireless device may receive the message, the indication, or the control information (e.g., DCI) in/via the CORESET. The wireless device may receive the message, the indication, or the control information (e.g., DCI) in/via the CORESET, for example, while the monitoring the PDCCH (or the PDCCH candidate(s) or the PDCCH transmissions/reception(s)) in/via the CORESET. The wireless device may receive the message, the indication, or the control information (e.g., DCI) in/via the CORESET based on the TCI state. The receiving the message, the indication, or the control information (e.g., DCI) in/via the CORESET based on the TCI state may comprise one or more DM-RS antenna ports of the PDCCH (or the PDCCH candidate(s) or the PDCCH transmissions/reception(s)) in/via the CORESET being quasi co-located with the reference signal indicated by the TCI state. The one or more DM-RS antenna ports of the PDCCH (or the PDCCH candidate(s) or the PDCCH transmissions/reception(s)) in the CORESET may be quasi co-located with the reference signal with respect to the quasi co-location type indicated by the TCI state.

The receiving the message, the indication, or the control information (e.g., DCI) in/via the CORESET based on the TCI state may comprise one or more DM-RS antenna ports of the PDCCH (or the PDCCH candidate(s) or the PDCCH transmissions/reception(s)) in the CORESET being quasi co-located with the reference signal indicated by the TCI state. The one or more DM-RS antenna ports of the PDCCH (or the PDCCH candidate(s) or the PDCCH transmissions/reception(s)) in the CORESET may be quasi co-located with the reference signal with respect to the quasi co-location type indicated by the TCI state.

The activation command indicating/updating/activating the TCI state (or the single TCI state or one TCI state) may indicate no control channel repetition for the CORESET. The one or more configuration parameters may not indicate, for the CORESET, a control channel repetition.

The wireless device may update/override/overwrite/replace the TCI state, of the CORESET, with the candidate reference signal. The wireless device may update/override/overwrite/replace the TCI state with the candidate reference signal, for example, based on the completing the beam failure recovery. The wireless device may update/override/overwrite/replace the TCI state with the candidate reference signal, for example, based on receiving/detecting the DCI that completes the beam failure recovery.

The wireless device may monitor, for a message, an indication, or control information (e.g., DCI or for repetition of DCI), PDCCH (or PDCCH candidate(s) or PDCCH transmissions/receptions) in/via the CORESET based on the candidate reference signal. The wireless device may monitor, for the message, the indication, or the control information (e.g., DCI or for repetition of the DCI), the PDCCH (or the PDCCH candidate(s) or the PDCCH transmissions/receptions) in the CORESET based on the candidate reference signal, for example, based on/in response to the completing the beam failure recovery. The wireless device may monitor, for the message, the indication, or the control information (e.g., DCI or for repetition of the DCI), the PDCCH (or the PDCCH candidate(s) or the PDCCH transmissions/receptions) in/via the CORESET based on the candidate reference signal, for example, based on/in response to the updating/overriding/overwriting/replacing the TCI state, of the CORESET, with the candidate reference signal. The wireless device may monitor, for the message, the indication, or the control information (e.g., DCI or for repetition of the DCI), the PDCCH (or the PDCCH candidate(s) or the PDCCH transmissions/receptions) in/via the CORESET based on the candidate reference signal, for example, based on/in response to the receiving/detecting the response (e.g., DCI or the BFR response) that completes the beam failure recovery.

The wireless device may start monitoring, for a message, an indication, or control information (e.g., DCI or for repetition of DCI), PDCCH (or PDCCH candidate(s) or PDCCH transmissions/receptions) in/via the CORESET based on the candidate reference signal. The wireless device may start monitoring, for the message, the indication, or the control information (e.g., DCI or for repetition of the DCI), the PDCCH (or the PDCCH candidate(s) or the PDCCH transmissions/receptions) in the CORESET based on the candidate reference signal, for example, based on/in response to the completing the beam failure recovery. The wireless device may start monitoring, for the message, the indication, or the control information (e.g., DCI or for repetition of the DCI), the PDCCH (or the PDCCH candidate(s) or the PDCCH transmissions/receptions) in/via the CORESET based on the candidate reference signal, for example, based on/in response to the updating/overriding/overwriting/replacing the TCI state, of the CORESET, with the candidate reference signal. The wireless device may start monitoring, for the message, the indication, or the control information (e.g., DCI or for repetition of the DCI), the PDCCH (or the PDCCH candidate(s) or the PDCCH transmissions/receptions) in the CORESET based on the candidate reference signal, for example, based on/in response to the receiving/detecting the response (e.g., DCI or the BFR response) that completes the beam failure recovery.

The monitoring, for the message, the indication, or the control information (e.g., DCI or for repetition of the DCI), the PDCCH (or the PDCCH candidate(s) or the PDCCH transmissions/receptions) in/via the CORESET based on the candidate reference signal may comprise one or more DM-RS antenna ports of the PDCCH (or the PDCCH candidate(s) or the PDCCH transmissions/reception(s)) in the CORESET being quasi co-located with the candidate reference signal. The one or more DM-RS antenna ports of the PDCCH (or the PDCCH candidate(s) or the PDCCH transmissions/reception(s)) in the CORESET may be quasi co-located with the candidate reference signal with respect to a quasi co-location type (e.g., QCL typeD).

The monitoring the PDCCH (e.g., for the message, the indication, or the control information) in/via the CORESET based on the candidate reference signal may be (or start or occur) after a number/quantity of symbols from a last/ending/latest symbol of the PDCCH reception with the response (e.g., the BFR response or the DCI 2430 in FIG. 24).

The wireless device may update/override/overwrite/replace the TCI state, of the CORESET, with the candidate reference signal, for example, based on the beam failure detection group/set/pool. The wireless device may update/override/overwrite/replace the TCI state, of the CORESET, with the candidate reference signal, for example, based on the beam failure detection group/set/pool index of the beam failure detection group/set/pool. The wireless device may update/override/overwrite/replace the TCI state, of the CORESET, with the candidate reference signal, for example, based on whether the beam failure detection group/set/pool is the first beam failure detection group/set/pool or the second beam failure detection group/set/pool.

The TCI state of the CORESET may be associated with the beam failure detection group/set/pool. The wireless device may update/override/overwrite/replace the TCI state, of the CORESET, with the candidate reference signal, for example, based on the TCI state being associated with the beam failure detection group/set/pool. The beam failure detection group/set/pool may be, for example, the first beam failure detection group/set/pool (e.g., BFD group 1 shown in FIG. 24). The TCI state of the CORESET (e.g., TCI state 1 of CORESET 1 shown in FIG. 24) may be associated with the first beam failure detection group/set/pool. The wireless device may update/override/overwrite/replace the TCI state 1, of the CORESET 1, with the candidate reference signal (e.g., with an antenna port quasi co-location associated with the candidate reference signal), for example, based on the TCI state 1 being associated with the first beam failure detection group/set/pool.

The wireless device may monitor, for the message, the indication, or the control information (e.g., DCI or for repetition of the DCI), the PDCCH (or the PDCCH candidate(s) or the PDCCH transmissions/receptions) in the CORESET based on the candidate reference signal, for example, based on/in response to the TCI state of the CORESET being associated with the beam failure detection group/set/pool. The wireless device may monitor, for the message, the indication, or the control information (e.g., DCI or for repetition of the DCI), the PDCCH (or the PDCCH candidate(s) or the PDCCH transmissions/receptions) in/via the CORESET based on the candidate reference signal, for example, based on/in response to the CORESET being associated with the beam failure detection group/set/pool. The beam failure detection group/set/pool may be, for example, the first beam failure detection group/set/pool (e.g., BFD group 1 shown in FIG. 24). The TCI state of the CORESET (e.g., TCI state 1 of CORESET 1 shown in FIG. 24) may be associated with the first beam failure detection group/set/pool. The wireless device may monitor, for the message, the indication, or the control information (e.g., DCI), PDCCH in the CORESET 1 based on the candidate reference signal, for example, based on/in response to the TCI state 1 being associated with the first beam failure detection group/set/pool.

The wireless device may start monitoring, for the message, the indication, or the control information (e.g., DCI or for repetition of the DCI), the PDCCH (or the PDCCH candidate(s) or the PDCCH transmissions/receptions) in/via the CORESET based on the candidate reference signal, for example, based on/in response to the TCI state of the CORESET being associated with the beam failure detection group/set/pool. The wireless device may start monitoring, for the message, the indication, or the control information (e.g., DCI or for repetition of the DCI), the PDCCH (or the PDCCH candidate(s) or the PDCCH transmissions/receptions) in/via the CORESET based on the candidate reference signal, for example, based on/in response to the CORESET being associated with the beam failure detection group/set/pool.

The wireless device may receive/detect, via/in the CORESET, the message, the indication, or the control information (e.g., DCI or for repetition of the DCI). The wireless device may receive, via/in the CORESET, the message, the indication, or the control information (e.g., DCI or for repetition of the DCI), for example, based on (or during or while) monitoring, for the message, the indication, or the control information (e.g., DCI or for repetition of the DCI), the PDCCH (or the PDCCH candidate(s) or the PDCCH transmissions/receptions) in the CORESET. The wireless device may receive/detect the message, the indication, or the control information (e.g., DCI) based on the candidate reference signal. The wireless device may receive/detect the message, the indication, or the control information (e.g., DCI) based on the candidate reference signal, for example, based on/in response to the TCI state of the CORESET being associated with the beam failure detection group/set/pool. The wireless device may receive/detect the message, the indication, or the control information (e.g., DCI) based on the candidate reference signal, for example, based on/in response to the CORESET being associated with the beam failure detection group/set/pool.

The CORESET index of the CORESET may be equal to, for example, zero (or any other value). The CORESET may be, for example, CORESET-0 based on the CORESET index being equal to zero. The cell may be a primary cell. The wireless device may monitor, for the message, the indication, or the control information (e.g., DCI or for repetition of the DCI), the PDCCH (or the PDCCH candidate(s) or the PDCCH transmissions/receptions) in/via the CORESET based on the candidate reference signal, for example, based on/in response to the CORESET index of the CORESET being equal to zero (or any other value). The wireless device may monitor, for the message, the indication, or the control information (e.g., DCI or for repetition of the DCI), the PDCCH (or the PDCCH candidate(s) or the PDCCH transmissions/receptions) in/via the CORESET with the CORESET index that is equal to zero based on the candidate reference signal, for example, based on/in response to the cell being the primary cell.

The CORESET index may or may not be equal to zero. The cell may be a secondary cell. The wireless device may monitor, for the message, the indication, or the control information (e.g., DCI or for repetition of the DCI), the PDCCH (or the PDCCH candidate(s) or the PDCCH transmissions/receptions) in/via the CORESET with the CORESET index that is equal to (or different from) zero based on the candidate reference signal, for example, based on/in response to the cell being the secondary cell.

The wireless device may not update/override/overwrite/replace the TCI state, of the CORESET, with the candidate reference signal. The wireless device may not update/override/overwrite/replace the TCI state, of the CORESET, with the candidate reference signal, for example, if the TCI state is associated with a beam failure detection group/set/pool and the beam failure detection group/set/pool is not associated with a beam failure (e.g., the beam failure is associated with another beam failure detection group/set/pool). The wireless device may not update/override/overwrite/replace the TCI state with the candidate reference signal, for example, based on the completing the beam failure recovery. The wireless device may not update/override/overwrite/replace the TCI state with the candidate reference signal, for example, based on receiving/detecting the response (e.g., DCI) that completes the beam failure recovery.

The wireless device may monitor, for message, the indication, or the control information (e.g., DCI or for repetition of DCI), PDCCH (or PDCCH candidate(s) or PDCCH transmissions/receptions) in/via the CORESET based on the TCI state. The wireless device may monitor, for the message, the indication, or the control information (e.g., DCI or for repetition of the DCI), the PDCCH (or the PDCCH candidate(s) or the PDCCH transmissions/receptions) in/via the CORESET based on the TCI state, for example, based on/in response to (or after) the completing the beam failure recovery. The wireless device may monitor, for the message, the indication, or the control information (e.g., DCI or for repetition of the DCI), the PDCCH (or the PDCCH candidate(s) or the PDCCH transmissions/receptions) in/via the CORESET based on the TCI state, for example, based on/in response to the not updating/overriding/overwriting/replacing the TCI state, of the CORESET, with the candidate reference signal. The wireless device may monitor, for the message, the indication, or the control information (e.g., DCI or for repetition of the DCI), the PDCCH (or the PDCCH candidate(s) or the PDCCH transmissions/receptions) in/via the CORESET based on the TCI state, for example, based on/in response to (or after) the receiving/detecting the message, the indication, or the control information (e.g., DCI or the BFR response) that completes the beam failure recovery.

The wireless device may keep monitoring, for a message, an indication, or control information (e.g., DCI or for repetition of DCI), PDCCH (or PDCCH candidate(s) or PDCCH transmissions/receptions) in/via the CORESET based on the TCI state. The wireless device may keep monitoring, for a message, an indication, or control information, for example, if the TCI state is associated with a beam failure detection group/set/pool and the beam failure detection group/set/pool is not associated with a beam failure (e.g., the beam failure is associated with another beam failure detection group/set/pool). The wireless device may keep monitoring, for the message, the indication, or the control information (e.g., DCI or for repetition of the DCI), the PDCCH (or the PDCCH candidate(s) or the PDCCH transmissions/receptions) in/via the CORESET based on the TCI state, for example, based on/in response to (or after) the completing the beam failure recovery. The wireless device may keep monitoring, for the message, the indication, or the control information (e.g., DCI or for repetition of the DCI), the PDCCH (or the PDCCH candidate(s) or the PDCCH transmissions/receptions) in/via the CORESET based on the TCI state, for example, based on/in response to the not updating/overriding/overwriting/replacing the TCI state, of the CORESET, with the candidate reference signal. The wireless device may keep monitoring, for the message, the indication, or the control information (e.g., DCI or for repetition of the DCI), the PDCCH (or the PDCCH candidate(s) or the PDCCH transmissions/receptions) in the CORESET based on the TCI state, for example, based on/in response to (or after) the receiving/detecting the response (e.g., DCI or the BFR response) that completes the beam failure recovery.

The monitoring (or keeping monitoring), for the message, the indication, or the control information (e.g., DCI or for repetition of the DCI), the PDCCH (or the PDCCH candidate(s) or the PDCCH transmissions/receptions) in/via the CORESET based on the TCI state may comprise one or more DM-RS antenna ports of the PDCCH (or the PDCCH candidate(s) or the PDCCH transmissions/reception(s)) in the CORESET being quasi co-located with the reference signal indicated by the TCI state. The one or more DM-RS antenna ports of the PDCCH (or the PDCCH candidate(s) or the PDCCH transmissions/reception(s)) in the CORESET may be quasi co-located with the reference signal with respect to the quasi co-location type (e.g., QCL typeD) indicated by the TCI state.

The wireless device may not update/override/overwrite/replace the TCI state, of the CORESET, with the candidate reference signal, for example, based on the beam failure detection group/set/pool. The wireless device may not update/override/overwrite/replace the TCI state, of the CORESET, with the candidate reference signal, for example, based on the beam failure detection group/set/pool index of the beam failure detection group/set/pool. The wireless device may not update/override/overwrite/replace the TCI state, of the CORESET, with the candidate reference signal, for example, based on whether the beam failure detection group/set/pool is the first beam failure detection group/set/pool or the second beam failure detection group/set/pool.

The TCI state of the CORESET may not be associated with the beam failure detection group/set/pool. The TCI state of the CORESET may be associated with a second beam failure detection group/set/pool that is different from the beam failure detection group/set/pool. The wireless device may not update/override/overwrite/replace the TCI state, of the CORESET, with the candidate reference signal, for example, based on the TCI state not being associated with the beam failure detection group/set/pool. The beam failure detection group/set/pool may be the first beam failure detection group/set/pool (e.g., BFD group 1 shown in FIGS. 24 and 26). The TCI state of the CORESET (e.g., TCI state 2 of CORESET 4 shown in FIG. 24) may not be associated with the first beam failure detection group/set/pool (e.g., BFD group 1). The TCI state of the CORESET (e.g., TCI state 2 of CORESET 4) may be associated with the second beam failure detection group/set/pool (e.g., BFD group 2 shown in FIGS. 24 and 26). The wireless device may not update/override/overwrite/replace the TCI state 2, of the CORESET 4, with the candidate reference signal, for example, based on the TCI state 2 not being associated with the first beam failure detection group/set/pool (e.g., BFD group 1).

The wireless device may monitor, for the message, the indication, or the control information (e.g., DCI or for repetition of the DCI), the PDCCH (or the PDCCH candidate(s) or the PDCCH transmissions/receptions) in/via the CORESET based on the TCI state, for example, based on/in response to the TCI state of the CORESET not being associated with the beam failure detection group/set/pool. The wireless device may monitor, for the message, the indication, or the control information (e.g., DCI or for repetition of the DCI), the PDCCH (or the PDCCH candidate(s) or the PDCCH transmissions/receptions) in/via the CORESET based on the TCI state, for example, based on/in response to the CORESET not being associated with the beam failure detection group/set/pool. The beam failure detection group/set/pool may be the first beam failure detection group/set/pool (e.g., BFD group 1 shown in FIG. 24). The TCI state of the CORESET (e.g., TCI state 2 of CORESET 4) may not be associated with the first beam failure detection group/set/pool. The TCI state of the CORESET (e.g., TCI state 2 of CORESET 4) may be associated with the second beam failure detection group/set/pool. The wireless device may monitor, for a message, an indication, or control information (e.g., DCI), PDCCH in the CORESET 4 based on the TCI state 2, for example, based on/in response to the TCI state 2 not being associated with the first beam failure detection group/set/pool.

The wireless device may keep monitoring, for the message, the indication, or the control information (e.g., DCI or for repetition of the DCI), the PDCCH (or the PDCCH candidate(s) or the PDCCH transmissions/receptions) in the CORESET based on the TCI state, for example, based on/in response to the TCI state of the CORESET not being associated with the beam failure detection group/set/pool. The wireless device may keep monitoring, for the message, the indication, or the control information (e.g., DCI or for repetition of the DCI), the PDCCH (or the PDCCH candidate(s) or the PDCCH transmissions/receptions) in/via the CORESET based on the TCI state, for example, based on/in response to the CORESET not being associated with the beam failure detection group/set/pool.

The wireless device may receive/detect, via/in the CORESET, the message, the indication, or the control information (e.g., DCI or for repetition of the DCI). The wireless device may receive, via/in the CORESET, the message, the indication, or the control information (e.g., DCI or for repetition of the DCI), for example, based on (or during or while) monitoring, for the message, the indication, or the control information (e.g., DCI or for repetition of the DCI), the PDCCH (or the PDCCH candidate(s) or the PDCCH transmissions/receptions) in/via the CORESET. The wireless device may receive/detect the message, the indication, or the control information (e.g., DCI) based on the TCI state. The wireless device may receive/detect the message, the indication, or the control information (e.g., DCI) based on the TCI state, for example, based on/in response to the TCI state of the CORESET not being associated with the beam failure detection group/set/pool. The wireless device may receive/detect the message, the indication, or the control information (e.g., DCI) based on the TCI state (e.g., instead of antenna port quasi co-location associated with the candidate reference signal), for example, based on/in response to the CORESET not being associated with the beam failure detection group/set/pool.

As described herein, (e.g., at step 2510 in FIG. 25A), a wireless device may receive one or more messages comprising one or more configuration parameters (e.g., configuration parameters 2420/2620), for example, for a cell (e.g., PCell, SCell, PUCCH SCell, etc.). A base station (or a relay, or any other wireless devices) may send/transmit the one or more messages comprising the one or more configuration parameters (e.g., at step 2512 in FIG. 25B). The one or more configuration parameters may indicate a channel repetition (e.g., control channel repetition).

The wireless device may activate a downlink BWP of the cell as an active downlink BWP of the cell. The active downlink BWP of the cell may comprise one or more CORESETs. The one or more configuration parameters may indicate the one or more CORESETs for the downlink BWP.

The one or more configuration parameters may indicate a plurality of beam failure detection groups/sets/pools (e.g., BFD group 1, BFD group 2 shown in FIGS. 24 and 26). The one or more configuration parameters may indicate one or more beam failure detection groups/sets/pools (or beam failure detection reference signal groups/sets/pools or BFD-RS groups/sets/pools). The one or more beam failure detection groups/sets/pools may indicate, for beam failure detection, one or more reference signals (e.g., CSI-RS, SS/PBCH block, DM-RS, TRS, and the like). Each beam failure detection group/set/pool of the one or more beam failure detection groups/sets/pools may indicate respective reference signal(s) of the one or more reference signals.

The one or more beam failure detection groups/sets/pools may comprise a first beam failure detection group/set/pool (or 1st first beam failure detection group/set/pool). The one or more beam failure detection groups/sets/pools may comprise a second beam failure detection group/set/pool (or 2nd beam failure detection group/set/pool).

The wireless device may monitor (e.g., at step 2520 shown in FIG. 25A), for a message, an indication, or control information (e.g., DCI or for repetition of DCI), PDCCH (or PDCCH candidate(s) or PDCCH transmissions/receptions) in/via a CORESET of the one or more CORESETs based on at least two TCI states (e.g., based on at least two antenna port quasi co-location (QCL) assumptions/properties/structures). The base station may send/transmit (e.g., at step 2522 shown in FIG. 25B) the message, an indication, or control information (e.g., DCI or for repetition of DCI) in/via the CORESET of the one or more CORESETs based on at least two TCI states (e.g., based on at least two antenna port quasi co-location (QCL) assumptions/properties/structures). The at least two TCI states may comprise a first TCI state and a second TCI state. The first TCI state may be associated with the first beam failure detection group/set/pool. The second TCI state may be associated with the second beam failure detection group/set/pool. A CORESET may be associated with at least two TCI states, where the at least two TCI states=[the first TCI state, the second TCI state].

The wireless device may determine/detect a beam failure of/for a beam failure detection group/set/pool of the one or more beam failure detection groups/sets/pools (e.g., at time T2 shown in FIGS. 24 and 26). The wireless device may determine/detect the beam failure of/for the beam failure detection group/set/pool, for example, based on one or more reference signals. The wireless device may determine/detect the beam failure of/for the beam failure detection group/set/pool, for example, based on the one or more reference signals indicated by the beam failure detection group/set/pool. The wireless device may determine/detect the beam failure of the beam failure detection group/set/pool based on measuring/assessing/determining a radio link quality (e.g., BLER, SINR, L1-RSRP, and the like) of the one or more reference signals.

The wireless device may initiate/trigger/start a beam failure recovery (or a beam failure recovery procedure). The wireless device may initiate/trigger/start, for the beam failure detection group/set/pool, the beam failure recovery. The wireless device may initiate/trigger/start the beam failure recovery, for example, based on the determining/detecting the beam failure of/for the beam failure detection group/set/pool.

The wireless device may determine/identify a candidate reference signal. The wireless device may determine/identify, for the beam failure recovery, the candidate reference signal. The wireless device may determine/identify the candidate reference signal, for example, based on measuring/assessing/determining a radio link quality (e.g., BLER, SINR, L1-RSRP, and the like) of the candidate reference signal.

The wireless device may send/transmit (e.g., at step 2530 shown in FIG. 25A), for the beam failure recovery, an uplink signal (e.g., random-access preamble, BFR MAC-CE, and the like) indicating the candidate reference signal. The base station may receive (e.g., at step 2532 shown in FIG. 25B), for the beam failure recovery, the uplink signal (e.g., random-access preamble, BFR MAC-CE, and the like) indicating the candidate reference signal.

The wireless device may receive/detect a response (e.g., DCI or a BFR response). The wireless device may complete the beam failure recovery (e.g., at step 2540 shown in FIG. 25A), for example, based on the receiving/detecting the response (e.g., DCI or the BFR response). The wireless device may complete the beam failure recovery successfully, for example, based on the receiving/detecting the response (e.g., DCI or the BFR response). The receiving/detecting the response (e.g., DCI or the BFR response) may comprise performing/detecting a PDCCH reception with the DCI.

The wireless device may receive the response (e.g., DCI or the BFR response), for example, in/via a recovery search space set indicated/identified by a recovery search space set index (e.g., RecoverySearchSpaceId). The recovery search space set may be associated with a recovery CORESET (e.g., BFR CORESET, dedicated CORESET). The one or more CORESETs may, for example, comprise the recovery CORESET.

A second HARQ process number indicated by the response (e.g., DCI or the BFR response) for transmission of a second uplink signal may be same as (or equal to) a first HARQ process number used for transmission of the uplink signal (e.g., random-access preamble, BFR MAC-CE or a PUSCH transmission comprising/with the BFR MAC-CE). The wireless device may perform an HARQ process.

The beam failure detection group/set/pool may be the first beam failure detection group/set/pool (e.g., n equal to 1, or any other value associated with the first beam failure detection group/set/pool, at steps 2550/2552 shown in FIG. 25A and FIG. 25B). The wireless device may monitor, for the message, the indication, or the control information (e.g., DCI or for repetition of DCI), PDCCH (or PDCCH candidate(s) or PDCCH transmissions/receptions) in/via the CORESET based on the candidate reference signal and the second TCI state, for example, based on/in response to the completing the beam failure recovery. The wireless device may monitor, for the message, the indication, or the control information (e.g., DCI or for repetition of DCI), PDCCH (or PDCCH candidate(s) or PDCCH transmissions/receptions) in/via the CORESET based on the candidate reference signal and the second TCI state, for example, based on/in response to the receiving/detecting the response (e.g., DCI or the BFR response) that completes the beam failure recovery. The wireless device may monitor, for the message, the indication, or the control information (e.g., DCI or for repetition of DCI), PDCCH (or PDCCH candidate(s) or PDCCH transmissions/receptions) in/via the CORESET based on the candidate reference signal and the second TCI state, for example, based on/in response to the beam failure detection group/set/pool being the first beam failure detection group/set/pool (e.g., n equal to 1 at steps 2550/2552). The monitoring the PDCCH in/via the CORESET based on the candidate reference signal and the second TCI state may be (or start or occur) after a number/quantity of symbols from a last/ending/latest symbol of the PDCCH reception with the response (e.g., DCI or the BFR response).

The beam failure detection group/set/pool may be the first beam failure detection group/set/pool (e.g., n equal to 1 at steps 2550/2552 shown in FIG. 25A and FIG. 25B). The wireless device may monitor (e.g., at step 2560 shown in FIG. 25A), for a message, an indication, or control information (e.g., DCI or for repetition of DCI), PDCCH (or PDCCH candidate(s) or PDCCH transmissions/receptions) in/via the CORESET based on the candidate reference signal and the second TCI state. The base station may send/transmit (e.g., at step 2562 shown in FIG. 25B), via the CORESET, the message, the indication, or the control information (e.g., DCI or for repetition of the DCI), the PDCCH (or the PDCCH candidate(s) or the PDCCH transmissions/receptions) based on the candidate reference signal and the second TCI state. The wireless device may receive, via the CORESET, the message, the indication, or the control information (e.g., DCI or for repetition of the DCI), the PDCCH (or the PDCCH candidate(s) or the PDCCH transmissions/receptions), for example, based on the monitoring, for the message, the indication, or the control information (e.g., DCI), the CORESET. The wireless device may receive, via the CORESET, the message, the indication, or the control information (e.g., DCI or for repetition of the DCI), the PDCCH (or the PDCCH candidate(s) or the PDCCH transmissions/receptions) based on the candidate reference signal and the second TCI state, for example, based on/in response to the completing the beam failure recovery. The wireless device may receive, via the CORESET, the message, the indication, or the control information (e.g., DCI or for repetition of the DCI), the PDCCH (or the PDCCH candidate(s) or the PDCCH transmissions/receptions) based on the candidate reference signal and the second TCI state, for example, based on/in response to the receiving/detecting the response (e.g., DCI or the BFR response) that completes the beam failure recovery. The wireless device may receive, via the CORESET, the message, the indication, or the control information (e.g., DCI or for repetition of the DCI), the PDCCH (or the PDCCH candidate(s) or the PDCCH transmissions/receptions) based on the candidate reference signal and the second TCI state, for example, based on/in response to the beam failure detection group/set/pool being the first beam failure detection group/set/pool. The monitoring, for the message, the indication, or the control information (e.g., DCI or for repetition of DCI), PDCCH (or PDCCH candidate(s) or PDCCH transmissions/receptions) in/via the CORESET based on the candidate reference signal may be associated with the first TRP and not associated with the second TRP (and/or the second beam failure detection group/set/pool). The monitoring, for the message, the indication, or the control information (e.g., DCI or for repetition of DCI), PDCCH (or PDCCH candidate(s) or PDCCH transmissions/receptions) in/via the CORESET based on the second TCI state may be associated with the second TRP and not associated with the first TRP (and/or the first beam failure detection group/set/pool).

The beam failure detection group/set/pool may be the second beam failure detection group/set/pool (e.g., n not equal to 1 at steps 2550/2552 shown in FIG. 25A and FIG. 25B). The wireless device may monitor, for a message, an indication, or control information (e.g., DCI or for repetition of DCI), PDCCH (or PDCCH candidate(s) or PDCCH transmissions/receptions) in/via the CORESET based on the first TCI state and the candidate reference signal, for example, based on/in response to the completing the beam failure recovery. The wireless device may monitor, for the message, the indication, or the control information (e.g., DCI or for repetition of DCI), PDCCH (or PDCCH candidate(s) or PDCCH transmissions/receptions) in/via the CORESET based on the first TCI state and the candidate reference signal, for example, based on/in response to the receiving/detecting the response (e.g., DCI or the BFR response) that completes the beam failure recovery. The wireless device may monitor, for the message, the indication, or the control information (e.g., DCI or for repetition of DCI), PDCCH (or PDCCH candidate(s) or PDCCH transmissions/receptions) in/via the CORESET based on the first TCI state and the candidate reference signal, for example, based on/in response to the beam failure detection group/set/pool being the second beam failure detection group/set/pool (e.g., n not equal to 1 at steps 2550/2552). The monitoring the PDCCH in/via the CORESET based on the first TCI state and the candidate reference signal may be (or start or occur) after a number/quantity of symbols from a last/ending/latest symbol of the PDCCH reception with the response (e.g., DCI or the BFR response).

The beam failure detection group/set/pool may be the second beam failure detection group/set/pool (e.g., n not equal to 1 at steps 2550/2552 shown in FIG. 25A and FIG. 25B). The wireless device may monitor (e.g., at step 2570 shown in FIG. 25A), for a message, an indication, or control information (e.g., DCI or for repetition of DCI), PDCCH (or PDCCH candidate(s) or PDCCH transmissions/receptions) in/via the CORESET based on the first TCI state and the candidate reference signal. The base station may send/transmit (e.g., at step 2572 shown in FIG. 25B), via the CORESET, the message, the indication, or the control information (e.g., DCI or for repetition of the DCI), the PDCCH (or the PDCCH candidate(s) or the PDCCH transmissions/receptions) based on the first TCI state and the candidate reference signal. The wireless device may receive, via the CORESET, the message, the indication, or the control information (e.g., DCI or for repetition of the DCI), the PDCCH (or the PDCCH candidate(s) or the PDCCH transmissions/receptions), for example, based on the monitoring, for the message, the indication, or the control information (e.g., DCI), the CORESET. The wireless device may receive, via the CORESET, the message, the indication, or the control information (e.g., DCI or for repetition of the DCI), the PDCCH (or the PDCCH candidate(s) or the PDCCH transmissions/receptions) based on the first TCI state and the candidate reference signal, for example, based on/in response to the completing the beam failure recovery. The wireless device may receive, via the CORESET, the message, the indication, or the control information (e.g., DCI or for repetition of the DCI), the PDCCH (or the PDCCH candidate(s) or the PDCCH transmissions/receptions) based on the first TCI state and the candidate reference signal, for example, based on/in response to the receiving/detecting the response (e.g., DCI or the BFR response) that completes the beam failure recovery. The wireless device may receive, via the CORESET, the message, the indication, or the control information (e.g., DCI or for repetition of the DCI), the PDCCH (or the PDCCH candidate(s) or the PDCCH transmissions/receptions) based on the first TCI state and the candidate reference signal, for example, based on/in response to the beam failure detection group/set/pool being the second beam failure detection group/set/pool. The monitoring, for the message, the indication, or the control information (e.g., DCI or for repetition of DCI), PDCCH (or PDCCH candidate(s) or PDCCH transmissions/receptions) in/via the CORESET based on the first TCI state may be associated with the first TRP and not associated with the second TRP (and/or the second beam failure detection group/set/pool). The monitoring, for the message, the indication, or the control information (e.g., DCI or for repetition of DCI), PDCCH (or PDCCH candidate(s) or PDCCH transmissions/receptions) in/via the CORESET based on the candidate reference signal may be associated with the second TRP and not associated with the first TRP (and/or the first beam failure detection group/set/pool).

The one or more configuration parameters (e.g., configuration parameters 2420/2620 or any other configuration parameters) may indicate a plurality of spatial relations (or settings) (e.g., indicated/provided by an information element PUCCH-Spatialrelationinfo and/or provided by a higher layer parameter spatialRelationInfoToAddModList), for example, for the uplink BWP of the cell. The plurality of spatial relations may indicate spatial relations (or settings) for uplink transmissions (e.g., PUCCH/PUSCH/SRS transmissions) via the one or more uplink resources.

The wireless device may send/transmit, via the one or more uplink resources, an uplink signal based on one or more spatial relations (or one or more spatial relation information). The plurality of spatial relations may comprise the one or more spatial relations. The wireless device may send/transmit, via each uplink resource of the one or more uplink resources, an uplink signal based on respective spatial relation(s) of the one or more spatial relations. The one or more spatial relations may be, for example, Spatial relation 1, Spatial relation 2, Spatial relation 3, and Spatial relation 4 shown in FIG. 26. The wireless device may send/transmit, via Uplink resource 1, an uplink signal based on Spatial relation 1. The wireless device may send/transmit, via Uplink resource 2, an uplink signal based on Spatial relation 1 and Spatial relation 2. The wireless device may send/transmit, via Uplink resource 3, an uplink signal based on Spatial relation 3 and Spatial relation 4. The wireless device may send/transmit, via Uplink resource 4, an uplink signal based on Spatial relation 2.

The wireless device may, for example, receive one or more activation commands (e.g., Activation command(s) 2630 shown in FIG. 26) indicating/updating/activating the one or more spatial relations for the one or more uplink resources. Each activation command (e.g., MAC-CE, DCI, RRC, PUCCH spatial relation Activation/Deactivation MAC CE) of the one or more activation commands may indicate/update/activate, for a respective uplink resource of the one or more uplink resources, respective spatial relation(s) of the one or more spatial relations. A first activation command of the one or more activation commands may indicate/update/activate, for example, Spatial relation 1 for Uplink resource 1 shown in FIG. 26. A second activation command of the one or more activation commands may indicate/update/activate, for example, Spatial relation 1 and Spatial relation 2 for Uplink resource 2 shown in FIG. 26. A third activation command of the one or more activation commands may indicate/update/activate, for example, Spatial relation 3 and Spatial relation 4 for Uplink resource 3 shown in FIG. 26. A fourth activation command of the one or more activation commands may indicate/update/activate, for example, Spatial relation 2 for Uplink resource 4 shown in FIG. 26.

The one or more configuration parameters may, for example, indicate/update/activate the one or more spatial relations for the one or more uplink resources. The one or more configuration parameters may indicate/update/activate, for a respective uplink resource of the one or more uplink resources, respective spatial relation(s) of the one or more spatial relations. The one or more configuration parameters may indicate/update/activate, for example, Spatial relation 1 for Uplink resource 1 shown in FIG. 26. The one or more configuration parameters may indicate/update/activate Spatial relation 1 and Spatial relation 2 for Uplink resource 2 shown in FIG. 26. The one or more configuration parameters may indicate/update/activate Spatial relation 3 and Spatial relation 4 for Uplink resource 3 shown in FIG. 26. The one or more configuration parameters may indicate/update/activate Spatial relation 2 for Uplink resource 4 shown in FIG. 26.

The wireless device may send/transmit, via an uplink resource of the one or more uplink resources, an uplink signal based on at least two spatial relations. The one or more spatial relations may, for example, comprise the at least two spatial relations. The plurality of spatial relations may, for example, comprise the at least two spatial relations. The at least two spatial relations may comprise a first spatial relation and a second spatial relation. The at least two spatial relations may be, for example, the first spatial relation (Spatial relation1) and the second spatial relation (Spatial relation2), for example, if the uplink resource is Uplink resource 2 shown in FIG. 26. The at least two spatial relations may be, for example, the first spatial relation (Spatial relation 3) and the second spatial relation (Spatial relation 4), for example, if the uplink resource is Uplink resource 3.

The uplink signal may, for example, be a PUCCH (or a PUCCH transmission). The uplink signal may, for example, be an uplink control information (UCI). The UCI may be at least one of: SR, HARQ-ACK, and CSI report. The uplink signal may, for example, be an SRS (or an SRS transmission). The uplink signal may, for example, be a PUSCH (or a PUSCH transmission). The uplink signal may, for example, be a transport block. The uplink signal may, for example, be a random-access preamble (or a PRACH transmission).

The wireless device may send/transmit, via the uplink resource, the uplink signal based on at least two spatial relations, for example, before/prior to completing the beam failure recovery. The wireless device may send/transmit, via the uplink resource, the uplink signal based on at least two spatial relations, for example, before/prior to completing the beam failure recovery successfully. The wireless device may send/transmit, via the uplink resource, the uplink signal based on at least two spatial relations, for example, during the beam failure recovery. The wireless device may send/transmit, via the uplink resource, the uplink signal based on at least two spatial relations, for example, before/prior to the detecting the beam failure (e.g., detect a beam failure for the beam failure detection group 1 at time T2 shown in FIG. 26). The wireless device may send/transmit, via the uplink resource, the uplink signal based on at least two spatial relations, for example, after (or in response to or on) receiving an activation command indicating/updating/activating, for the uplink resource, the at least two spatial relations. The one or more activation commands may comprise the activation command (e.g., Activation command(s) 2430/2630).

The wireless device may receive, for example, an activation command (e.g., PUCCH spatial relation Activation/Deactivation MAC CE, Enhanced PUCCH spatial relation Activation/Deactivation MAC CE, DCI, RRC, and the like) indicating/updating/activating the at least two spatial relations for the uplink resource. The activation command may indicate/update/activate the at least two spatial relations among the plurality of spatial relations. The one or more activation commands may comprise the activation command. The one or more configuration parameters may, for example, indicate/update/activate the at least two spatial relations for the uplink resource.

The at least two spatial relations may indicate at least two reference signals (e.g., CSI-RS, SSB/PBCH block, SRS, DM-RS). Each spatial relation of the at least two spatial relations may indicate a respective reference signal of the at least two reference signals.

The first spatial relation (e.g., Spatial relation 1 of Uplink resource 2 and/or Spatial relation 3 of Uplink resource 3) may indicate/comprise a first reference signal index (e.g., provided by a higher layer parameter referenceSignal, srs-index, SRI, ssb-index, csi-RS-Index, NZP-CSI-RS-ResourceId or PUCCH-PathlossReferenceRS-Id) identifying/indicating/of a first reference signal (e.g., RS 1 and/or RS 2 shown in FIG. 26) of the at least two reference signals. The one or more configuration parameters may indicate the first reference signal index for the first reference signal (e.g., RS 1 and/or RS 2 shown in FIG. 26). The first TRP may, for example, transmit/receive the first reference signal. The first spatial relation may be associated with the first TRP, for example, based on the first TRP transmitting/receiving the first reference signal indicated by the first spatial relation. The first spatial relation may be associated with the first beam failure detection group/set/pool, for example, based on the first TRP transmitting the one or more first reference signals in the first beam failure detection group/set/pool and transmitting/receiving the first reference signal indicated by the first spatial relation. The first spatial relation may be associated with the first beam failure detection group/set/pool, for example, based on the one or more first reference signals in the first beam failure detection group/set/pool comprising the first reference signal indicated by the first spatial relation. The first spatial relation may be associated with the first beam failure detection group/set/pool, for example, based on at least one reference signal of/among the one or more first reference signals in the first beam failure detection group/set/pool being quasi co-located with the first reference signal indicated by the first spatial relation. The at least one reference signal may be quasi co-located with the first reference signal, for example, with respect to a quasi co-location type (e.g., QCL TypeD, QCL TypeC, QCL TypeB, QCL TypeA, and the like). The quasi co-location type may be, for example, QCL TypeD. The one or more configuration parameters may indicate, for the uplink resource (or for the first spatial relation of the uplink resource, or for the first reference signal indicated by the first spatial relation), an index (e.g., TRP index, CORESET pool index, antenna panel index, beam failure detection group/set/pool index). The index (or a value of the index) may indicate the first beam failure detection group/set/pool (or the first TRP). The index may be, for example, equal to the first beam failure detection group/set/pool index. The first spatial relation may be associated with the first beam failure detection group/set/pool, for example, based on the index (or the value of the index) indicating the first beam failure detection group/set/pool.

The second spatial relation (e.g., Spatial relation 2 of Uplink resource 2 and/or Spatial relation 4 of Uplink resource 3) may indicate/comprise a second reference signal index (e.g., provided by a higher layer parameter referenceSignal, srs-index, SRI, ssb-index, csi-RS-Index, NZP-CSI-RS-ResourceId or PUCCH-PathlossReferenceRS-Id) identifying/indicating/of a second reference signal (e.g., RS 3 and/or RS 4 shown in FIG. 26) of the at least two reference signals. The one or more configuration parameters may indicate the second reference signal index for the second reference signal (e.g., RS 3 and/or RS 4 shown in FIG. 26). The second TRP may, for example, transmit/receive the second reference signal. The second spatial relation may be associated with the second TRP, for example, based on the second TRP transmitting/receiving the second reference signal indicated by the second spatial relation. The second spatial relation may be associated with the second beam failure detection group/set/pool, for example, based on the second TRP transmitting the one or more second reference signals in the second beam failure detection group/set/pool and transmitting/receiving the second reference signal indicated by the second spatial relation. The second spatial relation may be associated with the second beam failure detection group/set/pool, for example, based on the one or more second reference signals in the second beam failure detection group/set/pool comprising the second reference signal indicated by the second spatial relation. The second spatial relation may be associated with the second beam failure detection group/set/pool, for example, based on at least one reference signal of/among the one or more second reference signals in the second beam failure detection group/set/pool being quasi co-located with the second reference signal indicated by the second spatial relation. The at least one reference signal may be quasi co-located with the second reference signal, for example, with respect to a quasi co-location type (e.g., QCL TypeD, QCL TypeC, QCL TypeB, QCL TypeA, and the like). The quasi co-location type may be, for example, QCL TypeD. The one or more configuration parameters may indicate, for the uplink resource (or for the second spatial relation of the uplink resource, or for the second reference signal indicated by the second spatial relation), an index (e.g., TRP index, CORE-SET pool index, antenna panel index, beam failure detection group/set/pool index). The index (or a value of the index) may indicate the second beam failure detection group/set/pool (or the second TRP). The index may be, for example, equal to the second beam failure detection group/set/pool index. The second spatial relation may be associated with the second beam failure detection group/set/pool, for example, based on the index (or the value of the index) indicating the second beam failure detection group/set/pool.

The wireless device may send/transmit, via the uplink resource, the uplink signal based on the at least two spatial relations, for example, based on/in response to the receiving the activation command indicating/activating/selecting/updating the at least two spatial relations for the uplink resource.

The transmitting, via the uplink resource, the uplink signal based on the at least two spatial relations may comprise transmitting, via the uplink resource, the uplink signal with/using at least two spatial domain transmission filters (or transmitting beams) determined based on the at least two spatial relations. The transmitting, via the uplink resource, the uplink signal based on the at least two spatial relations may comprise transmitting, via the uplink resource, the uplink signal with/using at least two spatial domain transmission filters (or transmitting beams) determined based on the at least two reference signals of the at least two spatial relations. The at least two spatial domain transmission filters may comprise a first spatial domain transmission filter and a second spatial domain transmission filter. The wireless device may determine the at least two spatial domain transmission filters based on the at least two spatial relations. The wireless device may determine the at least two spatial domain transmission filters based on the at least two reference signals indicated by the at least two spatial relations. The wireless device may determine each spatial domain transmission filter of the at least two spatial domain transmission filters based on a respective spatial relation of the at least two spatial relations. The wireless device may, for example, determine the first spatial domain transmission filter of the at least two spatial domain transmission filters based on the first spatial relation of the at least two spatial relations. The wireless device may, for example, determine the first spatial domain transmission filter based on the first reference signal indicated by the first spatial relation. The wireless device may, for example, determine the second spatial domain transmission filter of the at least two spatial domain transmission filters based on the second spatial relation of the at least two spatial relations. The wireless device may, for example, determine the second spatial domain transmission filter based on the second reference signal indicated by the second spatial relation.

The wireless device may send/transmit, via the uplink resource, the uplink signal with/using the first spatial domain transmission filter in one or more first uplink transmission occasions (e.g., PUSCH/PUSCH/SRS/PRACH transmission occasions). The wireless device may send/transmit, via the uplink resource, the uplink signal with/using the second spatial domain transmission filter in one or more second uplink transmission occasions (e.g., PUSCH/PUSCH/SRS/PRACH transmission occasions). The one or more first uplink transmission occasions and the one or more second uplink transmission occasions may be, for example, the same. The one or more first uplink transmission occasions and the one or more second uplink transmission occasions may be, for example, different.

A spatial relation of an uplink resource may provide/indicate/comprise a reference signal index (e.g., ssb-Index, csi-RS-Index, NZP CSI-RS resource index, srs, SRS-ResourceId) indicating/identifying/of a reference signal (e.g., SS/PBCH block, CSI-RS, SRS). The one or more configuration parameters may indicate the reference signal index for the reference signal. The spatial relation may indicate the reference signal for spatial relationship derivation for the uplink resource. The spatial relation may provide/indicate a spatial setting for transmission of an uplink signal (e.g., UCI, SR, HARQ-ACK, CSI report, etc.) via the uplink resource. The wireless device may determine a spatial domain transmission filter, for transmission of the uplink signal via the uplink resource, based on the reference signal. The plurality of spatial relations may comprise the spatial relation. The one or more uplink resources may comprise the uplink resource.

The reference signal may be a downlink reference signal. The downlink reference signal may comprise an SS/PBCH block. The downlink reference signal may comprise a CSI-RS (e.g., periodic CSI-RS, semi-persistent CSI-RS, aperiodic CSI-RS). The downlink reference signal may comprise a DM-RS (e.g., for PUCCH, PUSCH, etc.). The wireless device may use a spatial domain receiving filter to receive the downlink reference signal. The wireless device may send/transmit the uplink signal, via the uplink resource, for example, based on the reference signal (e.g., indicated by the spatial relation) being the downlink reference signal. The wireless device may send/transmit the uplink signal, via the uplink resource, with a spatial domain transmission filter that is the same as the spatial domain receiving filter. The wireless device may send/transmit the uplink signal, via the uplink resource, with the spatial domain receiving filter, for example, based on the reference signal (e.g., indicated by the spatial relation) being the downlink reference signal. The determining the spatial domain transmission filter based on the reference signal may comprise determining the spatial domain receiving filter used to receive the reference signal as the spatial domain transmission filter, for example, based on the reference signal being the downlink reference signal.

The reference signal may be an uplink reference signal (e.g., periodic SRS, semi-persistent SRS, aperiodic SRS, DM-RS). The wireless device may use a second spatial domain transmission filter to send/transmit the uplink reference signal. The wireless device may transmit the uplink signal, via the uplink resource, for example based on the reference signal (e.g., indicated by the spatial relation) being the uplink reference signal. The wireless device may send/transmit the uplink signal, via the uplink resource, with a spatial domain transmission filter that is the same (or substantially similar) as the second spatial domain transmission filter used to transmit the uplink reference signal. The determining the spatial domain transmission filter based on the reference signal may comprise determining the second spatial domain transmission filter used to send/transmit the reference signal as the spatial domain transmission filter, for example, based on the reference signal being the uplink reference signal.

The transmitting, via the uplink resource, the uplink signal based on the at least two spatial relations may comprise transmitting, via the uplink resource, the uplink signal with/using at least two transmission powers determined based on the at least two spatial relations. The at least two transmission powers may comprise a first transmission power and a second transmission power. The wireless device may determine/calculate/compute the at least two transmission powers based on the at least two spatial relations. The wireless device may determine/calculate/compute each transmission power of the at least two transmission powers based on a respective spatial relation of the at least two spatial relations. The wireless device may, for example, determine the first transmission power of the at least two transmission powers based on the first spatial relation of the at least two spatial relations. The wireless device may, for example, determine the second transmission power of the at least two transmission powers based on the second spatial relation of the at least two spatial relations.

The wireless device may send/transmit, via the uplink resource, the uplink signal with/using the first transmission power in the one or more first uplink transmission occasions (e.g., PUSCH/PUSCH/SRS/PRACH transmission occasions). The wireless device may send/transmit, via the uplink resource, the uplink signal with/using the second transmission power in the one or more second uplink transmission occasions (e.g., PUSCH/PUSCH/SRS/PRACH transmission occasions).

The transmitting, via the uplink resource, the uplink signal based on the at least two transmission powers may comprise transmitting, via the uplink resource, the uplink signal with/using at least two transmission powers determined/calculated/computed based on the at least two reference signals of the at least two spatial relations. The wireless device may, for example, determine the first transmission power based on the first reference signal (e.g., PUCCH-PathlossReferenceRS) indicated by the first spatial relation. The wireless device may, for example, determine the second transmission power based on the second reference signal (e.g., PUCCH-PathlossReferenceRS) indicated by the second spatial relation.

Determining/calculating/computing a transmission power based on a reference signal may comprise determining/calculating a downlink path loss estimate for the transmission power based on the reference signal. The wireless device may use the downlink path loss estimate in determining the transmission power. The transmission power may comprise the downlink path loss estimate. The determining/calculating the downlink path loss estimate based on the reference signal may comprise measuring/assessing the reference signal. The measuring/assessing the reference signal may comprise measuring/determining a radio link quality (e.g., higher layer filters RSRP, L1-RSRP, L3-RSRP, SINR, etc.) of the reference signal.

The at least two spatial relations may indicate at least two closed loop process indexes (e.g., 1 or any other value). Each spatial relation of the at least two spatial relations may indicate a respective closed loop process index of the at least two closed loop process indexes. The at least two closed loop process indexes may comprise a first closed loop process index indicated by the first spatial relation and a second closed loop process index indicated by the second spatial relation.

The transmitting, via the uplink resource, the uplink signal based on the at least two transmission powers may comprise transmitting, via the uplink resource, the uplink signal with/using at least two transmission powers determined/calculated/computed based on the at least two closed loop process indexes of the at least two spatial relations. The wireless device may, for example, determine the first transmission power based on the first closed loop process index indicated by the first spatial relation. The wireless device may, for example, determine the second transmission power based on the second closed loop process index indicated by the second spatial relation.

The one or more configuration parameters may indicate an uplink channel repetition (e.g., PUSCH/PUCCH repetition/aggregation). The one or more configuration parameters may comprise an uplink channel repetition enabling parameter that enables (or activates or indicates) the uplink channel repetition. The uplink channel repetition may comprise a repetition of an uplink signal (e.g., PUCCH, UCI).

The activation command indicating/updating/activating the at least two spatial relations may indicate an uplink channel repetition, for example, for the uplink resource. The activation command indicating/updating/activating the at least two spatial relations for the uplink resource may indicate the uplink channel repetition for the uplink resource.

The uplink channel repetition may be a repetition/multiplexing scheme. The repetition/multiplexing scheme may be, for example, a time domain repetition scheme (e.g., TDM scheme).

The wireless device may send/transmit, via the uplink resource, the uplink signal for the uplink channel repetition. The base station may send/transmit, for the uplink resource, the activation command indicating/activating/updating the at least two spatial relations for the uplink channel repetition. The wireless device may send/transmit, via the uplink resource, repetition of the uplink signal. The wireless device may send/transmit, via the uplink resource, repetition of the uplink signal, for example, based on the at least two spatial relations. The wireless device may send/transmit, via the uplink resource, one or more first repetitions of the uplink signal based on the first spatial relation. The wireless device may send/transmit, via the uplink resource, the one or more first repetitions of the uplink signal with/using the first spatial domain transmission filter. The wireless device may send/transmit, via the uplink resource, the one or more first repetitions of the uplink signal with/using the first transmission power. The wireless device may send/transmit, via the uplink resource, one or more second repetitions of the uplink signal based on the second spatial relation. The wireless device may send/transmit, via the uplink resource, the one or more second repetitions of the uplink signal with/using the second spatial domain transmission filter. The wireless device may send/transmit, via the uplink resource, the one or more second repetitions of the uplink signal with/using the second transmission power.

The wireless device may update/override/overwrite/replace a spatial relation, of/among the at least two spatial relations, with the candidate reference signal (e.g., with a spatial relation associated with the candidate reference signal). The wireless device may update/override/overwrite/replace the spatial relation, of/among the at least two spatial relations, with the candidate reference signal (e.g., with a spatial relation associated with the candidate reference signal), for example, based on the completing the beam failure recovery. The wireless device may update/override/overwrite/replace the spatial relation, of/among the at least two spatial relations, with the candidate reference signal, for example, based on receiving/detecting the response (e.g., DCI or the BFR response) that completes the beam failure recovery.

The at least two spatial relations may comprise one or more non-updated spatial relations. The one or more non-updated spatial relations may not comprise the (updated/overridden/overwritten/replaced) spatial relation. The one or more non-updated spatial relations may be different from the (updated) spatial relation. Each spatial relation of the one or more non-updated spatial relations may be different from the (updated) spatial relation. The (updated) spatial relation may be the first spatial relation (e.g., Spatial relation 1 of Uplink resource 2 and/or spatial relation 3 of Uplink resource 3 in FIG. 26). The one or more non-updated spatial relations may be the second spatial relation (e.g., Spatial relation 2 of Uplink resource 2 and/or Spatial relation 4 of Uplink resource 3 in FIG. 26), for example, based on the (updated) spatial relation being the first spatial relation. The (updated) spatial relation may be the second spatial relation (e.g., Spatial relation 2 of Uplink resource 2 and/or Spatial relation 4 of Uplink resource 3 in FIG. 26). The one or more non-updated spatial relations may be the first spatial relation (e.g., Spatial relation 1 of Uplink resource 2 and/or Spatial relation 3 of Uplink resource 3 in FIG. 26), for example, based on the (updated) spatial relation being the second spatial relation.

The wireless device may not update/override/overwrite/replace the one or more non-updated spatial relations with the candidate reference signal (e.g., with a spatial relation associated with the candidate reference signal). The wireless device may not update/override/overwrite/replace each spatial relation of the one or more non-updated spatial relations with the candidate reference signal (e.g., with a spatial relation associated with the candidate reference signal), for example, if the one or more non-updated spatial relations is associated with the second beam failure detection group (e.g., BFD group 2 in FIG. 26) and the second beam failure detection group is not associated with a beam failure.

The wireless device may send/transmit, via the uplink resource, an uplink signal (or repetition of an uplink signal) based on the candidate reference signal and the one or more non-updated spatial relations (e.g., Candidate RS and Spatial relation 2 of Uplink resource 2, or Candidate RS and Spatial relation 4 of Uplink resource 3). The wireless device may send/transmit, via the uplink resource, the uplink signal (or repetition of the uplink signal) based on the candidate reference signal and the one or more non-updated spatial relations, for example, based on/in response to the completing the beam failure recovery. The wireless device may send/transmit, via the uplink resource, the uplink signal (or repetition of the uplink signal) based on the candidate reference signal and the one or more non-updated spatial relations, for example, based on/in response to the updating/overriding/overwriting/replacing the spatial relation, of/among the at least two spatial relation, with the candidate reference signal. The wireless device may send/transmit, via the uplink resource, the uplink signal (or repetition of the uplink signal) based on the candidate reference signal and the one or more non-updated spatial relations, for example, based on/in response to the receiving/detecting the response (e.g., DCI or the BFR response) that completes the beam failure recovery.

The wireless device may send/transmit, via the cell, the uplink signal. The cell may comprise the uplink resource. The cell may be a primary cell. The wireless device may send/transmit, via a secondary cell different from the cell, the uplink signal.

The wireless device may send/transmit, via the uplink resource, the uplink signal (or repetition of the uplink signal) based on the candidate reference signal and the one or more non-updated spatial relations, for example, based on/in response to the cell being a PUCCH SCell. The wireless device may send/transmit, via the uplink resource, the uplink signal (or repetition of the uplink signal) based on the candidate reference signal and the one or more non-updated spatial relations, for example, based on/in response to the BFR MAC-CE indicating the cell. The wireless device may send/transmit, via the uplink resource, the uplink signal (or repetition of the uplink signal) based on the candidate reference signal and the one or more non-updated spatial relations, for example, based on/in response to the one or more configuration parameters indicating the plurality of spatial relations. The wireless device may send/transmit, via the uplink resource, the uplink signal (or repetition of the uplink signal) based on the candidate reference signal and the one or more non-updated spatial relations, for example, based on/in response to the not transmitting the PUCCH with the LRR. The wireless device may send/transmit, via the uplink resource, the uplink signal (or repetition of the uplink signal) based on the candidate reference signal and the one or more non-updated spatial relations, for example, based on/in response to the transmitting, via the PCell or the PSCell, the PUCCH with the LRR.

The transmitting, via the uplink resource, the uplink signal (or repetition of the uplink signal) based on the candidate reference signal and the one or more non-updated spatial relations may be (or start or occur) after a number/quantity of symbols from a last/ending/latest symbol of the PDCCH reception with the response (e.g., the BFR response or the DCI 2660 in FIG. 26). The transmitting, via the uplink resource, the uplink signal (or repetition of the uplink signal) based on the candidate reference signal and the one or more non-updated spatial relations may be (or start or occur) after a number/quantity of symbols from a last/ending/latest symbol of the PDCCH reception with the response (the BFR response) that completes the beam failure recovery. The number/quantity of symbols may be, for example, fixed/preconfigured/predefined/preset. The number/quantity of symbols may be, for example, 28 symbols. The number/quantity of symbols may be, for example, 14 symbols. The number/quantity of symbols may be, for example, 42 symbols. The number/quantity of symbols may be, for example, based on latency/delay of a backhaul (e.g., 2 ms, 5 ms, 10 ms, 20 ms, 50 ms, and the like). The one or more configuration parameters may, for example, indicate the number/quantity of symbols.

The (updated) spatial relation may be the first spatial relation (e.g., Spatial relation 1 and/or Spatial relation 3 shown in FIG. 26). The one or more non-updated spatial relations may be the second spatial relation (e.g., Spatial relation 2 and/or Spatial relation 4 shown in FIG. 26). The transmitting, via the uplink resource, the uplink signal (or repetition of the uplink signal) based on the candidate reference signal and the one or more non-updated spatial relations may comprise transmitting, via the uplink resource, the uplink signal (or repetition of the uplink signal) based on the candidate reference signal and the second spatial relation.

The transmitting, via the uplink resource, the uplink signal (or repetition of the uplink signal) based on the candidate reference signal and the second spatial relation may comprise transmitting, via the uplink resource, the uplink signal (or repetition of the uplink signal) with/using a candidate spatial domain transmission filter and with/using the second spatial domain transmission filter determined based on the second spatial relation. The wireless device may send/transmit, via the uplink resource, the uplink signal (or repetition of the uplink signal) with/using the candidate spatial domain transmission filter in one or more first uplink transmission occasions. The wireless device may send/transmit, via the uplink resource, the uplink signal (or repetition of the uplink signal) with/using the second spatial domain transmission filter in one or more second uplink transmission occasions.

The wireless device may determine the candidate spatial domain transmission filter based on the candidate reference signal. The wireless device may receive the candidate reference signal with/using the candidate spatial domain transmission filter. The wireless device may receive the candidate reference signal with a spatial domain transmission filter that is the same (or substantially same) as the candidate spatial domain transmission filter.

The wireless device may send/transmit the uplink signal (e.g., Uplink signal 2650 in FIG. 26) indicating the candidate reference signal with/using the candidate spatial domain transmission filter. The uplink signal may, for example, be a PRACH transmission (e.g., random-access preamble). The PRACH transmission may be a last/latest PRACH transmission. The wireless device may send/transmit the uplink signal (e.g., Uplink signal 2650 in FIG. 26) indicating the candidate reference signal with/using a spatial domain transmission filter that is the same (or substantially same) as the candidate spatial domain transmission filter.

The transmitting, via the uplink resource, the uplink signal (or repetition of the uplink signal) based on the candidate reference signal and the second spatial relation may comprise transmitting, via the uplink resource, the uplink signal (or repetition of the uplink signal) with/using a candidate transmission power and with/using the second transmission power determined based on the second spatial relation.

The wireless device may determine the candidate transmission power, for example, based on the candidate reference signal. The determining/calculating/computing the candidate transmission power based on the candidate reference signal may comprise determining/calculating a downlink path loss estimate for the candidate transmission power based on the candidate reference signal. The determining/calculating the downlink path loss estimate based on the candidate reference signal may comprise measuring/assessing a radio link quality (e.g., L1-RSRP, L3-RSRP, BLER, SINR, SNR, and the like) of the candidate reference signal.

The wireless device may determine the candidate transmission power, for example, based on a closed loop process index that is equal to zero (e.g., 1=0). The wireless device may ignore the first closed loop process index. The wireless device may not determine the candidate transmission power based on the first closed loop process index, for example, based on the completing the beam failure recovery.

The wireless device may set (or reset) a value of a power control parameter/index to zero (e.g., q_u=0). The wireless device may set (or reset) the value of the power control parameter/index to zero, for example, based on the completing the beam failure recovery. The wireless device may determine the candidate transmission power, for example, based on the power control parameter/index that is equal to zero.

The wireless device may send/transmit, via the uplink resource, the uplink signal (or repetition of the uplink signal) with/using the candidate transmission power in the one or more first uplink transmission occasions. The wireless device may send/transmit, via the uplink resource, the uplink signal (or repetition of the uplink signal) with/using the second spatial domain transmission filter in the one or more second uplink transmission occasions.

The (updated) spatial relation may be the second spatial relation. The one or more non-updated spatial relations may be the first spatial relation. The transmitting, via the uplink resource, the uplink signal (or repetition of the uplink signal) based on the candidate reference signal and the one or more non-updated spatial relations may comprise transmitting, via the uplink resource, the uplink signal (or repetition of the uplink signal) based on the candidate reference signal and the first spatial relation.

The transmitting, via the uplink resource, the uplink signal (or repetition of the uplink signal) based on the candidate reference signal and the first spatial relation may comprise transmitting, via the uplink resource, the uplink signal (or repetition of the uplink signal) with/using a candidate spatial domain transmission filter and with/using the first spatial domain transmission filter determined based on the first spatial relation. The wireless device may send/transmit, via the uplink resource, the uplink signal (or repetition of the uplink signal) with/using the candidate spatial domain transmission filter in one or more second uplink transmission occasions. The wireless device may send/transmit, via the uplink resource, the uplink signal (or repetition of the uplink signal) with/using the first spatial domain transmission filter in one or more first uplink transmission occasions.

The wireless device may determine the candidate spatial domain transmission filter based on the candidate reference signal. The wireless device may receive the candidate reference signal with/using the candidate spatial domain transmission filter. The wireless device may receive the candidate reference signal with a spatial domain reception filter that is the same (or substantially same) as the candidate spatial domain transmission filter.

The wireless device may send/transmit the uplink signal (e.g., Uplink signal in FIG. 26) indicating the candidate reference signal with/using the candidate spatial domain transmission filter. The uplink signal may, for example, be a PRACH transmission (e.g., random-access preamble). The PRACH transmission may be a last/latest PRACH transmission. The wireless device may send/transmit the uplink signal (e.g., Uplink signal 2650 in FIG. 26) indicating the candidate reference signal with/using a spatial domain transmission filter that is the same (or substantially same) as the candidate spatial domain transmission filter.

The transmitting, via the uplink resource, the uplink signal (or repetition of the uplink signal) based on the candidate reference signal and the first spatial relation may comprise transmitting, via the uplink resource, the uplink signal (or repetition of the uplink signal) with/using a candidate transmission power and with/using the first transmission power determined based on the first spatial relation.

The wireless device may determine the candidate transmission power, for example, based on the candidate reference signal. The determining/calculating/computing the candidate transmission power based on the candidate reference signal may comprise determining/calculating a downlink path loss estimate for the candidate transmission power based on the candidate reference signal. The determining/calculating the downlink path loss estimate based on the candidate reference signal may comprise measuring/assessing a radio link quality (e.g., L1-RSRP, L3-RSRP, BLER, SINR, SNR, and the like) of the candidate reference signal.

The wireless device may determine the candidate transmission power, for example, based on a closed loop process index that is equal to zero (e.g., 1=0). The wireless device may ignore the second closed loop process index. The wireless device may not determine the candidate transmission power based on the second closed loop process index, for example, based on the completing the beam failure recovery.

The wireless device may set (or reset) a value of a power control parameter/index to zero (e.g., q_u=0). The wireless device may set (or reset) the value of the power control parameter/index to zero (or any other value), for example, based on the completing the beam failure recovery. The wireless device may determine the candidate transmission power, for example, based on the power control parameter/index that is equal to zero (or any other value).

The wireless device may send/transmit, via the uplink resource, the uplink signal (or repetition of the uplink signal) with/using the candidate transmission power in the one or more second uplink transmission occasions. The wireless device may send/transmit, via the uplink resource, the uplink signal (or repetition of the uplink signal) with/using the first spatial domain transmission filter in the one or more first uplink transmission occasions.

The wireless device may send/transmit, via the uplink resource, the uplink signal (or repetition of the uplink signal) based on the candidate reference signal and the one or more non-updated spatial relations, for example, until receiving a second activation command (e.g., PUCCH spatial relation Activation/Deactivation MAC CE, Enhanced PUCCH spatial relation Activation/Deactivation MAC CE, DCI, RRC, and the like) indicating/activating a new spatial relation (e.g., PUCCH-SpatialRelationInfo) for the uplink resource. The wireless device may send/transmit, via the uplink resource, the uplink signal (or repetition of the uplink signal) based on the candidate reference signal and the one or more non-updated spatial relations, for example, until receiving a second activation command (e.g., PUCCH spatial relation Activation/Deactivation MAC CE, Enhanced PUCCH spatial relation Activation/Deactivation MAC CE, DCI, RRC, and the like) updating the spatial relation of the uplink resource with a new spatial relation. The wireless device may send/transmit, via the uplink resource, an uplink signal (or repetition of an uplink signal) based on the new spatial relation and the one or more non-updated spatial relations, for example, based on/in response to the receiving the second activation command.

The wireless device may update/override/overwrite/replace the spatial relation, of/among the at least two spatial relations, with the candidate reference signal (e.g., a spatial relation associated with the candidate reference signal), for example, based on the beam failure detection group/set/pool. The wireless device may update/override/overwrite/replace the spatial relation, of/among the at least two spatial relations, with the candidate reference signal (e.g., a spatial relation associated with the candidate reference signal), for example, based on the beam failure detection group/set/pool index of the beam failure detection group/set/pool. The wireless device may update/override/overwrite/replace the spatial relation, of/among the at least two spatial relations, with the candidate reference signal (e.g., a spatial relation associated with the candidate reference signal), for example, based on whether the beam failure detection group/set/pool is the first beam failure detection group/set/pool or the second beam failure detection group/set/pool. The wireless device may update/override/overwrite/replace the spatial relation, of/among the at least two spatial relations, with the candidate reference signal, for example, based on the spatial relation being associated with the beam failure detection group/set/pool.

The wireless device may determine/select the spatial relation of/among the at least two spatial relations, for example, based on the beam failure detection group/set/pool. The wireless device may determine/select the spatial relation of/among the at least two spatial relations, for example, based on the beam failure detection group/set/pool index of the beam failure detection group/set/pool. The wireless device may determine/select the spatial relation of/among the at least two spatial relations, for example, based on whether the beam failure detection group/set/pool is the first beam failure detection group/set/pool or the second beam failure detection group/set/pool. The wireless device may determine/select the spatial relation of/among the at least two spatial relations, for example, based on the spatial relation being associated with the beam failure detection group/set/pool.

The (updated) spatial relation may be, for example, the first spatial relation (e.g., Spatial relation 1 and/or Spatial relation 3 shown in FIG. 26). The (updated) spatial relation may be the first spatial relation, for example, based on the beam failure detection group/set/pool being the first beam failure detection group/set/pool. The wireless device may send/transmit, via the uplink resource, the uplink signal (or repetition of the uplink signal) based on the candidate reference signal and the second spatial relation (e.g., Spatial relation 2 and/or Spatial relation 4 shown in FIG. 26), for example, based on/in response to the beam failure detection group/set/pool being the first beam failure detection group/set/pool. The (updated) spatial relation may be the first spatial relation, for example, based on the beam failure being associated with the first TRP. The (updated) spatial relation may be the first spatial relation, for example, based on the beam failure detection group/set/pool index being equal to a first value. The first value may be, for example, fixed/preconfigured/predefined/preset. The first value may be, for example, equal to zero (or any other value). The first value may be, for example, equal to one (or any other value). The one or more configuration parameters may, for example, indicate the first value. The wireless device may send/transmit, via the uplink resource, the uplink signal (or repetition of the uplink signal) based on the candidate reference signal and the second spatial relation, for example, based on/in response to the beam failure detection group/set/pool index being equal to the first value (e.g., 0, 1). The wireless device may send/transmit, via the uplink resource, the uplink signal (or repetition of the uplink signal) based on the candidate reference signal and the second spatial relation, for example, based on/in response to the first spatial relation being associated with the beam failure detection group/set/pool. The candidate reference signal and the second spatial relation may be, for example, Candidate RS and Spatial relation 2 of Uplink resource 2 shown in FIG. 26. The candidate reference signal and the second spatial relation may be Candidate RS and Spatial relation 4 of Uplink resource 3 shown in FIG. 26.

The (updated) spatial relation may be, for example, the second spatial relation (e.g., Spatial relation 2 and/or Spatial relation 4 shown in FIG. 26). The (updated) spatial relation may be the second spatial relation, for example, based on the beam failure detection group/set/pool being the second beam failure detection group/set/pool. The wireless device may send/transmit, via the uplink resource, the uplink signal (or repetition of the uplink signal) based on the candidate reference signal and the first spatial relation, for example, based on/in response to the beam failure detection group/set/pool being the second beam failure detection group/set/pool. The (updated) spatial relation may be the second spatial relation, for example, based on the beam failure being associated with the second TRP. The (updated) spatial relation may be the second spatial relation, for example, based on the beam failure detection group/set/pool index being equal to a second value. The second value may be, for example, fixed/preconfigured/predefined/preset. The second value may be, for example, equal to one (or any other value different from the first value). The second value may be, for example, equal to two (or any other value different from the second value). The one or more configuration parameters may, for example, indicate the second value. The wireless device may send/transmit, via the uplink resource, the uplink signal (or repetition of the uplink signal) based on the candidate reference signal and the first spatial relation, for example, based on/in response to the beam failure detection group/set/pool index being equal to the second value (e.g., 1, 2). The wireless device may send/transmit, via the uplink resource, the uplink signal (or repetition of the uplink signal) based on the candidate reference signal and the first spatial relation, for example, based on/in response to the second spatial relation being associated with the beam failure detection group/set/pool.

The wireless device may send/transmit, via an uplink resource of the one or more uplink resources, an uplink signal (or repetition of an uplink signal) based on a spatial relation (or a single spatial relation or one spatial relation). The spatial relation may be Spatial relation 1 shown in FIG. 26, for example, if the uplink resource is Uplink resource 1 shown in FIG. 26. The spatial relation may be Spatial relation 2 shown in FIG. 26, for example, if the uplink resource is Uplink resource 4 shown in FIG. 26.

The wireless device may send/transmit, via the uplink resource, the uplink signal based on the spatial relation, for example, before/prior to completing the beam failure recovery. The wireless device may send/transmit, via the uplink resource, the uplink signal based on the spatial relation, for example, before/prior to completing the beam failure recovery successfully. The wireless device may send/transmit, via the uplink resource, the uplink signal based on the spatial relation, for example, during the beam failure recovery. The wireless device may send/transmit, via the uplink resource, the uplink signal based on the spatial relation, for example, before/prior to the detecting the beam failure. The wireless device may send/transmit, via the uplink resource, the uplink signal based on the spatial relation, for example, after (or in response to or on) receiving an activation command indicating/updating/activating, for the uplink resource, the spatial relation. The one or more activation commands may comprise the activation command. The wireless device may send/transmit, via the uplink resource, the uplink signal based on the spatial relation, for example, after (or in response to or on) receiving the one or more configuration parameters indicating/updating/activating, for the uplink resource, the spatial relation.

The wireless device may receive, for example, an activation command indicating/updating/activating the spatial relation for the uplink resource. The activation command may indicate/update/activate the spatial relation among the plurality of spatial relations. The one or more spatial relations may comprise the spatial relation. The one or more activation commands may comprise the activation command. The one or more configuration parameters may, for example, indicate/update/activate the spatial relation for the uplink resource.

The spatial relation may indicate a reference signal (e.g., CSI-RS, SSB/PBCH block, SRS, DM-RS). The reference signal may be a first reference signal (e.g., RS 1 and/or RS 2 shown in FIG. 26) indicated by the Spatial relation 1, for example, if the uplink resource is Uplink resource 1 shown in FIG. 26. The reference signal may be a second reference signal (e.g., RS 3 and/or RS 4 shown in FIG. 26) indicated by the Spatial relation 2, for example, if the uplink resource is Uplink resource 4 shown in FIG. 26.

The first TRP may, for example, send/transmit the reference signal indicated by the spatial relation. The spatial relation may be associated with the first TRP, for example, based on the first TRP transmitting/receiving the reference signal indicated by the spatial relation. The spatial relation may be associated with the first beam failure detection group/set/pool, for example, based on the first TRP transmitting the one or more first reference signals in the first beam failure detection group/set/pool and transmitting/receiving the reference signal indicated by the spatial relation. The spatial relation may be associated with the first beam failure detection group/set/pool, for example, based on the one or more first reference signals in the first beam failure detection group/set/pool comprising the reference signal indicated by the spatial relation. The spatial relation may be associated with the first beam failure detection group/set/pool, for example, based on at least one reference signal of/among the one or more first reference signals in the first beam failure detection group/set/pool being quasi co-located with the reference signal indicated by the spatial relation. The at least one reference signal may be quasi co-located with the reference signal, for example, with respect to a quasi co-location type (e.g., QCL TypeD, QCL TypeC, QCL TypeB, QCL TypeA, and the like). The quasi co-location type may be, for example, QCL TypeD. The one or more configuration parameters may indicate, for the uplink resource (or for the spatial relation of the uplink resource, or for the reference signal indicated by the spatial relation), an index (e.g., TRP index, CORESET pool index, antenna panel index, beam failure detection group/set/pool index). The index (or a value of the index) may indicate the first beam failure detection group/set/pool (or the first TRP). The index may be, for example, equal to the first beam failure detection group/set/pool index. The spatial relation may be associated with the first beam failure detection group/set/pool, for example, based on the index (or the value of the index) indicating the first beam failure detection group/set/pool. The spatial relation of the uplink resource being associated with the first beam failure detection group/set/pool may, for example, comprise the uplink resource being associated with the first beam failure detection group/set/pool. The uplink resource may be associated with the first beam failure detection group/set/pool, for example, based on the one or more configuration parameters indicating, for the uplink resource, the index indicating the first beam failure detection group/set/pool.

The second TRP may, for example, send/transmit the reference signal indicated by the spatial relation. The spatial relation may be associated with the second TRP, for example, based on the second TRP transmitting the reference signal indicated by the spatial relation. The spatial relation may be associated with the second beam failure detection group/set/pool, for example, based on the second TRP transmitting the one or more second reference signals in the second beam failure detection group/set/pool and transmitting/receiving the reference signal indicated by the spatial relation. The spatial relation may be associated with the second beam failure detection group/set/pool, for example, based on the one or more second reference signals in the second beam failure detection group/set/pool comprising the reference signal indicated by the spatial relation. The spatial relation may be associated with the second beam failure detection group/set/pool, for example, based on at least one reference signal of/among the one or more second reference signals in the second beam failure detection group/set/pool being quasi co-located with the reference signal indicated by the spatial relation. The at least one reference signal may be quasi co-located with the reference signal, for example, with respect to a quasi co-location type (e.g., QCL TypeD, QCL TypeC, QCL TypeB, QCL TypeA, and the like). The quasi co-location type may be, for example, QCL TypeD. The one or more configuration parameters may indicate, for the uplink resource (or for the spatial relation of the uplink resource, or for the reference signal indicated by the spatial relation), an index (e.g., TRP index, CORESET pool index, antenna panel index, beam failure detection group/set/pool index). The index (or a value of the index) may indicate the second beam failure detection group/set/pool (or the second TRP). The index may be, for example, equal to the second beam failure detection group/set/pool index. The spatial relation may be associated with the second beam failure detection group/set/pool, for example, based on the index (or the value of the index) indicating the second beam failure detection group/set/pool. The spatial relation of the uplink resource being associated with the second beam failure detection group/set/pool may, for example, comprise the uplink resource being associated with the second beam failure detection group/set/pool. The uplink resource may be associated with the second beam failure detection group/set/pool, for example, based on the one or more configuration parameters indicating, for the uplink resource, the index indicating the second beam failure detection group/set/pool.

The transmitting, via the uplink resource, the uplink signal (or repetition of the uplink signal) based on the spatial relation may comprise transmitting, via the uplink resource, the uplink signal with/using a spatial domain transmission filter determined based on the spatial relation. The wireless device may determine the spatial domain transmission filter based on the reference signal indicated by the spatial relation.

The transmitting, via the uplink resource, the uplink signal (or repetition of the uplink signal) based on the spatial relation may comprise transmitting, via the uplink resource, the uplink signal with/using a transmission power determined based on the spatial relation. The wireless device may determine the transmission power, for example, based on the reference signal (e.g., PUCCH-PathlossReferenceRS) indicated by the spatial relation. The wireless device may determine the transmission power, for example, based on a closed loop process index indicated by the spatial relation.

The activation command indicating/updating/activating the spatial relation (or the single spatial relation or one spatial relation) may indicate no uplink channel repetition for the uplink resource. The one or more configuration parameters may not indicate, for the uplink resource, an uplink channel repetition.

The wireless device may update/override/overwrite/replace the spatial relation, of the uplink resource, with the candidate reference signal. The wireless device may update/override/overwrite/replace the spatial relation with the candidate reference signal, for example, based on the completing the beam failure recovery. The wireless device may update/override/overwrite/replace the spatial relation with the candidate reference signal, for example, based on receiving/detecting the response (e.g., DCI or the BFR response) that completes the beam failure recovery.

The wireless device may send/transmit, via the uplink resource, an uplink signal (or repetition of an uplink signal) based on the candidate reference signal. The wireless device may send/transmit, via the uplink resource, the uplink signal (or repetition of the uplink signal) based on the candidate reference signal, for example, based on/in response to the completing the beam failure recovery. The wireless device may send/transmit, via the uplink resource, the uplink signal (or repetition of the uplink signal) based on the candidate reference signal, for example, based on/in response to the updating/overriding/overwriting/replacing the spatial relation, of the uplink resource, with the candidate reference signal. The wireless device may send/transmit, via the uplink resource, the uplink signal (or repetition of the uplink signal) based on the candidate reference signal, for example, based on/in response to the receiving/detecting the response (e.g., DCI or the BFR response) that completes the beam failure recovery.

The transmitting, via the uplink resource, the uplink signal based on the candidate reference signal may be (or start or occur) after a number/quantity of symbols from a last/ending/latest symbol of the PDCCH reception with the response (e.g., the BFR response or the DCI 2660 in FIG. 26). The transmitting, via the uplink resource, the uplink signal based on the candidate reference signal may be based on the PDCCH reception with the response (e.g., the BFR response or the DCI 2660 in FIG. 26).

The transmitting, via the uplink resource, the uplink signal based on the candidate reference signal may comprise transmitting, via the uplink resource, the uplink signal with/using a candidate spatial domain transmission filter.

The wireless device may determine the candidate spatial domain transmission filter based on the candidate reference signal. The wireless device may receive the candidate reference signal with/using the candidate spatial domain transmission filter. The wireless device may receive the candidate reference signal with a spatial domain transmission filter that is the same (or substantially same) as the candidate spatial domain transmission filter.

The wireless device may send/transmit the uplink signal (e.g., Uplink signal 2650 in FIG. 26) indicating the candidate reference signal with/using the candidate spatial domain transmission filter. The uplink signal may, for example, be a PRACH transmission (e.g., random-access preamble). The PRACH transmission may be a last/latest PRACH transmission. The wireless device may send/transmit the uplink signal (e.g., Uplink signal 2650 in FIG. 26) indicating the candidate reference signal with/using a spatial domain transmission filter that is the same (or substantially same) as the candidate spatial domain transmission filter.

The transmitting, via the uplink resource, the uplink signal (or repetition of the uplink signal) based on the candidate reference signal may comprise transmitting, via the uplink resource, the uplink signal (or repetition of the uplink signal) with/using a candidate transmission power. The wireless device may determine the candidate transmission power, for example, based on the candidate reference signal. The wireless device may determine the candidate transmission power, for example, based on a closed loop process index that is equal to zero (e.g., $1=0$). The wireless device may ignore the closed loop process index indicated by the spatial relation. The wireless device may not determine the candidate transmission power based on the closed loop process index indicated by the spatial relation, for example, based on the completing the beam failure recovery. The wireless device may determine the candidate transmission power, for example, based on a power control parameter/index that is equal to zero (e.g., $q\_u=0$). The wireless device may set (or reset) a value of the power control parameter/index to zero (or any other value), for example, based on the completing the beam failure recovery.

The wireless device may update/override/overwrite/replace the spatial relation, of the uplink resource, with the candidate reference signal, for example, based on the beam failure detection group/set/pool. The wireless device may update/override/overwrite/replace the spatial relation, of the uplink resource, with the candidate reference signal, for example, based on the beam failure detection group/set/pool index of the beam failure detection group/set/pool. The wireless device may update/override/overwrite/replace the spatial relation, of the uplink resource, with the candidate reference signal, for example, based on whether the beam failure detection group/set/pool is the first beam failure detection group/set/pool or the second beam failure detection group/set/pool.

The spatial relation of the uplink resource may be associated with the beam failure detection group/set/pool. The wireless device may update/override/overwrite/replace the spatial relation, of the uplink resource, with the candidate reference signal, for example, based on the spatial relation being associated with the beam failure detection group/set/pool. The beam failure detection group/set/pool may be, for example, the first beam failure detection group/set/pool (e.g., BFD group 1 shown in FIG. 26). The spatial relation of the uplink resource (e.g., Spatial relation 1 of Uplink resource 1) may be associated with the first beam failure detection group/set/pool. The wireless device may update/override/overwrite/replace the Spatial relation 1, of the Uplink resource 1, with the candidate reference signal, for example, based on the Spatial relation 1 being associated with the first beam failure detection group/set/pool.

The wireless device may send/transmit, via the uplink resource, the uplink signal (or repetition of the uplink signal) based on the candidate reference signal, for example, based on/in response to the spatial relation of the uplink resource being associated with the beam failure detection group/set/pool. The wireless device may send/transmit, via the uplink resource, the uplink signal (or repetition of the uplink signal) based on the candidate reference signal, for example, based on/in response to the uplink resource being associated with the beam failure detection group/set/pool. The beam failure detection group/set/pool may be the first beam failure detection group/set/pool (e.g., BFD group 1 shown in FIG. 26). The spatial relation of the uplink resource (e.g., Spatial relation 1 of Uplink resource 1 shown in FIG. 26) may be associated with the first beam failure detection group/set/pool. The wireless device may send/transmit, via the uplink resource, the uplink signal (or repetition of the uplink signal) based on the candidate reference signal, for example, based on/in response to the Spatial relation 1 being associated with the first beam failure detection group/set/pool.

The wireless device may send/transmit, via the uplink resource, the uplink signal (or repetition of the uplink signal) based on the candidate reference signal, for example, until receiving a second activation command (e.g., PUCCH spatial relation Activation/Deactivation MAC CE, Enhanced PUCCH spatial relation Activation/Deactivation MAC CE, DCI, RRC, and the like) indicating/activating a new spatial relation (e.g., PUCCH-SpatialRelationInfo) for the uplink resource. The new spatial relation may be different from the previously configured spatial relation (e.g., configured by the configuration parameters 2620 and/or activated by the activation command(s) 2630). The wireless device may send/transmit, via the uplink resource, the uplink signal (or repetition of the uplink signal) based on the candidate reference signal, for example, until receiving a second activation command (e.g., PUCCH spatial relation Activation/Deactivation MAC CE, Enhanced PUCCH spatial relation Activation/Deactivation MAC CE, DCI, RRC, and the like) updating the spatial relation of the uplink resource with a new spatial relation. The wireless device may send/transmit, via the uplink resource, an uplink signal (or repetition of an uplink signal) based on the new spatial relation, for example, based on/in response to the receiving the second activation command.

The wireless device may not update/override/overwrite/replace the spatial relation, of the uplink resource, with the candidate reference signal. The wireless device may not update/override/overwrite/replace the spatial relation with the candidate reference signal, for example, based on (or after) the completing the beam failure recovery. The wireless device may not update/override/overwrite/replace the spatial relation with the candidate reference signal, for example, based on receiving/detecting the response (e.g., DCI or the BFR response) that completes the beam failure recovery. The wireless device may not update/override/overwrite/replace the spatial relation, of the uplink resource, with the candidate reference signal, for example, if the spatial relation is associated with a beam failure detection group/set/pool (e.g., the BFD group 2 shown in FIG. 26) and the beam failure detection group/set/pool is not associated with a beam failure.

The wireless device may send/transmit, via the uplink resource, an uplink signal (repetition of an uplink signal) based on the spatial relation. The wireless device may send/transmit, via the uplink resource, the uplink signal based on the spatial relation, for example, based on/in response to (or after) the completing the beam failure recovery. The wireless device may send/transmit, via the uplink resource, the uplink signal based on the spatial relation, for example, based on/in response to the not updating/overriding/overwriting/replacing the spatial relation, of the uplink resource, with the candidate reference signal. The wireless device may send/transmit, via the uplink resource, the uplink signal based on the spatial relation, for example, based on/in response to (or after) the receiving/detecting the response (e.g., DCI or the BFR response) that completes the beam failure recovery.

The wireless device may keep sending/transmitting, via the uplink resource, an uplink signal (repetition of an uplink signal) based on the spatial relation. The wireless device may keep sending/transmitting, via the uplink resource, the uplink signal based on the spatial relation, for example, based on/in response to (or after) the completing the beam failure recovery. The wireless device may keep sending/transmitting, via the uplink resource, the uplink signal based on the spatial relation, for example, based on/in response to the not updating/overriding/overwriting/replacing the spatial relation, of the uplink resource, with the candidate reference signal. The wireless device may keep sending/transmitting, via the uplink resource, the uplink signal based on the spatial relation, for example, based on/in response to (or after) the receiving/detecting the response (e.g., DCI or the BFR response) that completes the beam failure recovery.

The transmitting, via the uplink resource, the uplink signal based on the spatial relation may comprise transmitting, via the uplink resource, the uplink signal with/using the spatial domain transmission filter determined based on the spatial relation. The transmitting, via the uplink resource, the uplink signal based on the spatial relation may comprise keep transmitting, via the uplink resource, the uplink signal with/using the spatial domain transmission filter determined based on the spatial relation.

The transmitting, via the uplink resource, the uplink signal based on the spatial relation may comprise transmitting, via the uplink resource, the uplink signal with/using the transmission power determined based on the spatial relation. The transmitting, via the uplink resource, the uplink signal based on the spatial relation may comprise keep transmitting, via the uplink resource, the uplink signal with/using the transmission power determined based on the spatial relation.

The wireless device may not update/override/overwrite/replace the spatial relation, of the uplink resource, with the candidate reference signal, for example, based on the beam failure detection group/set/pool. The wireless device may not update/override/overwrite/replace the spatial relation, of the uplink resource, with the candidate reference signal, for example, based on the beam failure detection group/set/pool index of the beam failure detection group/set/pool. The wireless device may not update/override/overwrite/replace the spatial relation, of the uplink resource, with the candidate reference signal, for example, based on whether the beam failure detection group/set/pool is the first beam failure detection group/set/pool or the second beam failure detection group/set/pool.

The spatial relation of the uplink resource may not be associated with the beam failure detection group/set/pool. The spatial relation of the uplink resource may be associated with a second beam failure detection group/set/pool that is different from the beam failure detection group/set/pool. The wireless device may not update/override/overwrite/replace the spatial relation, of the uplink resource, with the candidate reference signal, for example, based on the spatial relation not being associated with the beam failure detection group/set/pool. The beam failure detection group/set/pool may be the first beam failure detection group/set/pool (e.g., BFD group 1 shown in FIG. 26). The spatial relation of the uplink resource (e.g., Spatial relation 2 of Uplink resource 4) may not be associated with the first beam failure detection group/set/pool. The spatial relation of the uplink resource (e.g., Spatial relation 2 of Uplink resource 4) may be associated with the second beam failure detection group/set/pool. The wireless device may not update/override/overwrite/replace the Spatial relation 2, of the Uplink resource 4, with the candidate reference signal, for example, based on the Spatial relation 2 not being associated with the first beam failure detection group/set/pool.

The wireless device may send/transmit (or keep sending/transmitting), via the uplink resource, the uplink signal based on the spatial relation, for example, based on/in response to the spatial relation of the uplink resource not being associated with the beam failure detection group/set/pool. The wireless device may send/transmit (or keep sending/transmitting), via the uplink resource, the uplink signal based on the spatial relation, for example, based on/in response to the uplink resource not being associated with the beam failure detection group/set/pool. The beam failure detection group/set/pool may be the first beam failure detection group/set/pool (e.g., BFD group 1 shown in FIG. 26). The spatial relation of the uplink resource (e.g., Spatial relation 2 of Uplink resource 4) may not be associated with the first beam failure detection group/set/pool. The spatial relation of the uplink resource (e.g., Spatial relation 2 of Uplink resource 4) may be associated with the second beam failure detection group/set/pool. The wireless device may send/transmit, via the Uplink resource 4, the uplink signal based on the Spatial relation 2, for example, based on/in response to the Spatial relation 2 not being associated with the first beam failure detection group/set/pool.

The wireless device may keep sending/transmitting, via the uplink resource, the uplink signal based on the spatial relation, for example, based on/in response to the spatial relation of the uplink resource not being associated with the beam failure detection group/set/pool. The wireless device may keep sending/transmitting, via the uplink resource, the uplink signal based on the spatial relation, for example, based on/in response to the uplink resource not being associated with the beam failure detection group/set/pool.

As described herein (e.g., at step 2710 in FIG. 27A), a wireless device may receive one or more messages comprising one or more configuration parameters (e.g., configuration parameters 2420/2620), for example, for a cell (e.g., PCell, SCell, PUCCH SCell, etc.). A base station (or a relay, or any other wireless devices) may send/transmit the one or more messages comprising the one or more configuration parameters (e.g., at step 2712 in FIG. 27B). The one or more configuration parameters may indicate a channel repetition (e.g., a control channel repetition). The one or more configuration parameters may indicate a plurality of beam failure detection groups/sets/pools (e.g., BFD group 1, BFD group 2 shown in FIGS. 24 and 26).

The wireless device may activate an uplink BWP of the cell as an active uplink BWP of the cell. The active uplink BWP of the cell may comprise one or more uplink resources. The one or more configuration parameters may indicate the one or more uplink resources for the uplink BWP.

The wireless device may send/transmit (e.g., at step 2720 shown in FIG. 27A), via an uplink resource (e.g., PUCCH/PUSCH/PRACH/SRS resource) of the one or more uplink resources, an uplink signal (e.g., UCI, SR, HARQ-ACK, PUSCH, TB, SRS, PRACH, and the like) based on at least two spatial relations. The at least two spatial relations may comprise a first spatial relation (e.g., Spatial relation 1 and/or Spatial relation 3 shown in FIG. 26) and a second spatial relation (e.g., Spatial relation 2 and/or Spatial relation 4 shown in FIG. 26). The first spatial relation may be associated with (and/or indicate) a first reference signal (e.g., RS 1 and/or RS 2). The second spatial relation may be associated with (and/or indicate) a second reference signal (RS 3 and/or RS 4). The base station may receive (e.g., at step 2722 shown in FIG. 27B), via the uplink resource (e.g., PUCCH/PUSCH/PRACH/SRS resource) of the one or more uplink resources, the uplink signal (e.g., UCI, SR, HARQ-ACK, PUSCH, TB, SRS, PRACH, and the like) based on the at least two spatial relations.

The one or more configuration parameters may indicate one or more beam failure detection groups/sets/pools (or beam failure detection reference signal groups/sets/pools or BFD-RS groups/sets/pools). The one or more beam failure detection groups/sets/pools may indicate, for beam failure detection, one or more reference signals (e.g., CSI-RS, SS/PBCH block, DM-RS, TRS, and the like). Each beam failure detection group/set/pool of the one or more beam failure detection groups/sets/pools may indicate respective reference signal(s) of the one or more reference signals.

The one or more beam failure detection groups/sets/pools may comprise a first beam failure detection group/set/pool (or 1st first beam failure detection group/set/pool). The one or more beam failure detection groups/sets/pools may comprise a second beam failure detection group/set/pool (or 2nd beam failure detection group/set/pool).

The wireless device may determine/detect a beam failure of/for a beam failure detection group/set/pool of the one or more beam failure detection groups/sets/pools (e.g., at time T2 shown in FIGS. 24 and 26). The wireless device may determine/detect the beam failure of/for the beam failure detection group/set/pool, for example, based on one or more reference signals. The wireless device may determine/detect the beam failure of/for the beam failure detection group/set/pool, for example, based on the one or more reference signals indicated by the beam failure detection group/set/pool. The wireless device may determine/detect the beam failure of the beam failure detection group/set/pool based on measuring/assessing/determining a radio link quality (e.g., BLER, SINR, L1-RSRP, and the like) of the one or more reference signals.

The wireless device may initiate/trigger/start a beam failure recovery (or a beam failure recovery procedure). The wireless device may initiate/trigger/start, for the beam failure detection group/set/pool, the beam failure recovery. The wireless device may initiate/trigger/start the beam failure recovery, for example, based on the determining/detecting the beam failure of/for the beam failure detection group/set/pool.

The wireless device may determine/identify a candidate reference signal. The wireless device may determine/identify, for the beam failure recovery, the candidate reference signal. The wireless device may determine/identify the candidate reference signal, for example, based on measuring/assessing/determining a radio link quality (e.g., BLER, SINR, L1-RSRP, and the like) of the candidate reference signal.

The wireless device may send/transmit (e.g., at step 2730 shown in FIG. 27A), for the beam failure recovery, an uplink signal (e.g., random-access preamble, BFR MAC-CE, and the like) indicating the candidate reference signal. The base station may receive (e.g., at step 2732 shown in FIG. 27B), for the beam failure recovery, the uplink signal (e.g., random-access preamble, BFR MAC-CE, and the like) indicating the candidate reference signal.

The wireless device may receive/detect a response (e.g., DCI or a BFR response). The wireless device may complete the beam failure recovery (e.g., at step 2740 shown in FIG. 27A), for example, based on the receiving/detecting the response (e.g., DCI or the BFR response). The wireless device may complete the beam failure recovery successfully, for example, based on the receiving/detecting the response (e.g., DCI or the BFR response). The receiving/detecting the response (e.g., DCI or the BFR response) may comprise performing/detecting a PDCCH reception with the DCI. The base station may send/transmit (e.g., at step 2742 shown in FIG. 27B) the response (e.g., DCI or the BFR response) completing the beam failure recovery.

The wireless device may receive the response (e.g., DCI or the BFR response), for example, in/via a recovery search space set indicated/identified by a recovery search space set index (e.g., RecoverySearchSpaceId). The recovery search space set may be associated with a recovery CORESET (e.g., BFR CORESET, dedicated CORESET). The one or more CORESETs may, for example, comprise the recovery CORESET.

A second HARQ process number indicated by the response (e.g., DCI or the BFR response) for transmission of a second uplink signal may be same as (or equal to) a first HARQ process number used for transmission of the uplink signal (e.g., random-access preamble, BFR MAC-CE or a PUSCH transmission comprising/with the BFR MAC-CE). The wireless device may perform an HARQ process.

Figure 27A:
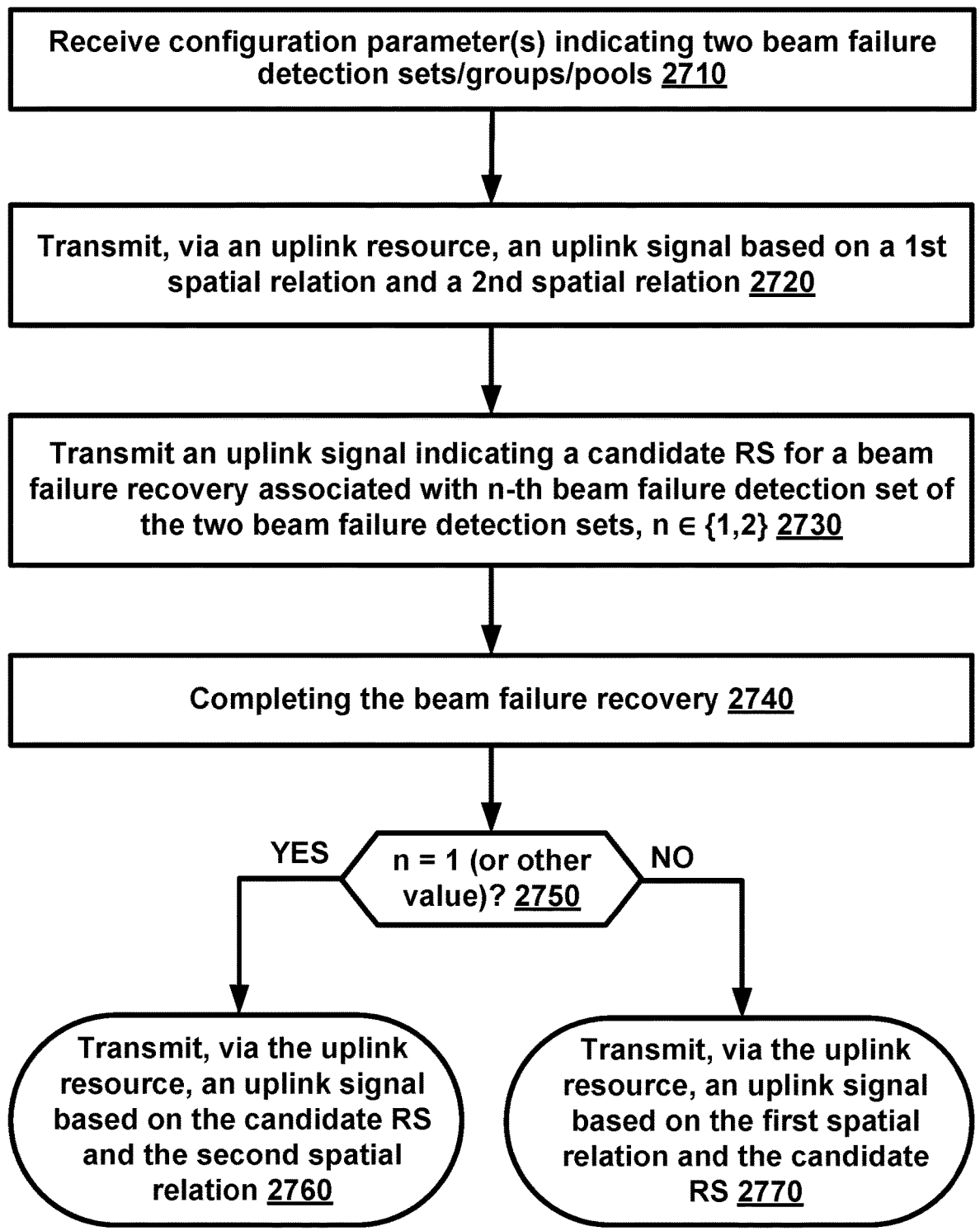
FIG. 27A and FIG. 27B show example methods of channel control for transmission and/or reception.
Figure 27B:
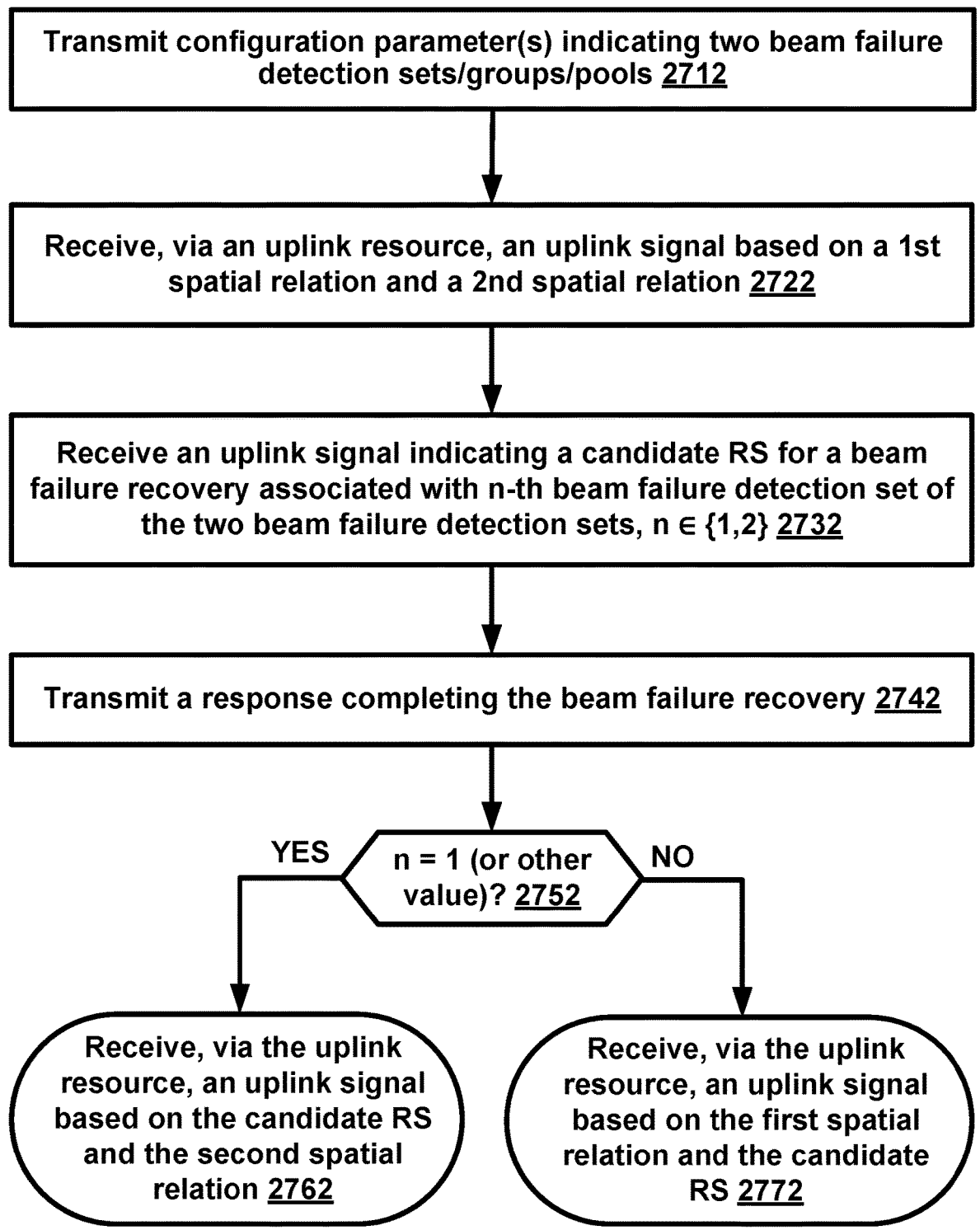

The beam failure detection group/set/pool may be the first beam failure detection group/set/pool (e.g., n equal to 1, or any other value associated with the first beam failure detection group/set/pool, at steps 2750/2752 shown in FIG. 27A and FIG. 27B). The wireless device may send/transmit, via the uplink resource, an uplink signal (or repetition of an uplink signal) based on the candidate reference signal and the second spatial relation, for example, based on/in response to the completing the beam failure recovery. The wireless device may send/transmit, via the uplink resource, an uplink signal (or repetition of an uplink signal, e.g., UCI, SR, HARQ-ACK, PUCCH, PUSCH transmission, SRS, PRACH, and the like) based on the candidate reference signal and the second spatial relation, for example, based on/in response to the receiving/detecting the response (e.g., DCI or the BFR response) that completes the beam failure recovery. The wireless device may send/transmit, via the uplink resource, an uplink signal (or repetition of an uplink signal) based on the candidate reference signal and the second spatial relation, for example, based on/in response to the beam failure detection group/set/pool being the first beam failure detection group/set/pool (e.g., n equal to 1 at steps 2750/2752). The transmitting, via the uplink resource, the uplink signal (or repetition of the uplink signal) based on the candidate reference signal and the second spatial relation may be (or start or occur) after a number/quantity of symbols from a last/ending/latest symbol of the PDCCH reception with the response (e.g., DCI or the BFR response).

The transmitting, via the uplink resource, the uplink signal (or repetition of the uplink signal) based on the candidate reference signal and the second spatial relation may comprise transmitting, via the uplink resource, the uplink signal (or repetition of the uplink signal) with/using a candidate spatial domain transmission filter (e.g., associated with the candidate reference signal and/or determined based on the candidate reference signal) and with/using a second spatial domain transmission filter (e.g., associated with the second spatial relation and/or determined based on the second spatial relation).

The wireless device may determine the second spatial domain transmission filter based on the second reference signal indicated by the second spatial relation. The wireless device may determine the candidate spatial domain transmission filter based on the candidate reference signal. The wireless device may receive the candidate reference signal with/using the candidate spatial domain transmission filter. The wireless device may receive the candidate reference signal with a spatial domain transmission filter that is the same (or substantially same) as the candidate spatial domain transmission filter. The wireless device may send/transmit the uplink signal (e.g., BFR MAC-CE) indicating the candidate reference signal with/using a spatial domain transmission filter that is the same (or substantially same) as the candidate spatial domain transmission filter.

The wireless device may send/transmit (e.g., at step 2760 shown in FIG. 27A), via the uplink resource, the uplink signal (or repetition of the uplink signal) with/using the candidate spatial domain transmission filter in one or more first uplink transmission occasions. The wireless device may send/transmit (e.g., at step 2760 shown in FIG. 27A), via the uplink resource, the uplink signal (or repetition of the uplink signal) with/using the second spatial domain transmission filter in the one or more second uplink transmission occasions. The base station may receive (e.g., at step 2762 shown in FIG. 27B), via the uplink resource, the uplink signal (or repetition of the uplink signal) with/using the candidate spatial domain transmission filter in one or more first uplink transmission occasions. The base station may receive (e.g., at step 2762 shown in FIG. 27B), via the uplink resource, the uplink signal (or repetition of the uplink signal) with/using the second spatial domain transmission filter in the one or more second uplink transmission occasions. The transmission/reception at steps 2760/2762 may be performed, for example, based on the beam failure detection group/set/pool being the first beam failure detection group/set/pool (e.g., n equal to 1 at steps 2750/2752 shown in FIG. 27A and FIG. 27B).

The transmitting, via the uplink resource, the uplink signal (or repetition of the uplink signal) based on the candidate reference signal and the second spatial relation may comprise transmitting, via the uplink resource, the uplink signal (or repetition of the uplink signal) with/using a candidate transmission power (e.g., associated with the candidate reference signal and/or determined based on the candidate reference signal) and with/using a second transmission power (e.g., associated with the second spatial relation and/or determined based on the second spatial relation).

The wireless device may determine the second transmission power, for example, based on the second reference signal indicated by the second spatial relation. The wireless device may determine the second transmission power, for example, based on measuring/assessing a radio link quality (e.g., L1-RSRP, L3-RSRP, BLER, SINR, SNR, and the like) of the second reference signal. The wireless device may determine the second transmission power, for example, based on a second closed loop process index indicated by the second spatial relation.

The wireless device may determine the candidate transmission power, for example, based on the candidate reference signal. The wireless device may determine the candidate transmission power, for example, based on measuring/assessing a radio link quality (e.g., L1-RSRP, L3-RSRP, BLER, SINR, SNR, and the like) of the candidate reference signal.

The wireless device may determine the candidate transmission power, for example, based on a closed loop process index that is equal to zero (e.g., l=0). The wireless device may ignore a first closed loop process index indicated by the first spatial relation. The wireless device may not determine the candidate transmission power based on the first closed loop process index, for example, based on the completing the beam failure recovery.

The wireless device may set (or reset) a value of a power control parameter/index to zero (e.g., q_u=0). The wireless device may set (or reset) the value of the power control parameter/index to zero, for example, based on the completing the beam failure recovery. The wireless device may determine the candidate transmission power, for example, based on the power control parameter/index that is equal to zero (or any other value).

The wireless device may send/transmit, via the uplink resource, the uplink signal (or repetition of the uplink signal) with/using the candidate transmission power in the one or more first uplink transmission occasions. The wireless device may send/transmit, via the uplink resource, the uplink signal (or repetition of the uplink signal) with/using the second transmission power in the one or more second uplink transmission occasions. The transmission/reception may be performed, for example, based on the beam failure detection group/set/pool being the first beam failure detection group/set/pool (e.g., n equal to 1 at steps 2750/2752 shown in FIG. 27A and FIG. 27B).

The beam failure detection group/set/pool may be the second beam failure detection group/set/pool (e.g., n not equal to 1 at steps 2750/2752 shown in FIG. 27A and FIG. 27B). The wireless device may send/transmit, via the uplink resource, an uplink signal (or repetition of an uplink signal) based on the candidate reference signal and the first spatial relation, for example, based on/in response to the completing the beam failure recovery. The wireless device may send/transmit, via the uplink resource, an uplink signal (or repetition of an uplink signal) based on the candidate reference signal and the first spatial relation, for example, based on/in response to the receiving/detecting the response (e.g., DCI or the BFR response) that completes the beam failure recovery. The wireless device may send/transmit, via the uplink resource, an uplink signal (or repetition of an uplink signal) based on the candidate reference signal and the first spatial relation, for example, based on/in response to the beam failure detection group/set/pool being the second beam failure detection group/set/pool (e.g., n not equal to 1 at steps 2750/2752). The transmitting, via the uplink resource, the uplink signal (or repetition of the uplink signal) based on the candidate reference signal and the first spatial relation may be (or start or occur) after a number/quantity of symbols from a last/ending/latest symbol of the PDCCH reception with the response (e.g., DCI or the BFR response).

The transmitting, via the uplink resource, the uplink signal (or repetition of the uplink signal) based on the candidate reference signal and the first spatial relation may comprise transmitting, via the uplink resource, the uplink signal (or repetition of the uplink signal) with/using a candidate spatial domain transmission filter (e.g., associated with the candidate reference signal and/or determined based on the candidate reference signal) and with/using a first spatial domain transmission filter (e.g., associated with the first spatial relation and/or determined based on the first spatial relation).

The wireless device may determine the first spatial domain transmission filter based on the first reference signal indicated by the first spatial relation. The wireless device may determine the candidate spatial domain transmission filter based on the candidate reference signal. The wireless device may receive the candidate reference signal with/using the candidate spatial domain transmission filter. The wireless device may receive the candidate reference signal with a spatial domain transmission filter that is the same (or substantially same) as the candidate spatial domain transmission filter. The wireless device may send/transmit the uplink signal (e.g., BFR MAC-CE) indicating the candidate reference signal with/using a spatial domain transmission filter that is the same (or substantially same) as the candidate spatial domain transmission filter.

The wireless device may send/transmit (e.g., at step 2770 shown in FIG. 27A), via the uplink resource, the uplink signal (or repetition of the uplink signal) with/using the candidate spatial domain transmission filter in one or more second uplink transmission occasions. The wireless device may send/transmit (e.g., at step 2770 shown in FIG. 27A), via the uplink resource, the uplink signal (or repetition of the uplink signal) with/using the first spatial domain transmission filter in the one or more first uplink transmission occasions. The base station may receive (e.g., at step 2772 shown in FIG. 27B), via the uplink resource, the uplink signal (or repetition of the uplink signal) with/using the candidate spatial domain transmission filter in one or more second uplink transmission occasions. The base station may receive (e.g., at step 2772 shown in FIG. 27B), via the uplink resource, the uplink signal (or repetition of the uplink signal) with/using the first spatial domain transmission filter in the one or more first uplink transmission occasions. The transmission/reception at step 2770/2772 may be performed, for example, based on the beam failure detection group/set/pool being the second beam failure detection group/set/pool (e.g., n not equal to 1 at steps 2750/2752 shown in FIG. 27A and FIG. 27B).

The transmitting, via the uplink resource, the uplink signal (or repetition of the uplink signal) based on the candidate reference signal and the first spatial relation may comprise transmitting, via the uplink resource, the uplink signal (or repetition of the uplink signal) with/using a candidate transmission power (e.g., associated with the candidate reference signal and/or determined based on the candidate reference signal) and with/using a first transmission power (e.g., associated with the first spatial relation and/or determined based on the first spatial relation).

The wireless device may determine the first transmission power, for example, based on the first reference signal indicated by the first spatial relation. The wireless device may determine the first transmission power, for example, based on measuring/assessing a radio link quality (e.g., L1-RSRP, L3-RSRP, BLER, SINR, SNR, and the like) of the first reference signal. The wireless device may determine the first transmission power, for example, based on a first closed loop process index indicated by the first spatial relation.

The wireless device may determine the candidate transmission power, for example, based on the candidate reference signal. The wireless device may determine the candidate transmission power, for example, based on measuring/assessing a radio link quality (e.g., L1-RSRP, L3-RSRP, BLER, SINR, SNR, and the like) of the candidate reference signal.

The wireless device may determine the candidate transmission power, for example, based on a closed loop process index that is equal to zero (e.g., l=0). The wireless device may ignore a second closed loop process index indicated by the second spatial relation. The wireless device may not determine the candidate transmission power based on the second closed loop process index, for example, based on the completing the beam failure recovery.

The wireless device may set (or reset) a value of a power control parameter/index to zero (e.g., q_u=0). The wireless device may set (or reset) the value of the power control parameter/index to zero, for example, based on the completing the beam failure recovery. The wireless device may determine the candidate transmission power, for example, based on the power control parameter/index that is equal to zero (or any other value).

The wireless device may send/transmit, via the uplink resource, the uplink signal (or repetition of the uplink signal) with/using the candidate transmission power in the one or more second uplink transmission occasions. The wireless device may send/transmit, via the uplink resource, the uplink signal (or repetition of the uplink signal) with/using the first transmission power in the one or more first uplink transmission occasions. The transmission/reception may be performed, for example, based on the beam failure detection group/set/pool being the second beam failure detection group/set/pool (e.g., n not equal to 1 at steps 2750/2752 shown in FIG. 27A and FIG. 27B). The one or more beam failure detection groups/sets/pools may be one or more CORESET groups (or CORESET pools or CORESET sets or CORESET BFD groups or beam failure detection CORESET groups, and the like).

As described herein, a wireless device may receive one or more messages comprising one or more configuration parameters, for example, for a cell (e.g., PCell, SCell, PUCCH SCell, etc.). The one or more configuration parameters may indicate a channel repetition (e.g., a control channel repetition).

The wireless device may activate a downlink BWP of the cell as an active downlink BWP of the cell. The active downlink BWP of the cell may comprise one or more CORESETs. The one or more configuration parameters may indicate the one or more CORESETs for the downlink BWP.

The wireless device may activate a downlink BWP of the cell as an active downlink BWP of the cell. The active downlink BWP of the cell may comprise a plurality of CORESETs. The one or more configuration parameters may indicate the plurality of CORESETs for the downlink BWP.

The wireless device may send/transmit, via an uplink resource of the one or more uplink resources, an uplink signal based on at least two spatial relations. The at least two spatial relations may comprise a first spatial relation and a second spatial relation. The first spatial relation may indicate a first reference signal. The second spatial relation may indicate a second reference signal.

The wireless device may activate an uplink BWP of the cell as an active uplink BWP of the cell. The active uplink BWP of the cell may comprise one or more uplink resources. The one or more configuration parameters may indicate the one or more uplink resources for the uplink BWP.

The one or more configuration parameters may indicate one or more CORESET groups. The one or more CORESET groups may indicate, for beam failure detection, one or more CORESETs. Each CORESET group of the one or more CORESET groups may indicate/comprise respective CORESET(s) of the one or more CORESETs. The plurality of CORESETs may comprise the one or more CORESETs.

The one or more CORESET groups may comprise a first CORESET group (or 1st CORESET group). The one or more CORESET groups may comprise a second CORESET group (or 2nd CORESET group).

The wireless device may monitor, for a message, an indication, or control information (e.g., DCI or for repetition of DCI), PDCCH (or PDCCH candidate(s) or PDCCH transmissions/receptions) in/via a CORESET of the plurality of CORESETs based on at least two TCI states (and/or at least two antenna port quasi co-location (QCL) assumptions/properties/structures). The at least two TCI states may comprise a first TCI state (e.g., TCI state 1 and/or TCI state 3 shown in FIG. 24) and a second TCI state (e.g., TCI state 2, and/or TCI state 4 shown in FIG. 24). The one or more CORESET groups may, for example, comprise the CORESET. The one or more CORESET groups may not, for example, comprise the CORESET.

The wireless device may determine/detect a beam failure of/for a CORESET group of the one or more CORESET groups. The wireless device may determine/detect the beam failure of/for the CORESET group, for example, based on one or more reference signals indicated by TCI state(s) activated for (or of) CORESET(s) in the CORESET group. The wireless device may determine/detect the beam failure of/for the CORESET group, for example, based on the one or more reference signals indicated by the CORESET group. The wireless device may determine/detect the beam failure based on measuring/assessing/determining a radio link quality (e.g., BLER, SINR, L1-RSRP, and the like) of the one or more reference signals. The CORESET group may comprise a first CORESET and a second CORESET. The wireless device may monitor, for the message, the indication, or the control information (e.g., DCI), PDCCH in/via the first CORESET based on the first TCI state. The wireless device may, for example, receive an activation command indicating/activating/updating, for the first CORESET, the first TCI state. The wireless device may monitor, for the message, the indication, or the control information (e.g., DCI), PDCCH in/via the second CORESET based on the second TCI state. The wireless device may, for example, receive an activation command indicating/activating/updating, for the second CORESET, the second TCI state. The one or more reference signals indicated by the CORESET group may comprise/be a first reference signal (e.g., RS 1 and/or RS 2 shown in FIG. 24) indicated by the first TCI state of the first CORESET and a second reference signal (e.g., RS 3 and/or RS 4 shown in FIG. 24) indicated by the second TCI state of the second CORESET.

The wireless device may initiate/trigger/start a beam failure recovery (or a beam failure recovery procedure). The wireless device may initiate/trigger/start, for the beam failure detection group/set/pool, the beam failure recovery. The wireless device may initiate/trigger/start the beam failure recovery, for example, based on the determining/detecting the beam failure.

The wireless device may determine/identify a candidate reference signal. The wireless device may determine/identify, for the beam failure recovery, the candidate reference signal. The wireless device may determine/identify the candidate reference signal, for example, based on measuring/assessing/determining a radio link quality (e.g., BLER, SINR, L1-RSRP, and the like) of the candidate reference signal. The wireless device may send/transmit, for the beam failure recovery, an uplink signal (e.g., random-access preamble, BFR MAC-CE, and the like) indicating the candidate reference signal.

The wireless device may receive/detect a response (e.g., DCI or a BFR response). The wireless device may complete the beam failure recovery, for example, based on the receiving/detecting the response (e.g., DCI or the BFR response). The wireless device may complete the beam failure recovery successfully, for example, based on the receiving/detecting the response (e.g., DCI or the BFR response). The receiving/detecting the response may comprise performing/detecting a PDCCH reception with the DCI.

The wireless device may receive the response (e.g., DCI or the BFR response), for example, in/via a recovery search space set indicated/identified by a recovery search space set index (e.g., RecoverySearchSpaceId). The recovery search space set may be associated with a recovery CORESET (e.g., BFR CORESET, dedicated CORESET). The one or more CORESETs may, for example, comprise the recovery CORESET.

A second HARQ process number indicated by the response (e.g., DCI) for transmission of a second uplink signal may be same as (or equal to) a first HARQ process number used for transmission of the uplink signal (e.g., random-access preamble, BFR MAC-CE or a PUSCH transmission comprising/with the BFR MAC-CE).

The CORESET group may be the first CORESET group. The wireless device may monitor, for the message, the indication, or the control information (e.g., DCI or for repetition of DCI), PDCCH (or PDCCH candidate(s) or PDCCH transmissions/receptions) in/via the CORESET based on the candidate reference signal and the second TCI state, for example, based on/in response to the completing the beam failure recovery. The wireless device may monitor, for the message, the indication, or the control information (e.g., DCI or for repetition of DCI), PDCCH (or PDCCH candidate(s) or PDCCH transmissions/receptions) in/via the CORESET based on the candidate reference signal and the second TCI state, for example, based on/in response to the receiving/detecting the response (e.g., DCI or the BFR response) that completes the beam failure recovery. The wireless device may monitor, for the message, the indication, or the control information (e.g., DCI or for repetition of DCI), PDCCH (or PDCCH candidate(s) or PDCCH transmissions/receptions) in/via the CORESET based on the candidate reference signal and the second TCI state, for example, based on/in response to the CORESET group being the first CORESET group. The wireless device may monitor, for the message, the indication, or the control information (e.g., DCI or for repetition of DCI), PDCCH (or PDCCH candidate(s) or PDCCH transmissions/receptions) in/via the CORESET based on the candidate reference signal and the second TCI state, for example, based on/in response to the CORESET being associated with (or corresponding to) the first CORESET group. The wireless device may monitor, for the message, the indication, or the control information (e.g., DCI or for repetition of DCI), PDCCH (or PDCCH candidate(s) or PDCCH transmissions/receptions) in the CORESET based on the candidate reference signal and the second TCI state, for example, based on/in response to the first CORESET group comprising the CORESET. The monitoring the PDCCH in the CORESET based on the candidate reference signal and the second TCI state may be (or start or occur) after a number/quantity of symbols from a last/ending/latest symbol of the PDCCH reception with the response (e.g., DCI or the BFR response).

The CORESET group may be the first CORESET group. The wireless device may receive, via the CORESET, the message, the indication, or the control information (e.g., DCI or the repetition of DCI), the PDCCH (or the PDCCH candidate(s) or the PDCCH transmissions/receptions) based on the candidate reference signal and the second TCI state, for example, based on/in response to the completing the beam failure recovery. The wireless device may receive, via the CORESET, the message, the indication, or the control information (e.g., DCI or the repetition of DCI), the PDCCH (or the PDCCH candidate(s) or the PDCCH transmissions/receptions) based on the candidate reference signal and the second TCI state, for example, based on/in response to the receiving/detecting the response (e.g., DCI or the BFR response) that completes the beam failure recovery. The wireless device may receive, via the CORESET, the message, the indication, or the control information (e.g., DCI or the repetition of DCI), the PDCCH (or the PDCCH candidate(s) or the PDCCH transmissions/receptions) based on the candidate reference signal and the second TCI state, for example, based on/in response to the CORESET group being the first CORESET group. The wireless device may receive, via the CORESET, the message, the indication, or the control information (e.g., DCI or the repetition of DCI), the PDCCH (or the PDCCH candidate(s) or the PDCCH transmissions/receptions) based on the candidate reference signal and the second TCI state, for example, based on/in response to the CORESET being associated with (or corresponding to) the first CORESET group. The wireless device may receive, via the CORESET, the message, the indication, or the control information (e.g., DCI or the repetition of DCI), the PDCCH (or the PDCCH candidate(s) or the PDCCH transmissions/receptions) based on the candidate reference signal and the second TCI state, for example, based on/in response to the first CORESET group comprising the CORESET.

The CORESET group may be the second CORESET group. The wireless device may monitor, for the message, the indication, or the control information (e.g., DCI or for repetition of DCI), PDCCH (or PDCCH candidate(s) or PDCCH transmissions/receptions) in/via the CORESET based on the candidate reference signal and the first TCI state, for example, based on/in response to the completing the beam failure recovery. The wireless device may monitor, for the message, the indication, or the control information (e.g., DCI or for repetition of DCI), PDCCH (or PDCCH candidate(s) or PDCCH transmissions/receptions) in/via the CORESET based on the candidate reference signal and the first TCI state, for example, based on/in response to the receiving/detecting the response (e.g., DCI or the BFR response) that completes the beam failure recovery. The wireless device may monitor, for the message, the indication, or the control information (e.g., DCI or for repetition of DCI), PDCCH (or PDCCH candidate(s) or PDCCH transmissions/receptions) in/via the CORESET based on the candidate reference signal and the first TCI state, for example, based on/in response to the CORESET group being the second CORESET group. The wireless device may monitor, for the message, the indication, or the control information (e.g., DCI or for repetition of DCI), PDCCH (or PDCCH candidate(s) or PDCCH transmissions/receptions) in/via the CORESET based on the candidate reference signal and the first TCI state, for example, based on/in response to the CORESET being associated with (or corresponding to) the second CORESET group. The wireless device may monitor, for the message, the indication, or the control information (e.g., DCI or for repetition of DCI), PDCCH (or PDCCH candidate(s) or PDCCH transmissions/receptions) in/via the CORESET based on the candidate reference signal and the first TCI state, for example, based on/in response to the second CORESET group comprising the CORESET. The monitoring the PDCCH in/via the CORESET based on the candidate reference signal and the first TCI state may be (or start or occur) after a number/quantity of symbols from a last/ending/latest symbol of the PDCCH reception with the response (e.g., DCI or the BFR response). The one or more configuration parameters may indicate, for the CORESET and the first CORESET group (or the CORESET group), an index (e.g., CORESET group index, TRP index, antenna panel index, BFD group index, BFD CORESET group index, and the like) with the same value.

The CORESET group may be the second CORESET group. The wireless device may receive, via the CORESET, the message, the indication, or the control information (e.g., DCI or the repetition of DCI), the PDCCH (or the PDCCH candidate(s) or the PDCCH transmissions/receptions) based on the candidate reference signal and the first TCI state, for example, based on/in response to the completing the beam failure recovery. The wireless device may receive, via the CORESET, the message, the indication, or the control information (e.g., DCI or the repetition of DCI), the PDCCH (or the PDCCH candidate(s) or the PDCCH transmissions/ receptions) based on the candidate reference signal and the first TCI state, for example, based on/in response to the receiving/detecting the response (e.g., DCI or the BFR response) that completes the beam failure recovery. The wireless device may receive, via the CORESET, the message, the indication, or the control information (e.g., DCI or the repetition of DCI), the PDCCH (or the PDCCH candidate(s) or the PDCCH transmissions/receptions) based on the candidate reference signal and the first TCI state, for example, based on/in response to the CORESET group being the second CORESET group. The wireless device may receive, via the CORESET, the message, the indication, or the control information (e.g., DCI or the repetition of DCI), the PDCCH (or the PDCCH candidate(s) or the PDCCH transmissions/receptions) based on the candidate reference signal and the first TCI state, for example, based on/in response to the CORESET being associated with (or corresponding to) the second CORESET group. The wireless device may receive, via the CORESET, the message, the indication, or the control information (e.g., DCI or the repetition of DCI), the PDCCH (or the PDCCH candidate(s) or the PDCCH transmissions/receptions) based on the candidate reference signal and the first TCI state, for example, based on/in response to the second CORESET group comprising the CORESET. The one or more configuration parameters may indicate, for the CORESET and the second CORESET group (or the CORESET group), an index (e.g., CORESET group index, TRP index, antenna panel index, BFD group index, BFD CORESET group index, and the like) with the same value.

The CORESET group may be the first CORESET group. The wireless device may send/transmit, via the uplink resource, an uplink signal (or repetition of an uplink signal) based on the candidate reference signal and the second spatial relation, for example, based on/in response to the completing the beam failure recovery. The wireless device may send/transmit, via the uplink resource, an uplink signal (or repetition of an uplink signal) based on the candidate reference signal and the second spatial relation, for example, based on/in response to the receiving/detecting the response (e.g., DCI or the BFR response) that completes the beam failure recovery. The wireless device may send/transmit, via the uplink resource, an uplink signal (or repetition of an uplink signal) based on the candidate reference signal and the second spatial relation, for example, based on/in response to the CORESET group being the first CORESET group. The wireless device may send/transmit, via the uplink resource, an uplink signal (or repetition of an uplink signal) based on the candidate reference signal and the second spatial relation, for example, based on/in response to the CORESET group (or the first CORESET group) being the associated with the uplink resource. The one or more configuration parameters may indicate, for the uplink resource and the first CORESET group (or the CORESET group), an index (e.g., CORESET group index, TRP index, antenna panel index, BFD group index, BFD CORESET group index, and the like) with the same value. The transmitting, via the uplink resource, the uplink signal (or repetition of the uplink signal) based on the candidate reference signal and the second spatial relation may be (or start or occur) after a number/quantity of symbols from a last/ending/latest symbol of the PDCCH reception with the response (e.g., DCI or the BFR response).

The transmitting, via the uplink resource, the uplink signal (or repetition of the uplink signal) based on the candidate reference signal and the second spatial relation may comprise transmitting, via the uplink resource, the uplink signal (or repetition of the uplink signal) with/using a candidate spatial domain transmission (e.g., associated with the candidate reference signal and/or determined based on the candidate reference signal) filter and with/using a second spatial domain transmission filter (e.g., associated with the second spatial relation and/or determined based on the second spatial relation).

The transmitting, via the uplink resource, the uplink signal (or repetition of the uplink signal) based on the candidate reference signal and the second spatial relation may comprise transmitting, via the uplink resource, the uplink signal (or repetition of the uplink signal) with/using a candidate transmission power (e.g., associated with the candidate reference signal and/or determined based on the candidate reference signal) and with/using a second transmission power (e.g., associated with the second spatial relation and/or determined based on the second spatial relation.

The CORESET group may be the second CORESET group. The wireless device may send/transmit, via the uplink resource, an uplink signal (or repetition of an uplink signal) based on the candidate reference signal and the first spatial relation, for example, based on/in response to the completing the beam failure recovery. The wireless device may send/transmit, via the uplink resource, an uplink signal (or repetition of an uplink signal) based on the candidate reference signal and the first spatial relation, for example, based on/in response to the receiving/detecting the response (e.g., DCI or the BFR response) that completes the beam failure recovery. The wireless device may send/transmit, via the uplink resource, an uplink signal (or repetition of an uplink signal) based on the candidate reference signal and the first spatial relation, for example, based on/in response to the CORESET group being the second CORESET group. The wireless device may send/transmit, via the uplink resource, an uplink signal (or repetition of an uplink signal) based on the candidate reference signal and the first spatial relation, for example, based on/in response to the CORESET group (or the second CORESET group) being the associated with the uplink resource. The one or more configuration parameters may indicate, for the uplink resource and the second CORESET group (or the CORESET group), an index (e.g., CORESET group index, TRP index, antenna panel index, BFD group index, BFD CORESET group index, and the like) with the same value. The transmitting, via the uplink resource, the uplink signal (or repetition of the uplink signal) based on the candidate reference signal and the first spatial relation may be (or start or occur) after a number/quantity of symbols from a last/ending/latest symbol of the PDCCH reception with the response (e.g., DCI or the BFR response).

The transmitting, via the uplink resource, the uplink signal (or repetition of the uplink signal) based on the candidate reference signal and the first spatial relation may comprise transmitting, via the uplink resource, the uplink signal (or repetition of the uplink signal) with/using a candidate spatial domain transmission filter (e.g., associated with the candidate reference signal and/or determined based on the candidate reference signal) and with/using a first spatial domain transmission filter (e.g., associated with the first spatial relation and/or determined based on the first spatial relation).

The transmitting, via the uplink resource, the uplink signal (or repetition of the uplink signal) based on the candidate reference signal and the first spatial relation may comprise transmitting, via the uplink resource, the uplink signal (or repetition of the uplink signal) with/using a candidate transmission power (e.g., associated with the candidate reference signal and/or determined based on the candidate reference signal) and with/using a first transmission power (e.g., associated with the first spatial relation and/or determined based on the first spatial relation).

A wireless device may perform a method comprising multiple operations. The wireless device may receive one or more configuration parameters indicating a plurality of beam failure detection sets of a cell. The one or more configuration parameters may be configured for the cell. The plurality of beam failure detection sets may comprise a first beam failure detection set of the cell and a second beam failure detection set of the cell. The wireless device may receive, based on a first transmission configuration indicator (TCI) state and a second TCI state, one or more first signals via one or more control resource sets (CORESETS). The wireless device may monitor, based on the first TCI state and the second TCI state, the one or more CORESETS. The first TCI state may be associated with the first beam failure detection set, and the second TCI state may be associated with the second beam failure detection set. The wireless device may transmit, based on a beam failure associated with the first beam failure detection set, an uplink signal indicating a candidate reference signal. The wireless device may detect the beam failure. The wireless device may receive a response to the uplink signal. The response may comprise DCI associated with a search space set indicated by a search space index (e.g., a recovery search space index). A cyclic redundancy check (CRC) of the DCI may be scrambled by C-RNTI or MCS C-RNTI. The DCI may schedule a PUSCH transmission with an HARQ process number. The HARQ process number may be equal to an HARQ process number used for transmission of the BFR MAC-CE. The DCI may comprise an NDI field that is being toggled. The wireless device may complete/terminate, based on receiving the response, a beam failure recovery. The wireless device may initiate/trigger, based on the detecting the beam failure, the beam failure recovery. After receiving the response, the wireless device may receive, based on the candidate reference signal and the second TCI state, one or more second signals via the one or more CORESETS. Each beam failure detection set, of the plurality of beam failure detection sets, may comprise one or more beam failure detection reference signals. The wireless device may determine, based on one or more measurements of one or more beam failure detection reference signals of the first beam failure detection set, the beam failure associated with the first beam failure detection set. The wireless device may receive an activation command associated with the one or more CORESETS. The activation command may indicate the first TCI state and the second TCI state. After receiving the activation command, the wireless device may monitor, based on the first TCI state and the second TCI state, the one or more CORESETS. The wireless device may receive, based on the candidate reference signal and the second TCI state, one or more second signals via the one or more CORESETS by: receiving, using a spatial domain filter associated with the candidate reference signal, the one or more second signals via the one or more CORESETS; and receiving, using a spatial domain filter associated with the second TCI state, the one or more second signals via the one or more CORESETS. The wireless device may start, after a quantity of symbols following reception of the response, monitoring the one or more CORESETS for reception of the one or more second signals. The uplink signal may comprise a random-access preamble associated with the candidate reference signal. The one or more configuration parameters may indicate the random-access preamble associated with the candidate reference signal. The uplink signal may comprise a beam failure recovery (BFR) medium-access control control element (MAC-CE). The BFR MAC-CE may comprise: a candidate beam reference signal field indicating the candidate reference signal; and a serving cell index indicating the cell. At least one demodulation reference signal (DMRS) antenna port may be associated with the one or more first signals via the one or more CORESETS and may be quasi co-located with: a first reference signal indicated by the first TCI state; and a second reference signal indicated by the second TCI state. At least one demodulation reference signal (DMRS) antenna port may be associated with the one or more second signals via the one or more CORESETS and may be quasi co-located with: the candidate reference signal; and a second reference signal indicated by the second TCI state. The one or more first signals may comprise downlink control information (DCI) (e.g., one or more repetitions of DCI). The one or more second signals may comprise DCI (e.g., one or more repetitions of DCI). Each beam failure detection set, of the plurality of beam failure detection sets, may be indicated by a beam failure detection set index of a plurality of beam failure detection set indexes. The uplink signal may comprise a preamble, and the cell may be a primary cell. The uplink signal may comprise a BFR MAC-CE, and the cell may be a secondary cell (e.g., a PUCCH SCell and/or at least one other SCell). The response may comprise downlink control information that schedules a physical uplink shared channel (PUSCH) transmission with a hybrid automatic repeat request (HARQ) process number, wherein the HARQ process number is equal to an HARQ process number for transmission of the uplink signal. The response may comprise downlink control information comprising a new data indicator (NDI) field that is being toggled. An active downlink bandwidth part (BWP) of the cell may comprise the one or more CORESETS. The candidate reference signal may be associated with the first beam failure detection set. The wireless device may comprise one or more processors; and memory storing instructions that, when executed by the one or more processors, cause the wireless device to perform the described method, additional operations and/or include the additional elements. A base station may comprise one or more processors; and memory storing instructions that, when executed by the one or more processors, cause the base station to perform operations complementary to the wireless device described herein. A system may comprise the wireless device configured to perform the described method, additional operations and/or include the additional elements; and a base station configured to perform operations complementary to the described method, additional operations and/or include the additional elements. A computer-readable medium may store instructions that, when executed, cause performance of the described method, complementary operations, additional operations, and/or include the additional elements.

A wireless device may perform a method comprising multiple operations. The wireless device may receive one or more configuration parameters indicating a plurality of beam failure detection sets of a cell. The plurality of beam failure detection sets may comprise a first beam failure detection set of the cell and a second beam failure detection set of the cell. The wireless device may transmit, based on a first spatial relation and a second spatial relation, one or more first signals via one or more uplink channel resources. The first spatial relation may be associated with the first beam failure detection set, and the second spatial relation may be associated with the second beam failure detection set. The wireless device may transmit, based on a beam failure associated with the first beam failure detection set, an uplink signal indicating a candidate reference signal. The wireless device may receive a response to the uplink signal. After receiving the response, the wireless device may transmit, based on the candidate reference signal and the second spatial relation, one or more second signals via the one or more uplink channel resources. The one or more second signals may comprise at least one of: a scheduling request (SR); a channel state information (CSI) report; or a hybrid automatic repeat request acknowledgement (HARQ-ACK). The wireless device may transmit the one or more first signals by: transmitting, using a spatial domain filter associated with the first spatial relation, one or more first repetitions of the one or more first signals associated with the cell; and transmitting, using a spatial domain filter associated with the second spatial relation, one or more second repetitions of the one or more first signals associated with the cell. The wireless device may transmit the one or more second signals by: transmitting, using a spatial domain filter associated with the candidate reference signal, one or more first repetitions of the one or more second signals associated with the cell; and transmitting, using a spatial domain filter associated with the second spatial relation, one or more second repetitions of the one or more second signals associated with the cell. The wireless device may transmit the one or more second signals by: transmitting, using an uplink transmission power associated with the candidate reference signal, one or more first repetitions of the one or more second signals associated with the cell; and transmitting, using an uplink transmission power associated with the second spatial relation, one or more second repetitions of the one or more second signals associated with the cell. Each beam failure detection set, of the plurality of beam failure detection sets, may comprise one or more beam failure detection reference signals. The wireless device may determine, based on one or more measurements of one or more beam failure detection reference signals of the first beam failure detection set, the beam failure associated with the first beam failure detection set. The wireless device may receive an activation command associated with the one or more uplink channel resources, wherein the activation command indicates the first spatial relation and the second spatial relation. The wireless device may transmit, based on the first spatial relation and the second spatial relation, the one or more first signals via the one or more uplink channel resources by: after receiving the activation command, transmitting, based on the first spatial relation and the second spatial relation, uplink control information (UCI). The uplink signal may comprise a random-access preamble associated with the candidate reference signal, and the one or more configuration parameters may indicate the random-access preamble associated with the candidate reference signal. The uplink signal may comprise a beam failure recovery (BFR) medium-access control control element (MAC-CE). The BFR MAC-CE may comprise: a candidate beam reference signal field indicating the candidate reference signal; and a serving cell index indicating the cell. The one or more first signals may comprise uplink control information (UCI). Each beam failure detection set, of the plurality of beam failure detection sets, may be indicated by a beam failure detection set index of a plurality of beam failure detection set indexes. The uplink signal may comprise a preamble, and the cell may be a primary cell. The uplink signal may comprise a BFR MAC-CE, and the cell may be a secondary cell. The response may comprise downlink control information that schedules a physical uplink shared channel (PUSCH) transmission with a hybrid automatic repeat request (HARQ) process number, wherein the HARQ process number is equal to an HARQ process number for transmission of the uplink signal. The response may comprise downlink control information comprising a new data indicator (NDI) field that is being toggled. An active uplink bandwidth part (BWP) of the cell may comprise the one or more uplink channel resources. The candidate reference signal may be associated with the first beam failure detection set. The wireless device may comprise one or more processors; and memory storing instructions that, when executed by the one or more processors, cause the wireless device to perform the described method, additional operations and/or include the additional elements. A base station may comprise one or more processors; and memory storing instructions that, when executed by the one or more processors, cause the base station to perform operations complementary to the wireless device described herein. A system may comprise the wireless device configured to perform the described method, additional operations and/or include the additional elements; and a base station configured to perform operations complementary to the described method, additional operations and/or include the additional elements. A computer-readable medium may store instructions that, when executed, cause performance of the described method, complementary operations, additional operations, and/or include the additional elements.

A wireless device may perform a method comprising multiple operations. The wireless device may receive one or more configuration parameters indicating a plurality of beam failure detection sets of a cell. The plurality of beam failure detection sets may comprise a first beam failure detection set of the cell and a second beam failure detection set of the cell. The wireless device may transmit, based on a beam failure associated with the first beam failure detection set, an uplink signal indicating a candidate reference signal associated with the first beam failure detection set. The wireless device may receive a response to the uplink signal. The wireless device may, after receiving the response, perform, based on the candidate reference signal associated with the first beam failure detection set, one or more first channel communications via one or more channel resources, and perform, based on at least one parameter associated with the second beam failure detection set, one or more second channel communications via the one or more channel resources. The at least one parameter may indicate at least one of: a transmission configuration indicator (TCI) state associated with the second beam failure detection set; or a spatial relation associated with the second beam failure detection set. The wireless device may perform, based on the at least one parameter associated with the second beam failure detection set, the one or more second channel communications via the one or more channel resources by at least one of: receiving, based on a transmission configuration indicator (TCI) state associated with the second beam failure detection set, one or more downlink signals via one or more control resource sets (CORESETS); or transmitting, based on a spatial relation associated with the second beam failure detection set, one or more uplink signals via one or more uplink channel resources. The wireless device may perform, based on the candidate reference signal associated with the first beam failure detection set, the one or more first channel communications via the one or more channel resources by at least one of: receiving, based on an antenna port quasi co-location associated with the candidate reference signal, one or more downlink signals via one or more control resource sets (CORESETS); or transmitting, based on a spatial relation associated with the candidate reference signal, one or more uplink signals via one or more uplink channel resources. The wireless device may perform, based on the candidate reference signal associated with the first beam failure detection set, the one or more first channel communications via the one or more channel resources by: performing, based on at least one parameter associated with the candidate reference signal, the one or more first channel communications via the one or more channel resources. The at least one parameter associated with the candidate reference signal may override at least one parameter associated with the first beam failure detection set. The at least one parameter associated with the first beam failure detection set may comprise at least one of: for one or more downlink channel transmissions, a transmission configuration indicator (TCI) state associated with the first beam failure detection set; or for one or more uplink channel transmissions, a spatial relation associated with the first beam failure detection set. The one or more first channel communications and the one or more second channel communications comprise at least one of: one or more physical downlink control channel (PDCCH) receptions; one or more physical downlink shared channel (PDSCH) receptions; one or more physical uplink control channel (PUCCH) transmissions; one or more physical uplink shared channel (PUSCH) transmissions; or one or more sounding reference signal (SRS) transmissions. The wireless device may perform, based on the candidate reference signal associated with the first beam failure detection set, the one or more first channel communications via the one or more channel resources by: starting, after a quantity of symbols following reception of the response, monitoring one or more control resource sets (CORESETS) for reception of one or more downlink channel transmissions. The wireless device may comprise one or more processors; and memory storing instructions that, when executed by the one or more processors, cause the wireless device to perform the described method, additional operations and/or include the additional elements. A base station may comprise one or more processors; and memory storing instructions that, when executed by the one or more processors, cause the base station to perform operations complementary to the wireless device described herein. A system may comprise the wireless device configured to perform the described method, additional operations and/or include the additional elements; and a base station configured to perform operations complementary to the described method, additional operations and/or include the additional elements. A computer-readable medium may store instructions that, when executed, cause performance of the described method, complementary operations, additional operations, and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

Communications described herein may be determined, generated, sent, and/or received using any quantity of messages, information elements, fields, parameters, values, indications, information, bits, and/or the like. While one or more examples may be described herein using any of the terms/phrases message, information element, field, parameter, value, indication, information, bit(s), and/or the like, one skilled in the art understands that such communications may be performed using any one or more of these terms, including other such terms. For example, one or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:
1. A method comprising:
receiving, by a wireless device, one or more configuration parameters indicating a plurality of beam failure detection sets of a cell, wherein the plurality of beam failure detection sets comprise a first beam failure detection set of the cell and a second beam failure detection set of the cell;
receiving, based on a first transmission configuration indicator (TCI) state and a second TCI state, one or more first signals via a control resource set (CORESET);
transmitting, based on a beam failure associated with the first beam failure detection set, an uplink signal indicating a candidate reference signal;
receiving a response to the uplink signal; and
after receiving the response, receiving, based on the candidate reference signal and the second TCI state, one or more second signals via the CORESET.
2. The method of claim 1, wherein each beam failure detection set, of the plurality of beam failure detection sets, comprises one or more beam failure detection reference signals.

3. The method of claim 1, further comprising:
   determining, based on one or more measurements of one or more beam failure detection reference signals of the first beam failure detection set, the beam failure associated with the first beam failure detection set.
4. The method of claim 1, further comprising:
   receiving an activation command associated with the CORESET, wherein the activation command indicates the first TCI state and the second TCI state; and
   after receiving the activation command, monitoring, based on the first TCI state and the second TCI state, the CORESET.
5. The method of claim 1, wherein the receiving, based on the candidate reference signal and the second TCI state, the one or more second signals via the CORESET comprises:
   receiving, using a spatial domain filter associated with the candidate reference signal, one or more first downlink signals via the CORESET; and
   receiving, using a spatial domain filter associated with the second TCI state, one or more second downlink signals via the CORESET.
6. The method of claim 1, further comprising:
   starting, after a quantity of symbols following reception of the response, monitoring the CORESET for reception of the one or more second signals.
7. The method of claim 1, wherein the one or more configuration parameters indicates an uplink resource associated with the candidate reference signal.
8. The method of claim 1, wherein the uplink signal comprises a medium-access control element (MAC-CE), wherein the MAC-CE comprises:
   a candidate beam reference signal field indicating the candidate reference signal; and
   a serving cell index indicating the cell.
9. The method of claim 1, wherein at least one demodulation reference signal (DMRS) antenna port is associated with the one or more first signals via the CORESET and is quasi co-located with:
   a first reference signal indicated by the first TCI state; and
   a second reference signal indicated by the second TCI state.
10. The method of claim 1, wherein the receiving the one or more second signals comprises:
    receiving, based on at least one parameter associated with the candidate reference signal, the one or more second signals via the CORESET, wherein the at least one parameter associated with the candidate reference signal overrides at least one parameter associated with the first TCI state.
11. The method of claim 1, wherein the one or more second signals is received via at least one of:
    one or more physical downlink control channel (PDCCH) receptions; or
    one or more physical downlink shared channel (PDSCH) receptions.
12. The method of claim 1, wherein the receiving the one or more second signals comprises:
    receiving, based on an antenna port quasi co-location associated with the candidate reference signal, one or more downlink signals via the CORESET.
13. The method of claim 1, wherein the first TCI state is associated with the first beam failure detection set, and wherein the second TCI state is associated with the second beam failure detection set.
14. A method comprising:
    receiving, by a wireless device, one or more configuration parameters indicating a plurality of beam failure detection sets of a cell, wherein the plurality of beam failure detection sets comprise a first beam failure detection set of the cell and a second beam failure detection set of the cell, and wherein the one or more configuration parameters further indicate a first transmission configuration indicator (TCI) state and a second TCI state;
    transmitting, based on a beam failure associated with the first beam failure detection set, an uplink signal indicating a candidate reference signal;
    receiving a response to the uplink signal; and
    after receiving the response, communicating, based on the candidate reference signal and the second TCI state, by at least one of:
        receiving one or more downlink signals via a control resource set (CORESET); or
        transmitting one or more uplink signals via an uplink channel resource.
15. The method of claim 14, wherein the receiving the one or more downlink signals comprises:
    receiving, based on an antenna port quasi co-location associated with the candidate reference signal, the one or more downlink signals via the CORESET.
16. The method of claim 14, wherein the receiving the one or more downlink signals comprises:
    receiving, based on at least one parameter associated with the candidate reference signal, the one or more downlink signals, wherein the at least one parameter associated with the candidate reference signal overrides at least one parameter associated with the first beam failure detection set; and
    wherein the at least one parameter associated with the first beam failure detection set comprises, for one or more downlink channel transmissions, the first TCI state.
17. The method of claim 14, wherein the receiving the one or more downlink signals comprises at least one of:
    receiving one or more physical downlink control channel (PDCCH) receptions; or
    receiving one or more physical downlink shared channel (PDSCH) receptions.
18. The method of claim 14, further comprising:
    starting, after a quantity of symbols following reception of the response, monitoring the CORESET for reception of one or more downlink channel transmissions.

\* \* \* \* \*